US012658378B2

(12) United States Patent
Morita et al.

(10) Patent No.: US 12,658,378 B2
(45) Date of Patent: Jun. 16, 2026

(54) SOLID ELECTROLYTIC CAPACITOR AND METHOD OF MANUFACTURING SOLID ELECTROLYTIC CAPACITOR

(71) Applicant: TDK Corporation, Tokyo (JP)

(72) Inventors: Takaaki Morita, Tokyo (JP); Hideyuki Kobayashi, Tokyo (JP); Yusuke Takahashi, Tokyo (JP); Masaki Oikawa, Tokyo (JP); Tetsushi Inoue, Tokyo (JP)

(73) Assignee: TDK CORPORATION, Tokyo (JP)

( * ) Notice: Subject to any disclaimer, the term of this patent is extended or adjusted under 35 U.S.C. 154(b) by 111 days.

(21) Appl. No.: 18/639,569

(22) Filed: Apr. 18, 2024

(65) Prior Publication Data

US 2024/0355554 A1 Oct. 24, 2024

(30) Foreign Application Priority Data

| Apr. 21, 2023 | (JP) | ................................. | 2023-070104 |
| Apr. 21, 2023 | (JP) | ................................. | 2023-070109 |
| Apr. 21, 2023 | (JP) | ................................. | 2023-070112 |
| Apr. 17, 2024 | (JP) | ................................. | 2024-066916 |
| Apr. 17, 2024 | (JP) | ................................. | 2024-067056 |

(51) Int. Cl.
*H01G 9/15* (2006.01)
*H01G 9/07* (2006.01)

(52) U.S. Cl.
CPC ................. *H01G 9/15* (2013.01); *H01G 9/07* (2013.01)

(58) Field of Classification Search
CPC ............. H01G 9/15; H01G 9/07; H01G 9/012
See application file for complete search history.

(56) References Cited

U.S. PATENT DOCUMENTS

| 2007/0297121 A1* | 12/2007 | Yoshida | ................... | H01G 9/15 |
| | | | | 361/523 |
| 2017/0365415 A1* | 12/2017 | Demizu | ................... | H01G 9/08 |
| 2018/0061583 A1 | 3/2018 | Suzuki | | |
| 2019/0122827 A1* | 4/2019 | Furukawa | ................ | H01G 9/15 |

(Continued)

FOREIGN PATENT DOCUMENTS

| JP | 2012-193420 A | 10/2012 |
| JP | 6686975 B2 | 4/2020 |

(Continued)

OTHER PUBLICATIONS

Translation of WO '408 (Year: 2018).*

*Primary Examiner* — Dion R. Ferguson
(74) *Attorney, Agent, or Firm* — XSENSUS LLP

(57) ABSTRACT

A solid electrolytic capacitor according to one embodiment of the present disclosure may include a stacked body having a plurality of stacked solid electrolytic capacitor elements being stacked, a first side electrode arranged on a first side surface of the stacked body, and a second side electrode arranged on a second side surface of the stacked body. Each of the solid electrolytic capacitor elements may include an anode electrode layer, a dielectric layer, a cathode electrode layer, a solid electrolyte layer, and an insulating region arranged on the anode electrode layer and adjacent to a side of the solid electrolyte layer. The first distance between the anode electrode layer and the second side electrode may be smaller than the second distance between the insulating region and the second side electrode.

21 Claims, 80 Drawing Sheets

(56)                    References Cited

U.S. PATENT DOCUMENTS

| | | | |
|---|---|---|---|
| 2019/0189361 A1 | 6/2019 | Kashihara et al. | |
| 2020/0194187 A1 * | 6/2020 | Kumakawa | H01G 9/08 |
| 2020/0303130 A1 * | 9/2020 | Furukawa | H01G 9/048 |
| 2020/0335284 A1 * | 10/2020 | Yamazaki | H01G 9/025 |
| 2023/0062760 A1 * | 3/2023 | Suzuki | H01G 9/055 |
| 2024/0128028 A1 * | 4/2024 | Furukawa | H01G 9/028 |
| 2024/0128029 A1 * | 4/2024 | Usa | H01G 9/15 |
| 2024/0355554 A1 * | 10/2024 | Morita | H01G 9/15 |

FOREIGN PATENT DOCUMENTS

| | | | | |
|---|---|---|---|---|
| JP | 6724881 B2 | 7/2020 | | |
| JP | 6776731 B2 | 10/2020 | | |
| JP | 2020-194825 A | 12/2020 | | |
| JP | 7001891 B2 | 1/2022 | | |
| JP | 7020504 B2 | 2/2022 | | |
| JP | 2022-068665 A | 5/2022 | | |
| WO | WO-2018235408 A1 * | 12/2018 | | H01M 10/0566 |
| WO | WO-2022131020 A1 * | 6/2022 | | H01G 9/012 |
| WO | WO-2023286484 A1 * | 1/2023 | | H01G 9/055 |
| WO | WO-2023188555 A1 * | 10/2023 | | H01G 9/15 |
| WO | WO-2024070529 A1 * | 4/2024 | | H01G 9/04 |

* cited by examiner

*Fig.1*
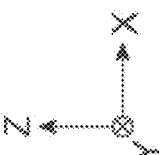

*Fig.3*
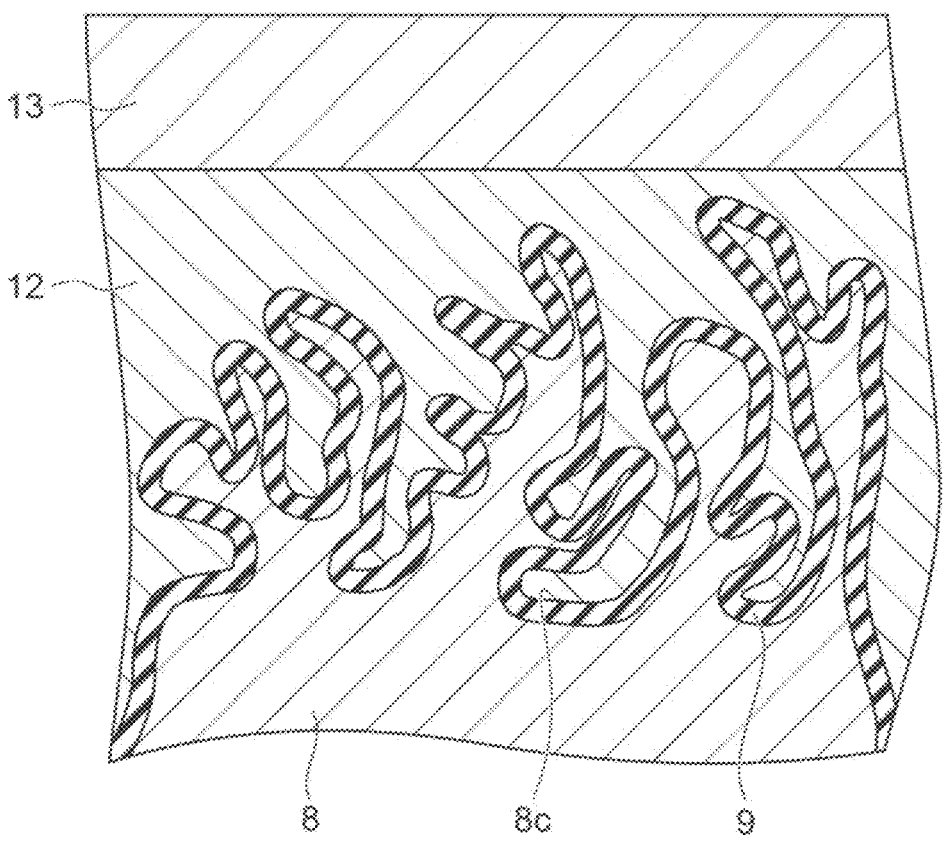
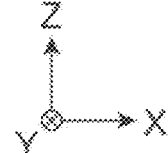

*Fig.4*
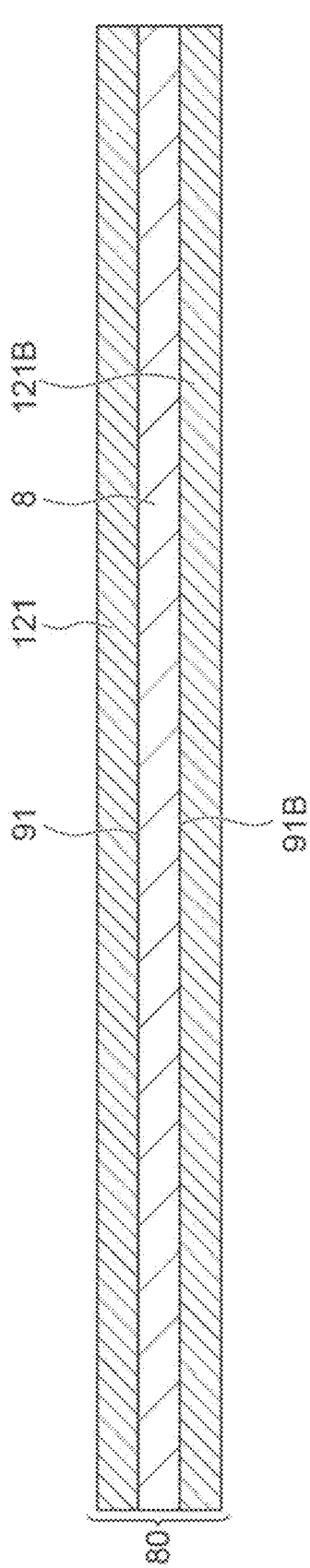
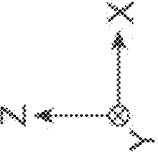

*Fig.8*
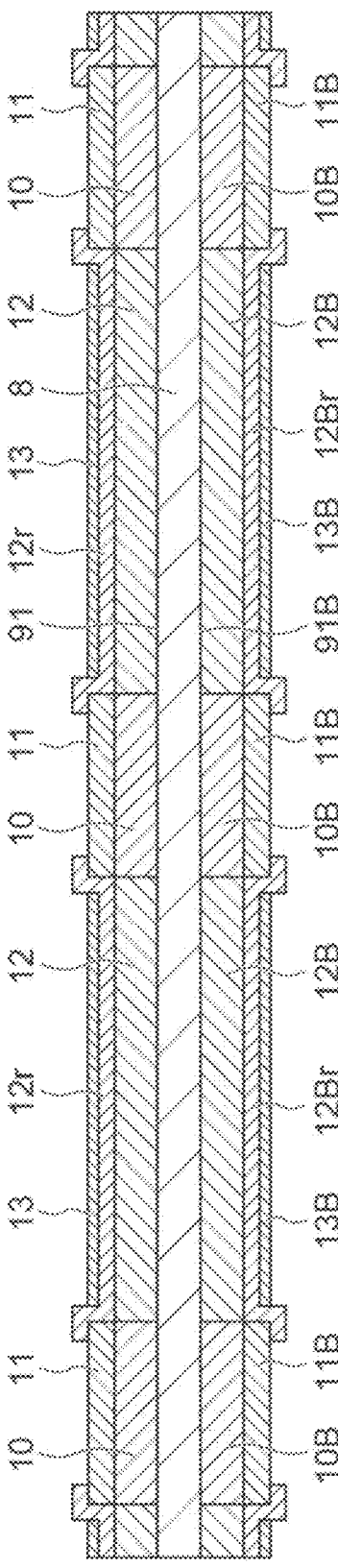
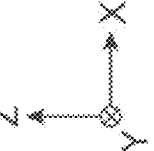

*Fig.40*
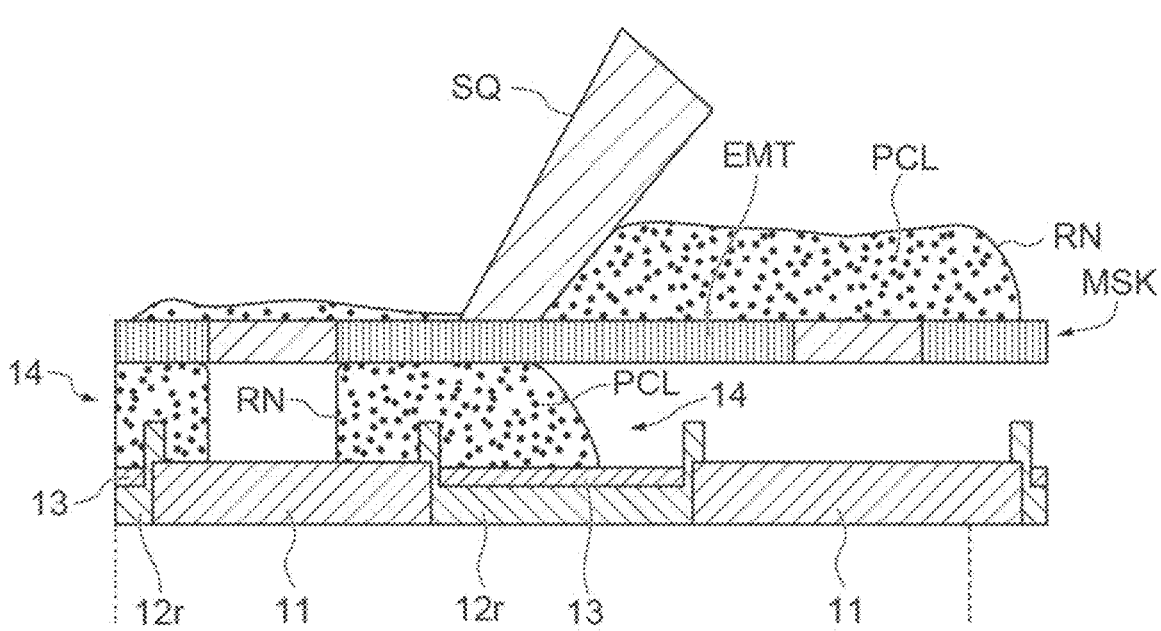
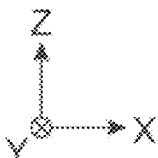

*Fig.67*
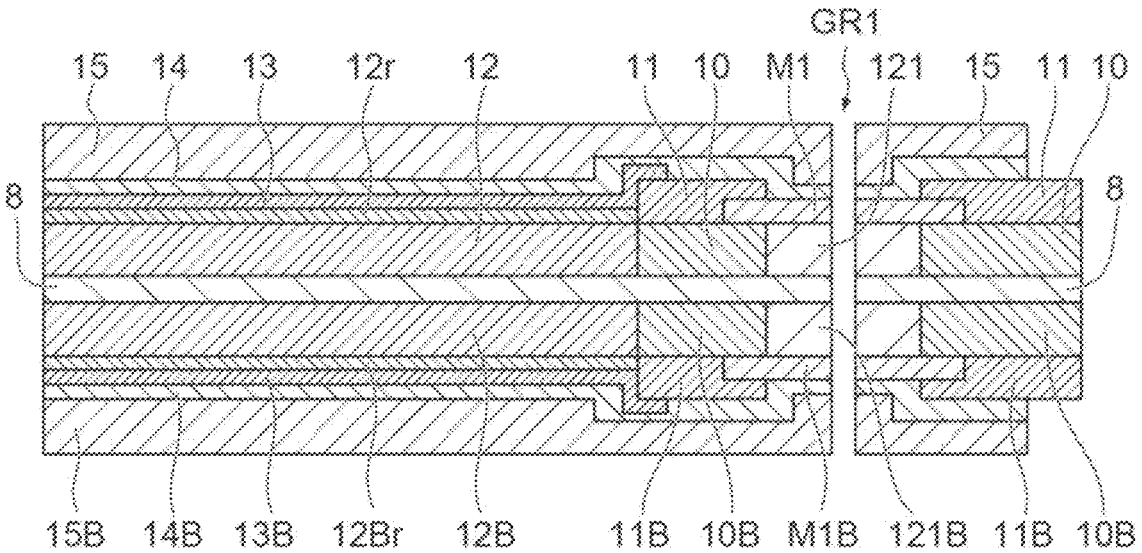
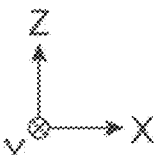

*Fig.68*
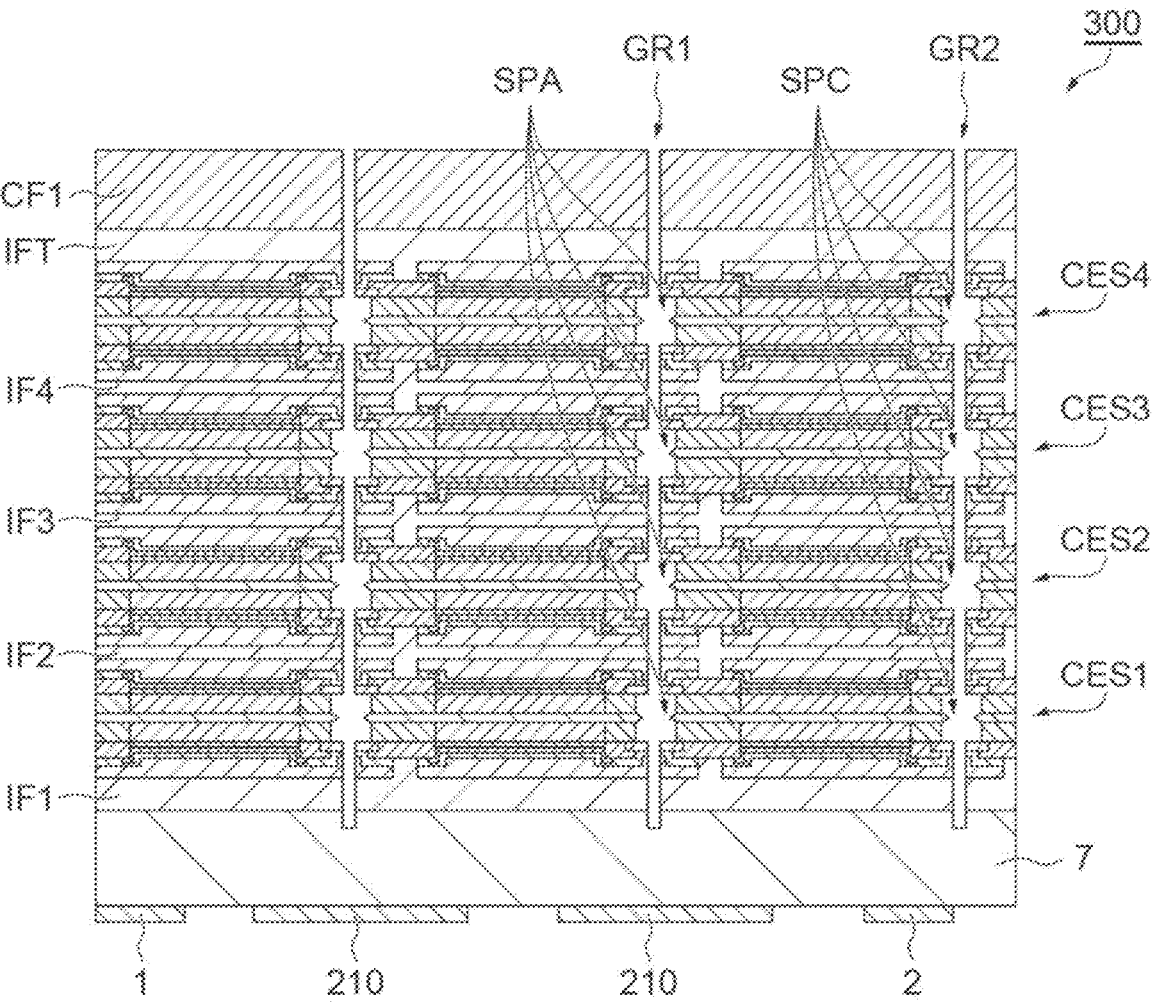
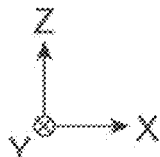

*Fig.69*
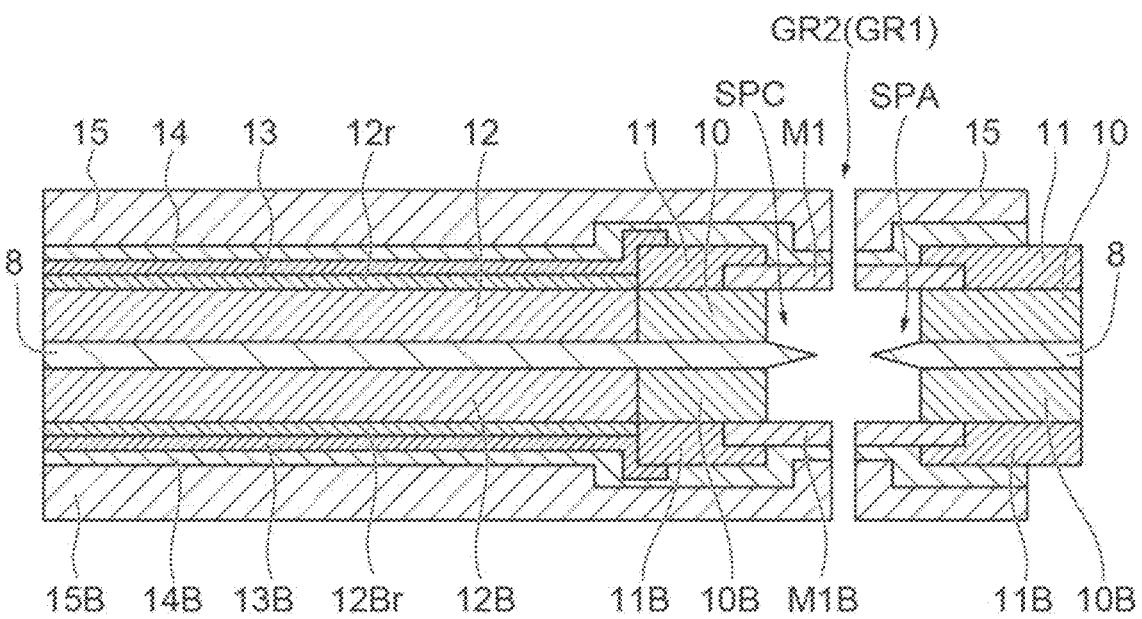
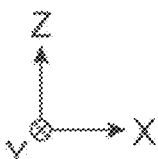

*Fig.71*
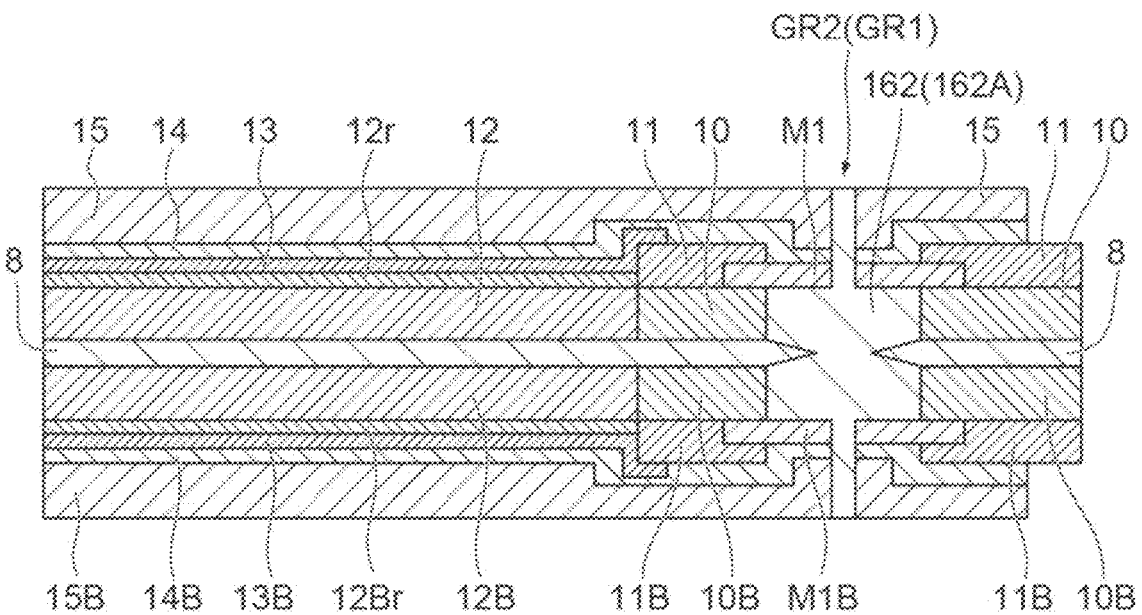
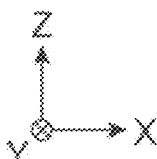

*Fig.73*
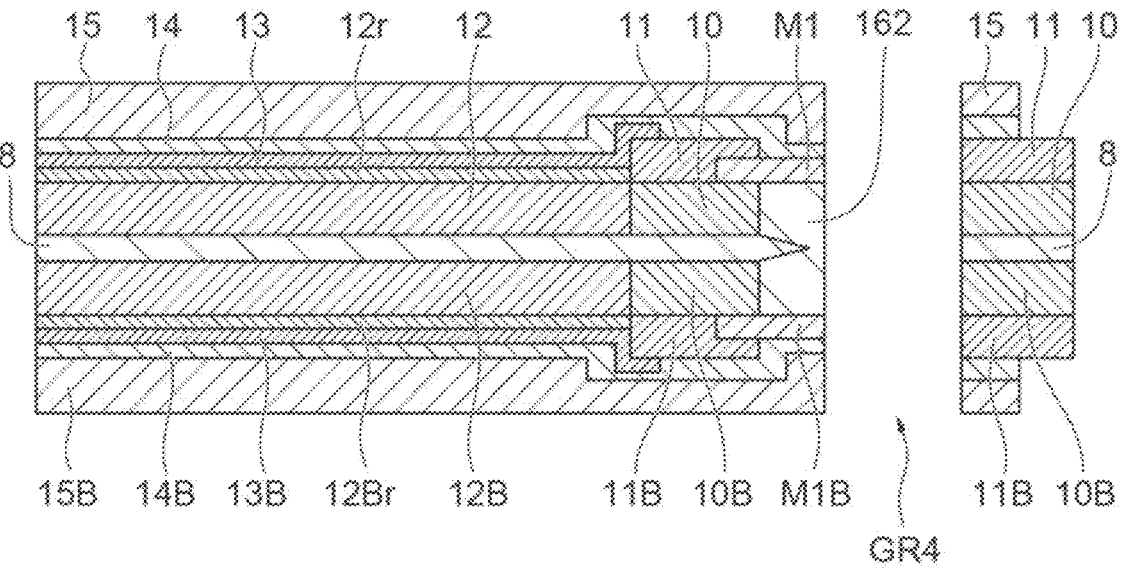
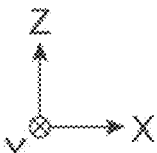

SOLID ELECTROLYTIC CAPACITOR AND METHOD OF MANUFACTURING SOLID ELECTROLYTIC CAPACITOR

TECHNICAL FIELD

The present disclosure relates to a solid electrolytic capacitor and a method of manufacturing the solid electrolytic capacitor.

BACKGROUND

Technologies relating to a solid electrolytic capacitor and a method of manufacturing the solid electrolytic capacitor are known.

Solid electrolytic capacitors are disclosed in the following Japanese patent documents: Japanese Patent No. 6724881, Japanese Patent No. 7020504, Japanese Patent No. 6686975, Japanese Patent No. 6776731, Japanese Unexamined Patent Publication No. 2022-68665, Japanese Unexamined Patent Publication No. 2020-194825, Japanese Patent No. 7001891, and Japanese Unexamined Patent Publication No. 2012-193420.

SUMMARY

A solid electrolytic capacitor according to one embodiment of the present disclosure is provided with a stacked body including a plurality of solid electrolytic capacitor elements being stacked; a first side electrode arranged on a first side surface of the stacked body; and a second side electrode arranged on a second side surface of the stacked body, and each of the solid electrolytic capacitor elements includes an anode electrode layer electrically connected to the first side electrode, a dielectric layer arranged on the anode electrode layer, a cathode electrode layer electrically connected to the second side electrode, a solid electrolyte layer interposed between the dielectric layer and the cathode electrode layer, and an insulating region arranged on the anode electrode layer and adjacent to a side surface of the solid electrolyte layer, and a first distance between the anode electrode layer and the second side electrode is smaller than a second distance between the insulating region and the second side electrode.

BRIEF DESCRIPTION OF THE DRAWINGS

FIG. 1 is a diagram illustrating the fundamental structure of a solid electrolytic capacitor;

FIG. 3 is a diagram illustrating an example of a structure in the vicinity of a solid electrolyte layer;

FIG. 4 is a diagram illustrated to describe a method of manufacturing a solid electrolytic capacitor;

FIG. 8 is a diagram illustrated to describe a method of manufacturing a solid electrolytic capacitor;

FIG. 40 is a diagram illustrated to describe a method of forming a cathode electrode layer;

3

Figure 41:
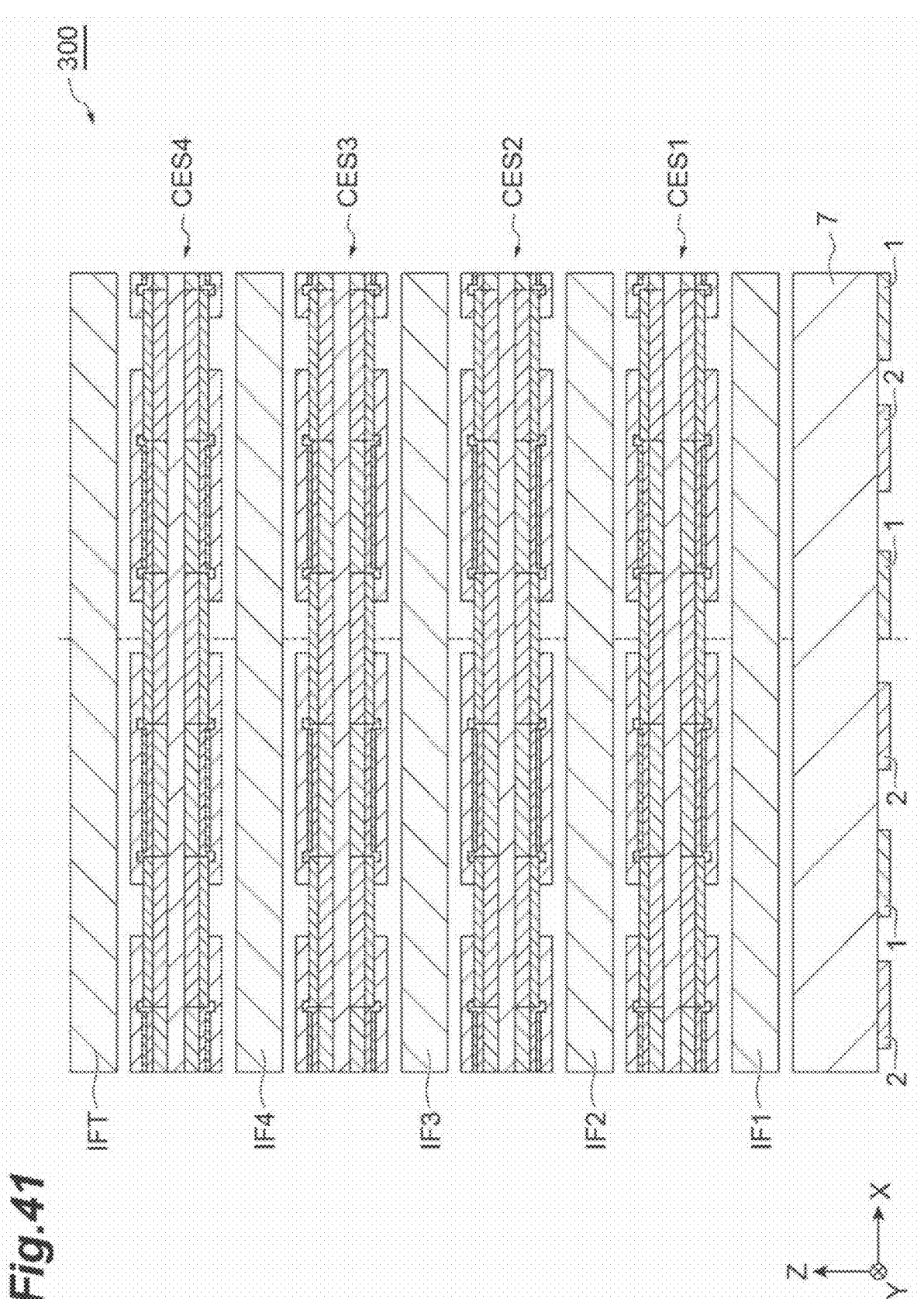
Figure 42:
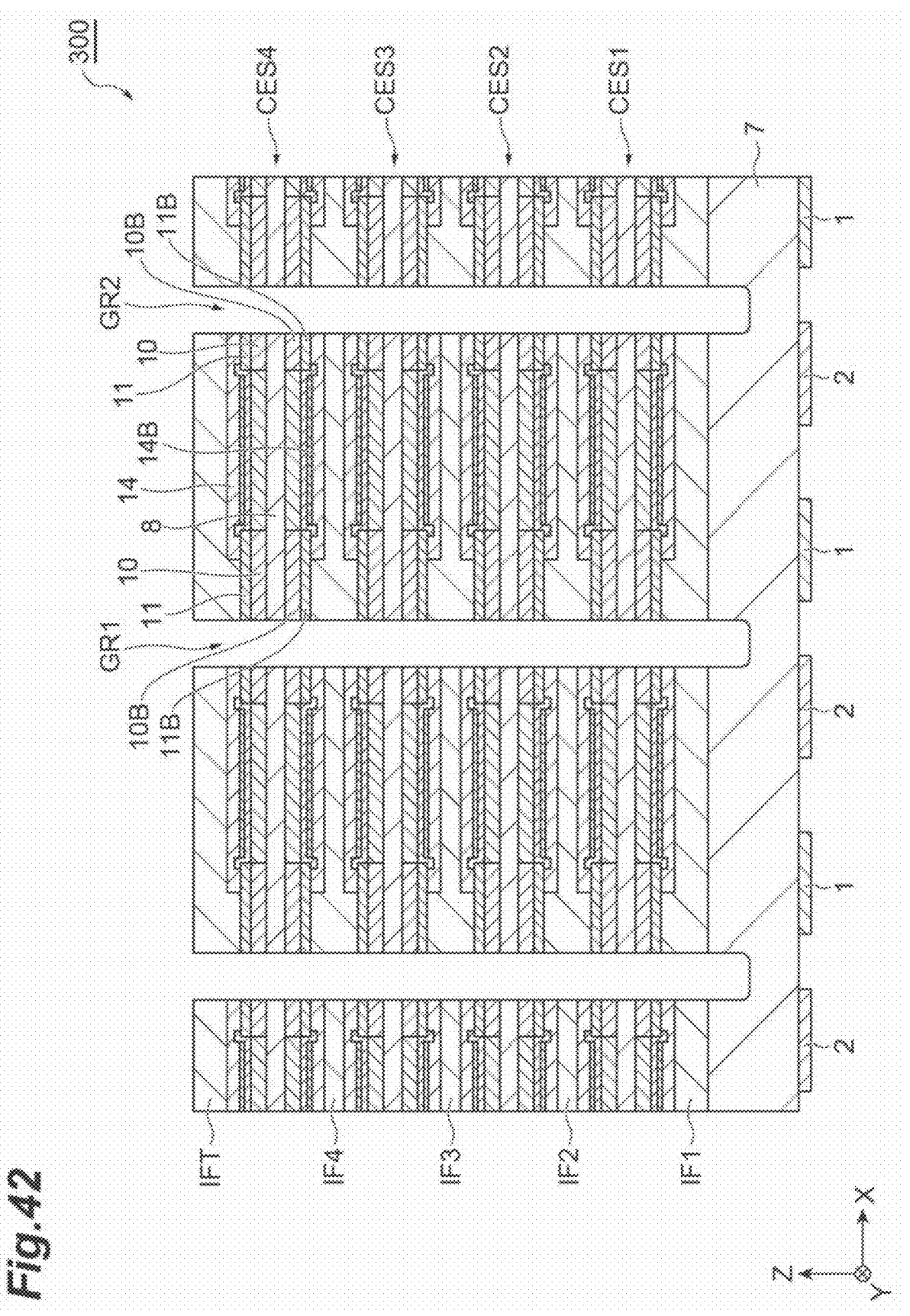
Figure 43:
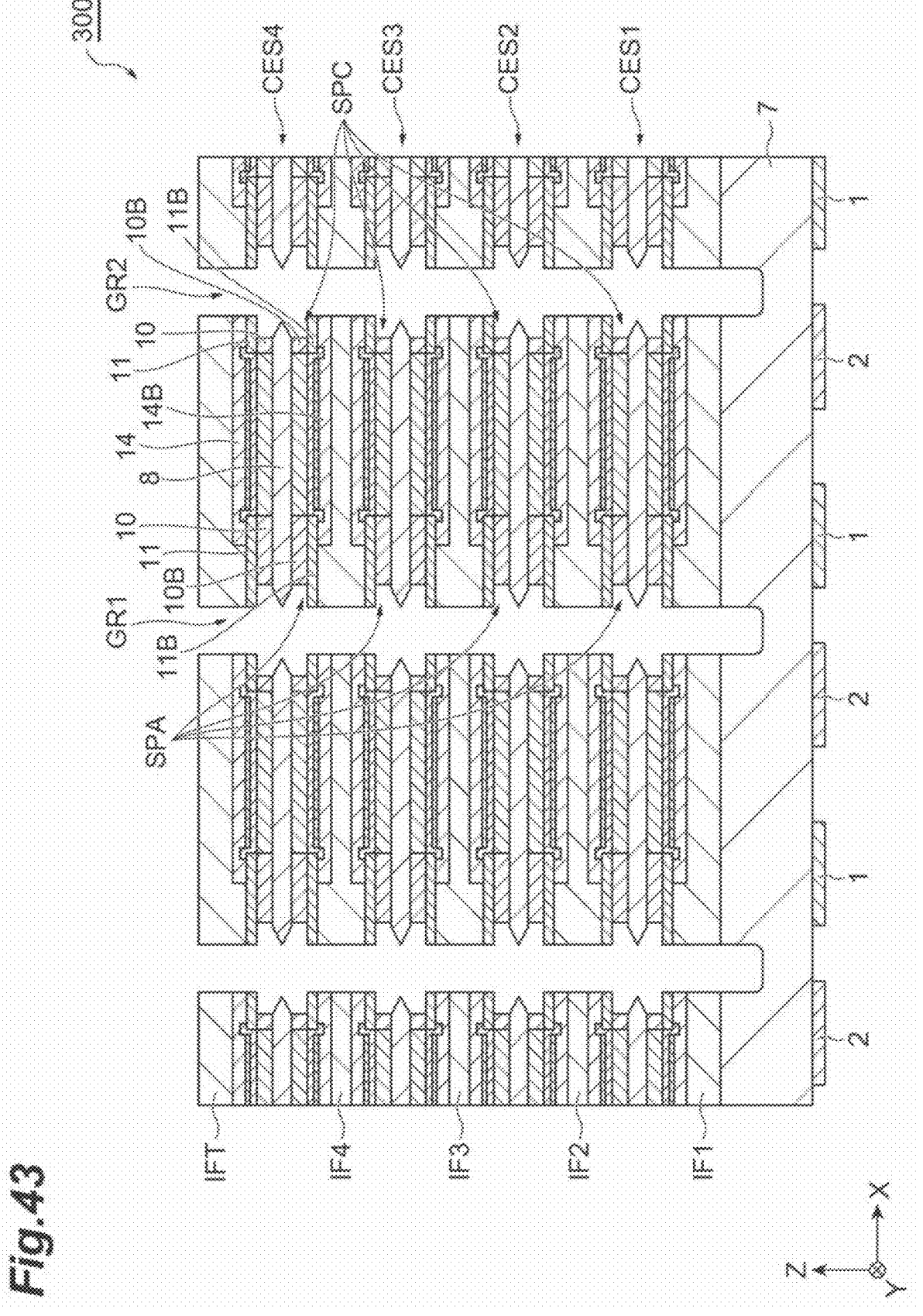
Figure 44:
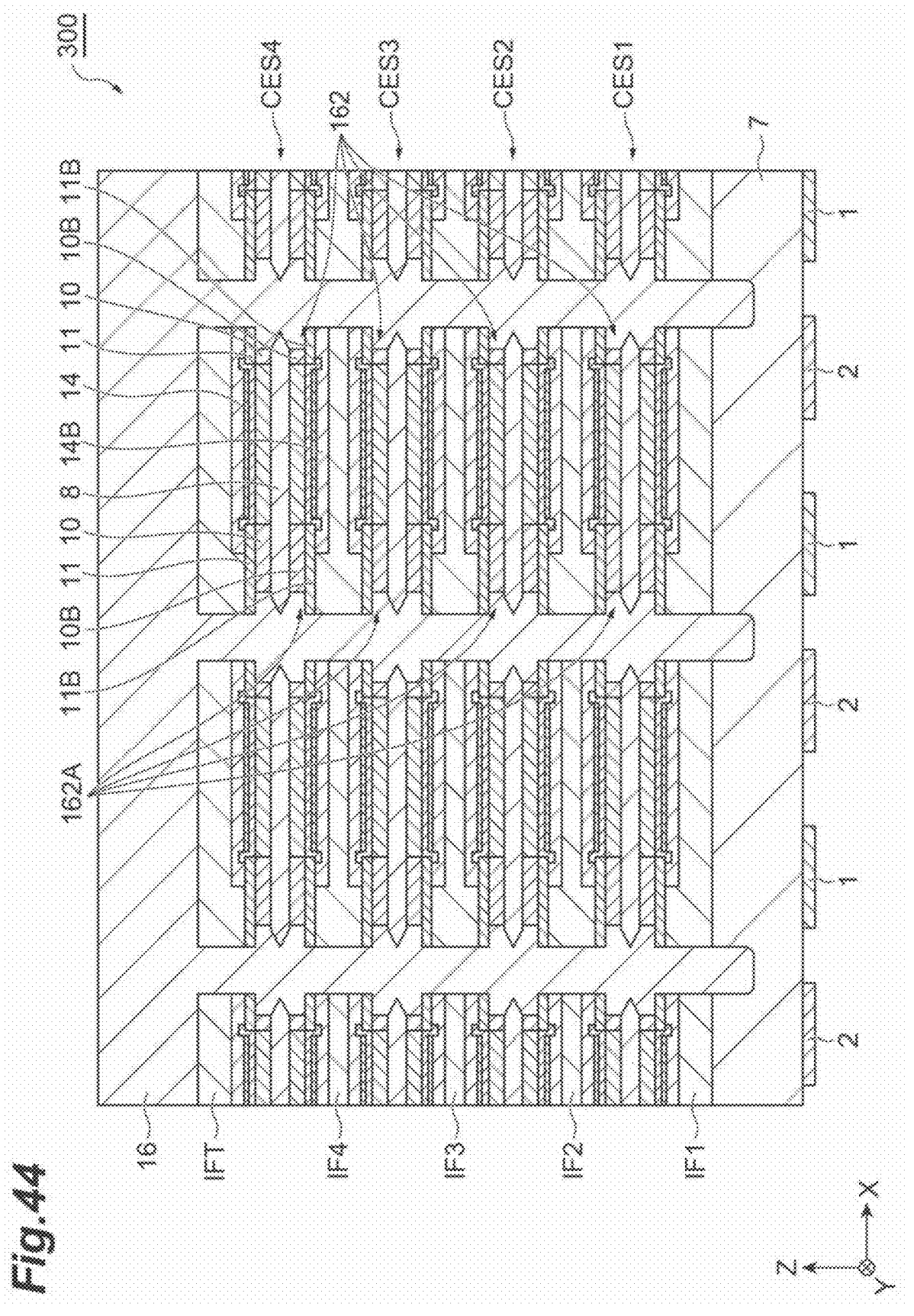
Figure 45:
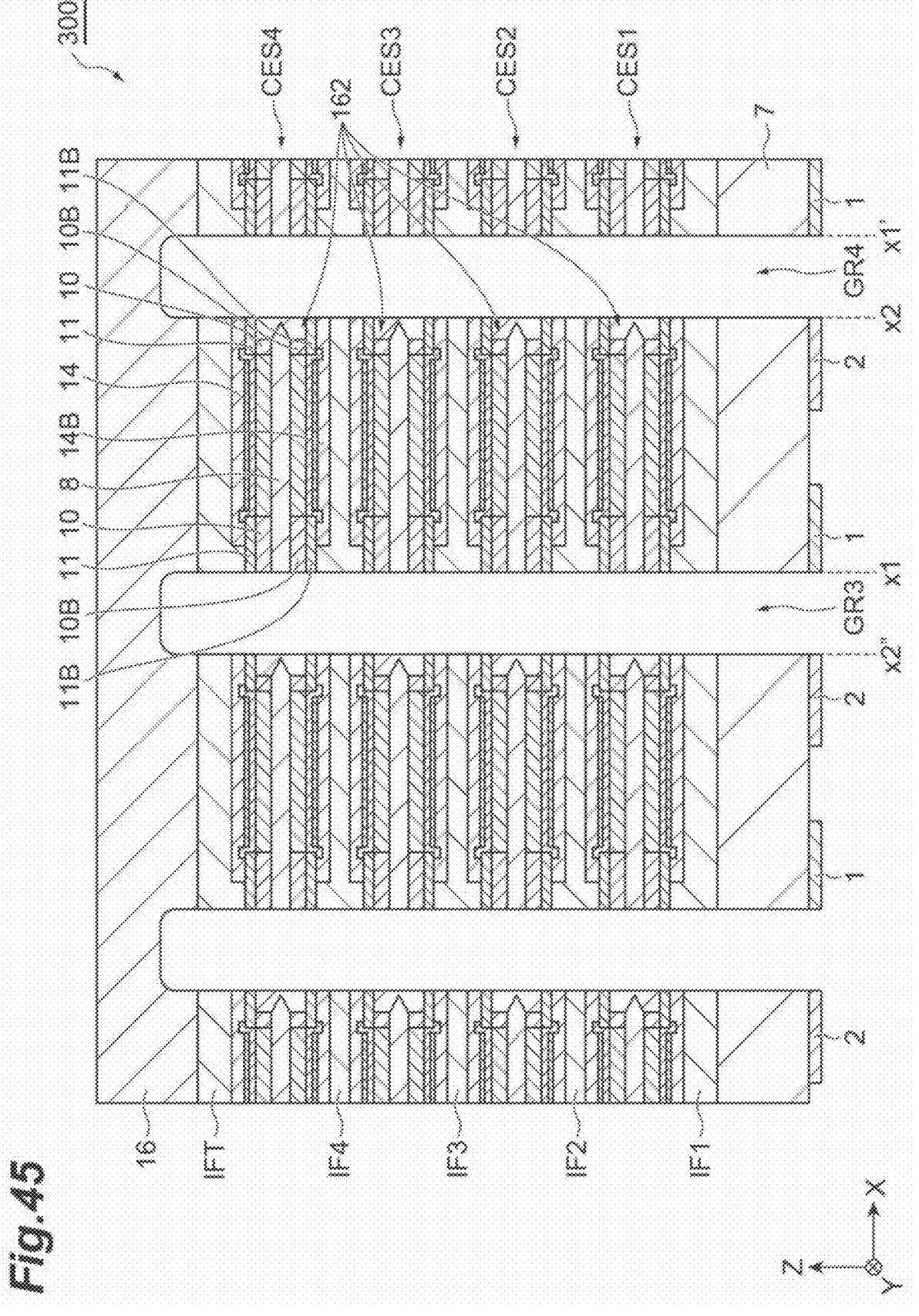
Figure 46:
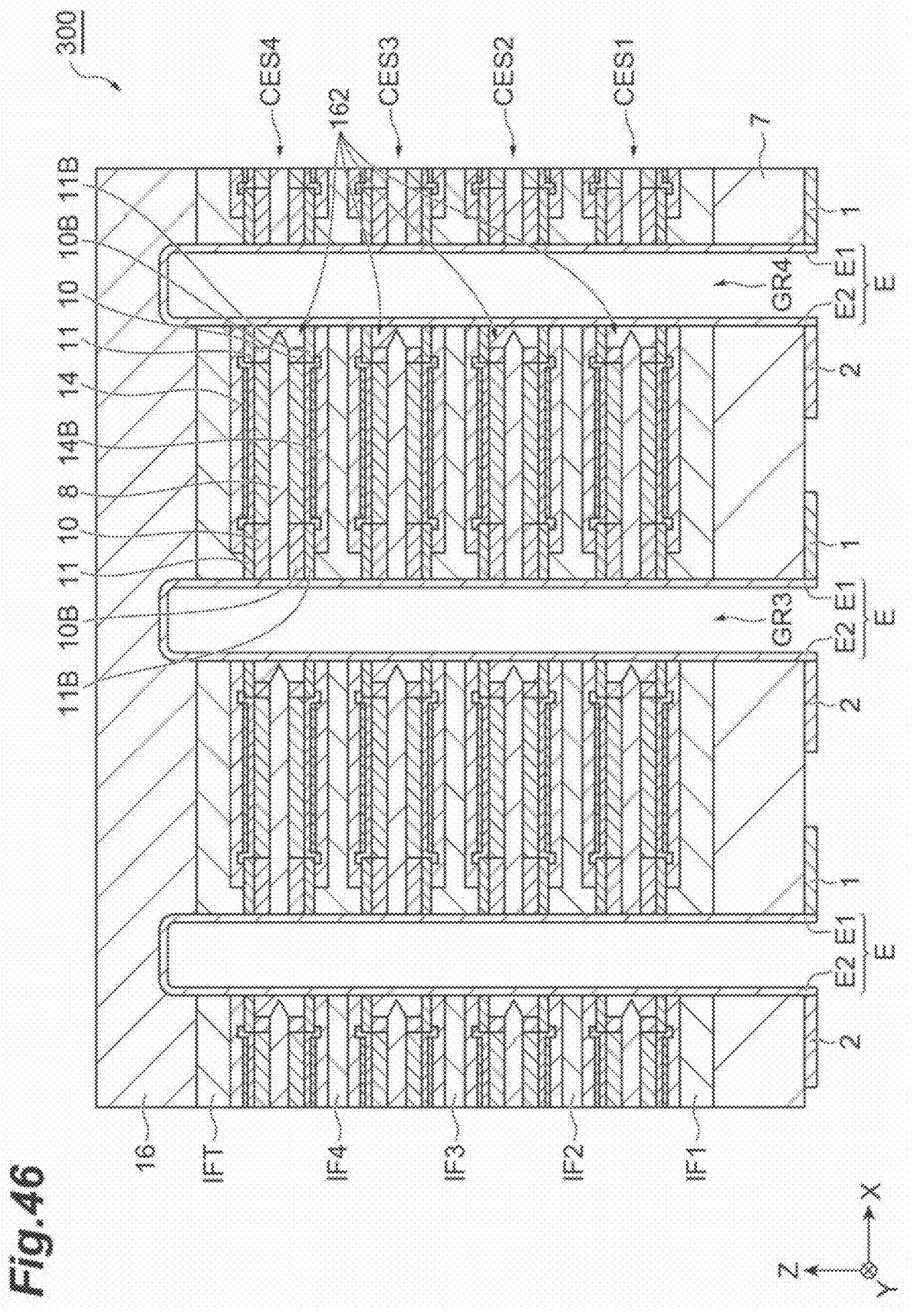
Figure 47:
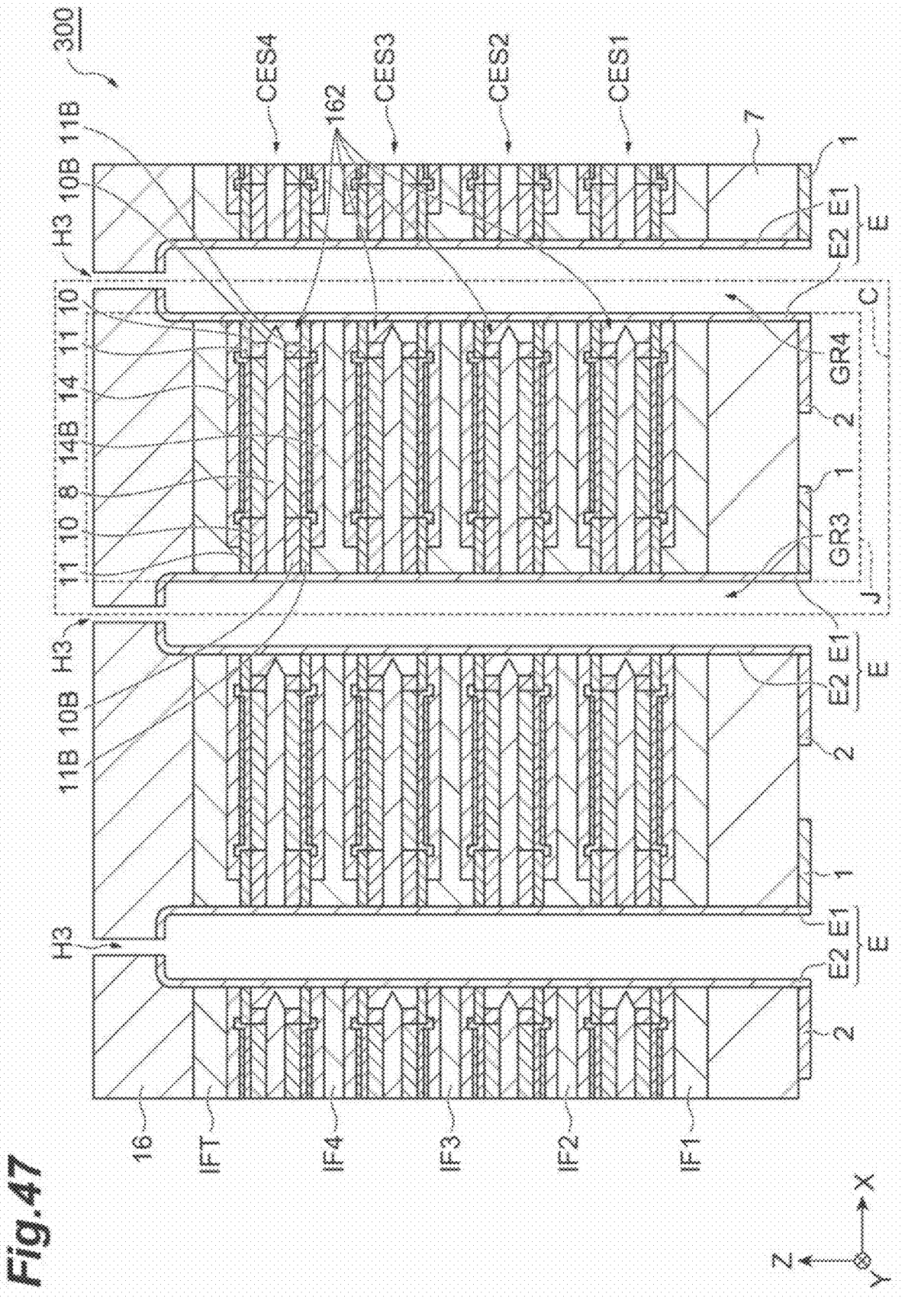
Figures 48A, 48B:
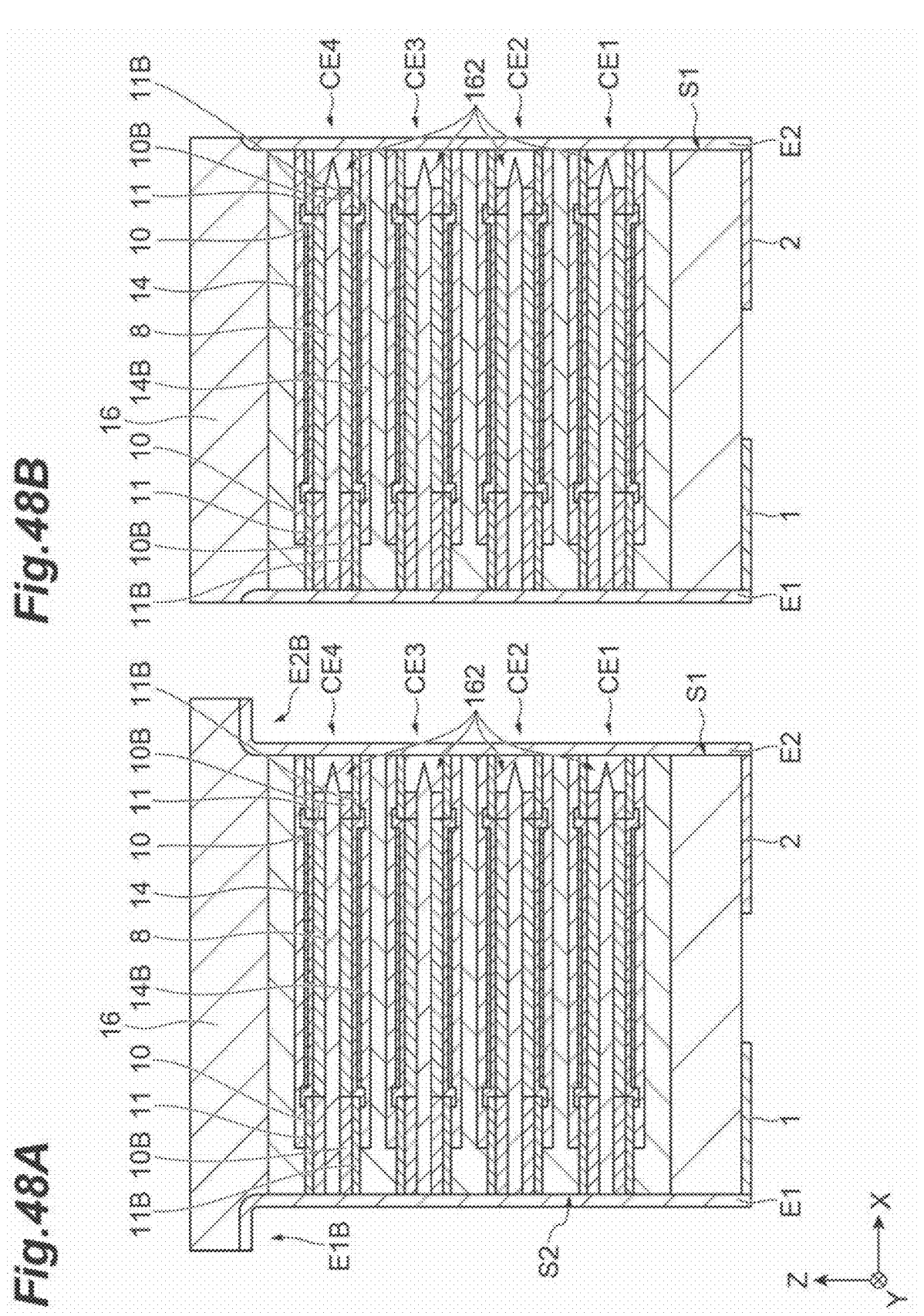
Figure 49:
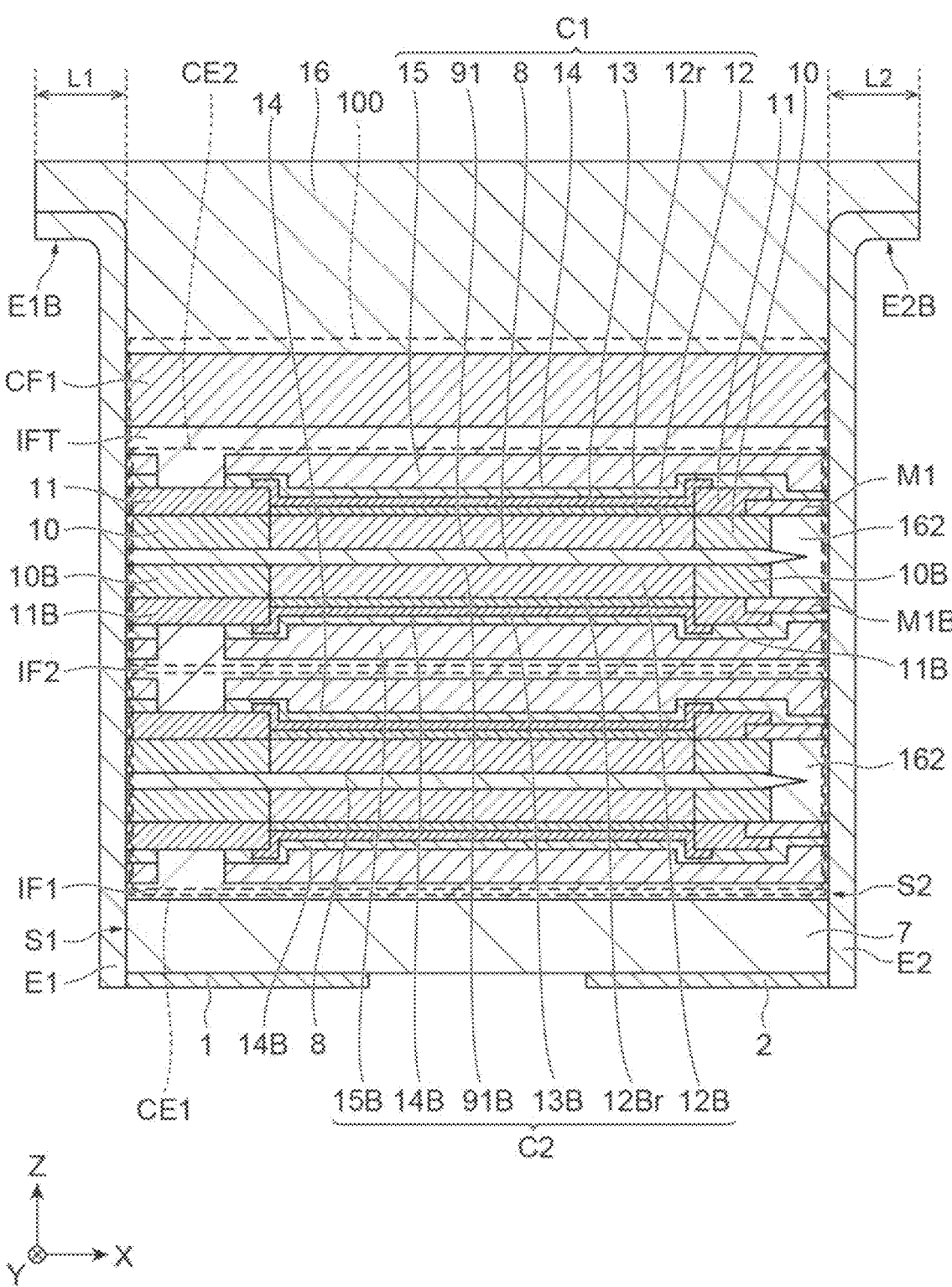
Figure 50:
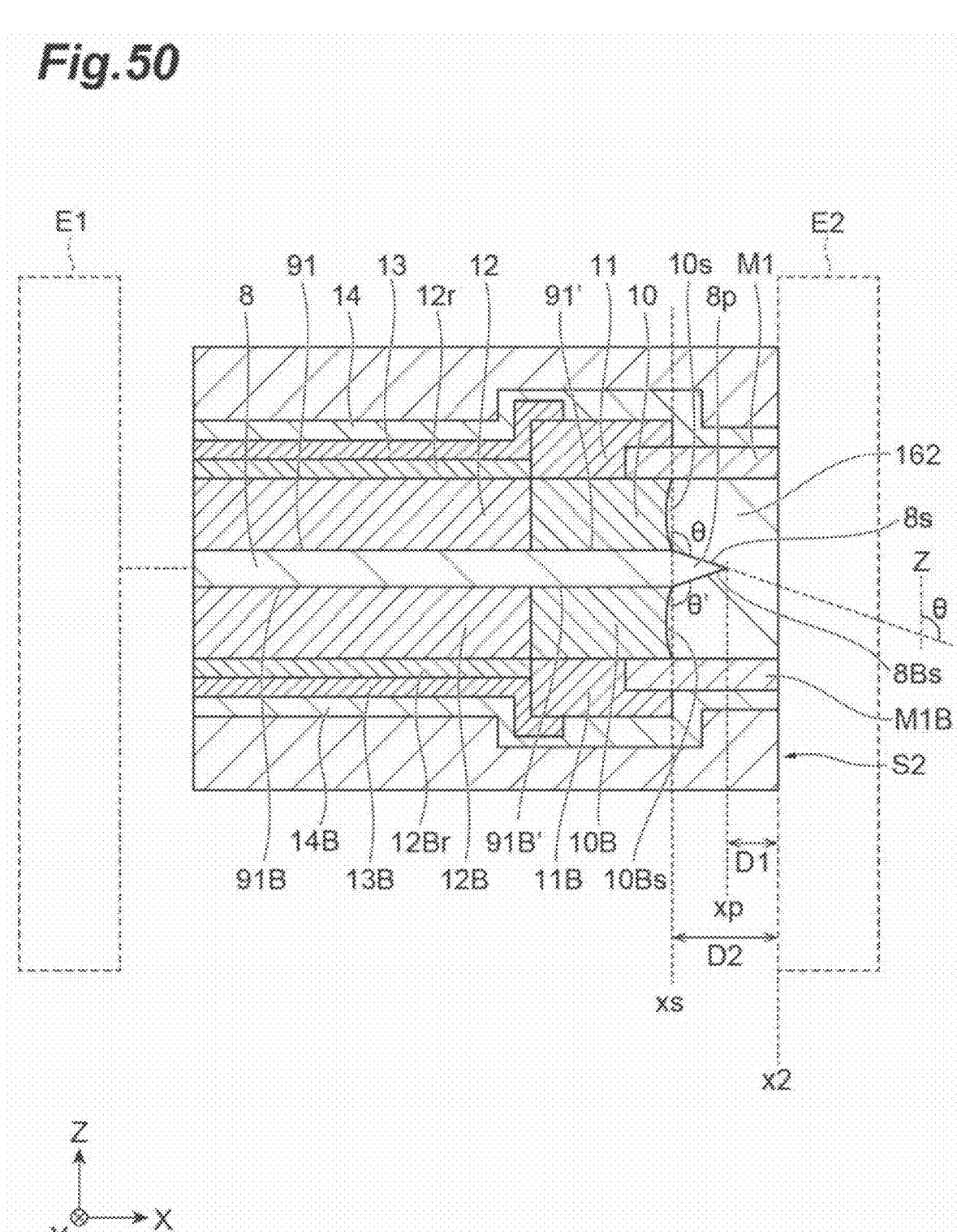
Figure 51:
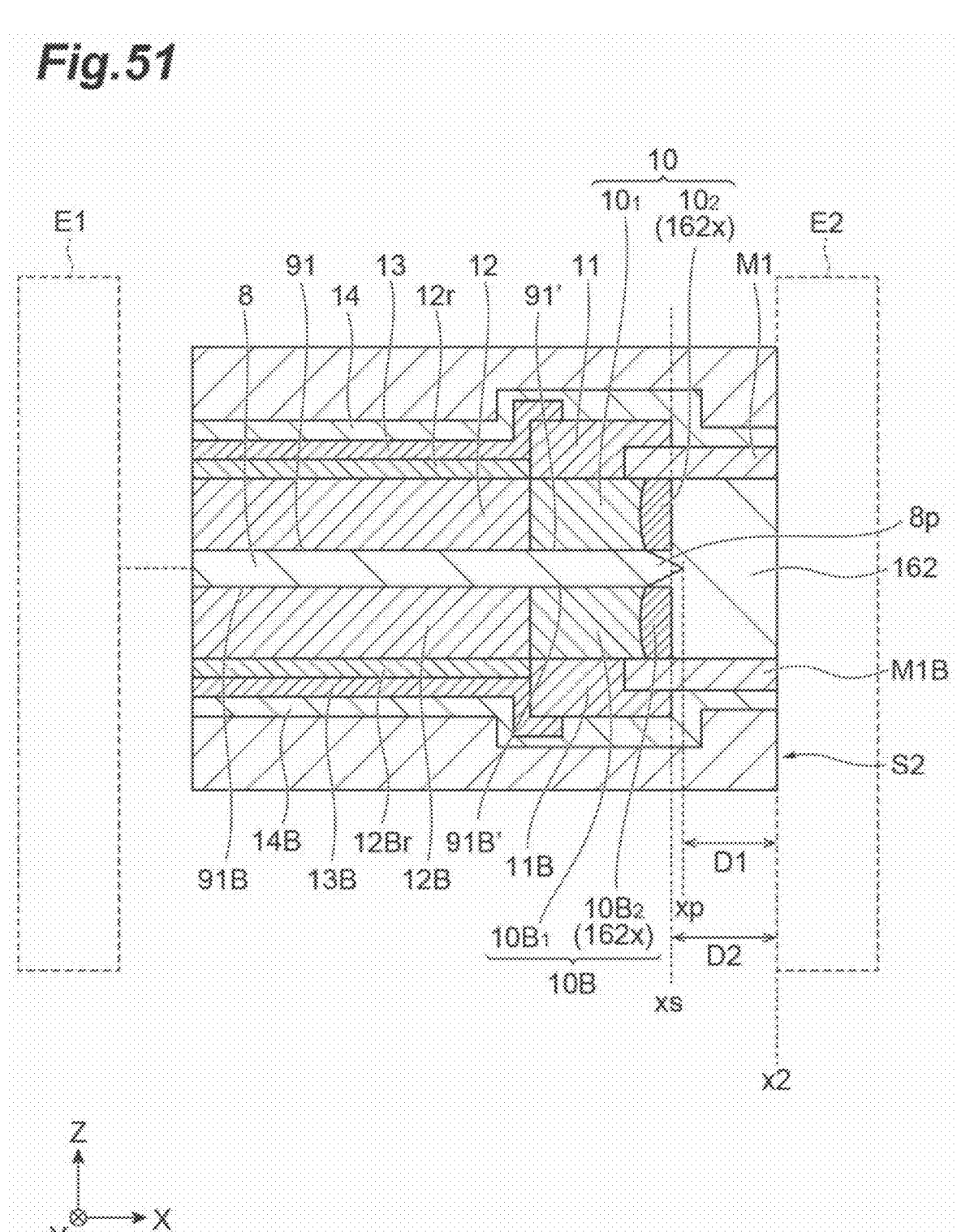
Figure 52:
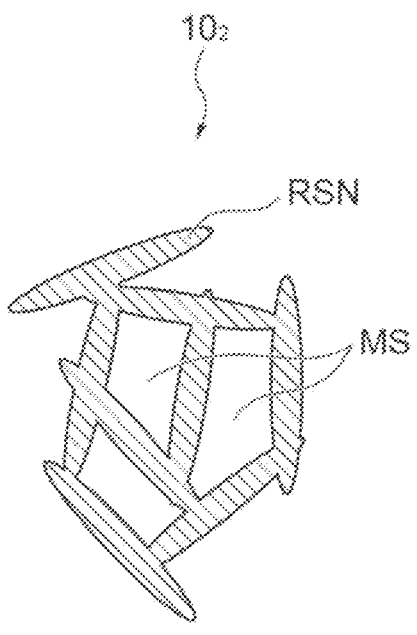
Figure 53:
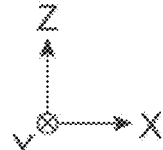
Figure 54:
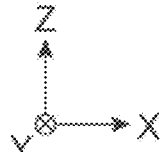
Figure 55:
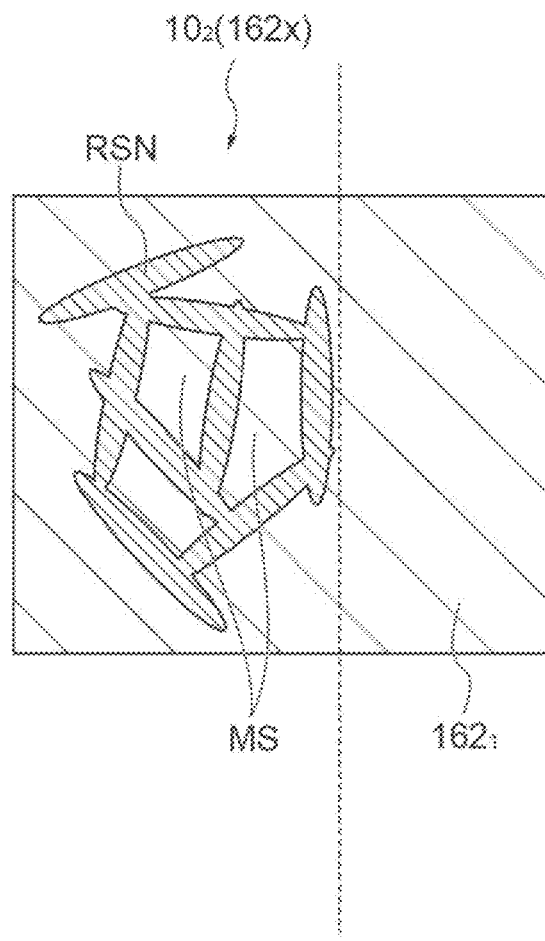
Figure 56:
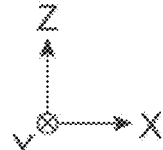
Figure 57:
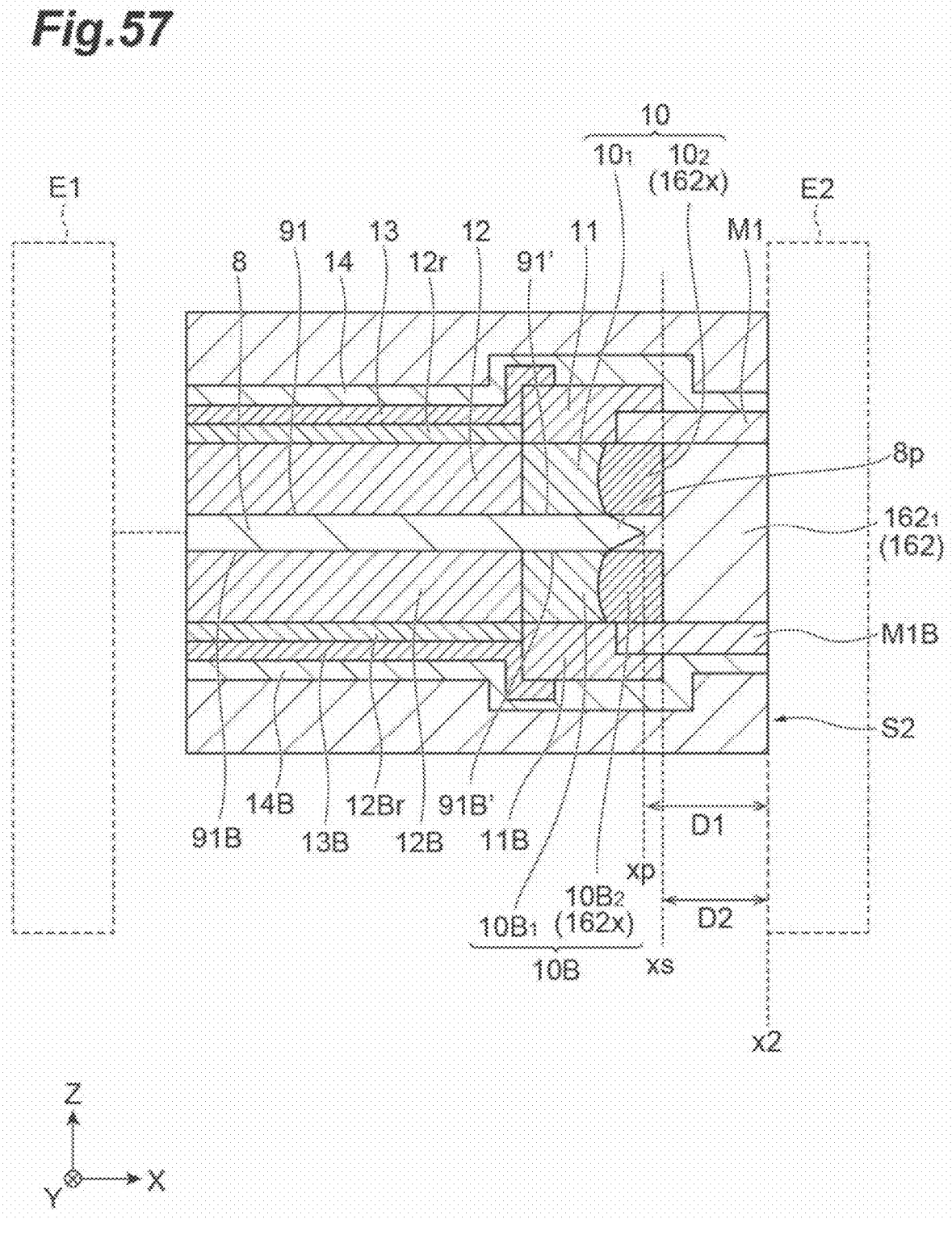
Figures 58A, 58B:
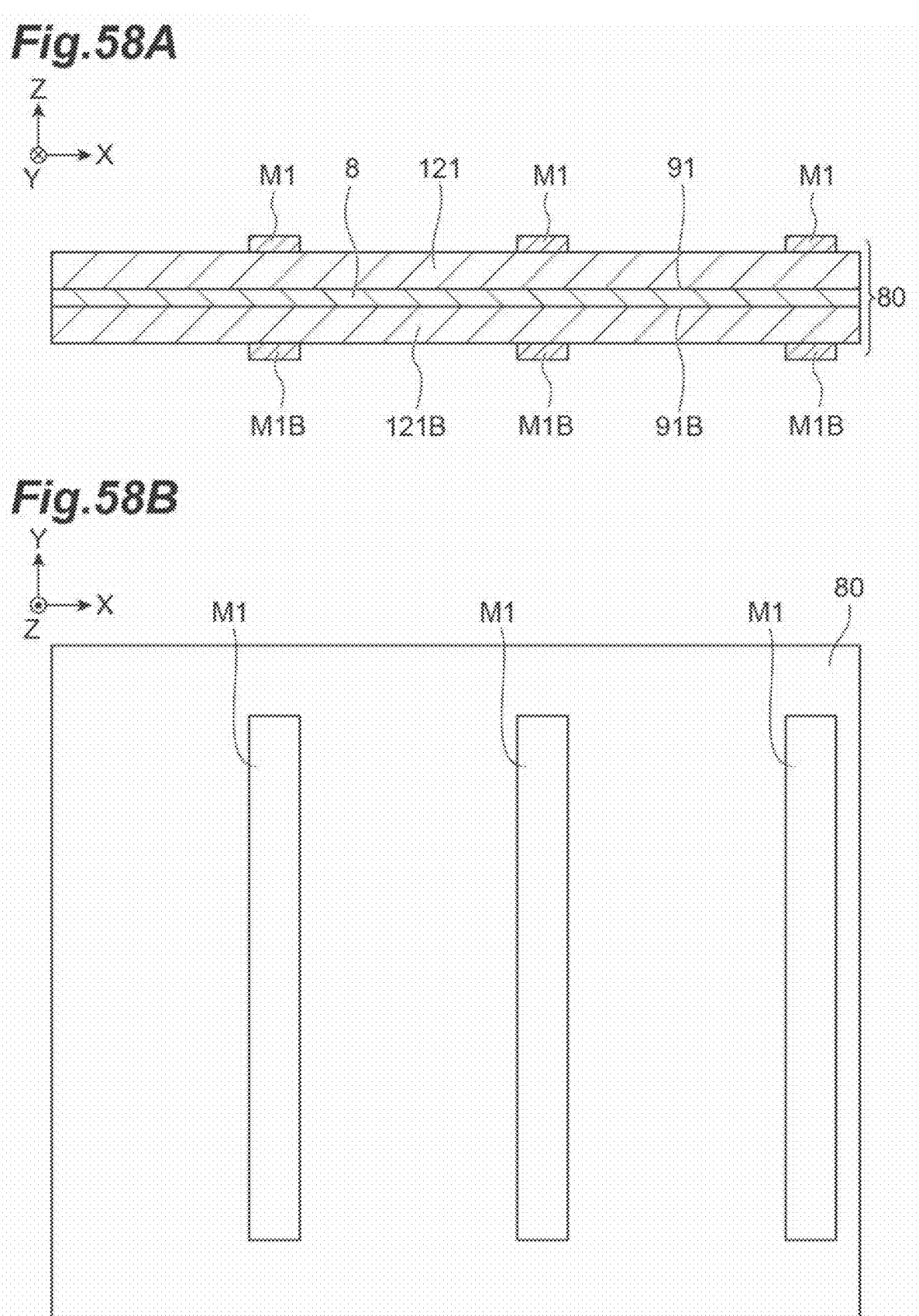
Figure 59A:
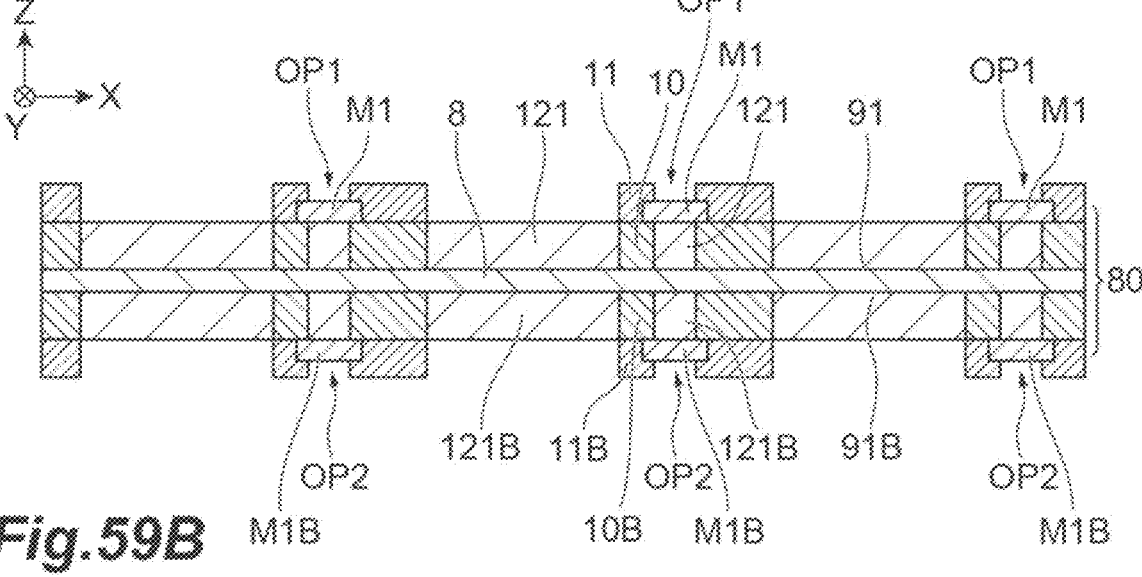
Figure 59B:
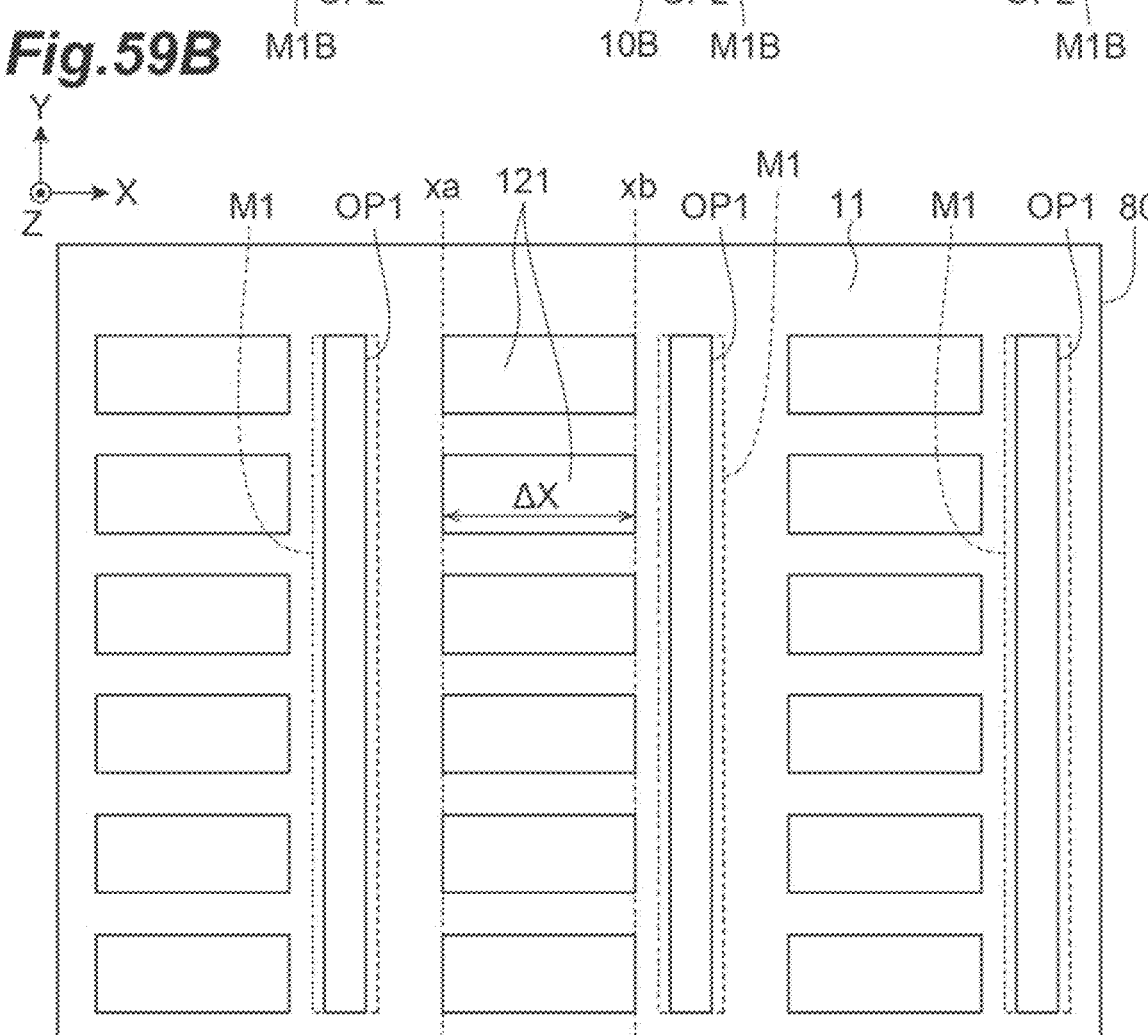
Figures 60A, 60B:
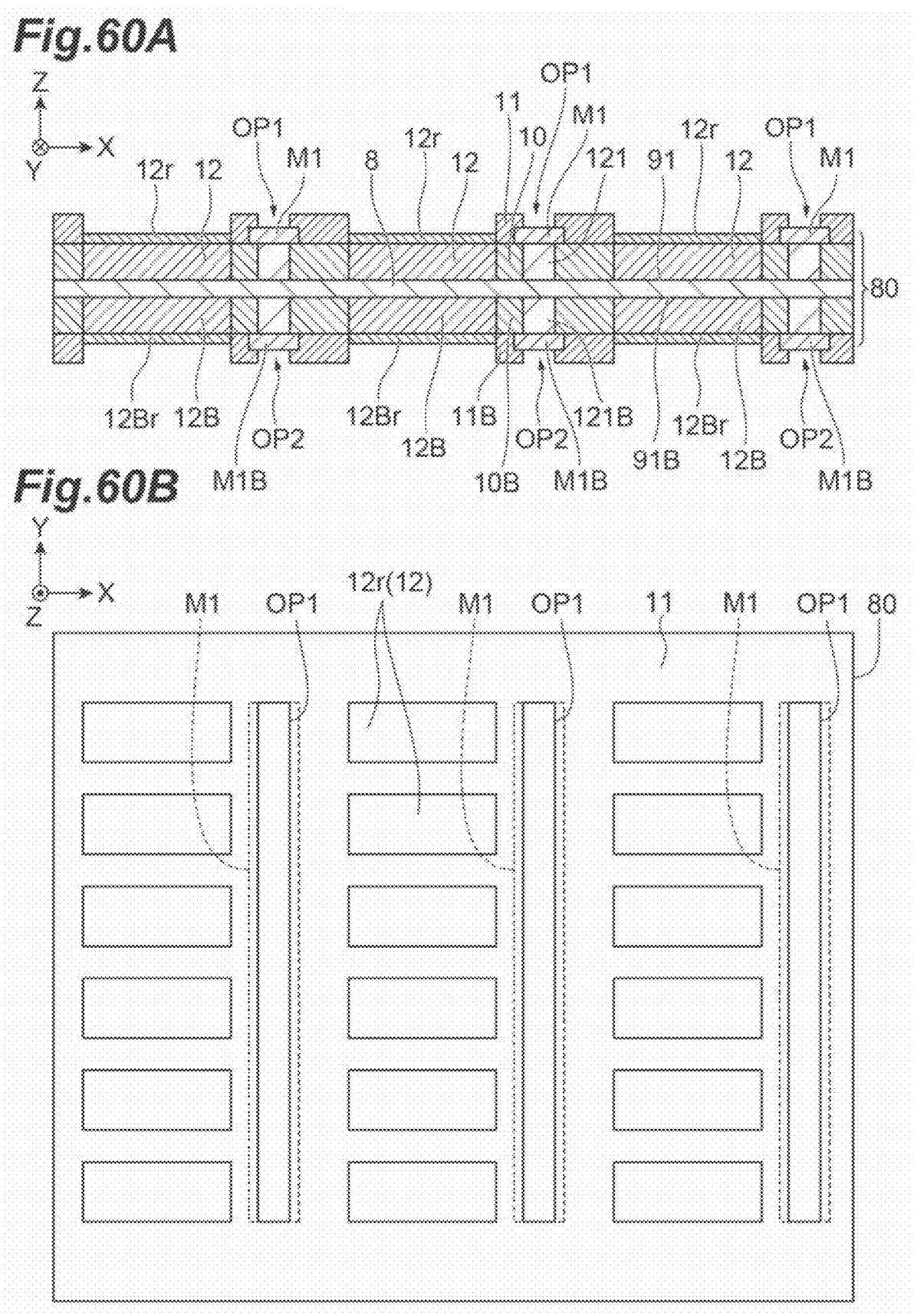
Figures 61A, 61B:
Figures 62A, 62B:
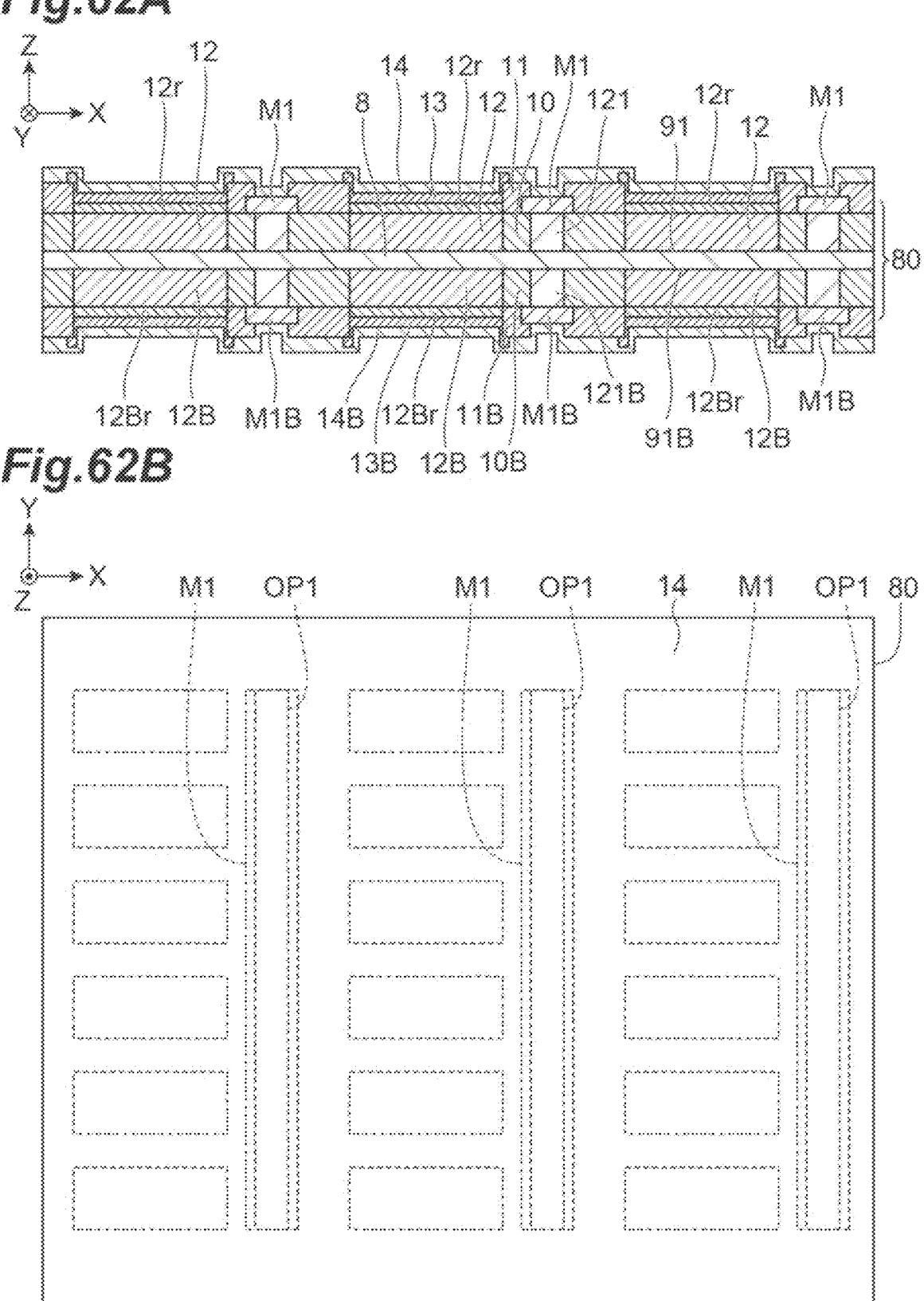
Figures 63A, 63B:
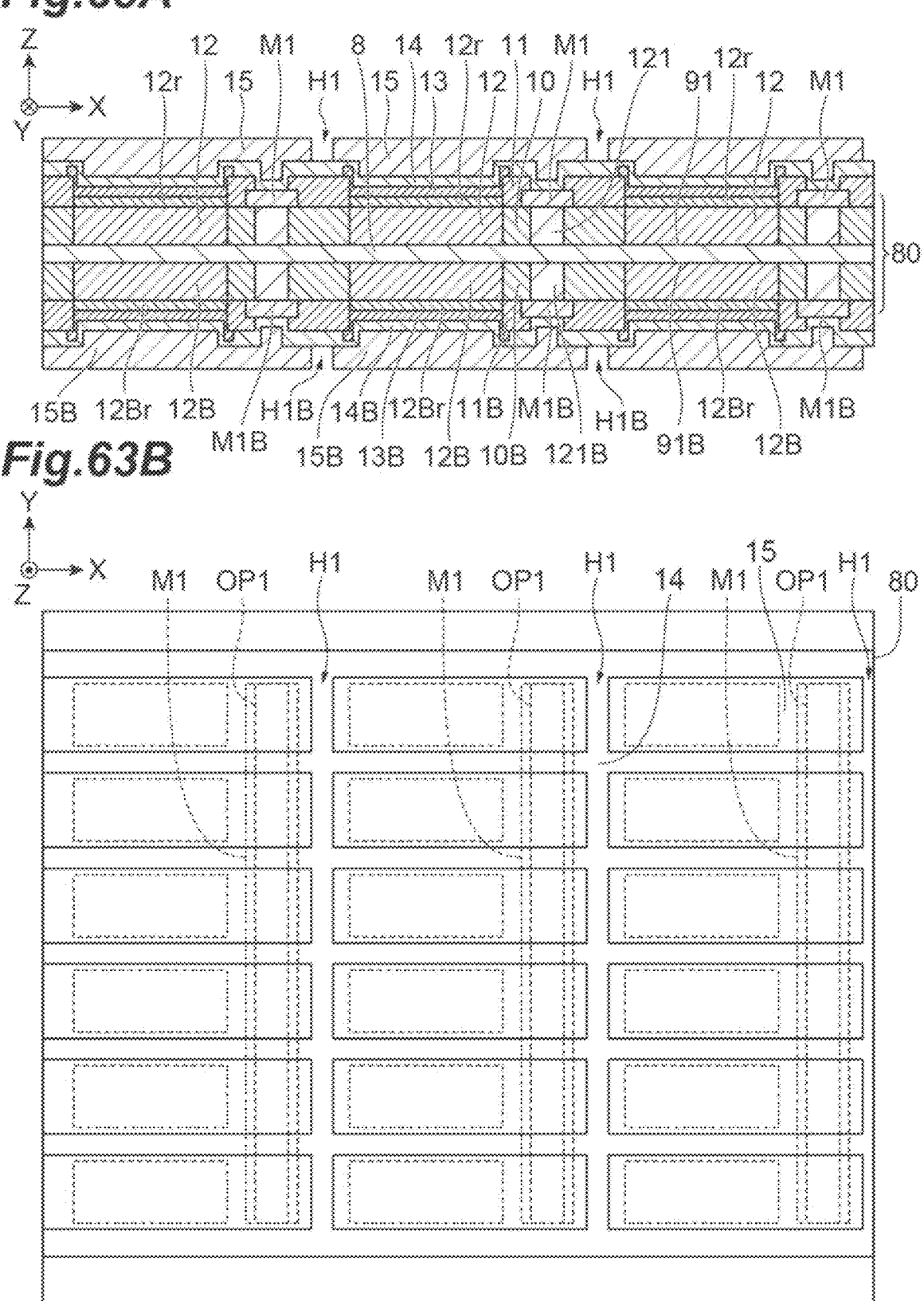
Figures 64A, 64B:
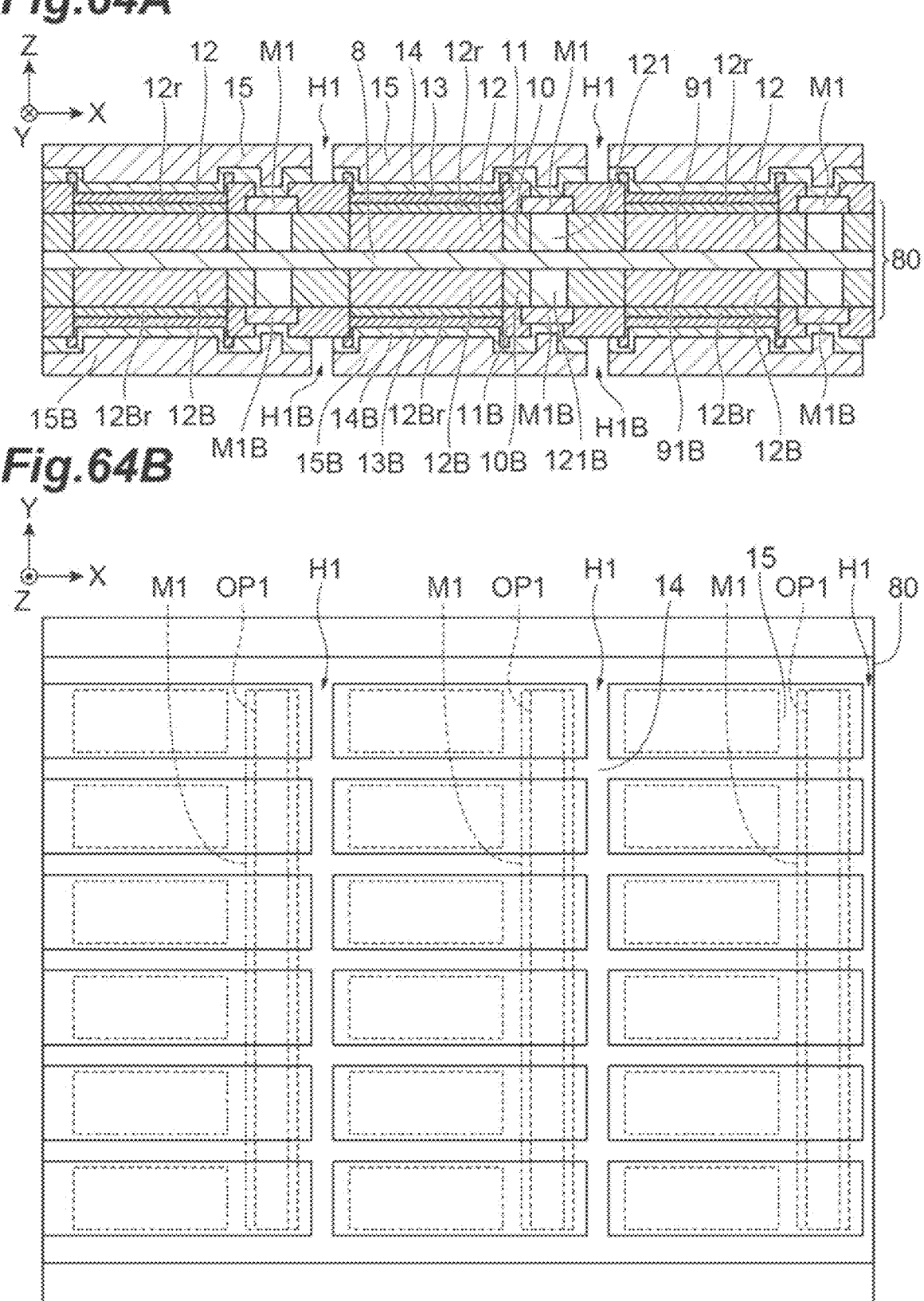

FIG. 41 is a diagram illustrated to describe a method of manufacturing a solid electrolytic capacitor;

FIG. 42 is a diagram illustrated to describe a method of manufacturing a solid electrolytic capacitor;

FIG. 43 is a diagram illustrated to describe a method of manufacturing a solid electrolytic capacitor;

FIG. 44 is a diagram illustrated to describe a method of manufacturing a solid electrolytic capacitor;

FIG. 45 is a diagram illustrated to describe a method of manufacturing a solid electrolytic capacitor;

FIG. 46 is a diagram illustrated to describe a method of manufacturing a solid electrolytic capacitor;

FIG. 47 is a diagram illustrated to describe a method of manufacturing a solid electrolytic capacitor;

FIGS. 48A and 48B are longitudinal cross-sectional views of a solid electrolytic capacitor;

FIG. 49 is a longitudinal cross-sectional view of a solid electrolytic capacitor;

FIG. 50 is a diagram illustrating an example of a peripheral structure of a lateral tip portion of an anode electrode layer;

FIG. 51 is a diagram illustrating an example of the peripheral structure of a lateral tip portion of an anode electrode layer;

FIG. 52 is a diagram illustrating an example of a second region;

FIG. 53 is a diagram illustrating an example of the peripheral structure of a lateral tip portion of an anode electrode layer;

FIG. 54 is a diagram illustrating an example of the peripheral structure of a lateral tip portion of an anode electrode layer;

FIG. 55 is a diagram illustrating an example of a resin-filled region and a first insulating portion;

FIG. 56 is a diagram illustrating an example of the peripheral structure of a lateral tip portion of an anode electrode layer;

FIG. 57 is a diagram illustrating an example of the peripheral structure of a lateral tip portion of an anode electrode layer;

FIG. 58A is a longitudinal cross-sectional view of an intermediate capacitor illustrated to describe a method of manufacturing a solid electrolytic capacitor, and FIG. 58B is a plan view of the intermediate capacitor;

FIG. 59A is a longitudinal cross-sectional view of an intermediate capacitor illustrated to describe a method of manufacturing a solid electrolytic capacitor, and FIG. 59B is a plan view of the intermediate capacitor;

FIG. 60A is a longitudinal cross-sectional view of an intermediate capacitor illustrated to describe a method of manufacturing a solid electrolytic capacitor, and FIG. 60B is a plan view of the intermediate capacitor;

FIG. 61A is a longitudinal cross-sectional view of an intermediate capacitor illustrated to describe a method of manufacturing a solid electrolytic capacitor, and FIG. 61B is a plan view of the intermediate capacitor;

FIG. 62A is a longitudinal cross-sectional view of an intermediate capacitor illustrated to describe a method of manufacturing a solid electrolytic capacitor, and FIG. 62B is a plan view of the intermediate capacitor;

FIG. 63A is a longitudinal cross-sectional view of an intermediate capacitor illustrated to describe a method of manufacturing a solid electrolytic capacitor, and FIG. 63B is a plan view of the intermediate capacitor;

FIG. 64A is a longitudinal cross-sectional view of an intermediate capacitor illustrated to describe a method of

Figure 65:
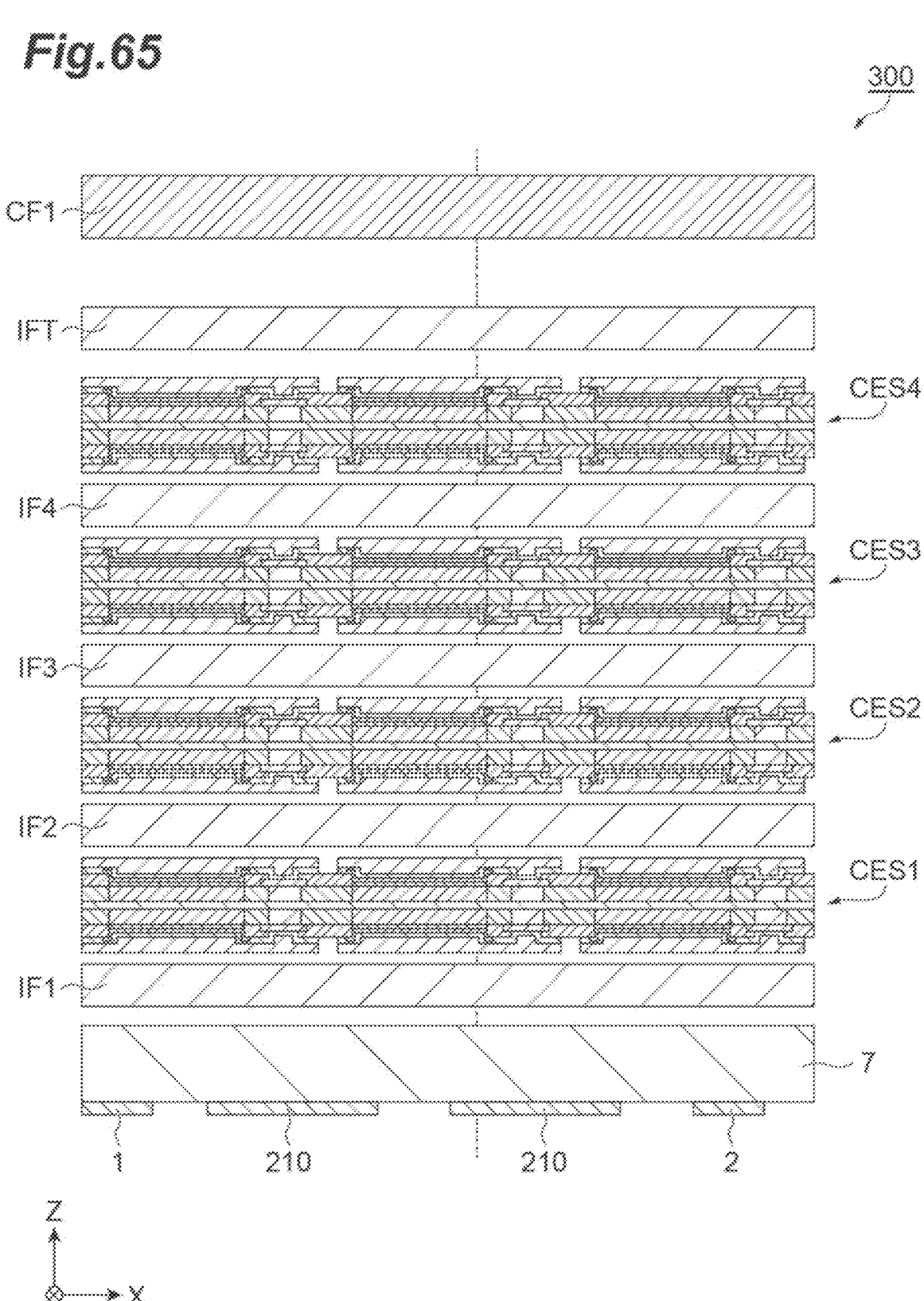
Figure 66:
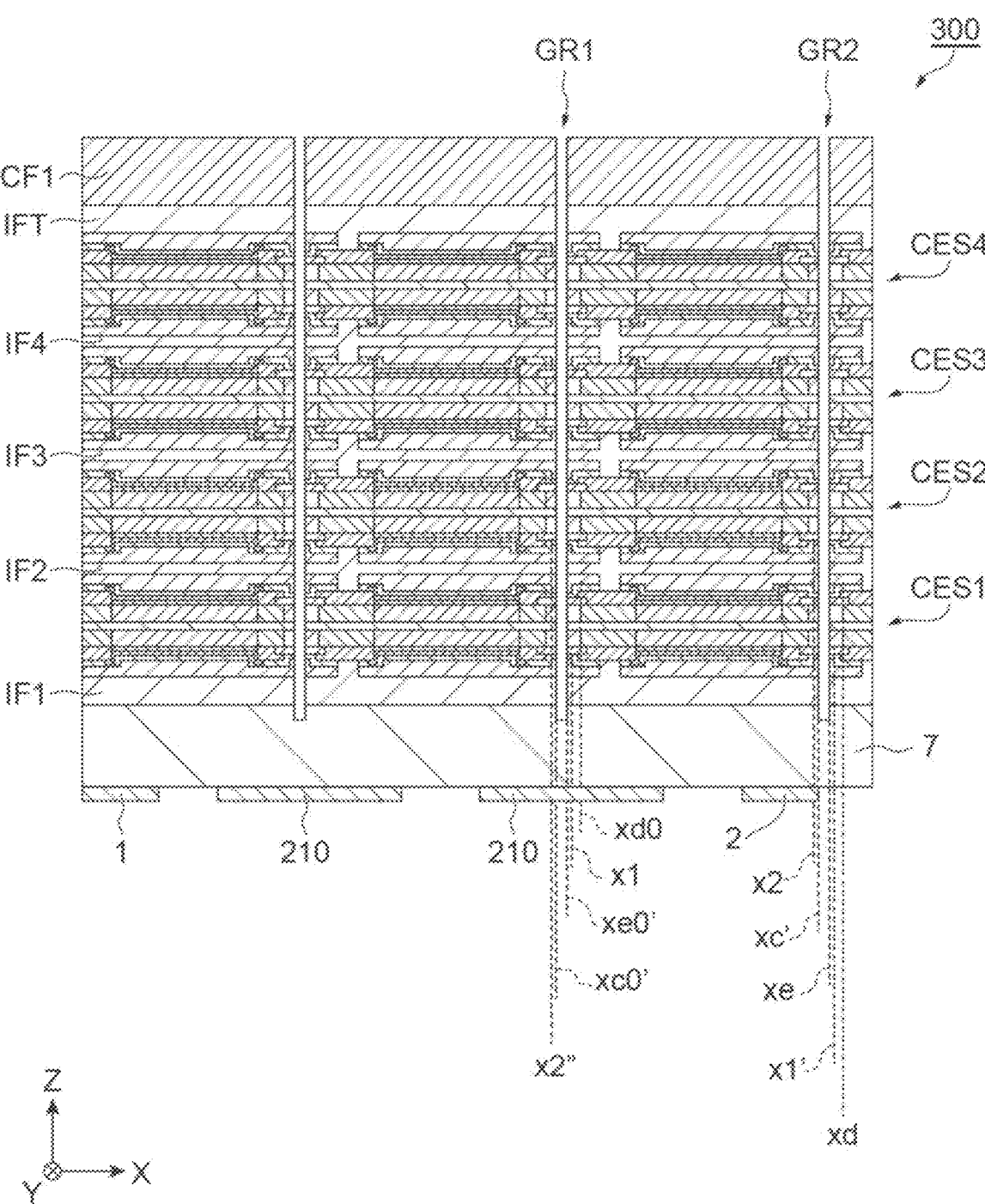
Figure 70:
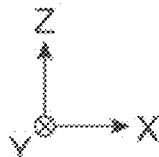
Figure 72:
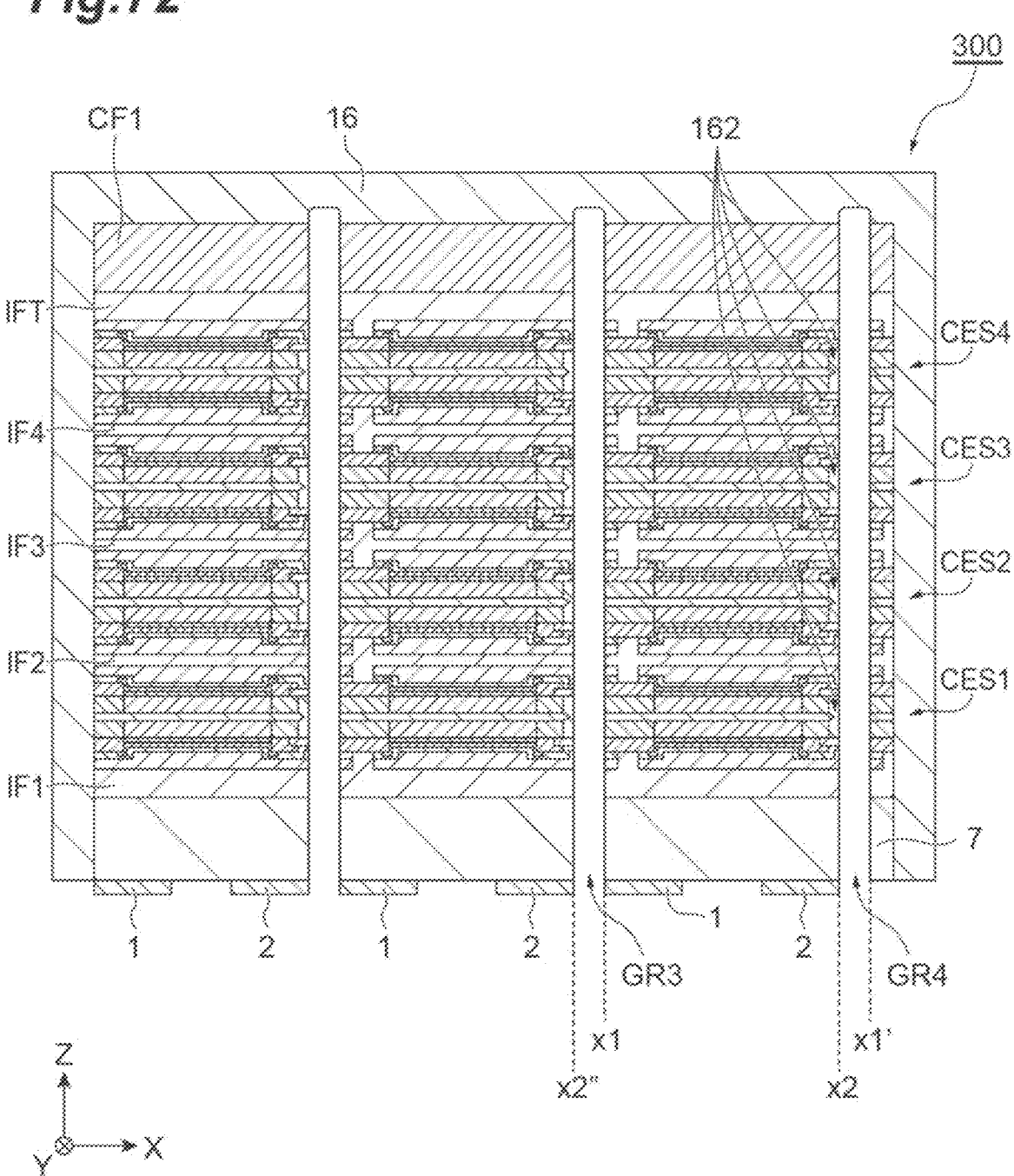
Figure 74:
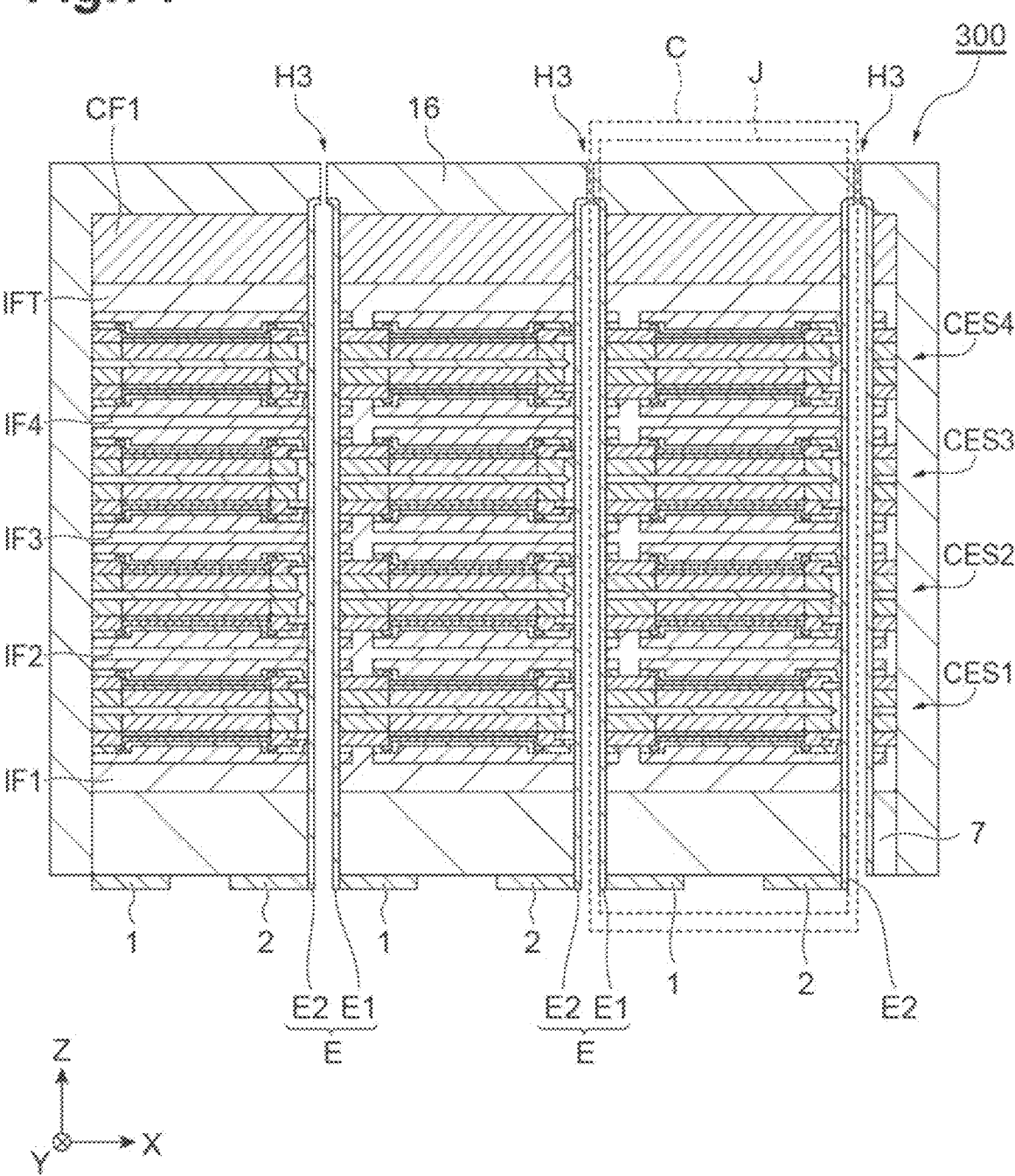
Figure 75:
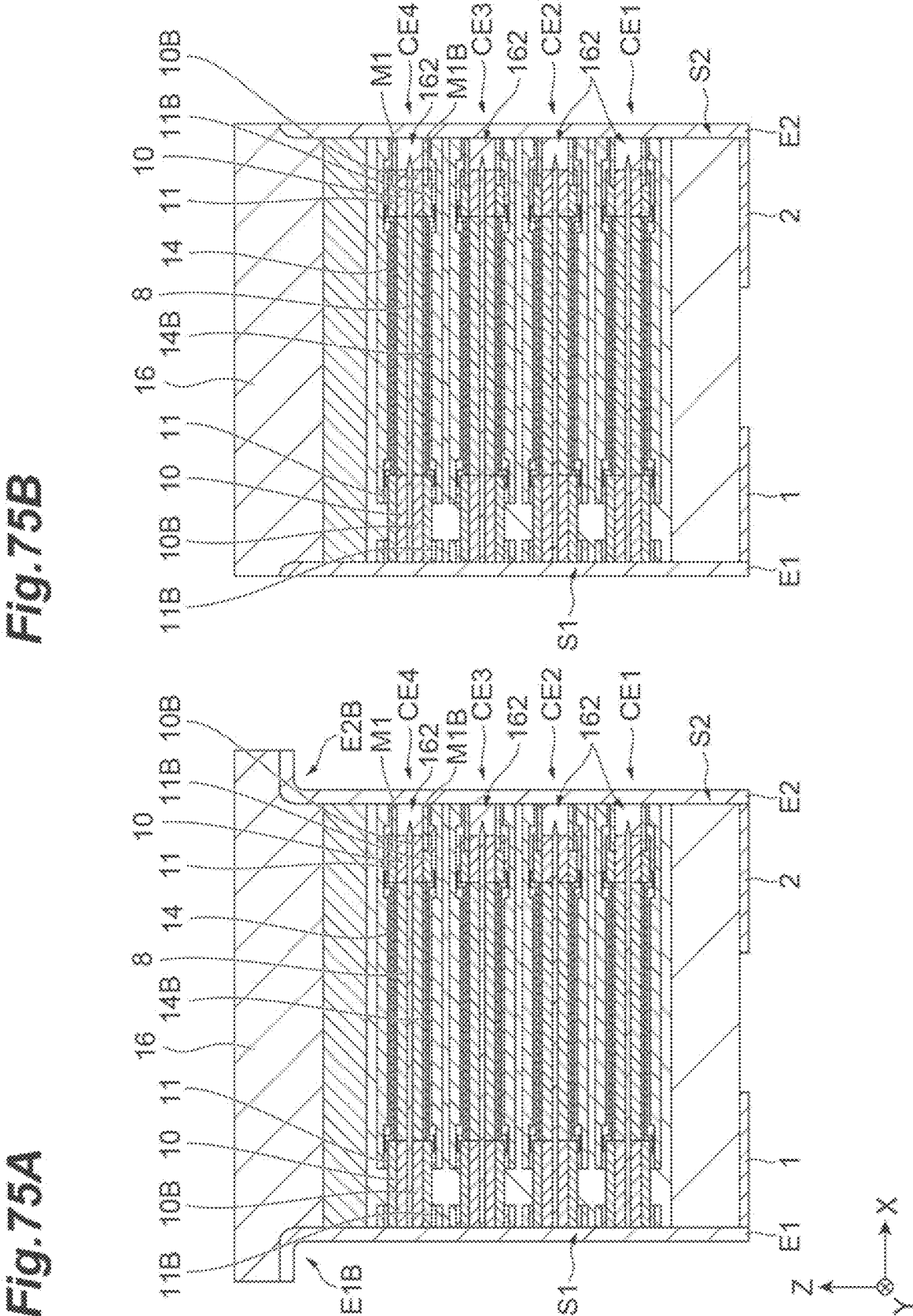
Figure 76:
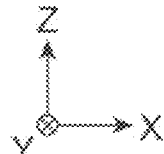
Figure 77:
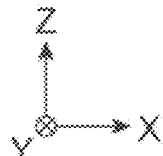
Figure 78:
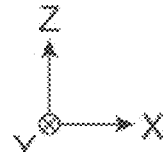
Figure 79A:
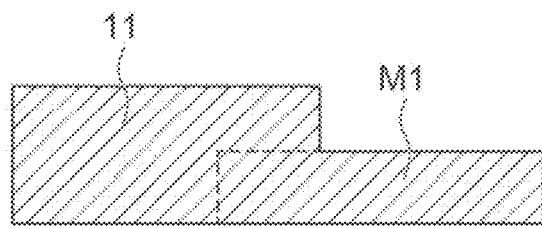
Figure 79B:
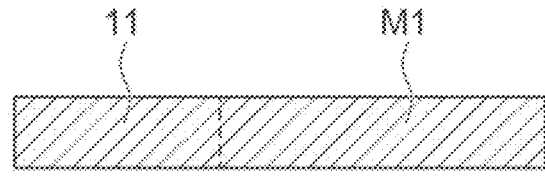
Figure 79C:
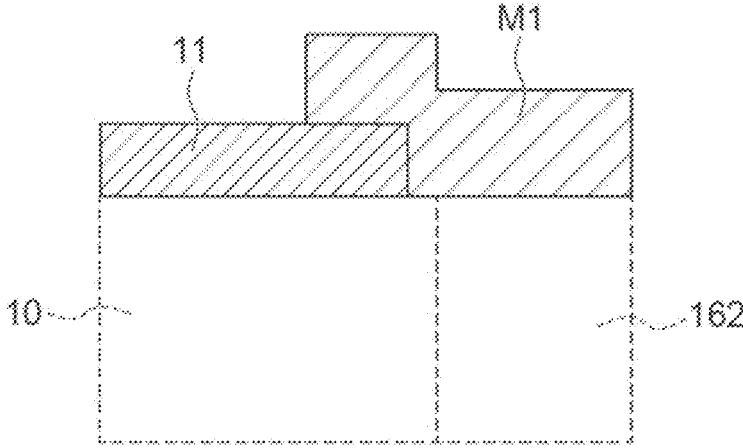
Figure 79D:
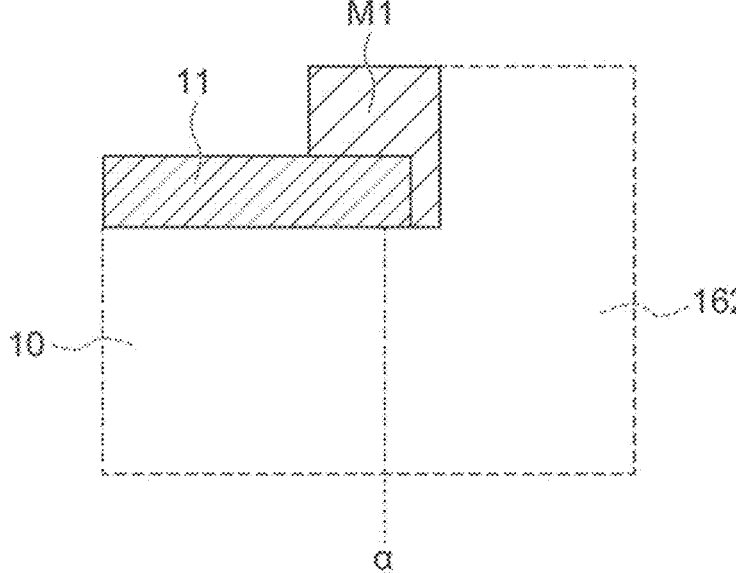
Figure 80:
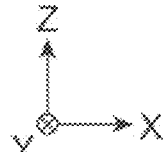

4 manufacturing a solid electrolytic capacitor, and FIG. 64B is a plan view of the intermediate capacitor;

FIG. 65 is a diagram illustrated to describe a method of manufacturing a solid electrolytic capacitor;

FIG. 66 is a diagram illustrated to describe a method of manufacturing a solid electrolytic capacitor;

FIG. 67 is an enlarged view of the periphery of a lateral tip portion of an anode electrode layer to describe a method of manufacturing a solid electrolytic capacitor;

FIG. 68 is a diagram to describe a method of manufacturing a solid electrolytic capacitor;

FIG. 69 is an enlarged view of the periphery of a lateral tip portion of an anode electrode layer to describe a method of manufacturing a solid electrolytic capacitor;

FIG. 70 is a diagram to describe a method of manufacturing a solid electrolytic capacitor;

FIG. 71 is an enlarged view of the periphery of a lateral tip portion of an anode electrode layer to describe a method of manufacturing a solid electrolytic capacitor;

FIG. 72 is a diagram to describe a method of manufacturing a solid electrolytic capacitor;

FIG. 73 is an enlarged view of the periphery of a lateral tip portion of an anode electrode layer to describe a method of manufacturing a solid electrolytic capacitor;

FIG. 74 is a diagram to describe a method of manufacturing a solid electrolytic capacitor;

FIGS. 75A and 75B are longitudinal cross-sectional views of a solid electrolytic capacitor;

FIG. 76 is a diagram illustrating an example of the peripheral structure of a lateral tip portion of an anode electrode layer;

FIG. 77 is a diagram illustrating an example of the peripheral structure of a lateral tip portion of an anode electrode layer;

FIG. 78 is a diagram illustrating an example of the peripheral structure of a lateral tip portion of an anode electrode layer;

FIGS. 79A, 79B, 79C, and 79D are diagrams illustrating longitudinal cross-sectional structures in the vicinity of a mask layer; and FIG. 80 is a diagram illustrating an example of the peripheral structure of a lateral tip portion of an anode electrode layer.

DETAILED DESCRIPTION

Various exemplary embodiments are now described in detail with reference to the drawings. Moreover, the same or corresponding parts in each drawing will be given the same reference numerals, and duplicated descriptions will be omitted.

FIG. 1 is a diagram illustrating the fundamental structure of a solid electrolytic capacitor.

The solid electrolytic capacitor includes a support substrate 7, a stacked body 100 provided on the support substrate 7, and a protective insulator 16 provided on the stacked body 100. The support substrate 7 has a lower surface provided with an anode terminal 1 and a cathode terminal 2. The stacked body 100 has a first side surface S1 provided with a first side electrode E1. The stacked body 100 also has a second side surface S2 provided with a second side electrode E2.

The stacked body 100 includes a plurality of stacked solid electrolytic capacitor elements. Two or more solid electrolytic capacitor elements included in the stacked body 100 may be acceptable. For simplicity of description, two solid electrolytic capacitor elements are illustrated in the figure. In other words, the stacked body 100 includes a first solid electrolytic capacitor element CE1 and a second solid electrolytic capacitor element CE2.

A three-dimensional orthogonal coordinate system is set. The stacking direction of the solid electrolytic capacitor elements in the stacked body 100 is defined as the Z-axis direction. The X-axis is perpendicular to the Z-axis. The Y-axis is perpendicular to the Z-axis and perpendicular to the X-axis. The first side surface S1 is one YZ plane of the stacked body 100, and the second side surface S2 is the other YZ plane of the stacked body 100.

One of the solid electrolytic capacitor elements includes a first capacitor C1 and a second capacitor C2 connected in parallel between the anode terminal 1 and the cathode terminal 2.

The first capacitor C1 includes an anode electrode layer 8 and a first cathode electrode layer 14 provided on the upper surface side of the anode electrode layer 8, and a first dielectric layer and a first solid electrolyte layer 12 are interposed between these electrode layers. The first dielectric layer is a dielectric layer 9 (see FIG. 3) formed from the periphery of an upper interface vicinity region 91 of the anode electrode layer 8 along the concave and convex shape inside the roughened layer. The second capacitor C2 includes the anode electrode layer 8 and a second cathode electrode layer 14B provided on the lower surface side of the anode electrode layer 8, and a second dielectric layer and a second solid electrolyte layer 12B are interposed between these electrode layers. The second dielectric layer is a dielectric layer formed from the periphery of a lower interface vicinity region 91B of the anode electrode layer 8 along the concave and convex shape inside the roughened layer. The second dielectric layer has a structure equivalent to that of the upper dielectric layer 9. Moreover, the anode electrode layer 8 in the first capacitor C1 and the second capacitor C2 is a common electrode layer. It may be acceptable for one solid electrolytic capacitor element to include only the first capacitor C1. It may be acceptable for one solid electrolytic capacitor element to include only the second capacitor C2.

The anode electrode layer 8 of each solid electrolytic capacitor element is electrically connected to the first side electrode E1. The first side electrode E1 is electrically connected to the anode terminal 1. The first cathode electrode layer 14 and the second cathode electrode layer 14B in each solid electrolytic capacitor element is electrically connected to the second side electrode E2 in pairs. The second side electrode E2 is electrically connected to the cathode terminal 2. Applying a voltage across the anode terminal 1 and the cathode terminal 2 results in a voltage being applied between the first side electrode E1 and the second side electrode E2. Applying a voltage across the first side electrode E1 and the second side electrode E2 charges the first capacitor C1 and the second capacitor C2 of each solid electrolytic capacitor element.

Figure 2:
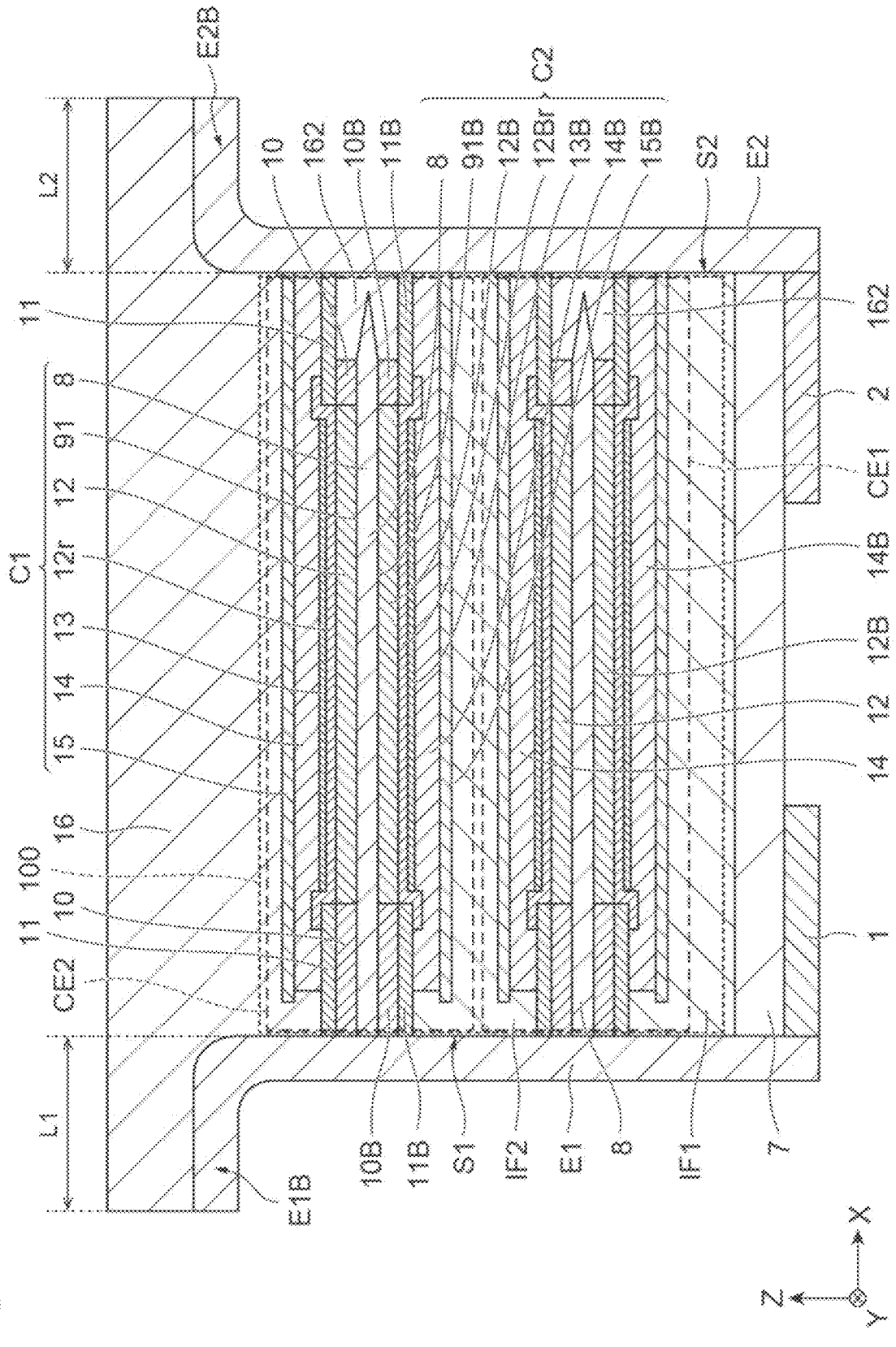
FIG. 2 is a longitudinal cross-sectional view of a solid electrolytic capacitor.

FIG. 2 is a longitudinal cross-sectional view of a solid electrolytic capacitor according to an embodiment.

The solid electrolytic capacitor includes the support substrate 7 on which the anode terminal 1 and the cathode terminal 2 are provided, the stacked body 100 provided with the plurality of solid electrolytic capacitor elements stacked on the support substrate 7, and the protective insulator 16 provided on the stacked body 100. The protective insulator 16 covers not only the top surface of the stacked body 100 but also both side surfaces (XZ plane) located at both ends of the Y-axis of the stacked body 100. The protective insulator 16 covers the stacked body 100 as an insulating portion 162 in a portion of the YZ plane located at one end of the X-axis. In other words, the solid electrolytic capacitor includes the support substrate 7 provided on the stacked body 100, the anode terminal 1 provided on the lower surface of the support substrate 7 and electrically connected to the first side electrode E1, and the cathode terminal 2 provided on the lower surface of the support substrate 7 and electrically connected to the second side electrode E2. In the case where the solid electrolytic capacitor is arranged on a wiring board having a first land electrode and a second land electrode, the anode terminal 1 and the cathode terminal 2 become connection terminals to these land electrodes. Specifically, the first land electrode is arranged directly below the anode terminal 1 provided on the lower surface of the support substrate 7, and the second land electrode is arranged directly below the cathode terminal 2. In this case, the first side electrode E1 and the second side electrode E2 can be electrically connected to the first land electrode and the second land electrode. Moreover, it is possible to connect the first and second side electrodes to the land electrodes on the wiring board even if the anode terminal 1 and the cathode terminal 2 are omitted.

The support substrate 7 is made of an insulating material. Inorganic insulating materials and organic insulating materials are known as insulating materials. Silicon oxide (e.g., $SiO_2$), silicon nitride (e.g., $SiN_x$), aluminum oxide (e.g., $Al_2O_3$), magnesium oxide (e.g., MgO), and the like are known as inorganic insulating materials, and glass substrates and LTCC (low temperature co-fired ceramics) substrates containing alumina and glass materials are known as insulating material substrates containing these materials. Thermosetting resins such as polyimide and epoxy resin are known as organic insulating materials. A glass epoxy substrate such as FR4 (Flame Retardant type 4), which is made by impregnating glass fiber (glass cloth or glass non-woven fabric) with epoxy resin and curing it, can also be used. In this example, a glass epoxy substrate is used as an insulating material suitable for the support substrate 7. Although the lower surface of the support substrate 7 is provided with the anode terminal 1 and the cathode terminal 2, a dummy electrode layer may be acceptable to be provided on the upper surface of the support substrate 7. The dummy electrode layer is used for reducing the warping of the support substrate 7, and it may be acceptable to have it the same shape as the anode terminal 1 and the cathode terminal 2 or to provide it on the entire upper surface of the support substrate 7.

The protective insulator 16 is made of an insulating material. Inorganic insulating materials and organic insulating materials are known as insulating materials. The above-mentioned materials are known as inorganic insulating materials, but in this example, an organic insulating material is used. Thermosetting resins such as polyimide and epoxy resin are known as organic insulating materials. In this example, an epoxy resin containing a filler is used as an insulating material suitable for the protective insulator 16. The protective insulator 16 before thermal curing in manufacturing can be in the form of powder, liquid, grain, or film.

The stacked body 100 is formed by stacking a plurality of solid electrolytic capacitor elements. Each solid electrolytic capacitor element (the first solid electrolytic capacitor element CE1 and the second solid electrolytic capacitor element CE2) includes the first capacitor C1 and the second capacitor C2 illustrated in FIG. 1. The structure of the first solid electrolytic capacitor element CE1 is the same as the structure of the second solid electrolytic capacitor element

7

8

CE2. The structure of the first capacitor C1 is the same as the structure of the second capacitor C2, except that it is upside down.

The first capacitor C1 includes a roughened layer provided on the upper surface of the anode electrode layer 8, the first dielectric layer provided on the upper surface of the roughened layer, the first solid electrolyte layer 12 provided on the upper surface of the first dielectric layer, and the first cathode electrode layer 14 provided on the upper surface of the first solid electrolyte layer 12. The first dielectric layer and the solid electrolyte layer 12 are sandwiched between the anode electrode layer 8 and the first cathode electrode layer 14. Specifically, the first capacitor C1 includes the anode electrode layer 8, the first dielectric layer provided on the surface of the anode electrode layer 8, the first solid electrolyte layer 12 covering the first dielectric layer, the first cathode electrode layer 14 sandwiching the first solid electrolyte layer 12 together with the first dielectric layer, and a first protective layer 15 covering the first cathode electrode layer 14. The first protective layer 15 can be omitted. Moreover, the first solid electrolyte layer 12 is made of a roughened layer containing a conductive polymer. Additionally, on the roughened layer of the first solid electrolyte layer 12, a conductive polymer layer 12r is formed. The conductive polymer layer 12r also functions as a solid electrolyte layer.

The roughened layer is made of roughened aluminum and has numerous pores. The roughening treatment can be performed by chemical conversion treatment and anodic oxidation. The roughening treatment can also be carried out only through chemical conversion treatment. The roughening treatment can also be performed only through anodic oxidation. The chemical conversion treatment can be carried out by immersing the aluminum foil in a chemical conversion solution (e.g., an aqueous solution of ammonium adipate). The anodic oxidation can be performed by applying a voltage to the aluminum foil immersed in an electrolyte. In using anodic oxidation, a porous layer is formed on the surface side of the aluminum foil, and a dielectric layer made of aluminum oxide is formed. Additionally, the roughening treatment can also be performed by etching. The first cathode electrode layer 14 is formed over the conductive polymer layer 12r via the first conductive layer 13. The first conductive layer 13 may be a single layer or it may be two or more layers.

The anode electrode layer 8 is made of a valve metal, but the material is not particularly limited as long as it is one that is generally used in electrolytic capacitors. As the valve metal or valve-acting metal, aluminum (Al), tantalum (Ta), niobium (Nb), titanium (Ti), hafnium (Hf), zirconium (Zr), zinc (Zn), tungsten (W), bismuth (Bi), antimony (Sb), and the like are known. Among these, aluminum or tantalum is relatively preferably used. The anode electrode layer 8 may be an alloy containing at least one metal selected from such a metal group. The metal constituting the anode electrode layer 8 is preferably a metal having a different solubility in acid or alkali from the metal constituting the cathode electrode layer, and is preferably a metal capable of selective etching in specific liquids. The anode electrode layer 8 in this example is assumed to be aluminum. The thickness of the anode electrode layer 8 is, for example, 1 μm to 500 μm.

In this example, the first cathode electrode layer 14 is made of copper (Cu). The first cathode electrode layer 14 may be made of other metals such as nickel (Ni), silver (Ag), and tin (Sn), in addition to copper (Cu). From the viewpoints of conductivity and cost, it is preferable that the first cathode electrode layer 14 is a single layer of copper alone or a composite layer containing copper and/or other metals (such as Ni, Cr, or Ni—Cr). The first cathode electrode layer 14 may be an alloy containing at least one metal selected from the group of these metals. In the case where an underlying layer of the first cathode electrode layer 14 contains Ni, Cr, or the like, the adhesion can be improved. Depending on the type of material of the first cathode electrode layer 14 (e.g., Ag), the underlying layer may not be necessary.

The conductive polymer (compound) included in the first solid electrolyte layer 12 and the conductive polymer layer 12r preferably contains at least one selected from the group consisting of polypyrrole, polyaniline, polythiophene, polyfuran, and derivatives thereof. Poly (3,4-ethylenedioxy-thiophene) (PEDOT) and polypyrrole (ppy) are preferably used. These may be used alone or in a mixture of two or more. These materials can have excellent conductivity by adding an appropriate dopant.

The first conductive layer 13 is, for example, an adhesive conductive layer (e.g., carbon paste). The adhesive conductive layer includes a conductor and an adhesive. The conductor in the adhesive conductive layer is a material containing carbon (e.g., graphite) or a metal. The adhesive in the adhesive conductive layer is a resin such as a phenol resin, a urea resin, an epoxy resin, a polyester resin, or a polyimide resin, or a hydrocarbon compound such as paraffin oil. Carbon paste is a mixture of graphite powder and an adhesive, and it can be used for the first conductive layer 13. The first conductive layer 13 can be formed by a printing technique.

Moreover, the metal conductive layer constituting the first cathode electrode layer 14 may be made of copper (Cu), nickel (Ni), silver (Ag), or tin (Sn), and these metal conductive layers may be formed as plating layers using electroplating. These metal conductive layers may also be formed by any method, such as sputtering. In the case of forming the plating layer by an electroless plating technique, the adhesive conductive layer underneath it may contain a catalytic metal. The catalytic metal is a noble metal with catalytic activity for electroless plating, and may be palladium (palladium-based material), gold, platinum, rhodium, or the like, with palladium being particularly preferred. These may be used alone or in a mixture of two or more. Additional metal film forming (thickening) using electrolytic plating may be performed on a metal film formed by electroless plating or sputtering.

Generally, for copper plating, sulfuric acid copper bath, pyrophosphoric acid copper bath, cyanide copper bath, copper fluoride bath, or the like may be used. For nickel plating, watt bath (nickel sulfate), sulfamate bath (nickel sulfamate), chloride bath (nickel chloride), or the like can be used. For tin plating, sulfuric acid baths, sulfonic acid baths, or the like can be used. Various plating techniques are known and can be applied to the formation of each plating layer.

The first conductive layer 13 has a function of electrically connecting the solid electrolyte layer 12 directly beneath it with the first cathode electrode layer 14 above it. The first conductive layer 13 has a function of protecting the solid electrolyte layer 12 directly beneath it. From the viewpoint of the protective function, this conductive layer also acts as a protective layer. Moreover, the first conductive layer 13 preferably includes a resin layer that incorporates a conductor into a resin that is highly heat-resistant, highly moisture-resistant (with low water absorption and permeability), and has high mechanical strength. The preferred thickness of the first conductive layer 13 is 1 μm to 50 μm, but it can also be set between 3 μm to 10 μm. Although it is possible to electrically connect the solid electrolyte layer 12 and the first cathode electrode layer 14 even if the first conductive layer 13 is omitted, it is preferable to have the first conductive layer 13.

The first protective layer 15 is made of a resist material that includes resin, and is preferably made of a material containing both resin and an inorganic material. As an inorganic material, a filler such as silica (silicon oxide) can be used. As the resin material, a thermosetting resin such as polyimide or epoxy resin can be used. In this example, the first protective layer 15 using epoxy resin with added silica is employed. The resist material can be a liquid material dissolved in a suitable solvent during manufacturing. Moreover, the first protective layer 15 can be omitted.

The second capacitor C2 has a roughened layer provided on the lower surface of the anode electrode layer 8, the second dielectric layer is provided on the lower surface of the roughened layer, the second solid electrolyte layer 12B is provided on the lower surface of the second dielectric layer, and the second cathode electrode layer 14B is provided on the lower surface of the second solid electrolyte layer 12B. The second dielectric layer and the second solid electrolyte layer 12B are sandwiched between the anode electrode layer 8 and the second cathode electrode layer 14B. Specifically, the second capacitor C2 includes the anode electrode layer 8, the second dielectric layer provided on the surface of the anode electrode layer 8, the second solid electrolyte layer 12B covering the second dielectric layer, the second cathode electrode layer 14B sandwiching the second solid electrolyte layer 12B together with the second dielectric layer, and a second protective layer 15B covering the second cathode electrode layer 14B. Moreover, the second solid electrolyte layer 12B is made of a roughened layer containing a conductive polymer. Below the roughened layer of the second solid electrolyte layer 12B, a conductive polymer layer 12Br is formed. The second cathode electrode layer 14B is formed below the conductive polymer layer 12r via a second conductive layer 13B.

The material of the second solid electrolyte layer 12B is identical to the material of the first solid electrolyte layer 12. The material of the conductive polymer layer 12Br is identical to that of the conductive polymer layer 12r. The material of the second conductive layer 13B is identical to the material of the conductive layer 13. The material of the second cathode electrode layer 14B is identical to that of the first cathode electrode layer 14. The material of the second protective layer 15B is identical to the material of the first protective layer 15.

The anode electrode layer 8 is physically and electrically connected to the first side electrode E1 provided on the first side surface S1 of the stacked body 100. The anode electrode layer 8 is electrically connected to the anode terminal 1 through the first side electrode E1. The first cathode electrode layer 14 and the second cathode electrode layer 14B are physically and electrically connected to the second side electrode E2 provided on the second side surface S2 of the stacked body 100. The first cathode electrode layer 14 and the second cathode electrode layer 14B are electrically connected to the cathode terminal 2 through the second side electrode E2.

The shape of the first side electrode E1 and the shape of the second side electrode E2 are the same and are plane symmetrical with respect to the XZ plane passing through the center position in the X-axis direction of the stacked body 100.

The part of the first side electrode E1 on the side of the protective insulator 16 has a first bent portion E1B that bent to bend away from the first side surface S1 to the outside, and the lower surface of the first bent portion E1B is exposed. Since the first bent portion E1B is bent around the Y-axis, the amount of rotational deformation around the Z-axis is small. Furthermore, a fillet is more likely to be formed at the position in contact with the lower surface of the first bent portion E1B. In this case, the dimension in the X-axis direction of the fillet at the position contacting the lower surface of the first bent portion E1B becomes large, and its volume increases. Thus, under environmental changes such as temperature, the amount of deformation of the first bent portion E1B is small, and the resistance to stress increases with the increase in the volume of the fillet itself. Thus, cracks are less likely to occur in the fillet, and the solid electrolytic capacitor can operate with high reliability. In addition, the complicated connection interface between the fillet and the side electrode also has the effect of preventing the progression of occurred cracks.

The part of the second side electrode E2 on the side of the protective insulator 16 has a second bent portion E2B that is bent to move away from the second side surface S2 toward the outside, and the lower surface of the second bent portion E2B is exposed. Since the second bent portion E2B is bent around the Y-axis, the amount of rotational deformation around the Z-axis is small. Furthermore, a fillet is more likely to be formed at the position where it contacts the lower surface of the second bent portion E2B. In this case, the dimension in the X-axis direction of the fillet at the position where it contacts the lower surface of the second bent portion E2B becomes large, leading to an increase in volume. Thus, under environmental changes such as temperature, the amount of deformation of the second bent portion E2B is small, and the resistance to stress increases with the increase in the volume of the fillet itself. Thus, cracks are less likely to occur in the fillet, and the solid electrolytic capacitor can operate with high reliability. In addition, the complicated connection interface between the fillet and the side electrode also has the effect of preventing the progression of occurred cracks.

It is preferable that the dimension L1 of the first bent portion E1B in the direction perpendicular to the first side surface S1 is 0.01 mm or more and 1 mm or less along the lower surface of the protective insulator 16. The dimension L1 is further preferably 0.03 mm or more and 0.3 mm or less. In the case where the dimension L1 of the first bent portion E1B is equal to or greater than the above-mentioned lower limit, the fillet is likely to come into contact with the lower surface of the first bent portion E1B. In addition, it helps to suppress the progress of the generated microcracks in the Z direction and prevent complete breakage of the component connection. Additionally, even if the dimension L1 of the first bent portion E1B exceeds the above-mentioned upper limit, the rate of increase in the effect of expanding the contact area of the fillet with the bottom surface of the first bent portion E1B becomes small, and from the viewpoint of suppressing an excessive increase in the component size and reducing material costs, it is preferable for the dimension L1 to be equal to or less than the upper limit.

Similarly, the dimension L2 of the second bent portion E2B in the direction perpendicular to the second side surface S2 is preferably 0.01 mm or more and 1 mm or less along the lower surface of the protective insulator 16. It is even more preferable that the dimension L2 is 0.03 mm or more and 0.3 mm or less. In the case where the dimension L2 of the second bent portion E2B is equal to or greater than the above-mentioned lower limit, the fillet is likely to come into contact with the lower surface of the second bent portion E2B. In addition, it helps to suppress the progress of the generated microcracks in the Z direction and prevent complete breakage of the component connection. Additionally, even if the dimension L2 of the second bent portion E2B exceeds the above-mentioned upper limit, the increase rate of the effect of expanding the contact area of the fillet to the lower surface of the second bent portion E2B is small, and from the viewpoint of suppressing an excessive increase in the component size and reducing material costs, it is preferable that the dimension L2 is equal to or less than the upper limit. Moreover, a prototype was manufactured by setting the dimension L1=the dimension L2. The dimensions of the prototype are L1=0.1 mm, L1=0.25 mm, and L1=0.45 mm. In both cases, satisfactory contact with the fillet was observed. From this viewpoint, it is possible, for example, to set L1=L2=prototype dimension±ΔL (ΔL=L1×50%) as an illustration.

In this figure, the positive direction of the X-axis is the right side, and the negative direction is the left side. Between the first side electrode E1 and the first solid electrolyte layer 12, a first insulating region 10 on the left side is interposed. In the vicinity of the interface between the first insulating region 10 on the left side and the anode electrode layer 8, a dielectric layer is formed, and the region closer to the anode electrode layer 8 than the dielectric layer is a conductive region. Between the first side electrode E1 and the second solid electrolyte layer 12B, a second insulating region 10B on the left side is interposed. In the vicinity of the interface between the second insulating region 10B on the left side and the anode electrode layer 8, a dielectric layer is formed, and the region closer to the anode electrode layer 8 than the dielectric layer is a conductive region. The first insulating region 10 is formed by filling the gaps in the roughened layer on the upper part of the anode electrode layer 8 with an insulating resin. Similarly, the second insulating region 10B is formed by filling an insulating resin into the gaps in the roughened layer below the anode electrode layer 8.

Between the second side electrode E2 and the first solid electrolyte layer 12, the right-side first insulating region 10 and the insulating portion 162 are interposed. In the vicinity of the interface between the right-side first insulating region 10 and the anode electrode layer 8, a dielectric layer is formed, and the region closer to the anode electrode layer 8 than the dielectric layer is a conductive region. Between the second side electrode E2 and the second solid electrolyte layer 12B, the right-side second insulating region 10B is interposed. In the vicinity of the interface between the right-side second insulating region 10B and the anode electrode layer 8, a dielectric layer is formed, and the region closer to the anode electrode layer 8 than the dielectric layer is a conductive region.

The insulating portion 162 is interposed between the right-side first insulating region 10 and the second side electrode E2. The insulating portion 162 is interposed between the second insulating region 10B on the right side and the second side electrode E2. The insulating portion 162 is interposed between the right end of the anode electrode layer 8 and the second side electrode E2. The material of the insulating portion 162 is different from the material of the first insulating region 10 and the second insulating region 10B. The material of the first insulating region 10 and the second insulating region 10B is the same. The material of the insulating portion 162 includes the same material as the material of the protective insulator 16, and preferably includes a filler in a resin (e.g., epoxy resin). Moreover, the insulating portion 162 has a three-layer structure of an upper layer, a middle layer, and a lower layer. The insulating portion 162 includes the constituent material (referred to as material A) included in the first insulating region 10 and the second insulating region 10B at least in the upper layer and the lower layer. The middle layer of the insulating portion 162 mainly includes the constituent material (referred to as material B) of the protective insulator 16. The resin included in the material A and the resin included in the material B may be the same or different materials.

The material A is made of a resist material containing a resin, and, if necessary, may include a filler of an inorganic material such as silica. This resin material may be a thermosetting resin such as polyimide or epoxy resin. An example of the material A may be an epoxy resin.

The material B is made of a resin containing a filler of an inorganic material such as silica. This resin material may be a thermosetting resin such as epoxy resin. An example of the material B may be an epoxy resin containing a filler of silica. The upper and lower layers of the insulating portion 162 contain the epoxy resin contained in the material A and the material B, and as an example, the filler content is small. The middle layer of the insulating portion 162 mainly contains the material B, contains epoxy resin and filler, and as an example, the filler content is higher than the upper and lower layers. Examples of resins that can be contained in the material A and the material B include phenol resin, methacrylic resin, epoxy resin, silicone resin, polycarbonate, polyethylene terephthalate, polyamide, polyimide, polybutadiene, polyethylene, polystyrene, or the like. Additionally, examples of inorganic materials constituting the filler include silica ($SiO_2$), aluminum oxide ($Al_2O_3$), and aluminum nitride (AlN).

Moreover, between the first insulating region 10 and the insulating portion 162 and the first cathode electrode layer 14, a first insulating layer 11 is interposed. The first insulating layer 11 contains the same resin material as the first insulating region 10 and includes a filler. Since the filler does not fundamentally permeate the first insulating region 10, the filler content is small. Between the second insulating region 10B and the insulating portion 162 and the second cathode electrode layer 14B, a second insulating layer 11B is interposed. The second insulating layer 11B is made of the same material as the first insulating layer 11. The second insulating region 10B is made of the same material as the first insulating region 10.

Between the support substrate 7 and the first solid electrolytic capacitor element CE1, a first insulating sheet IF1 is interposed. Between the first solid electrolytic capacitor element CE1 and the second solid electrolytic capacitor element CE2, a second insulating sheet IF2 is interposed. The insulating sheet is made of a material containing resin, and preferably a material containing resin and an inorganic material. As an inorganic material, a filler such as silica, or glass fiber (glass cloth or glass non-woven fabric) can be used. As the resin material, a thermosetting resin such as epoxy resin can be used. In this example, a resin sheet in which silica is added to epoxy resin is used, but it is also possible to use a prepreg material with epoxy resin impregnated into glass fiber.

FIG. 3 is a diagram illustrating an example of a structure in the vicinity of the solid electrolyte layer.

On the surface of the anode electrode layer 8, a first dielectric layer 9 is formed. The first dielectric layer 9 is typically a metal oxide film with electrical insulation properties (such as aluminum oxide ($Al_2O_3$) when the anode electrode layer 8 is made of aluminum). The first dielectric layer 9 is formed by oxidizing the surface layer of the anode electrode layer 8 in a specified manner. The thickness of the first dielectric layer 9 is, for example, 1 nm to 1 μm. The first solid electrolyte layer 12 is formed along the first dielectric layer 9 on the fine concave and convex surfaces of the anode electrode layer 8 formed by surface roughening, filling a recess 8c. The thickness of the first solid electrolyte layer 12 is preferably a thickness that can cover the concave and convex surfaces. The thickness of the first solid electrolyte layer 12 is, for example, approximately 1 μm to 100 μm.

Moreover, the total thickness provided with the anode electrode layer 8, the first solid electrolyte layer 12, and the second solid electrolyte layer 12B (the thickness of the region (metal sheet) containing aluminum) can be set preferably to 50 μm through 300 μm. More preferably, this thickness can be set between 100 μm and 150 μm.

A method of manufacturing the solid electrolytic capacitor mentioned above is now described.

The method of manufacturing the solid electrolytic capacitor includes (i) a process of manufacturing a solid electrolytic capacitor sheet (FIGS. 3 to 11), and (ii) a process of processing a plurality of solid electrolytic capacitor sheets (FIGS. 12 to 19A and 19B).

In the (i) solid electrolytic capacitor sheet manufacturing process, the following processes (a) to (g) are performed in sequence.

(a) Metal Sheet Preparation Process

In the metal sheet preparation process illustrated in FIG. 4, a metal sheet 80 made of a valve metal is prepared. The metal sheet 80 includes an anode electrode layer 8 made of a valve metal (aluminum in this example), a first roughened layer 121, and a second roughened layer 121B. The first roughened layer 121 is formed on the upper surface of the anode electrode layer 8. The second roughened layer 121B is formed on the lower surface of the anode electrode layer 8. The roughened layer is formed by etching or the like on both sides of the metal sheet, then followed by chemical processing on both sides of the metal sheet (forming an oxide film and/or anodic oxidation) to form an oxide layer on these surfaces. On the upper surface of the anode electrode layer 8, the first dielectric layer (oxide layer: in this example, an $Al_2O_3$ layer) is formed. The first dielectric layer is formed around the interface vicinity region 91 as illustrated in FIG. 3. The second dielectric layer (oxide layer: in this example, an $Al_2O_3$ layer) is formed on the lower surface of the anode electrode layer 8. The second dielectric layer is formed around the interface vicinity region 91B as illustrated in FIG. 3.

(b) Insulating Region Formation Process

Figure 5:
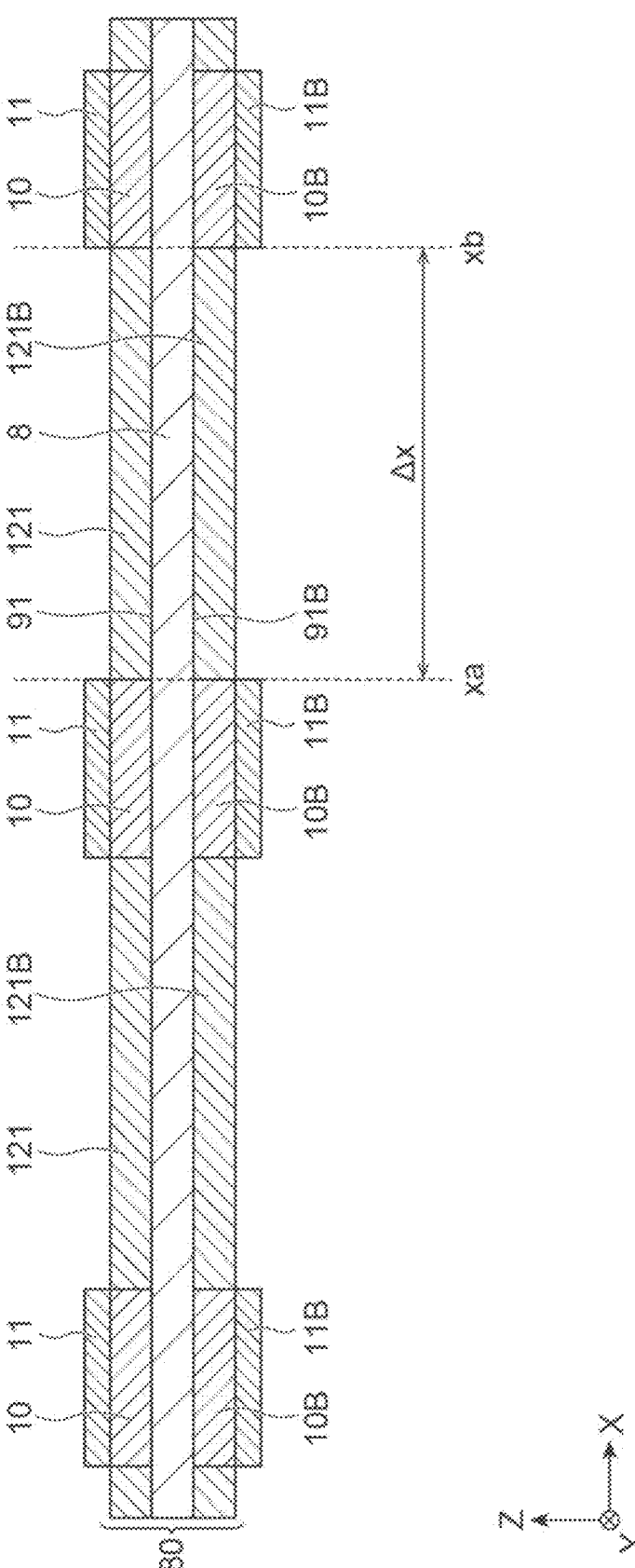
FIG. 5 is a diagram illustrated to describe a method of manufacturing a solid electrolytic capacitor.

In the insulating region formation process illustrated in FIG. 5, a resist is applied to the upper and lower surfaces of the metal sheet 80. There are various known techniques for applying the resist. For example, various techniques such as screen printing, gravure printing, and spray coating are known. In this example, the screen-printing technique is used.

In the resist printing process on the upper surface, a resist layer having a lattice pattern (rectangular grid) is formed on the upper surface of metal sheet 80. A mask (screen plate) with openings for the regions to be coated with resist is used to coat the resist in the openings, and pressure is applied to the resist using a squeegee.

In the resist printing process on the lower surface, a resist layer having a lattice pattern (rectangular grid) is formed on the lower surface of the metal sheet 80. A mask (screen plate) with openings for the regions to be coated with resist is used to coat the resist in the openings, and pressure is applied to the resist using a squeegee.

The resist printing process on the upper surface and the resist printing process on the lower surface can be performed simultaneously. By performing them simultaneously, the manufacturing time can be shortened. The resist printing process on the upper surface and the resist printing process on the lower surface can also be performed in different periods. The metal sheet 80 can also be flipped to process both sides. The resist material is the above-mentioned material A (e.g., a mixture of epoxy resin and silica filler). Known fillers other than silica include alumina and aluminum hydroxide.

Applying the resist allows the resist (insulating resin: such as epoxy resin) to permeate the first roughened layer 121, forming the first insulating region 10 having a lattice pattern in a planar view. Some resist remains on top of the first insulating region 10, forming the first insulating layer 11 with a lattice pattern in plan view. Applying the resist allows the resist (insulating resin: such as epoxy resin) to permeate the second roughened layer 121B, forming the second insulating region 10B with a lattice pattern in plan view. Some resist remains below the second insulating region 10B, forming the second insulating layer 11B with a lattice pattern in plan view.

The distance Δx between adjacent first insulating regions 10 along the X-axis direction is given by distance Δx=position xb−position xa. The conductive polymer is introduced into the openings of the first roughened layer 121 and the second roughened layer 121B defined by the distance Δx.

Figure 6:
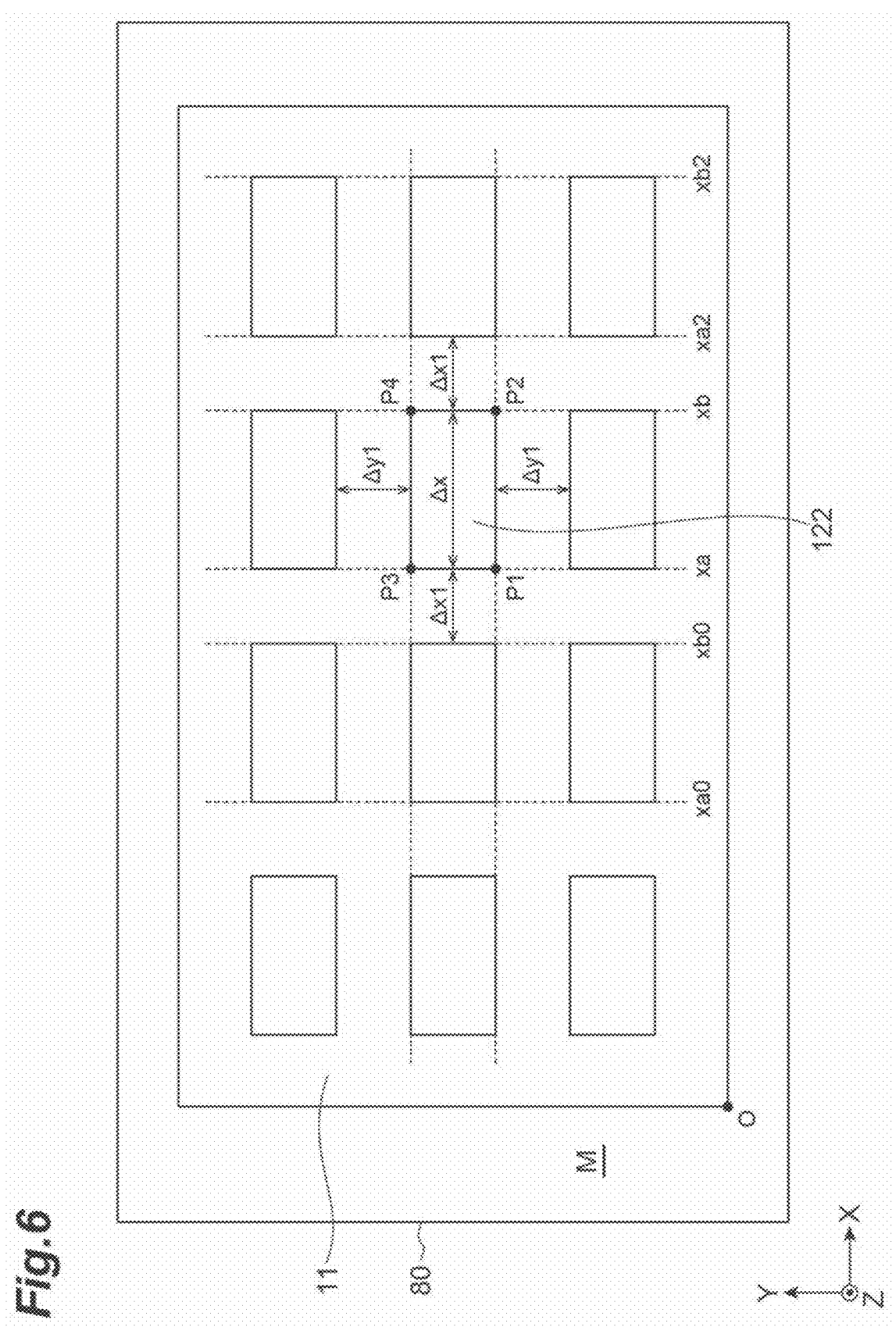
FIG. 6 is a plan view of a solid electrolytic capacitor sheet during manufacture.

FIG. 6 is a plan view of a solid electrolytic capacitor sheet during manufacture.

The first insulating layer 11 having a lattice pattern (rectangular grid) is formed on the surface of a metal sheet 80. The dimension of the metal sheet 80 in the X-axis direction is larger than the dimension in the Y-axis direction. The metal sheet 80 can be wound around a roll with the Y-axis as the axis of rotation, and in this case, the figure illustrates a portion of the metal sheet extending from the roll.

The outer contour of the first insulating layer 11 is rectangular. Taking the lower left vertex of the first insulating layer 11 as an origin O, the long side of the first insulating layer 11 on the lower side of the drawing extends from the origin O along the positive direction of the X-axis, and the short side of the first insulating layer 11 on the left side of the drawing extends from the origin O along the positive direction of the Y-axis. The contour of the metal sheet 80 is rectangular, and there is a margin region M between the first insulating layer 11 formed inside it. In other words, each side that defines the outer contour of the first insulating layer 11 is spaced from each side that defines the contour of the metal sheet 80. One of the openings in the lattice pattern of the first insulating layer 11 has a rectangular shape surrounded by vertices P1, P2, P3, and P4. If the positions of both ends of this opening in the X-axis direction are designated as positions xa and xb, then the distance Δx defined by these positions at these positions determines the width of the opening in the X-axis direction. The distance in the X-axis direction between adjacent openings along the X-axis direction is given by Δx1. The distance in the Y-axis direction between adjacent openings along the Y-axis direction is given by Δy1. In this example, Δx1<Δx. The first insulating layer 11 has a plurality of openings arranged two-dimensionally, each of which has a rectangular shape and the same size.

For a specific opening surrounded by vertices P1, P2, P3, and P4, the positions of both ends in the X-axis direction of the opening located to the left of the specific opening are designated as positions xa0 and xb0. The positions of both ends in the X-axis direction of the opening located to the right of this specific opening are designated as positions xa2 and xb2.

(c) Solid Electrolyte Layer Formation Process

Figure 7:
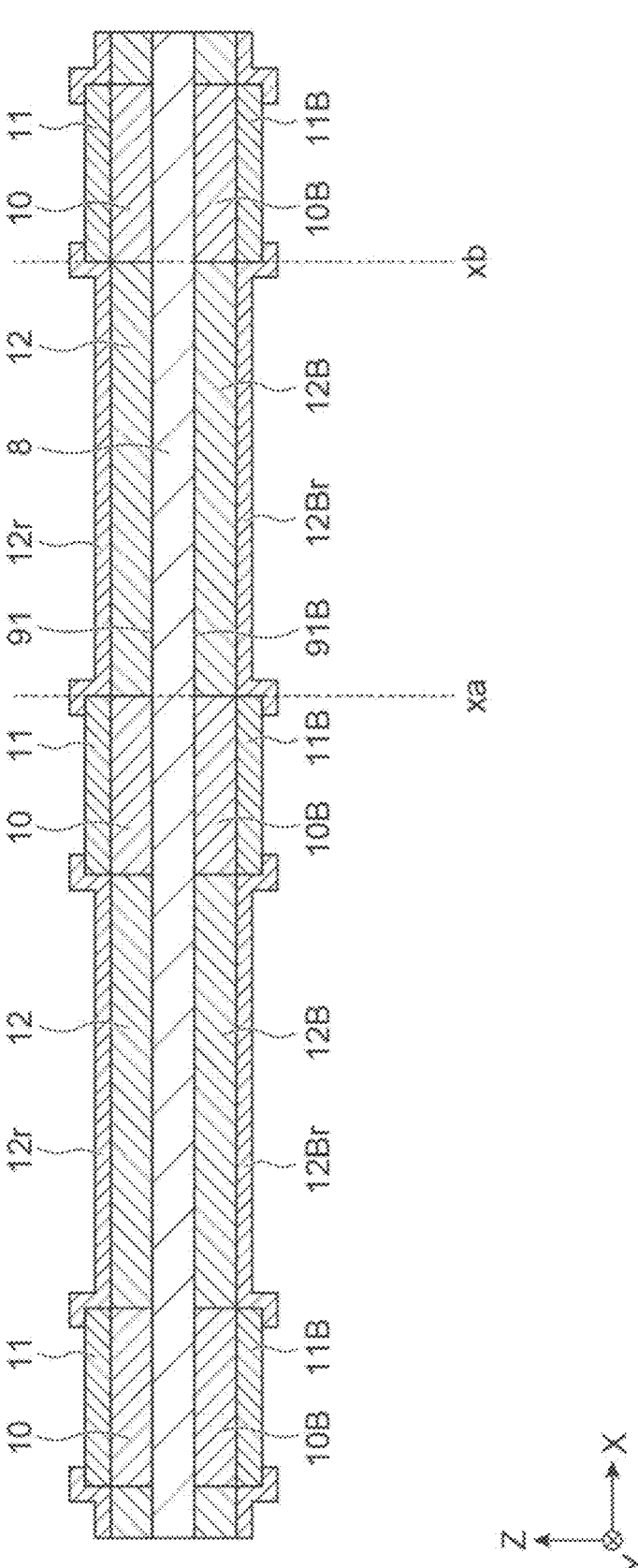
FIG. 7 is a diagram illustrated to describe a method of manufacturing a solid electrolytic capacitor.

In the solid electrolyte layer formation process illustrated in FIG. 7, after the formation of the insulating region, a conductive polymer is introduced into the above-mentioned openings on the upper and lower surfaces of the metal sheet 80 to form a solid electrolyte layer. There are various known methods for introducing conductive polymers. For example, techniques such as coating, chemical oxidation polymerization, and electrolytic polymerization are known.

In the coating technique, a solution containing a conductive polymer is supplied into the opening between the first insulating regions 10 on the upper surface side (and the opening between the second insulating regions 10B on the lower surface side). The solution containing a conductive polymer is either a solution in which a soluble conductive polymer is dissolved in a solvent (water or a solvent) or a solution in which conductive polymer particles (particle diameter: several nm to 20 nm) are dispersed in a solvent such as water or an organic solvent. Methods of supplying the solution containing a conductive polymer into an opening include dispensing droplets from a dispenser and applying a physically continuous liquid. The supplying methods include techniques such as inkjet, printing, and transfer. In this example, a method is used in which the solution containing a conductive polymer (e.g., an aqueous solution) is dropped into the opening from a dispenser, and then dried (removal of moisture). An example of the conductive polymer is doped poly (3,4-ethylenedioxythiophene) (PEDOT). Other conductive polymers mentioned above can also be used. Moreover, in the electrolytic polymerization technique, after forming a conductive resin seed layer as the base, the seed layer is immersed in a monomer solution and grown into a conductive resin layer by electrochemical polymerization.

The conductive polymer introduced to the upper surface side permeates the first roughened layer 121 (see FIG. 5) in the opening between the first insulating regions 10, forming the first solid electrolyte layer 12, with a portion of the conductive polymer remaining on the upper portion of the first solid electrolyte layer 12 to form the first conductive polymer layer 12r. In addition, a portion of the conductive polymer may protrude slightly from the opening, and the first conductive polymer layer 12r may be positioned to contact the main surface (XY plane) of the first insulating region 10. This positioning can help reduce the risk of misalignment during manufacturing and the occurrence of uncoated and unfilled portions. In the XY plane, the shapes of the respective first solid electrolyte layers 12 are rectangular, and these first solid electrolyte layers 12 are arranged in a two-dimensional manner. Moreover, the shapes of the respective first solid electrolyte layers 12 are not limited to a rectangle and can vary.

The conductive polymer introduced to the lower surface side permeates the second roughened layer 121B (see FIG. 5) in the opening between the second insulating regions 10B, forming the second solid electrolyte layer 12B, and a portion of the conductive polymer remains in the lower portion (lower portion in the figure) of the second solid electrolyte layer 12B, forming the second conductive polymer layer 12Br. Additionally, a portion of the conductive polymer may protrude slightly from the opening, and the second conductive polymer layer 12Br may be positioned to contact the main surface (XY plane) of the second insulating region 10B. This positioning can help reduce the risk of misalignment during manufacturing and the occurrence of uncoated and unfilled portions. In the XY plane, the shapes of the respective second solid electrolyte layers 12B are rectangular, and these second solid electrolyte layers 12B are arranged two-dimensionally. Moreover, the shapes of the respective second solid electrolyte layers 12B are not limited to a rectangle, and can vary.

The process of introducing the conductive polymer on the upper side and the process of introducing the conductive polymer on the lower side can be performed simultaneously or at different periods. By performing them simultaneously, the manufacturing time can be shortened. Additionally, it is possible to process the sheet by flipping it.

(d) Conductive Layer Formation Process

In the conductive layer formation process illustrated in FIG. 8, after the conductive polymer introduction process, the first conductive layer 13 is formed on the surface of the first solid electrolyte layer 12, and the second conductive layer 13B is formed on the back surface of the second solid electrolyte layer 12B. Each conductive layer may be a single layer or it may be two or more layers. The formation method can be a method of applying the material of the conductive layer (e.g., carbon paste). Techniques such as screen printing, gravure printing (transfer), and supplying using a dispenser can be used. There are many supplying techniques using a dispenser, such as air dispensing, in which compressed air is added to the liquid material and pushed out from a nozzle, jet dispensing in which the liquid material is sprayed from the tip of a nozzle and supplied, and supplying using an inkjet.

The first conductive layer formation process on the upper side and the second conductive layer formation process on the lower side can be performed simultaneously or in different periods. By performing them simultaneously, the manufacturing time can be shortened. Additionally, it is possible to process the sheet by flipping it.

(e) Cathode Electrode Layer Formation Process

Figure 9:
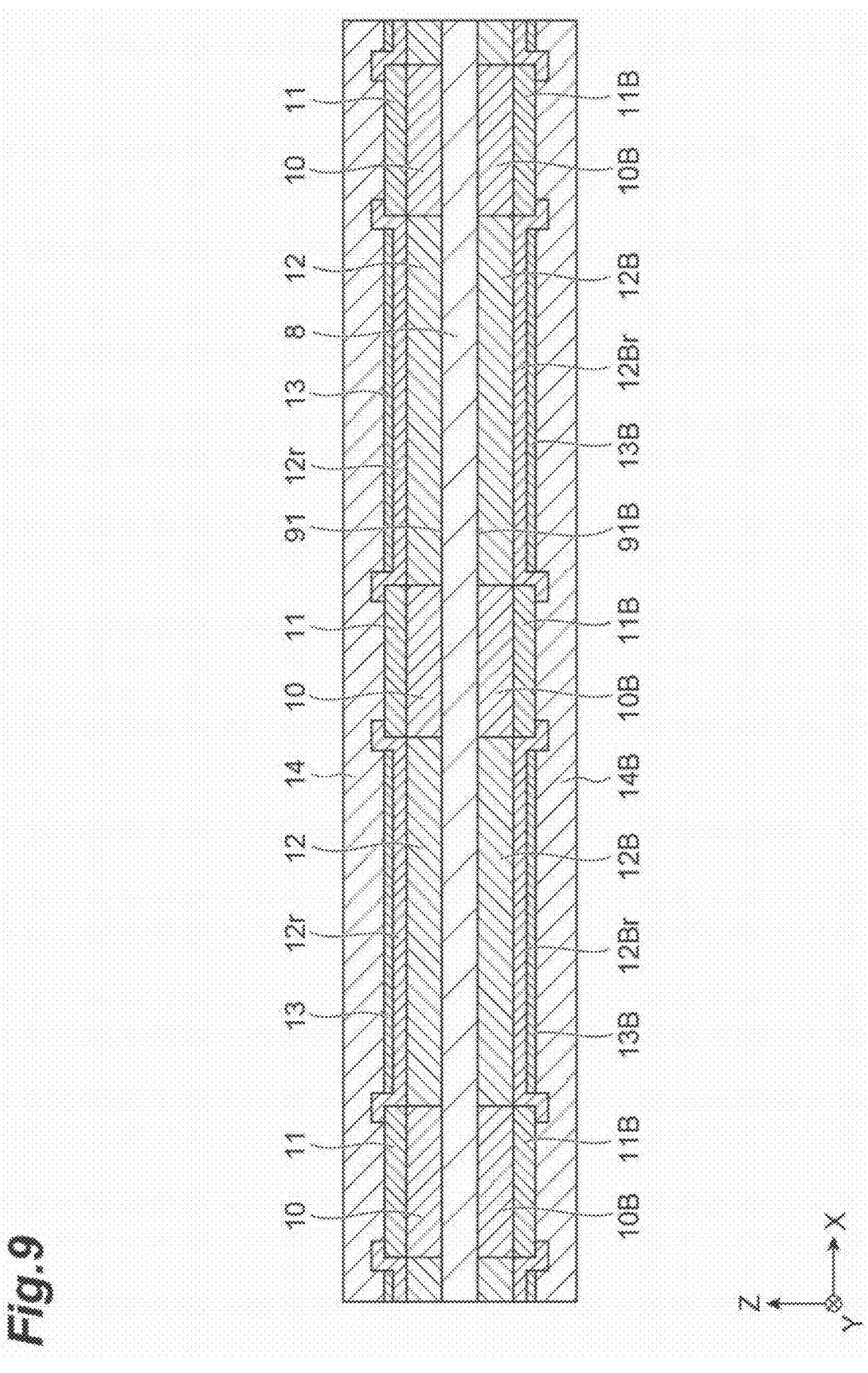
FIG. 9 is a diagram illustrated to describe a method of manufacturing a solid electrolytic capacitor.

In the cathode electrode layer formation process illustrated in FIG. 9, after the conductive layer formation process, the first cathode electrode layer 14 is formed on the surface having the surface of the first conductive layer 13, and the second cathode electrode layer 14B is formed on the back surface having the surface of the second conductive layer 13B. There are various techniques for forming the layers, but in this example, electroplating is used.

In the case of forming the first cathode electrode layer 14 on the upper side, an underlying layer is formed on the surface including the surface of the first conductive layer 13. In the case of forming the second cathode electrode layer 14B on the lower side, an underlying layer is formed on the surface including the surface of the second conductive layer 13B. These underlying layers are formed, for example, by using a sputtering technique. The material of the underlying layer may be copper (Cu) or nickel-chromium alloy (NiCr). The material of the underlying layer may be any material that has high adhesion to the layer directly below it and allow the plating layer to grow on top of it. Then, a plating layer is formed on the underlying layer. The material of the plating layer in this example is copper (Cu). The plating layer is formed by electrolytic plating on the entire surface on which the underlying layer is formed. Through these plating techniques, the first cathode electrode layer 14 and the second cathode electrode layer 14B are formed.

(f) Protective Layer Formation Process

Figure 10:
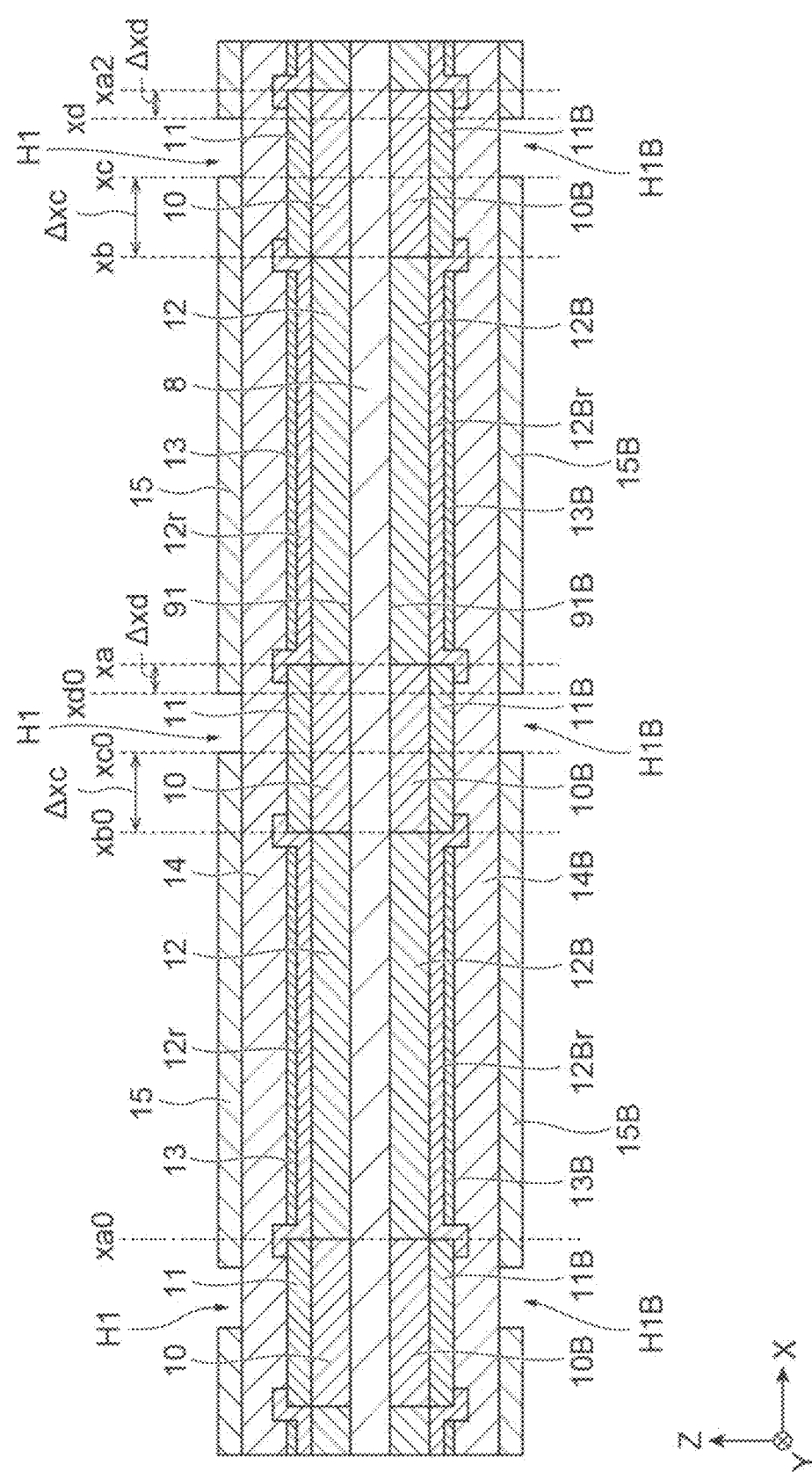
FIG. 10 is a diagram illustrated to describe a method of manufacturing a solid electrolytic capacitor.

In the protective layer formation process illustrated in FIG. 10, after the cathode electrode layer formation process, the first protective layer 15 is formed on the first cathode electrode layer 14, and the second protective layer 15B is formed on the second cathode electrode layer 14B. There are various techniques for forming the first protective layer 15 and the second protective layer 15B. For example, screen printing and gravure printing (transfer) can be used. In this example, the screen-printing technique is used. The resist material used for forming the first protective layer 15 and the second protective layer 15B is a material containing resin, as described above. The first protective layer formation process on the upper side and the second protective layer formation process on the lower side can be performed simultaneously or in different periods. By performing them simultaneously, the manufacturing time can be shortened. Additionally, it is possible to process the sheet by flipping it.

The first protective layer 15 has multiple regions arranged in a two-dimensional configuration, where the shape (shape in the XY plane) of each region is rectangular and the gaps between these regions form a lattice shape (rectangular grid). The width of this gap in the X-axis direction (width of the first opening H1) is given from a position xd to a position xc on the right side of the figure. The position xd is located at a distance Δxd away from a position xa2 illustrated in FIG. 6 in the negative direction of the X-axis. The position xc is located at a distance Δxc away from a position xb illustrated in FIG. 6 in the positive direction of the X-axis (in this example, Δxc>Δxd). The width of this gap in the X-axis direction (width of the first opening H1) is given from a position xd0 to a position xc0 in the center of the figure. The position xd0 is located at a distance Δxd away from the position xa illustrated in FIG. 6 in the negative direction of the X-axis. The position xc0 is located at a distance Δxc away from a position xb0 illustrated in FIG. 6 in the positive direction of the X-axis. The widths of the openings in the X-axis direction (xd-xc) and (xd0-xc0) are smaller than the width of one region in the X-axis direction (Δx) of the first insulating region 10 (FIG. 6).

The first protective layer 15 also has a frame-shaped region (not illustrated) that covers the margin region M (see FIG. 6) between the contour line of the first insulating layer 11 and the contour line of the metal sheet 80 in a planar view. The second protective layer 15B has a plurality of regions arranged two-dimensionally, each of which has a rectangular shape (shape in the XY plane), forming gaps between these regions in a lattice shape (rectangular grid). The second protective layer 15B also has a frame-shaped region (not illustrated) similar to that of the first protective layer 15. The dimensions of each region of the second protective layer 15B are identical to those in the first protective layer 15. These protective layers can function as a mask during the etching of the cathode electrode layer.

The first insulating region 10 is located directly below the first opening H1 located between adjacent rectangular regions included in the first protective layer 15, with the first cathode electrode layer 14 interposed therebetween. Directly below the first opening H1B located between adjacent rectangular regions included in the second protective layer 15B (on the anode electrode layer 8 side), the second insulating region 10B is located through the second cathode electrode layer 14B.

(g) Cathode Electrode Layer Etching and Dividing Process

Figure 11:
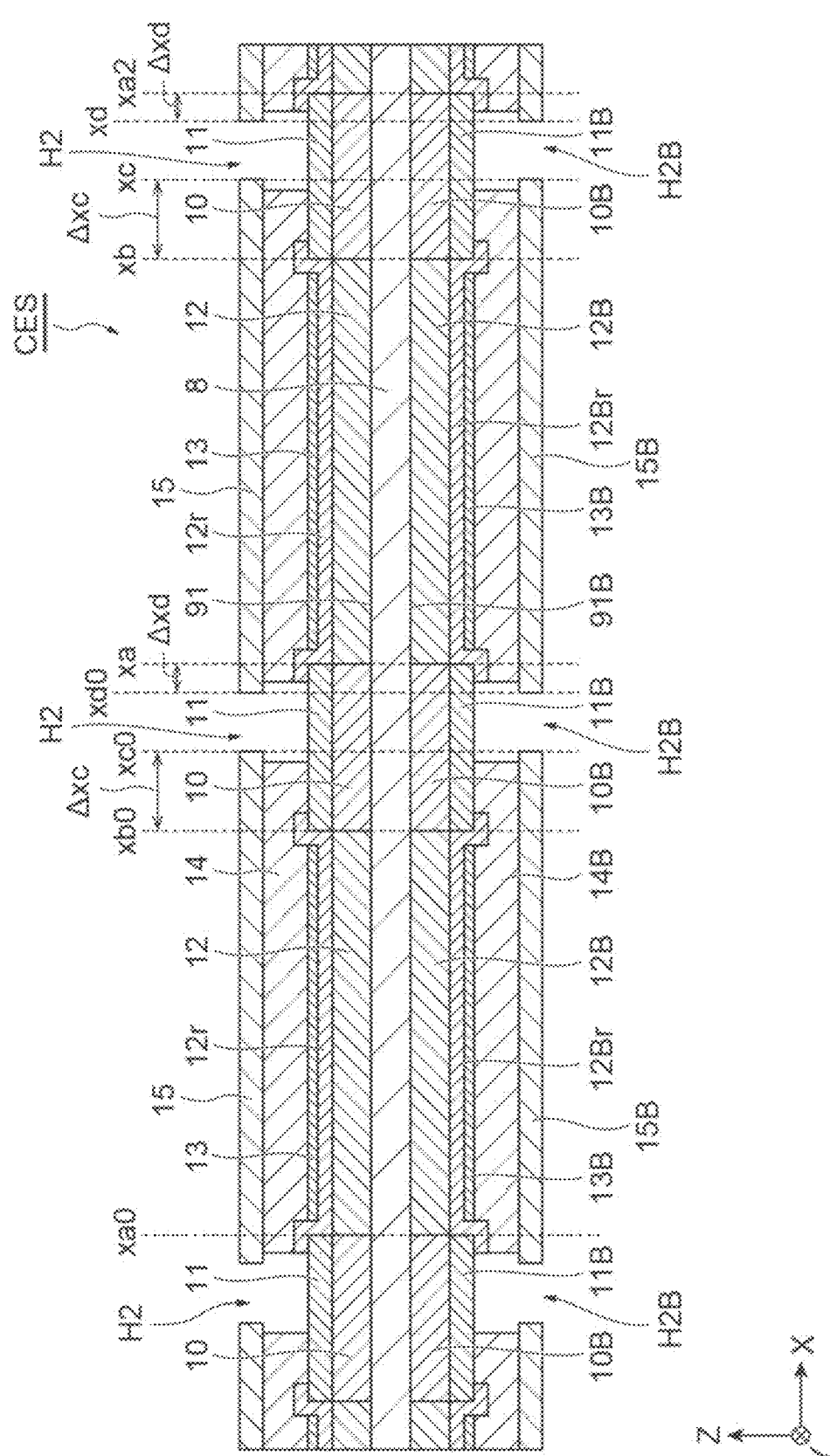
FIG. 11 is a diagram illustrated to describe a method of manufacturing a solid electrolytic capacitor.

In the cathode electrode layer etching and dividing process illustrated in FIG. 11, after the formation process of the first and second protective layers, the first cathode electrode layer 14 and the second cathode electrode layer 14B are etched and divided into a plurality of regions using these protective layers as a mask. As the etching solution, a ferric chloride solution, a copper chloride solution, a mixture of sulfuric acid and hydrogen peroxide solution, or the like can be used. Methods of etching include spraying the etching solution onto the cathode electrode layer or immersing the cathode electrode layer in the etching solution. The cathode electrode layer formed by plating has a dual-layer structure, so these layers are etched.

The etching solution is used to remove the region directly below the first opening in the first cathode electrode layer 14, dividing the first cathode electrode layer 14 into a plurality of rectangular regions. The width of a gap in the X-axis direction (width of the second aperture H2) between these rectangular regions made of the first cathode electrode layer 14 may be slightly wider than the X-axis width of the first opening H1 illustrated in FIG. 10. The XY plane shape of these gaps forms a lattice pattern (rectangular grid).

The etching solution is used to remove the region directly below the first opening in the second cathode electrode layer 14B, dividing the second cathode electrode layer 14B into a plurality of rectangular regions. The width of the gap in the X-axis direction (the width of the second opening H2B) between these rectangular regions made of the second cathode electrode layer 14B is slightly wider than the X-axis width of the first opening H1B illustrated in FIG. 10. The XY plane shape of these gaps forms a lattice pattern (rectangular grid).

As described above, the method of manufacturing the solid electrolytic capacitor sheet includes the processes of: (a) preparing the metal sheet, (b) forming the insulating region, (c) forming the solid electrolyte layer, (d) forming the conductive layer, (e) forming the cathode electrode layer, (f) forming the protective layer, and (g) etching and dividing the cathode electrode layer Through these processes, a solid electrolytic capacitor sheet CES is manufactured.

The (ii) process of processing a plurality of solid electrolytic capacitor sheets to manufacture individual solid electrolytic capacitors involves sequentially executing the following processes (A) to (G).

(A) Stacked Sheet Formation Process

Figure 12:
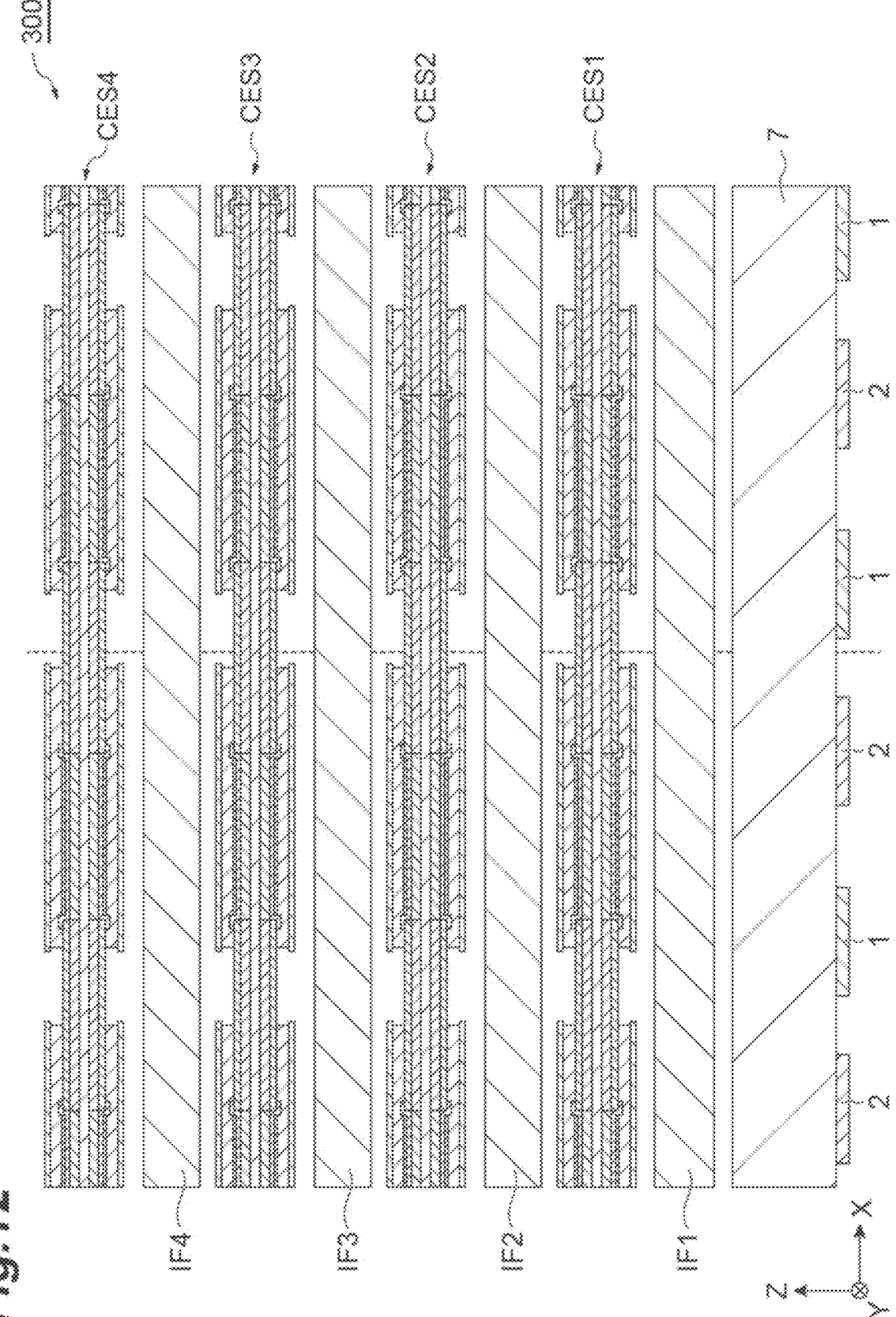
FIG. 12 is a diagram illustrated to describe a method of manufacturing a solid electrolytic capacitor.

In the stacked sheet formation process illustrated in FIG. 12, first, N sheets of the solid electrolytic capacitor illustrated in FIG. 11 are prepared (where 2≤N). In this example, let N=4, and a first solid electrolytic capacitor sheet CES1, a second solid electrolytic capacitor sheet CES2, a third solid electrolytic capacitor sheet CES3, and a fourth solid electrolytic capacitor sheet CES4 are prepared.

Next, a first insulating sheet IF1, the first solid electrolytic capacitor sheet CES1, a second insulating sheet IF2, the second solid electrolytic capacitor sheet CES2, a third insulating sheet IF3, the third solid electrolytic capacitor sheet CES3, a fourth insulating sheet IF4, and the fourth solid electrolytic capacitor sheet CES4 are stacked in this order on the support substrate 7. Pressure is applied in the Z-axis direction to the group of stacked sheets while heating it, forming a stacked sheet 300. Moreover, the multiple anode terminals 1 and the multiple cathode terminals 2 are formed in advance by patterning on the lower surface side of the support substrate 7.

In this example, the insulating sheets (first insulating sheet IF1, second insulating sheet IF2, third insulating sheet IF3, and fourth insulating sheet IF4) are made of a material such as the thermosetting resin described above, and by applying heat and pressure simultaneously, each insulating sheet bonds the upper and lower elements and hardens.

Moreover, the first insulating sheet IF1, the first solid electrolytic capacitor sheet CES1, the second insulating sheet IF2, the second solid electrolytic capacitor sheet CES2, the third insulating sheet IF3, the third solid electrolytic capacitor sheet CES3, the fourth insulating sheet IF4, the fourth solid electrolytic capacitor sheet CES4, and if necessary, an uppermost insulating sheet IFT of FIG. 41 may be stacked in this order on the support substrate 7. Pressure is applied in the Z-axis direction to the group of stacked sheets while heating it, forming a stacked sheet 300. Moreover, the multiple anode terminals 1 and the multiple cathode terminals 2 are formed in advance by patterning on the lower surface side of the support substrate 7.

In this example, the insulating sheets (first insulating sheet IF1, second insulating sheet IF2, third insulating sheet IF3, fourth insulating sheet IF4, and uppermost insulating sheet IFT) are made of materials such as thermosetting resins as described above, and by applying heat and pressure simultaneously, each insulating sheet bonds the upper and lower elements and hardens. For the insulating sheets, using a prepreg material containing glass fiber (glass cloth or glass non-woven fabric) is advantageous in terms of the processing load during the subsequent groove formation process and the molding load during the sealing process. It is also possible to further enhance the strength by forming an uppermost insulating sheet on the top layer side. It is better to have an uppermost insulating sheet, but it is not mandatory. It is also permissible to use a combination of prepreg material containing glass fibers and insulation sheets without glass fibers, and by using only the uppermost insulation sheet made of prepreg material containing glass fibers, the thickness and strength can be optimized.

(B) Groove Formation Process

Figure 13:
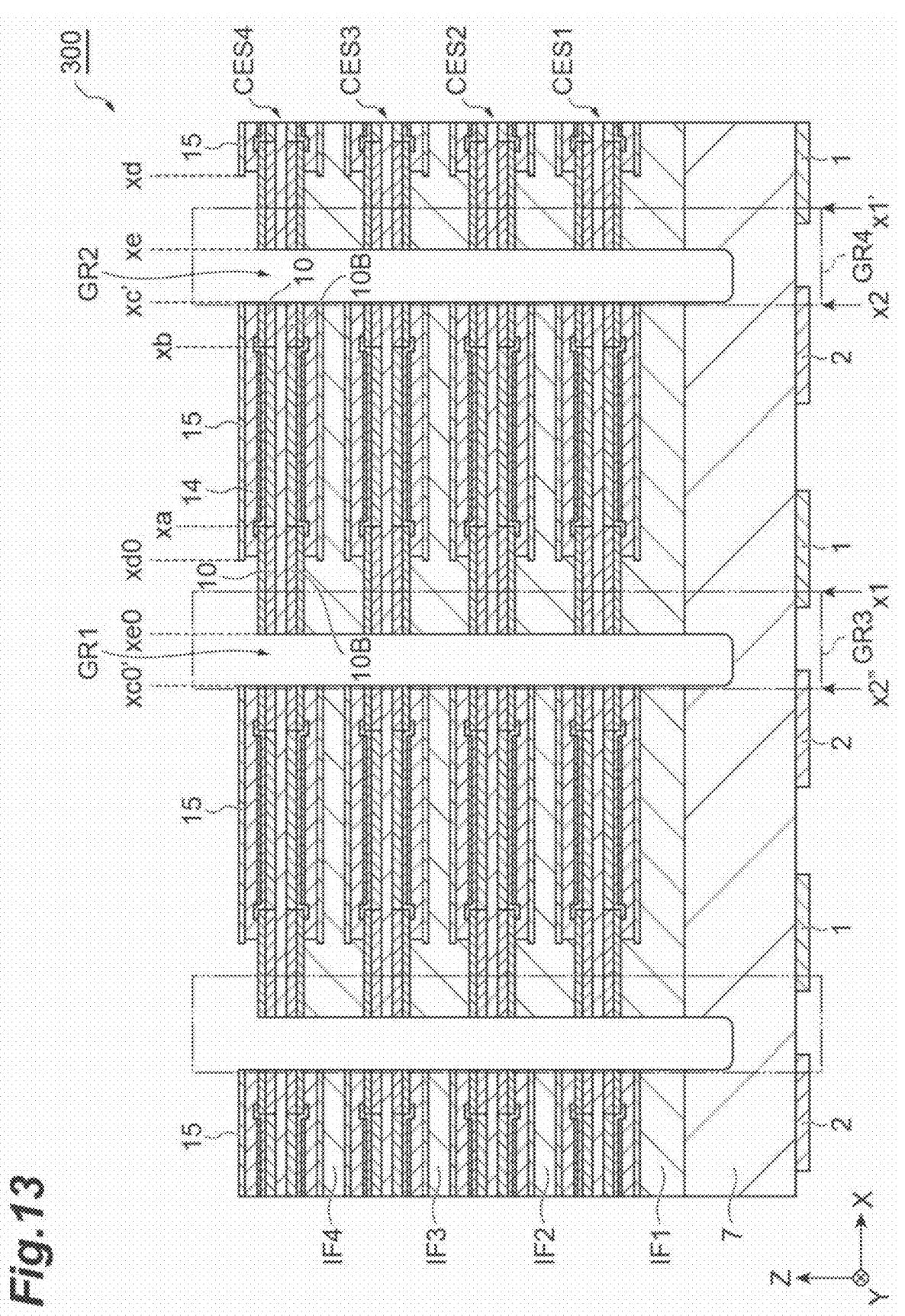
FIG. 13 is a diagram illustrated to describe a method of manufacturing a solid electrolytic capacitor.

In the groove formation process illustrated in FIG. 13, first, the stacked sheet 300 formed in the process of FIG. 12 is prepared. Next, the support substrate 7 of the stacked sheet 300 is placed on the lower side, and a groove is formed in a direction from top to bottom (the −Z-axis direction in FIG. 13). The planar shape of the entire groove in the XY plane is a lattice (rectangular grid), with the group of multiple grooves extending in the X-axis direction and the group of multiple grooves extending in the Y-axis direction. Each groove is formed to cut the first insulating region 10 and the second insulating region 10B of each electrolytic capacitor sheet in the thickness direction (Z-axis) and reaches the inside of the support substrate 7. Each groove does not cut the support substrate 7 completely. These grooves are formed by pressing a rotary blade against the stacked sheet 300. The number of rotary blades used to form the groove may be plural or singular. The width of each groove (rotary blade) is 0.1 mm to 0.7 mm, preferably 0.3 mm to 0.5 mm.

The two grooves adjacent along the X-axis direction and extending along the Y-axis direction are referred to as a first groove GR1 and a second groove GR2. In the subsequent process, the stacked sheet 300 is cut with the rotary blade having a width wider than the width of the first groove GR1 to form a third groove GR3 (see FIG. 16), and is cut with the rotary blade having a width wider than the width of the second groove GR2 to form a fourth groove GR4 (see FIG. 16).

In this figure, the positive direction of the X-axis is the right side, and the negative direction is the left side.

In the region provided with the first groove GR1, the cutting positions from the left side are set as follows in order. From the left side, there are arranged with the left-side cutting position x2″ of the third groove GR3 (third rotary blade), the left-side cutting position xc0′ of the first groove GR1 (first rotary blade), the right-side cutting position xe0 of the first groove GR1 (first rotary blade), the right-side cutting position (first position x1) of the third groove GR3 (third rotary blade), and the position xd0 of the left edge of the mask (protective layer 15) located to the right of the first groove GR1.

In the region provided with the second groove GR2, the cutting positions from the left side are set as follows in order. From the left side, there are arranged with the left-side cutting position (second position x2) of the fourth groove GR4 (fourth rotary blade), the left-side cutting position xc′ of the second groove GR2 (second rotary blade), the right-side cutting position xe of the second groove GR2 (second rotary blade), the right-side cutting position x1′ of the fourth groove GR4 (fourth rotary blade), and the position xd of the left edge of the mask (protective layer 15) located to the right of the second groove GR2.

Moreover, the XY planar shape of the group of grooves formed before the etching process (FIG. 14) of the anode electrode layer 8 made of aluminum does not have to be a rectangular lattice as described above. For example, the group of these grooves may be composed of only a plurality of grooves extending along the Y-axis direction. In this case, after the etching process (FIG. 14) is completed, a plurality of groups extending along the X-axis direction are formed. In this case, the inner side (XZ plane) of the grooves along the X-axis direction becomes flat, making it easier to embed insulating resin in the groove group. In the case of using this process, the degree of freedom in design is higher than in the case where the inner side (XZ plane) of the grooves extending in the X-axis direction is etched.

(C) Etching Process

Figure 14:
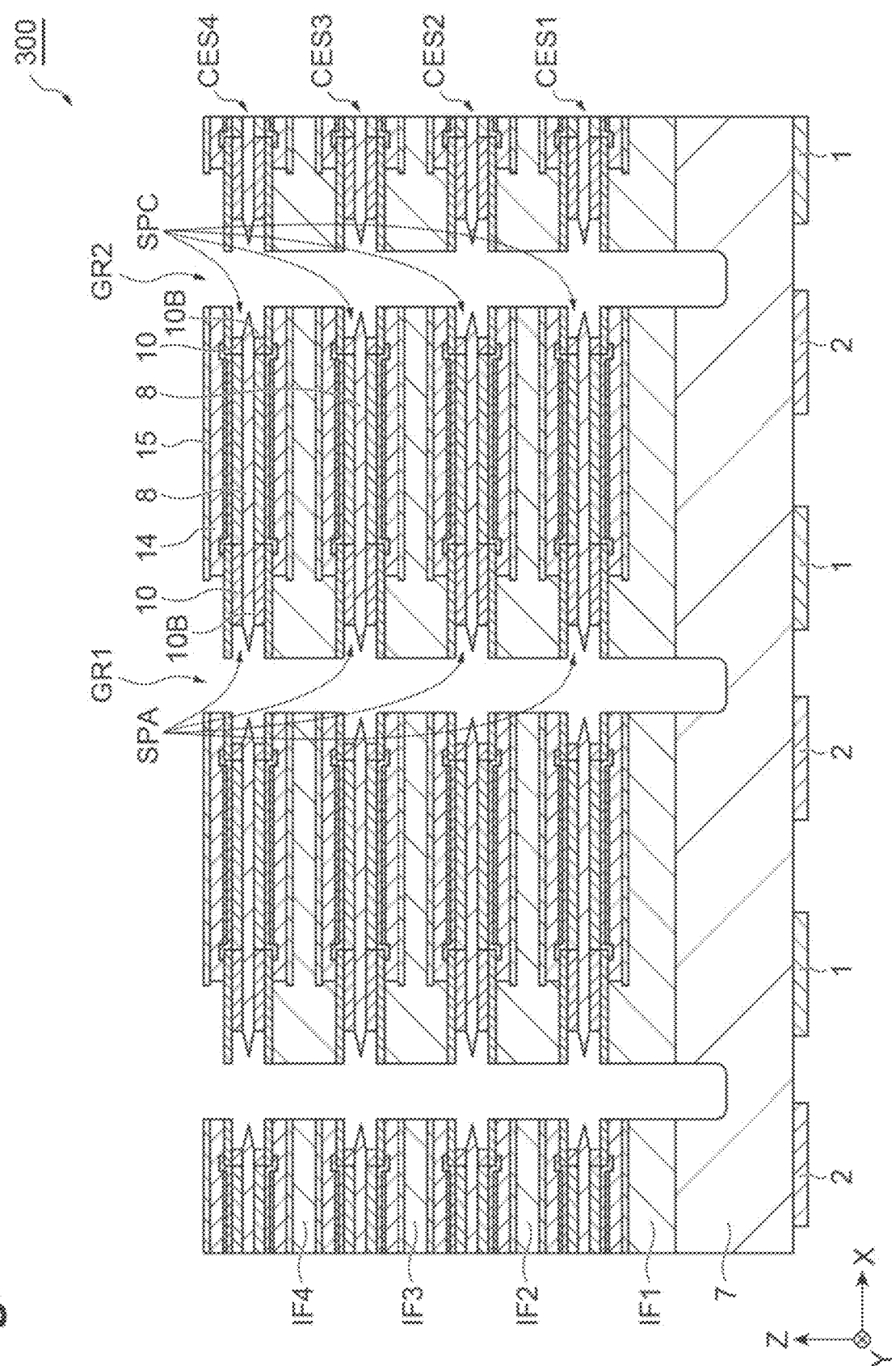
FIG. 14 is a diagram illustrated to describe a method of manufacturing a solid electrolytic capacitor.

In the etching process illustrated in FIG. 14, an etching solution is introduced into the plurality of grooves illustrated in FIG. 13, and the side of the anode electrode layer 8 exposed in the grooves is etched. As a technique of introducing the etching solution, spray coating may be used, or the etching solution may be allowed to immerse the exposed surfaces within the grooves. As for the type of etching solution for the material of the anode electrode layer 8 (in this example, aluminum (Al)), an etching solution capable of selectively etching the material without etching the material of the cathode electrode layer 14 (in this example, copper (Cu)) is used. As such an etching solution, an alkaline solution such as an aqueous sodium hydroxide solution or an acidic solution such as sulfuric acid can be used. Additives may be added to the etching solution as needed.

Both exposed side surfaces of the anode electrode layer 8 made of aluminum are etched, and by etching, new first space SPA and second space SPC, which are continuous with each groove, are formed, and both side surfaces of the anode electrode layer 8 form a protrusion. Focusing on one solid electrolytic capacitor, the first space SPA that is continuous with the first groove GR1 is formed on the left side, and the second space SPC that is continuous with the second groove GR2 is formed on the right side.

The etching solution dissolves not only the anode electrode layer 8 but also the aluminum contained in the first insulating region 10 and the second insulating region 10B. The first insulating region 10 and the second insulating region 10B contain aluminum constituting the roughened layer and an insulating resin such as epoxy resin infiltrated into the roughened layer. Since the etching solution dissolves the aluminum contained in the roughened layer, the regions on the groove side of the first insulating region 10 and the second insulating region 10B are either removed by the etching solution, leaving only the insulating resin. In the figure, the spaces formed by the etching solution (first space SPA and second space SPC) are illustrated to include a region where the insulating region has been completely removed and a region where only the insulating resin remains. Moreover, the aluminum portion contained in the first insulating region 10 (second insulating region 10B) is etched, but the resin portion is not etched and tends to remain in a sponge-like state. The figure simplifies the structure by not illustrating the sponge-like resin part.

Moreover, the protrusions are formed not only at both ends in the X-axis direction of the anode electrode layer 8 but also at both ends in the Y-axis direction, although the protrusions in the Y-axis direction may not be formed. For example, if the process of forming grooves extending in the X-axis direction is set after this etching process, protrusions at both ends in the Y-axis direction will not be formed. Such modifications to the manufacturing process are also possible.

(D) Filling Process

Figure 15:
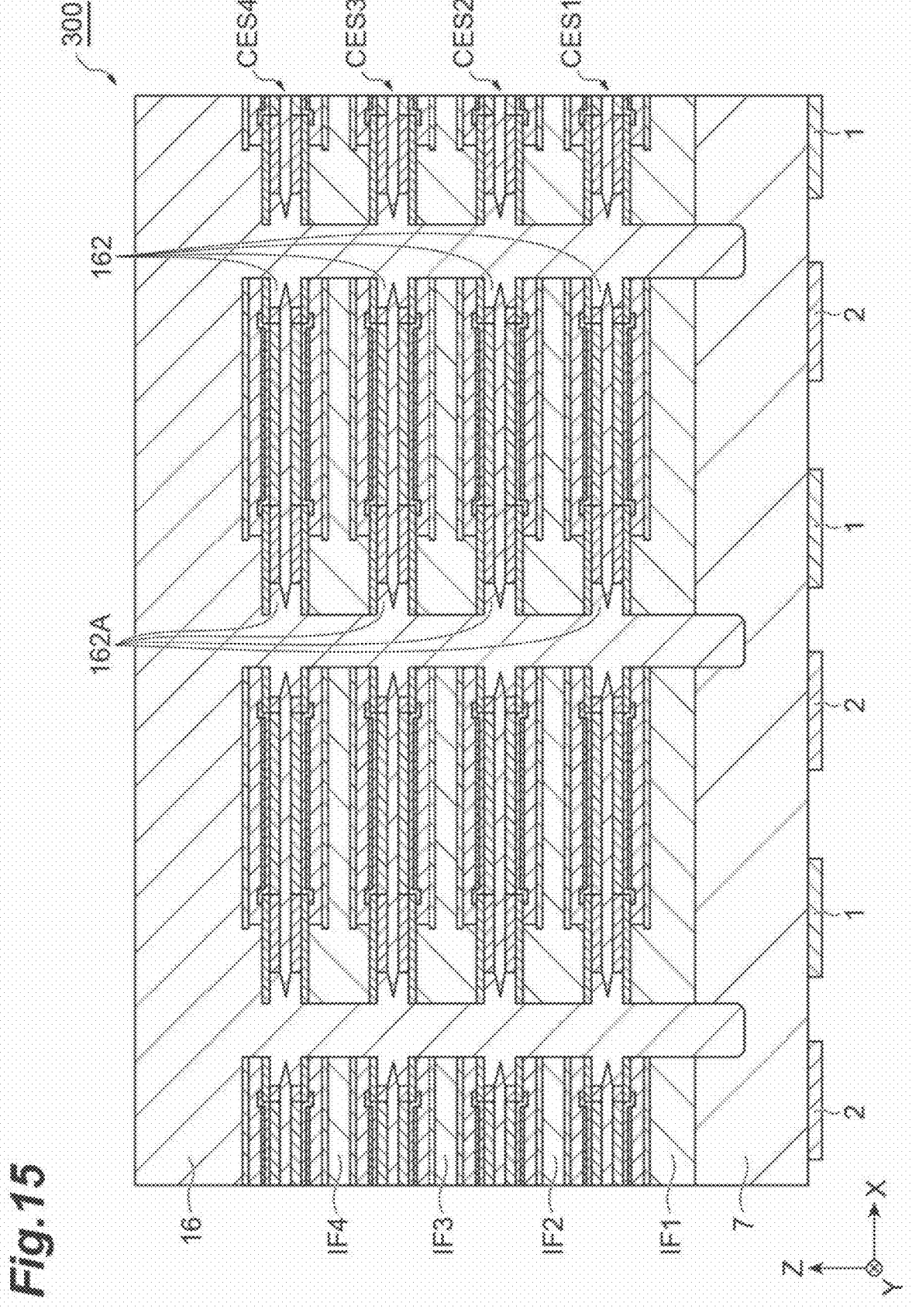
FIG. 15 is a diagram illustrated to describe a method of manufacturing a solid electrolytic capacitor.

In the filling process illustrated in FIG. 15, the groove group formed in the stacked sheet 300 and the spaces continuous with each groove are filled with insulating resin (the protective insulator 16, right insulating portion 162, and left insulating portion 162A). This insulating resin preferably contains a filler. In the filling process, the insulating resin is supplied to the upper surface of the stacked sheet 300, and pressure is applied in the Z-axis direction to fill the insulating resin into the grooves and spaces. The form of the supplied insulating resin may be liquid or solid sheet-like. As filling techniques, compression molding using a liquid-insulating resin, transfer molding, or injection molding can be used. Alternatively, a method can be used where a sheet-like resin sealing material is adhered to the surface of the stacked sheet 300 and the resin sealing material is press-flattened.

The insulating resin is a molded resin and, after the completion of the solid electrolytic capacitor, it covers most of the components. The insulating material constituting the insulating resin (protective insulator 16) is as described above, and as a suitable example, an epoxy resin containing a filler can be used. In the filling process, focusing on one solid electrolytic capacitor, the first space SPA formed in FIG. 14 is filled with a left insulating portion 162A, and the second space SPC is filled with a right insulating portion 162.

(E) Cutting Process

Figure 16:
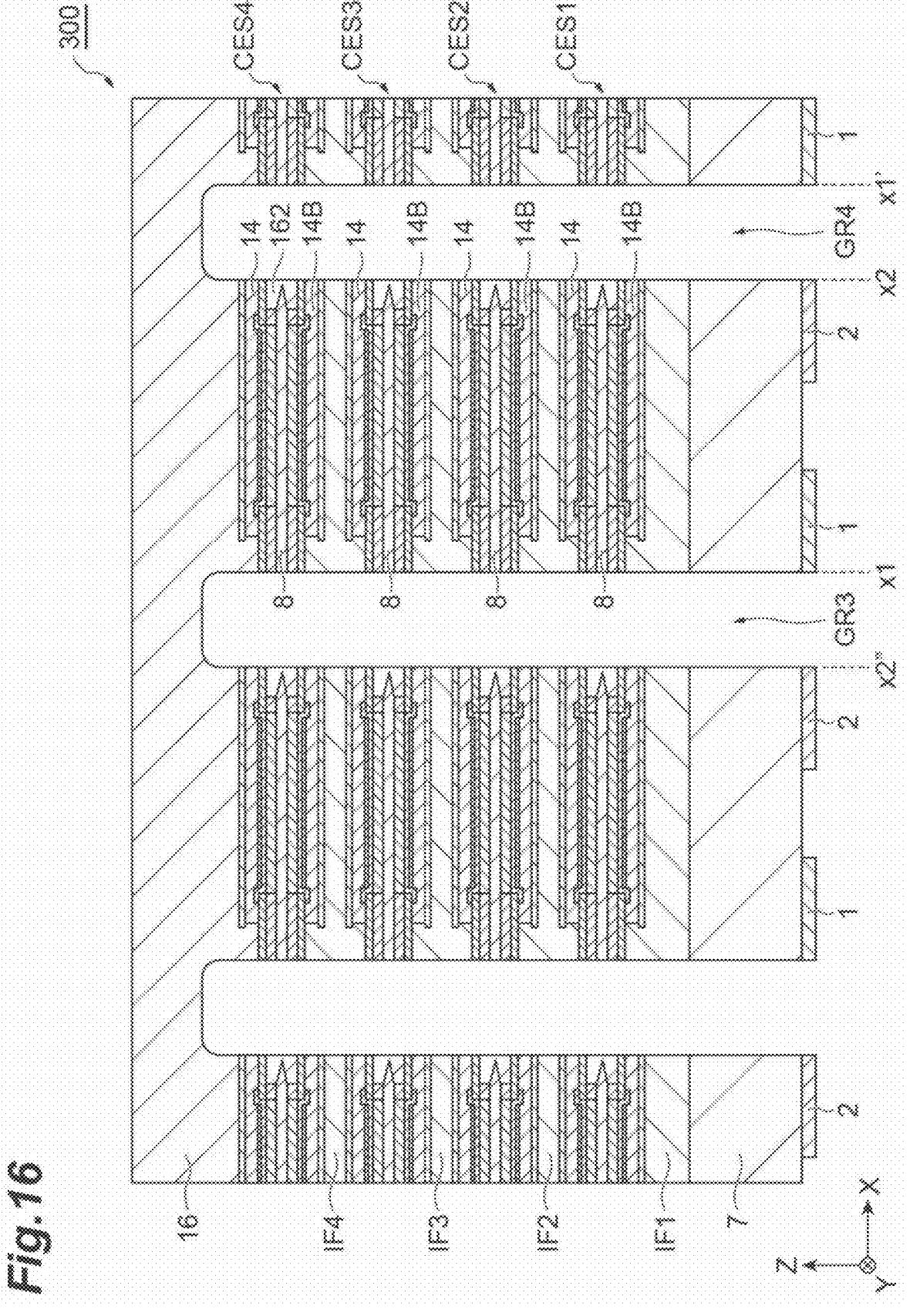
FIG. 16 is a diagram illustrated to describe a method of manufacturing a solid electrolytic capacitor.

In the cutting process illustrated in FIG. 16, multiple grooves with a depth direction in the positive direction of the Z-axis are formed in the stacked sheet 300. Moreover, the stacked sheet 300 can be inverted to facilitate the formation of these grooves.

The overall shape of the grooves in the XY plane is stripe-shaped, with the group of multiple grooves extending in the Y-axis direction. Each groove is formed to cut the first insulating region 10 and the second insulating region 10B of each electrolytic capacitor sheet in the thickness direction (Z-axis) and reaches the inside of the protective insulator 16 that functions as a lid. Each groove does not completely cut the protective insulator 16. These grooves are formed by pressing a rotary blade against the stacked sheet 300. The number of rotary blades used to form the groove may be plural or singular.

Adjacent in the X-axis direction and extending in the Y-axis direction, two grooves are designated as the third groove GR3 and the fourth groove GR4. The positional relationship between these grooves is as described above. With the formation of the third groove GR3, a part of the left side of the anode terminal 1 is removed. With the formation of the fourth groove GR4, a part of the right side of the cathode terminal 2 is removed.

Focusing on one solid electrolytic capacitor, a stacked body functioning as an individual component is formed between the first position x1 on the right side of the third groove GR3 and the second position x2 on the left side of the fourth groove GR4. With the formation of the third groove GR3, the left side surface of the anode electrode layer 8 is exposed at the first position x1. With the formation of the fourth groove GR4, the right sides of the first cathode electrode layer 14 and the second cathode electrode layer 14B are exposed at the second position x2. In other words, in the cutting process, the stacked sheet 300 is cut at the first position x1 to expose the anode electrode layer 8, and the stacked sheet 300 is cut at the second position x2 to expose the insulating portion 162 and the cathode electrode layer (the first cathode electrode layer 14 and the second cathode electrode layer 14B).

(F) Side Electrode Formation Process

Figure 17:
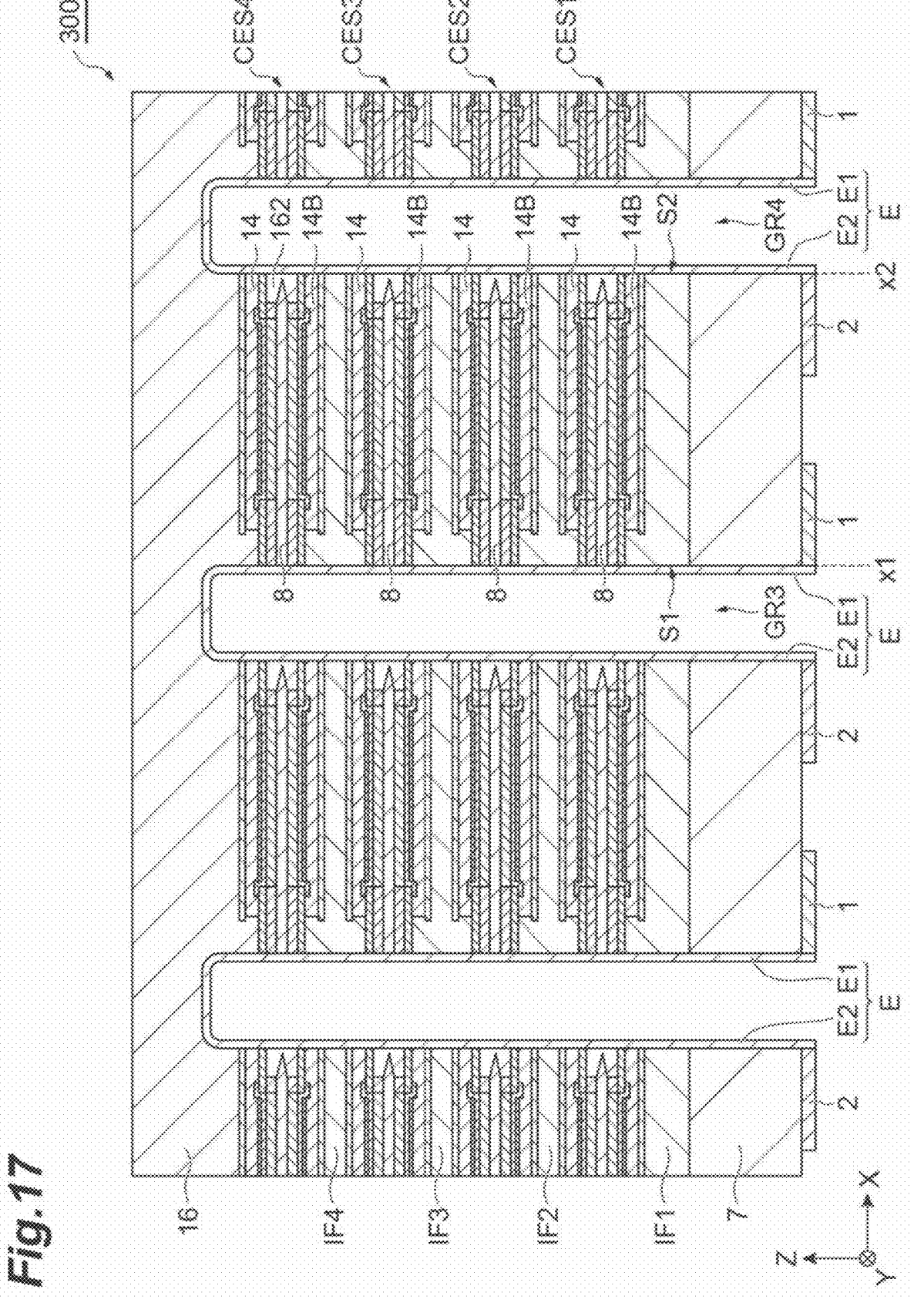
FIG. 17 is a diagram illustrated to describe a method of manufacturing a solid electrolytic capacitor.

In the side electrode formation process illustrated in FIG. 17, a side electrode E is formed on the inner surface of the groove formed in the process of FIG. 16. Moreover, in the following dicing process, the right portion of the side electrode E in one groove becomes the first side electrode E1, and the left portion becomes the second side electrode E2. More specifically, in the side electrode formation process, the first side electrode E1 is formed on the first side surface S1 exposed by cutting at the first position x1, and the second side electrode E2 is formed on the second side surface S2 exposed by cutting at the second position x2. The side electrode E is formed by depositing a plating layer on the underlying layer after the formation of the underlying layer.

The material of the underlying layer is a metal material with high adhesion to resin and metal. The material of the underlying layer (seed layer) can be composed of metals such as Cu, Cr, Ni, Ti, or Zn, conductive materials such as conductive carbon like C, or alloys containing at least one of these materials. The seed layer can be formed by common techniques such as sputtering, electroless plating, or coating. The material of the underlying layer may be any material that has high adhesion to the layer directly below it and allow the plating layer to grow on top of it. Then, a plating layer is formed on the underlying layer. The plating layer may be a single layer or may be composed of multiple stacked metal layers. The material of the plating layer in this example is copper (Cu). The plating layer is formed by electrolytic plating on the entire surface on which the underlying layer is formed. The plating layer can be configured as two or more layers. For example, the first plating layer can be a Cu layer, and the second plating layer can be a Ni layer. For example, the first plating layer can be a Cu layer, the second plating layer can be a Ni layer, and the third plating layer can be a Sn layer. For example, the first plating layer can be a Cu layer, and the second plating layer can be a Sn layer. Instead of the Sn layer, an Au layer can be used.

(G) Dicing Process (Individualization Process)

Figure 18:
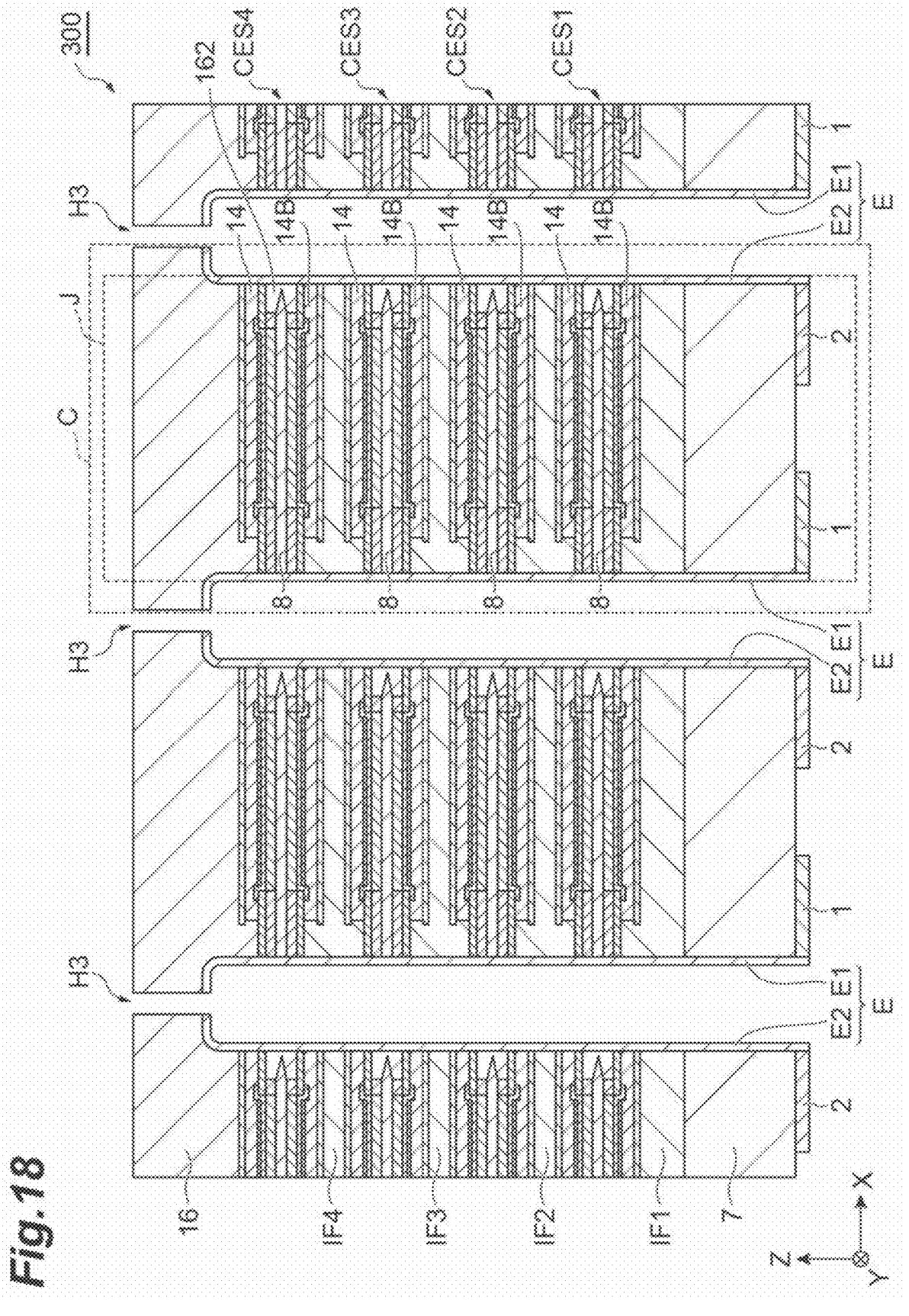
FIG. 18 is a diagram illustrated to describe a method of manufacturing a solid electrolytic capacitor.

In the dicing process illustrated in FIG. 18, the stacked sheet on which the side electrodes are formed is diced. Dicing can be performed using the rotary blade or similar tools, creating a third opening H3 for separating individual components. The dicing lines are set in a lattice pattern (rectangular grid) and are composed of a plurality of cutting lines extending in the X-axis direction and a plurality of cutting lines extending in the Y-axis direction. The group of cutting lines extending in the X-axis direction passes directly above the insulating resin embedded in the grooves extending in the X-axis direction in the process of FIG. 15. The group of cutting lines extending in the Y-axis direction passes through the deepest part of the side electrode E. As described above, this manufacturing method includes an individualization process in which the stacked sheet is divided by dicing or the like to form individual solid electrolytic capacitors.

Figures 19A, 19B:
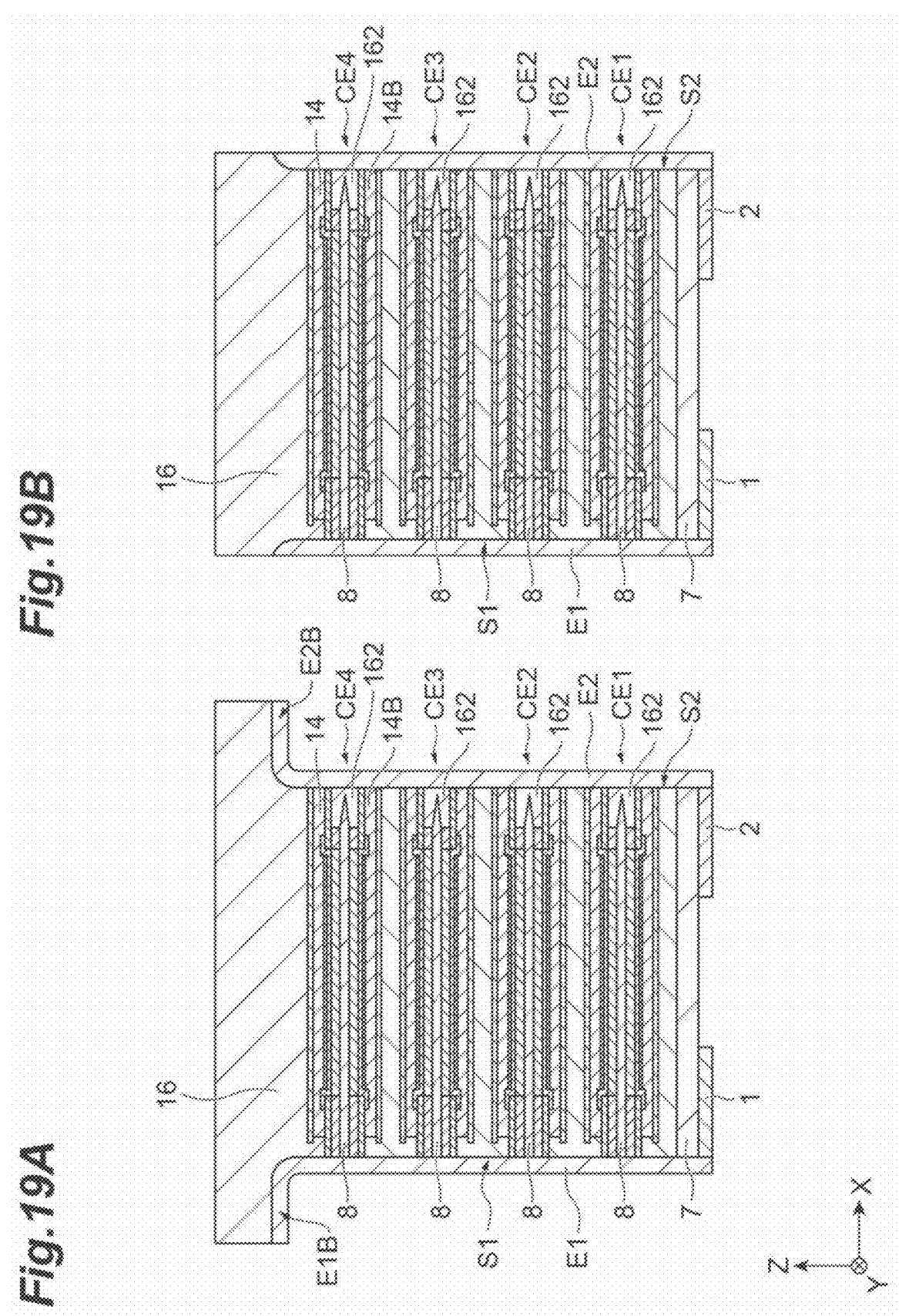
FIGS. 19A and 19B are longitudinal cross-sectional views of a solid electrolytic capacitor.

FIG. 19A is a longitudinal cross-sectional view of a solid electrolytic capacitor manufactured by the above-mentioned manufacturing method. The region surrounded by the dotted line C in FIG. 18 represents one solid electrolytic capacitor. The first solid electrolytic capacitor sheet CES1, the second solid electrolytic capacitor sheet CES2, the third solid electrolytic capacitor sheet CES3, and the fourth solid electrolytic capacitor sheet CES4 illustrated in FIG. 18 correspond to the first solid electrolytic capacitor element CE1, the second solid electrolytic capacitor element CE2, the third solid electrolytic capacitor element CE3, and the fourth solid electrolytic capacitor element CE4, respectively. This solid electrolytic capacitor is identical to the solid electrolytic capacitor illustrated in FIG. 2 except for the number of solid electrolytic capacitor elements being four.

FIG. 19B is a longitudinal cross-sectional view of a solid electrolytic capacitor manufactured by a manufacturing method with a wider dicing rotary blade width. The region surrounded by dotted line J in FIG. 18 represents one solid electrolytic capacitor. This solid electrolytic capacitor does not have a side electrode with a bent portion. If the side electrode has a bent portion, there is an effect of increasing the fillet strength as described above. If the side electrode does not have a bent portion, the component becomes smaller.

As described above, the manufacturing method of the solid electrolytic capacitor includes the following processes: (A) stacked sheet formation process, (B) groove formation process, (C) etching process, (D) filling process, (E) cutting process, (F) side electrode formation process, and (G) dicing process.

In the (A) stacked sheet formation process, a plurality of solid electrolytic capacitor sheets CES each including the anode electrode layer 8 and the cathode electrode layer 14 were prepared, and the plurality of solid electrolytic capacitor sheets were stacked to form the stacked sheet 300.

In the (B) groove formation process, the first groove GR1 and the second groove GR2 were formed in the stacked sheet 300.

In the (C) etching process, the side surfaces of the anode electrode layer 8 exposed in the first groove GR1 and the second groove GR2 were etched.

In the (D) filling process, an insulating resin was filled in the space formed by etching the anode electrode layer 8 to form the insulating portion 162.

In the (E) cutting process, the stacked sheet 300 was cut at the first position x1 to expose the anode electrode layer 8, and the stacked sheet 300 was cut at the second position x2 to expose the insulating portion 162 and the cathode electrode layer (first cathode electrode layer 14 and second cathode electrode layer 14B).

In the (F) side electrode formation process, the first side electrode E1 was formed on the first side surface S1 exposed by the cut at the first position x1, and the second side electrode E2 was formed on the second side surface S2 exposed by the cut at the second position x2.

In the (G) dicing process, the stacked sheet 300 was diced to separate it into a plurality of solid electrolytic capacitors. The dicing process is generally performed when using the stacked sheet provided with the plurality of solid electrolytic capacitors arranged two-dimensionally. Furthermore, even before the dicing process, the group of multiple solid electrolytic capacitors is manufactured. If the dicing process at this stage is omitted, for example, in the above-mentioned (E) cutting process, a method of adhering the stacked sheet 300 to another adhesive sheet and completely cutting the stacked sheet itself can be considered, in which case the cutting process also serves as the dicing process.

The above-mentioned manufacturing method of the solid electrolytic capacitor includes a stacked sheet formation process of preparing the plurality of solid electrolytic capacitor sheets each including the anode electrode layer and the cathode electrode layer and of stacking the plurality of solid electrolytic capacitor sheets to form a stacked sheet, and includes a dicing process of dicing the stacked sheet.

In this manufacturing method, the plurality of solid electrolytic capacitor sheets each including the anode electrode layer and the cathode electrode layer is prepared in advance, stacked, and then individualized (diced) to manufacture individual solid electrolytic capacitors. With this manufacturing method, it is possible to cut out a large number of solid electrolytic capacitors at once after stacking, thereby improving productivity The above-mentioned manufacturing method of the solid electrolytic capacitor includes a groove formation process of forming a groove in the stacked sheet 300, an anode side etching process of etching the side surface of the anode electrode layer 8 exposed in the groove, and a filling process of filling an insulating resin into the space formed by etching the anode electrode layer 8 to form the insulating portion 162. The side surface of the anode electrode layer can be insulated by the filled insulating resin. The above-mentioned manufacturing method of the solid electrolytic capacitor further includes a cutting process of cutting the stacked sheet at the first position x1 to expose the anode electrode layer 8 and at the second position x2 to expose the insulating portion and the cathode electrode layer 14, and a side electrode formation process of forming the first side electrode E1 on the first side surface exposed by the cutting at the first position x1 and forming the second side electrode E2 on the second side surface exposed by the cutting at the second position x2.

In this manufacturing method, the first side electrode E1 connected to the anode electrode layer 8 and the second side electrode E2 connected to the cathode electrode layer E14 can be easily formed, thereby improving productivity.

In the above-mentioned method of manufacturing the solid electrolytic capacitor, the groove formation process includes forming the first groove GR1 and the second groove GR2 in the stacked sheet 300 as a groove, and the anode side etching process etches the exposed side surfaces of the anode electrode layer 8 in the first groove GR1 and the second groove GR2.

Forming the first groove GR1 and the second groove GR2 makes it possible to form an independent solid electrolytic capacitor element between these grooves. Even if there is only one groove, a method of cutting the stacked sheet at a position on the opposite side to the groove formation side in a separate process is also possible, but forming the first groove GR1 and the second groove GR2 allows for more efficient production.

In the above-mentioned method of manufacturing the solid electrolytic capacitor, the method of manufacturing a solid electrolytic capacitor sheet used in the stacked sheet formation process includes a process of forming the insulating region 10 having a lattice pattern in a planar view on the anode electrode layer 8, a process of forming the solid electrolyte layer 12 within an opening of the lattice pattern, and a process of forming the cathode electrode layer 14 that is electrically connected to the solid electrolyte layer 12 and divided into a plurality of regions in a planar view. The process of forming the divided cathode electrode layer can include a process of forming the cathode electrode layer 14 electrically connected to the solid electrolyte layer 12 and a process of dividing the cathode electrode layer 14 into a plurality of regions in a planar view. It is also possible to pre-form the divided cathode electrode layer using a printing technique with a conductive resin or the like.

Dividing the cathode electrode layer 14 into a plurality of regions in advance allows the anode and cathode to be electrically isolated (insulated) after stacking and allows the stacked sheet to be easily divided. This makes the subsequent dicing process of the stacked sheet 300 easier. In addition, when cutting between the plurality of regions of the cathode electrode layer 14 in the above-mentioned cutting process, since the region is separated from the cut surface, it becomes easy to form a structure in which the first side electrode E1 is not connected to the cathode electrode layer 14. Moreover, as described above, since the side electrode is formed along the Y-axis direction, the plurality of grooves (e.g., the first groove GR1 and the second groove GR2 (FIG. 13)) along the Y-axis direction in a planar view are formed before the etching process (FIG. 14). On the other hand, the plurality of grooves (grooves for filling with insulating resin) along the X-axis direction in a planar view can also be formed after completing the etching process.

In the above-mentioned method of manufacturing the solid electrolytic capacitor, the method of manufacturing the solid electrolytic capacitor sheet used in the stacked sheet formation process includes a process of preparing the metal sheet 80 having a roughened layer on the anode electrode layer 8, and the insulating region 10 is formed by supplying an insulating resin into the roughened layer.

Supplying an insulating resin to the roughened layer makes it possible to form the insulating region easily. Moreover, a part of the insulating region can dissolve the metallic components contained in the roughened layer during the above-mentioned etching process, allowing for the insulating resin to be filled during the filling process, thereby completely isolating the anode portion and improving insulation performance.

In the above-mentioned method of manufacturing the solid electrolytic capacitor, in the dicing process, the stacked sheet 300 is diced along the gaps between the multiple regions of the cathode electrode layer 14. The dicing makes it possible to produce easily individual solid electrolytic capacitors.

The above-mentioned method of manufacturing the solid electrolytic capacitor includes a process of forming the protective insulator 16 on the first surface side of the stacked sheet 30, a cutting process of cutting (FIG. 16) the stacked sheet 30 at the first position (x1) where the anode electrode layer 8 is exposed to a position that reaches the protective insulator 16 and cutting the stacked sheet 30 at the second position (x2) where the insulating portion 162 and the cathode electrode layer 14 are exposed to a position that reaches the protective insulator 16, and a side electrode formation process of forming the first side electrode E1 on the first side surface exposed by the cutting at the first position (x1) and forming the second side electrode E2 on the second side surface exposed by the cutting at the second position (x2).

Figure 20:
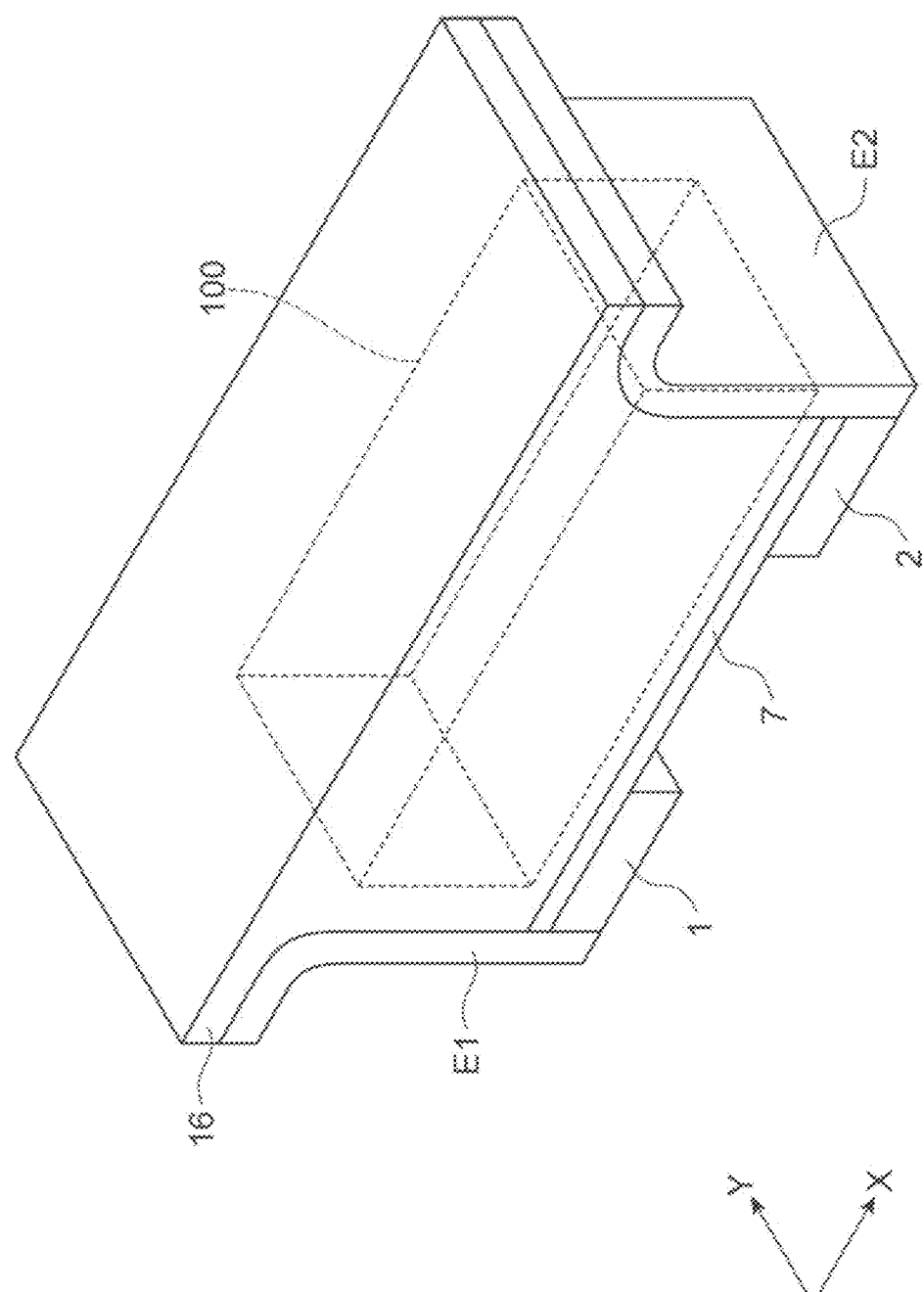
FIG. 20 is a perspective view of a solid electrolytic capacitor.

FIG. 20 is a perspective view of the solid electrolytic capacitor.

The solid electrolytic capacitor includes the stacked body 100 formed by stacking the plurality of solid electrolytic capacitor elements, the first side electrode E1 and the second side electrode E2 provided at both ends of the stacked body 100 in the X-axis direction, and the anode terminal 1 and the cathode terminal 2 provided on the lower surface of the support substrate 7, and the protective insulator 16 located at least on the upper part of the solid electrolytic capacitor is a molded resin made of an insulating resin. This molded resin covers both end positions of the stacked body 100 in the Y-axis direction.

Figure 21:
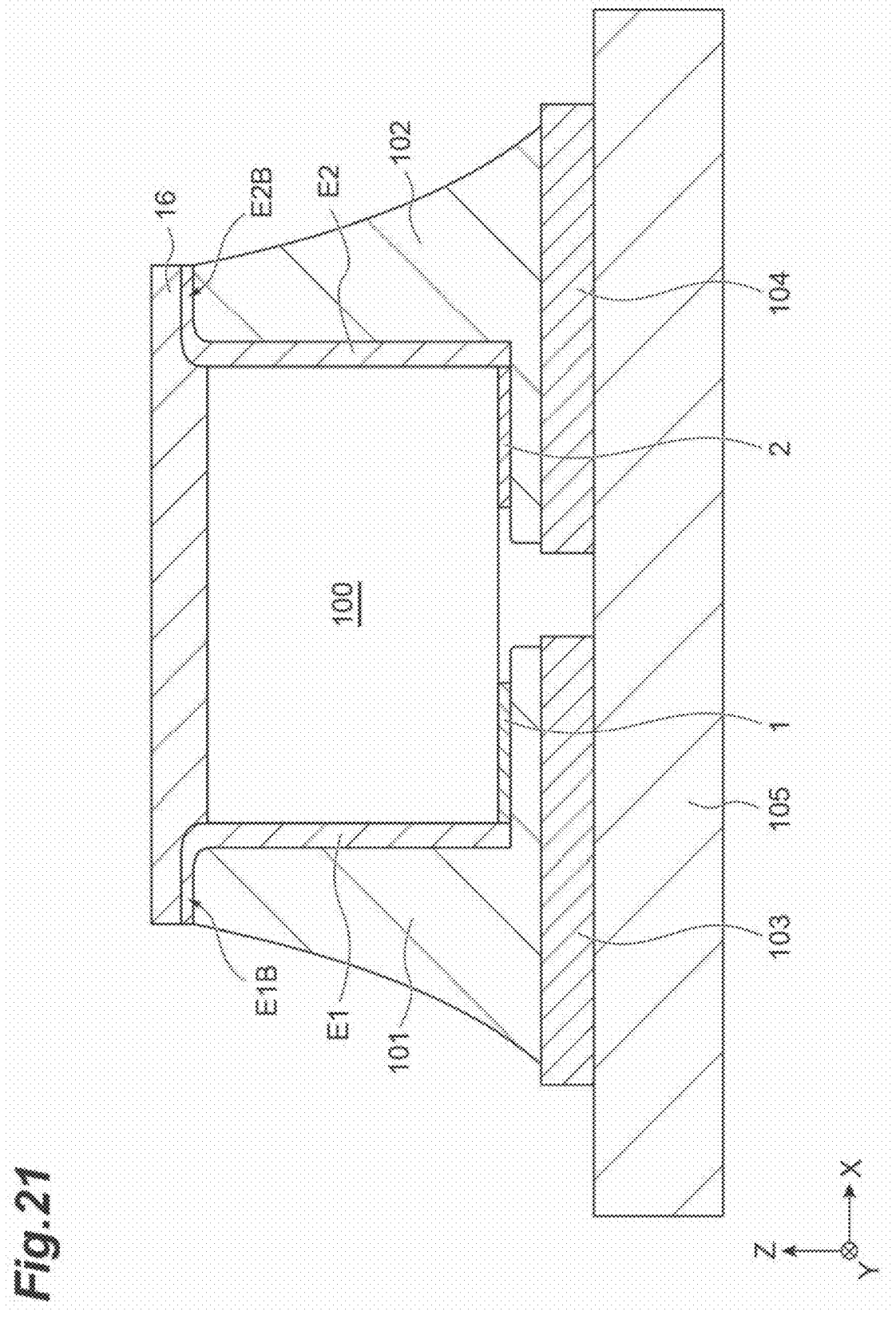
FIG. 21 is a diagram illustrating a solid electrolytic capacitor mounted on a substrate.

FIG. 21 is a diagram illustrating a solid electrolytic capacitor mounted on a substrate.

On a wiring board 105 made of an insulator, a first land electrode 103 and a second land electrode 104 are formed. The first land electrode 103 is electrically connected to the anode terminal 1 and the first side electrode E1 via a first fillet 101 made of a solder material. The second land electrode 104 is electrically connected to the cathode terminal 2 and the second side electrode E2 via a second fillet 102 made of a solder material.

The anode terminal 1 and the cathode terminal 2 are made of copper (Cu), and their surfaces may include a material (Sn) contained in solder. The first side electrode E1 and the second side electrode E2 are made of copper (Cu), and their surfaces may include a material (Sn) contained in solder.

The first fillet 101 is in contact with the side (YZ plane) of the first side electrode E1 and the lower surface (XY plane) of the first bent portion E1B. The second fillet 102 is in contact with the side (YZ plane) of the second side electrode E2 and the lower surface (XY plane) of the second bent portion E2B. The presence of the first bent portion E1B and the second bent portion E2B increases the dimension of the fillet in the X-axis direction, enhancing the mechanical strength.

Figure 22:
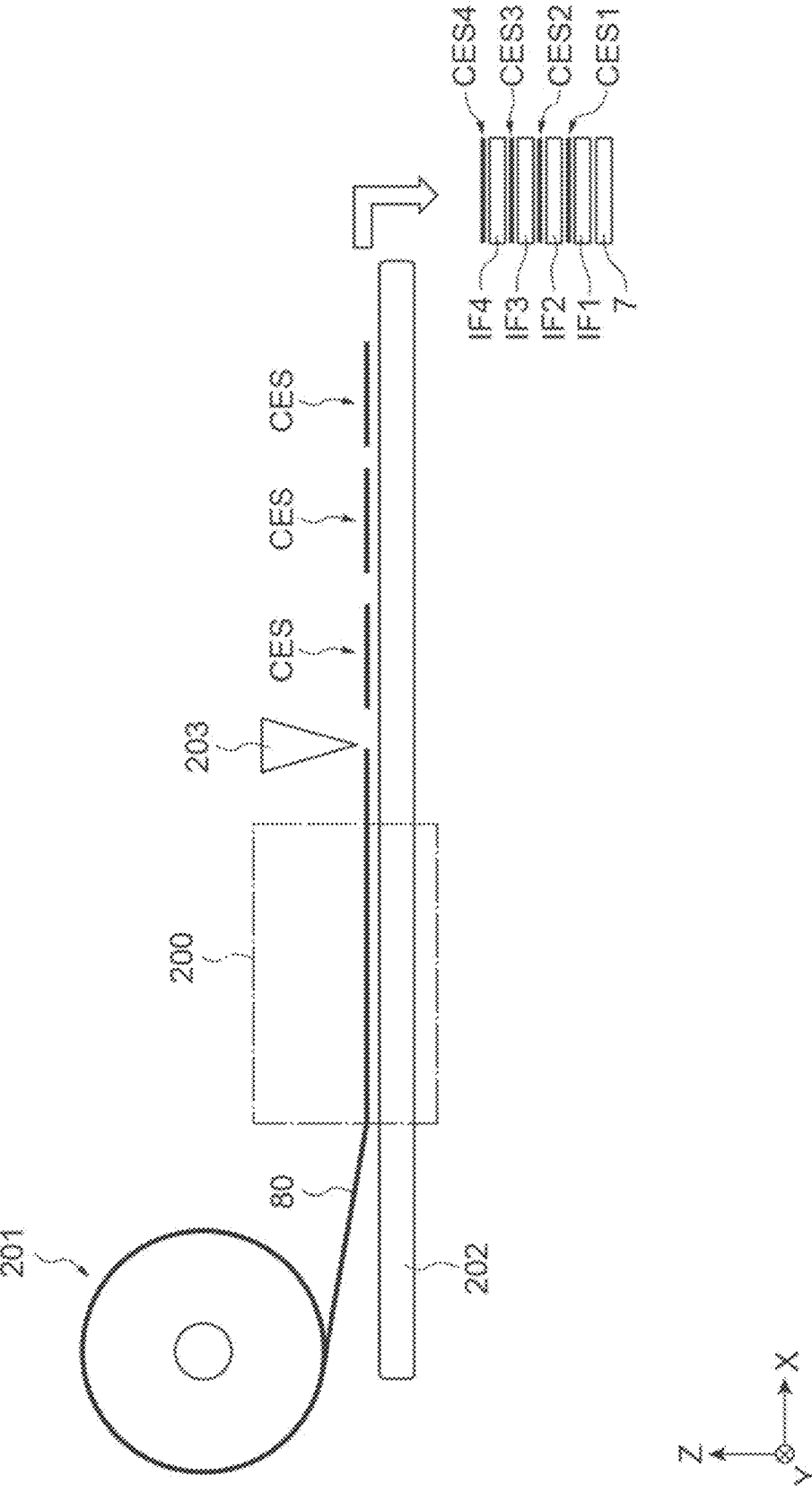
FIG. 22 is a diagram illustrating an example of an apparatus used to manufacture a solid electrolytic capacitor.

FIG. 22 is a diagram illustrating an example of a manufacturing apparatus for a solid electrolytic capacitor.

The above-mentioned processes (a) to (g) for manufacturing the solid electrolytic capacitor sheet CES can utilize a roll body 201 wound with an initial metal sheet 80. The metal sheet 80 extending from the roll body 201 is transported into a processing device 200 by the transport device 202. The processing device 200 continuously executes the above-mentioned processes (a) to (g). After the process (g) is completed, the metal sheet 80 is cut at regular intervals by the cutting device 203, thus separating it into individual solid electrolytic capacitor sheets CES. The solid electrolytic capacitor sheets CES are then sequentially stacked on the support substrate 7 as described in process (A), followed by further processing. In this manufacturing method, using the roll body 201 to perform continuous processing allows an increase in production efficiency. Moreover, it is not necessary to perform all the processing processes by the processing device 200, and after performing some of the processes by the processing device 200, the metal sheet can be wound onto another roll, and then another process can be executed using that roll. Alternatively, it is also possible to execute the above-mentioned manufacturing method using sheet bodies cut to a convenient size without using a roll.

Figure 23:
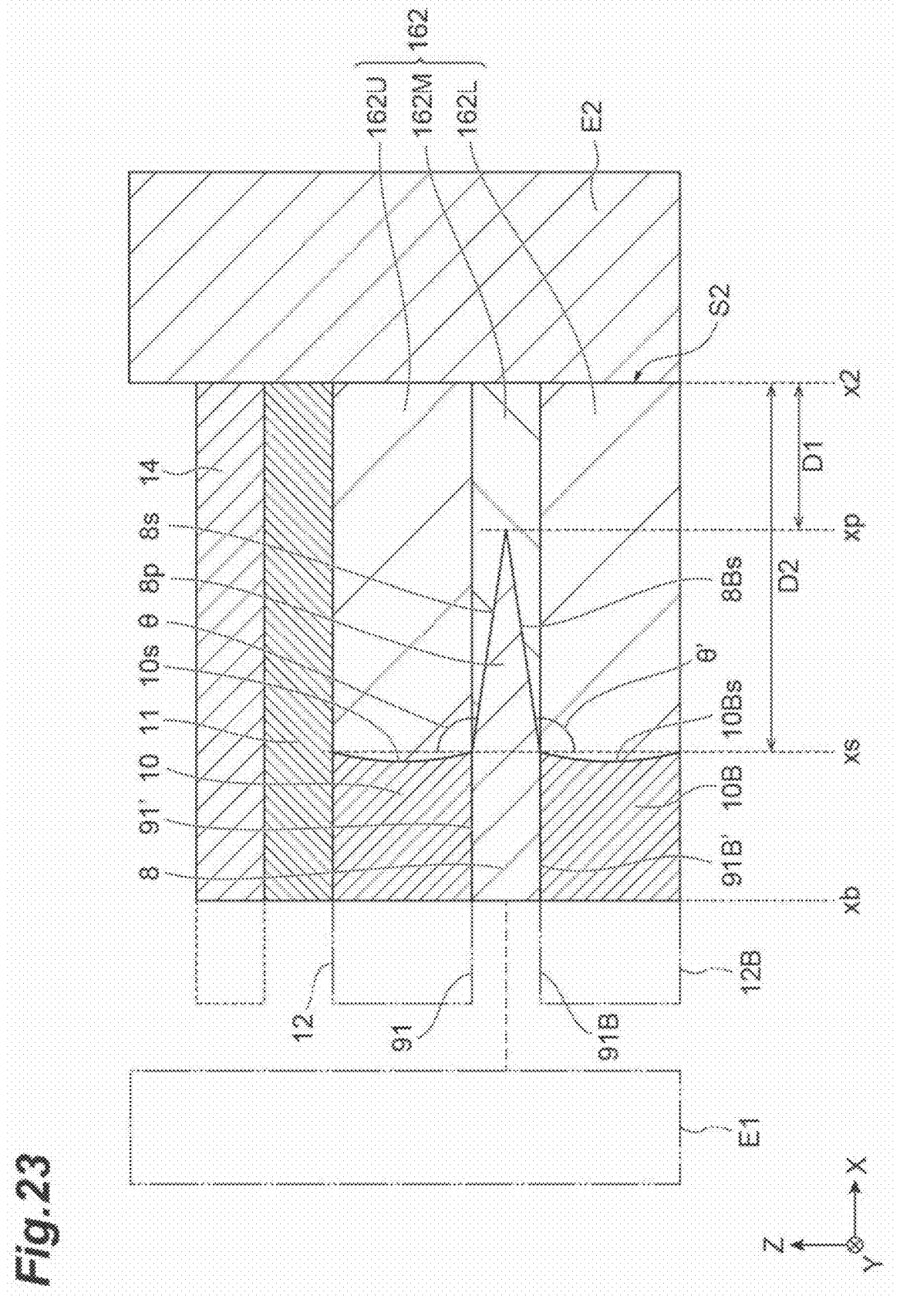
FIG. 23 is a diagram illustrating an example of a peripheral structure of a lateral tip portion of an anode electrode layer.

FIG. 23 is a diagram illustrating an example of the peripheral structure of the lateral tip portion of the anode electrode layer 8.

As described above, the solid electrolytic capacitor includes the stacked body 100 provided with the plurality of stacked solid electrolytic capacitor elements, the first side electrode E1 provided on the first side surface S1 of the stacked body 100, and the second side electrode E2 provided on the second side surface S2 of the stacked body 100.

Moreover, the solid electrolytic capacitor element includes, on the upper side of the anode electrode layer 8, the first dielectric layer, the first solid electrolyte layer 12, and the first cathode electrode layer 14, and includes the first insulating region 10 and an upper layer 162U of the insulating portion 162 on the side. On the side of the anode electrode layer 8, a middle layer 162M of the insulating portion 162 is located. The anode electrode layer 8 is electrically connected to the first side electrode E1. The first dielectric layer is provided on the anode electrode layer 8. The first cathode electrode layer 14 is electrically connected to the second side electrode E2. The first solid electrolyte layer 12 is interposed between the first dielectric layer and the first cathode electrode layer 14. The insulating portion 162 is interposed between the side of the anode electrode layer 8 and the second side electrode E2, and contains an insulating resin. The first insulating region 10 is interposed between the insulating portion 162 and the first solid electrolyte layer 12, and contains a material different from that of the insulating portion 162. Moreover, a dielectric layer made of aluminum oxide or the like is interposed between the first insulating region 10 and the anode electrode layer 8, and this dielectric layer is formed around an interface vicinity region 91'.

The lower side of the anode electrode layer 8 is provided with the second dielectric layer, the second solid electrolyte layer 12B, and the second cathode electrode layer, and is provided with the second insulating region 10B and a lower layer 162L of the insulating portion 162 on the side. Between the second insulating region 10B and the anode electrode layer 8, a dielectric layer made of aluminum oxide or the like is interposed, and this dielectric layer is formed around an interface vicinity region 91B'.

In this figure, an XYZ three-dimensional orthogonal coordinate system is also set, and multiple solid electrolytic capacitor elements are stacked along the Z-axis direction, with the direction from the first side electrode E1 to the second side electrode E2 being the positive direction of the X-axis. The anode electrode layer 8 has a protrusion 8p that protrudes in the positive direction of the X-axis at the end position in the positive direction of the X-axis. The X position of the tip of the protrusion 8p is designated as the tip position xp. The first distance D1 is the distance between the anode electrode layer 8 and the second side electrode E2, and more specifically, the distance between the tip position xp of the protrusion 8p and the position of the second side surface S2 (second position x2). The X position of the first insulating region 10 closest to the second side electrode E2 is designated as the end position xs. The second distance D2 is the distance between the first insulating region 10 and the second side electrode E2, and more specifically, the distance between the end position xs of the first insulating region 10 on the second side electrode side and the position of the second side surface S2 (second position x2). In this example, the first distance D1 is smaller than the second distance D2. Moreover, the second distance D2 is also the distance between the second insulating region 10B and the second side electrode E2.

The insulating portion 162 formed by filling with insulating resin has a three-layer structure. In other words, focusing on the upper capacitor, the insulating portion 162 has a first region (middle layer 162M) adjacent to the side of the anode electrode layer 8, and a second region (upper layer 162U) adjacent to the side of the first insulating region 10.

The insulating portion 162 also has a third region (lower layer 162L) adjacent to the side of the second insulating region 10B. The second region (upper layer 162U) is softer than the first region (middle layer 162M). The third region (lower layer 162L) is softer than the first region (middle layer 162M). This is because the filler content of the upper layer 162U and the lower layer 162L is low.

The first region (middle layer 162M) contains a resin and a filler, and the second region (162U) contains a resin and a filler. The filler content of the second region (upper layer 162U) is lower than that of the first region (middle layer 162M). The filler content of the third region (lower layer 162L) is lower than that of the first region (middle layer 162M). The second and third regions are softer because of their low filler content rate.

The upper layer 162U and the lower layer 162L are made of a mixture of the resin obtained by removing the filler from the above-mentioned material A and material B, but the filler content is lower than that of both material A and material B. The middle layer 162M is mainly made of the material B. In one example, the material A is a mixture of a resin A1 (epoxy resin) and a filler A2 (silica). The material B is a mixture of a resin B1 (epoxy resin) and a filler B2 (silica). The types of resin A1 and resin B1 may be the same or different. The types of filler A2 and filler B2 may be the same or different. In one example, the upper layer 162U and the lower layer 162L contain the resin A1 and the resin B1, and the filler content is smaller than that of the middle layer 162M. The middle layer 162M contains the material B containing the filler B2, and the content rate of the material A is small.

Furthermore, the first region (middle layer 162M) contains the resin B1 and the filler B2 contained in the material B, and the second region (upper layer 162U) and the third region (lower layer 162L) contain a mixed resin of the resin A1 and the resin B1 contained in the material A and the material B. The second region and the third region can be made of a mixed resin, and can be designed to have different characteristics than the first region. For example, the hardness of these regions can be varied. The preferred content rate of the filler B2 in the upper layer 162U and the lower layer 162L can be 0% by mass or more and less than 20% by mass, and the preferred content rate of the filler B2 in the middle layer 162M can be 20% by mass or more and 85% by mass or less. In the case of such a preferred setting example, the stress generated from the difference in the expansion coefficient in the low elasticity part (region with high filler content) can be alleviated in the high elasticity part (region with low filler content). Furthermore, by mixing two types of resin, material A and material B, in the upper and lower regions (upper layer 162U and lower layer 162L), in a complex manner, a more robust adhesion can be obtained than when only a single material is formed. For example, a highly heat-resistant and highly elastic epoxy resin can be used as the resin of material A, and a low-elasticity epoxy resin can be used as the resin of material B. For instance, a polyimide resin can be used as the resin of material A, and an epoxy resin can be used as the resin of material B. Alternatively, an acrylic-epoxy mixed resin can be used as the resin of material A, and another epoxy resin can be used as the resin of material B.

The fundamental function of the insulating portion 162 is to electrically insulate the anode electrode layer 8 from the second side electrode E2. The upper layer 162U and the lower layer 162L of the insulating portion 162 are soft, which helps protect elastically the nearby structure from deformation by providing elasticity.

The side of the second side electrode E2 of the anode electrode layer 8 is provided with the protrusion 8p. Stress may be applied to the interface between the protrusion 8p and the insulating portion 162. Stress may be applied to the interface between the first insulating region 10 (or the second insulating region 10B) and the insulating portion 162. On the other hand, the tip position xp of the protrusion 8p that determines the first distance D1 is different from the end position xs on the side of the second side electrode of the first insulating region 10 that determines the second distance D2, so the alignment of these positions can help suppress the transmission of stress to the interface with the insulating portion 162 more than when these positions are coincident. In other words, it is possible to suppress the occurrence and progression of cracks in the component. In the case where an interface of an appropriate material is located above the anode electrode layer 8, the tip position (X-direction position) of the protrusion 8p can be made different from the interface position (X-direction position), so further suppressing the transmission of stress to the interface than when these positions are coincident.

Furthermore, the protrusion 8p has a triangular shape in the XZ plane. A first angle θ that defines the upper hypotenuse of the triangle forms an angle with the Z-axis passing through the X-axis position (xs) that determines the second distance D2 of the first insulating region 10 and the contour line 8s of the protrusion 8p at the intersection of this Z-axis and the protrusion 8p in the XZ plane. The first angle θ is greater than 90° (an obtuse angle: 90°<θ). In the case of this obtuse angle shape, when a deformation stress is applied that bends the hypotenuse (contour line 8s) of the protrusion 8p about the Y-axis, the force acting on the first insulating region 10 is smaller than in the case where the first angle θ is 90°. Thus, the occurrence of cracks in the component is suppressed.

Similarly, a second angle θ' that defines the lower hypotenuse of the triangle is the angle formed by the Z-axis passing through the X-axis position (xs) that determines the second distance D2 of the second insulating region 10B and the contour line 8Bs of the protrusion 8p at the intersection of the Z-axis and the protrusion 8p in the XZ plane. The second angle θ' is greater than 90° (an obtuse angle: 90°<θ'). In the case of this obtuse angle shape, when a deformation stress is applied that bends the hypotenuse (contour line 8Bs) of the protrusion 8p about the Y-axis, the force acting on the second insulating region 10B is smaller than when the second angle θ' is 90°. Thus, the occurrence of cracks in the component is suppressed.

With the above-mentioned structure, in addition to suppressing the occurrence of cracks, delamination between the layers is also suppressed, thereby increasing the lifespan of the solid electrolytic capacitor.

Figure 24:
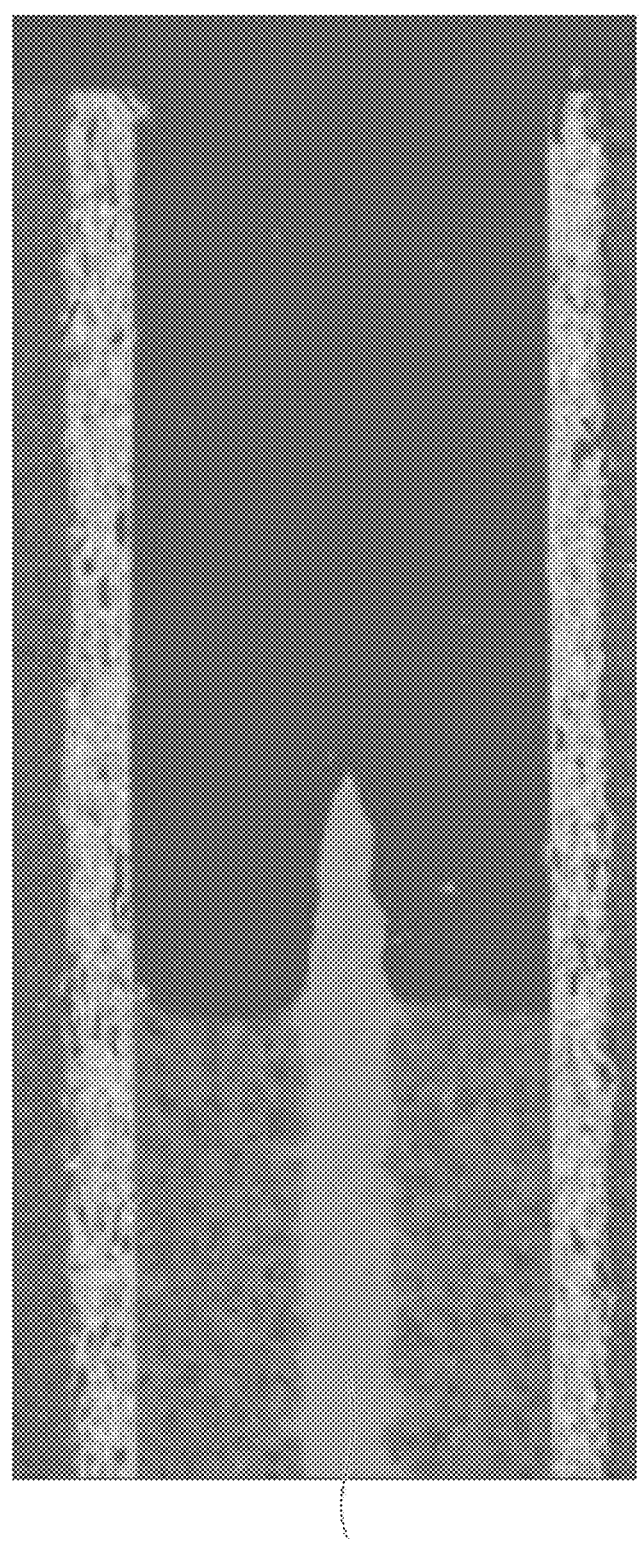
FIG. 24 is a diagram illustrating the peripheral structure of a lateral tip portion of an anode electrode layer observed by an electron microscope.

FIG. 24 is a diagram illustrating the peripheral structure of the lateral tip portion of the anode electrode layer observed by an electron microscope. The tip of the anode electrode layer 8 is indicated in a protruding state.

Figure 25:
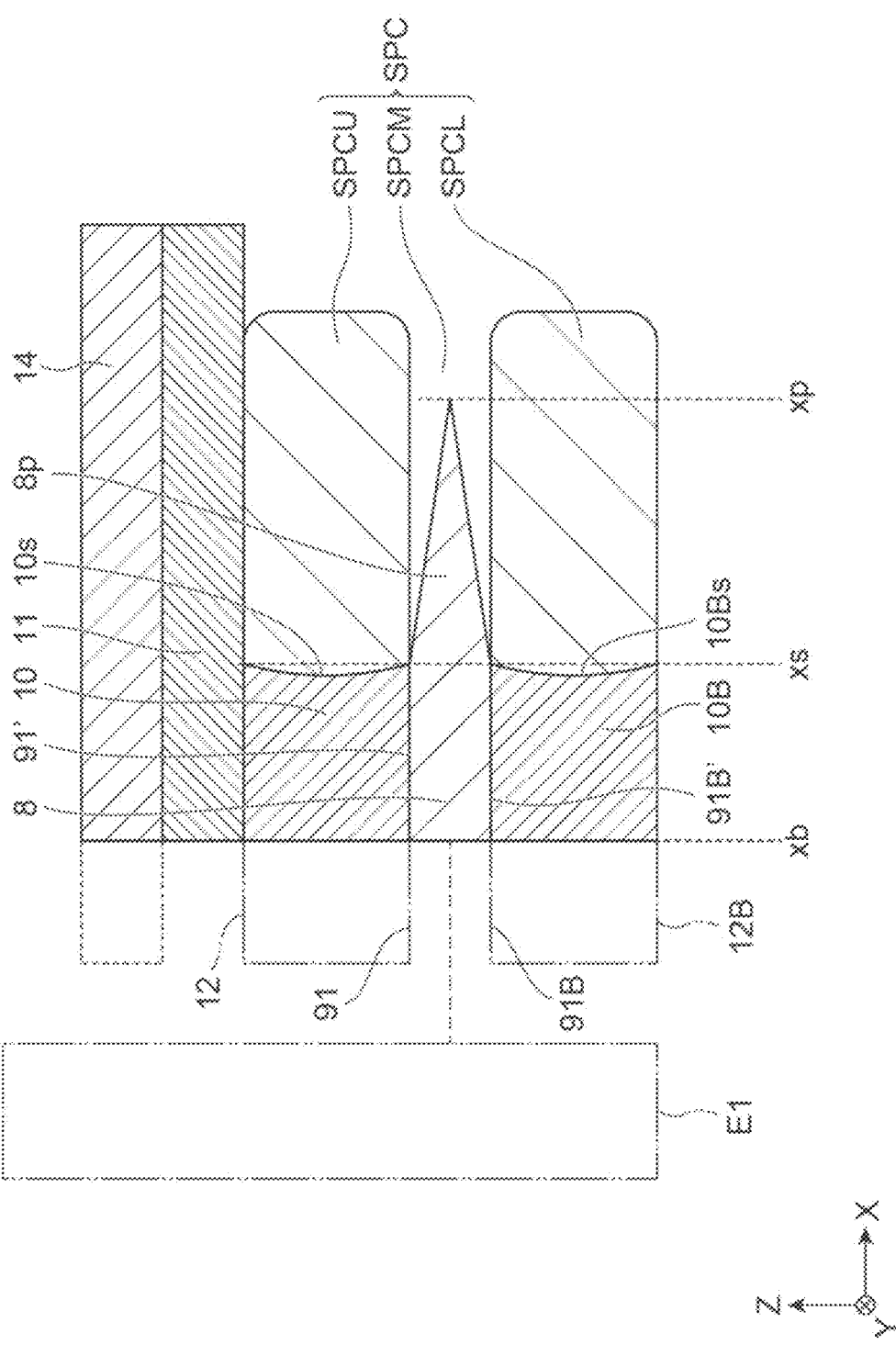
FIG. 25 is a diagram illustrating an example of the peripheral structure of a lateral tip portion of an anode electrode layer in relation to etching.

FIG. 25 is a diagram illustrating an example of the peripheral structure of the lateral tip portion of the anode electrode layer in relation to etching. The spaces (first space SPA and second space SPC) formed in the above-mentioned (C) etching process (FIG. 14) are spaces from which the material (aluminum) constituting the anode electrode layer has been removed rather than spaces filled only with a gas such as air. In the upper space SPCU and lower space SPCL in such a space (exemplified by illustrating only the second space SPC), the resist material (insulating resin: such as epoxy resin) supplied in the above-mentioned (b) insulating region formation process (FIG. 5) remains. The middle space SPCM in this space is a space from which the anode electrode layer has been removed, and it is filled with gas after etching.

The resist material (resin contained in the material A) in the upper space SPCU is mixed with the insulating resin (material B) for molding in the subsequent (D) filling process (FIG. 15). Similarly, the resist material (resin contained in the material A) in the lower space SPCL is mixed with the insulating resin (material B) for molding in the subsequent (D) filling process (FIG. 15). Moreover, the filler (e.g., silica) contained in the material B is less likely to be mixed into the resist material (resin contained in the material A). Since there is no resist material in the middle space SPCM, the material B containing the filler is easily filled. Through these processes, the filler content of the upper and lower layers of the insulating portion 162 (FIG. 23) decreases, resulting in a soft cushioning effect.

Figure 26:
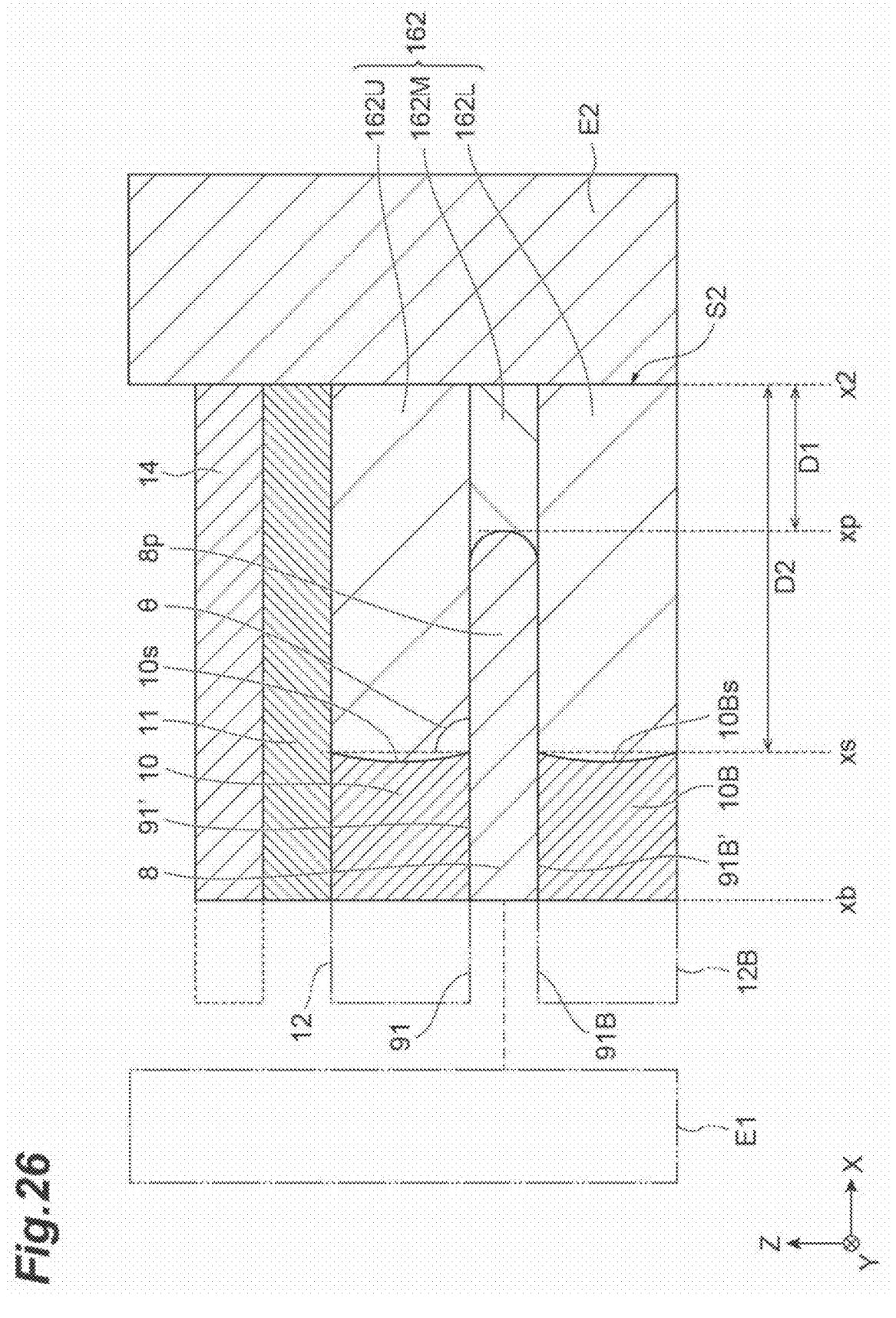
FIG. 26 is a diagram illustrating an example of the peripheral structure of a lateral tip portion of an anode electrode layer.

FIG. 26 is a diagram illustrating an example of the peripheral structure of the lateral tip portion of the anode electrode layer. In this figure, the shape of the protrusion 8p illustrated in FIG. 23 is modified, with the tip being rounded.

Even in the case of this shape, similar to the shape of FIG. 23, the tip position xp of the protrusion 8p is different from the end position xs of the first insulating region 10 on the side of the second side electrode, and thus, it is possible to suppress the transmission of stress applied to the interface with the insulating portion 162 compared to the case where these positions coincide. In other words, it is possible to suppress the occurrence of cracks in the component. Moreover, the first angle θ illustrated in FIG. 23 is 90° in this example, and from this point of view, the shape of FIG. 23 has a stress-relieving effect.

Figure 27:
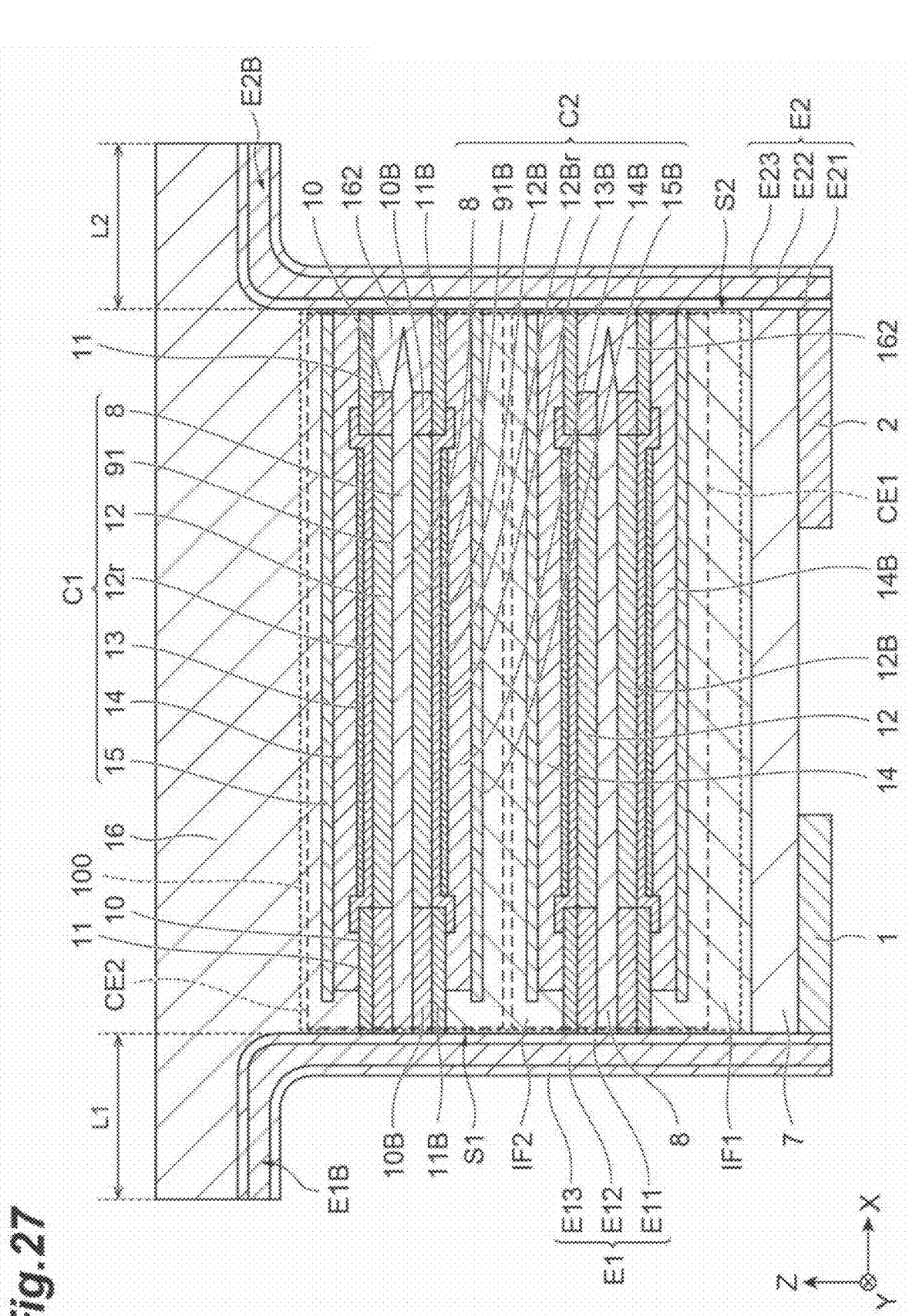
FIG. 27 is a longitudinal cross-sectional view of a solid electrolytic capacitor.

FIG. 27 is a longitudinal cross-sectional view of a solid electrolytic capacitor. The difference from the solid electrolytic capacitor illustrated in FIG. 2 is that the first side electrode E1 and the second side electrode E2 each have multiple layers.

The first side electrode E1 is made of a conductive material. In this example, the first side electrode E1 includes a first electrode layer E11, a second electrode layer E12, and a third electrode layer E13. The second side electrode E2 is made of a conductive material. In this example, the second side electrode E2 includes a first electrode layer E21, a second electrode layer E22, and a third electrode layer E23. The material of the first electrode layer E11 on one side and the first electrode layer E21 on the other side are the same. The material of the second electrode layer E12 on one side and the second electrode layer E22 on the other side are the same. The material of the third electrode layer E13 on one side and the third electrode layer E23 on the other side are the same. Thus, only the material of one electrode layer on one side will be described. The material of the first side electrode E1 and the material of the second side electrode E2 can also be made different.

On the first side surface S1 of the stacked body 100, a thin seed layer is in contact and formed, and the first electrode layer E11 is formed in contact with the seed layer. The interface between the first electrode layer E11 and the first side surface S1 corresponds to the seed layer. A suitable example of the thickness of the seed layer made of a metal is 0.2 μm or less. The seed layer is made of a conductive material that can adhere to both metals and insulators. For example, the seed layer includes at least one type of metal selected from the group of metals consisting of copper (Cu), chromium (Cr), nickel (Ni), titanium (Ti), and zinc (Zn). The seed layer can also use an alloy containing a metal selected from the group of metals (e.g., nickel-chromium alloy (NiCr)). It is also possible to use a material containing a conductive paste in which metal powder is mixed with resin for the seed layer. The conductive paste can improve adhesion to the underlying resin, and allows the seed layer to be formed by a simpler method such as coating or printing, rather than by sputtering or electroless plating. As the conductive paste, carbon paste, silver paste, copper paste, or the like is used. For example, when using a conductive paste, the thickness of the seed layer is preferably 0.2 μm or more and 10 μm or less, which is the best thickness to expect the best adhesion and is not too high in resistance.

The first electrode layer E11 is made of a material with excellent electrical conductivity. A preferred example of the thickness of the first electrode layer E11 is 5 μm or more and 15 μm or less, and an even more preferred example of the thickness is 8 μm or more and 12 μm or less, and in the case where the thickness is equal to or greater than the lower limit, the influence of the base can be suppressed, and in the case where the thickness is equal to or less than the upper limit, the material cost can be reduced. Exemplarily, this thickness is 10 μm. As the first electrode layer E11, a material with excellent conductivity, that is, a plating layer containing copper (Cu) or silver (Ag) can be preferably used.

The second electrode layer E12 is an intermediate layer interposed between the first electrode layer E11 and the third electrode layer E13. The second electrode layer E12 has a role of preventing the diffusion of elements such as Sn contained in the solder and the third electrode layer, and preventing the oxidation of elements such as Cu contained in the first electrode layer. Thus, materials, such as Ni, which are more resistance to oxidation and inhibiting metal diffusion compared to Cu, are used as the material for the second electrode layer E12. If the second electrode layer E12 is too thin, its oxidation and diffusion prevention effect is weakened, and if it is too thick, the resistance value increases. A preferred example of the thickness of the second electrode layer E12 is 1 μm or more and 5 μm or less, and an even more preferred example of the thickness is 2 μm or more and 4 μm or less, and in the case where the thickness is equal to or greater than the lower limit, the above-mentioned diffusion prevention effect is obtained, and in the case where the thickness is equal to or less than the upper limit, an increase in the resistance value can be suppressed. Exemplarily, the thickness is 3 μm. Preferably, nickel (Ni), which is a material more stable than copper (Cu), can be used as the second electrode layer E12.

The third electrode layer E13 is made of a conductive material that makes satisfactory contact with an Sn alloy (solder) provided outside. Known examples of Sn alloys include Sn—Ag—Cu, Sn—Cu, Sn—Sb, and Sb—Bi. The third electrode layer E13 can be made of a metal (such as an alloy of Sn or SnAg) that has satisfactory wetting properties with the solder material. A preferred example of the thickness of the third electrode layer E13 is 3 μm or more and 7 μm or less, and a more preferred example of the thickness is 4 μm or more and 6 μm or less, and in the case where the thickness is equal to or greater than the lower limit, the influence of the base can be suppressed, while in the case where the thickness is equal to or less than the upper limit, the material cost can be reduced. Exemplarily, the thickness is 5 μm. The third electrode layer E13 may be made of a material (e.g., Au) containing gold (Au) which has excellent electrical conductivity and satisfactory wetting properties with solder. In the case of using gold, the effect can be obtained even if the thickness of the electrode layer is greater than 0 μm and less than 1 μm, and in the case where the thickness is greater than 0 μm and less than 0.1 μm, the effect can be obtained while reducing the cost.

As described above, in this example, the solid electrolytic capacitor includes an insulating sheet (e.g., second insulating sheet IF2) interposed between adjacent solid electrolytic capacitor elements, and this insulating sheet includes a resin. The first side surface S1 of the stacked body 100 includes the side surface of the anode electrode layer 8 and the side surface of the insulating sheet.

The insulating sheet, with its side surfaces, is better suited for a stacked body with high thickness uniformity and homogeneity compared to coated insulating resin. The insulating sheet has lateral sides. Thus, the seed layer that is the base of the first side electrode E1 contacts not only the side of the anode electrode layer 8 but also the side of the resin-containing insulating sheet, adhering to both. The seed layer of the electrolytic plating is made of a material that is capable of contacting these electrode layers and resin layers. The seed layer can be formed by common techniques such as sputtering, electroless plating, or coating. If each electrode layer is made of multiple layers, a structure that improves the reliability and solder-wetting properties of the terminal portion can be obtained.

Figure 28:
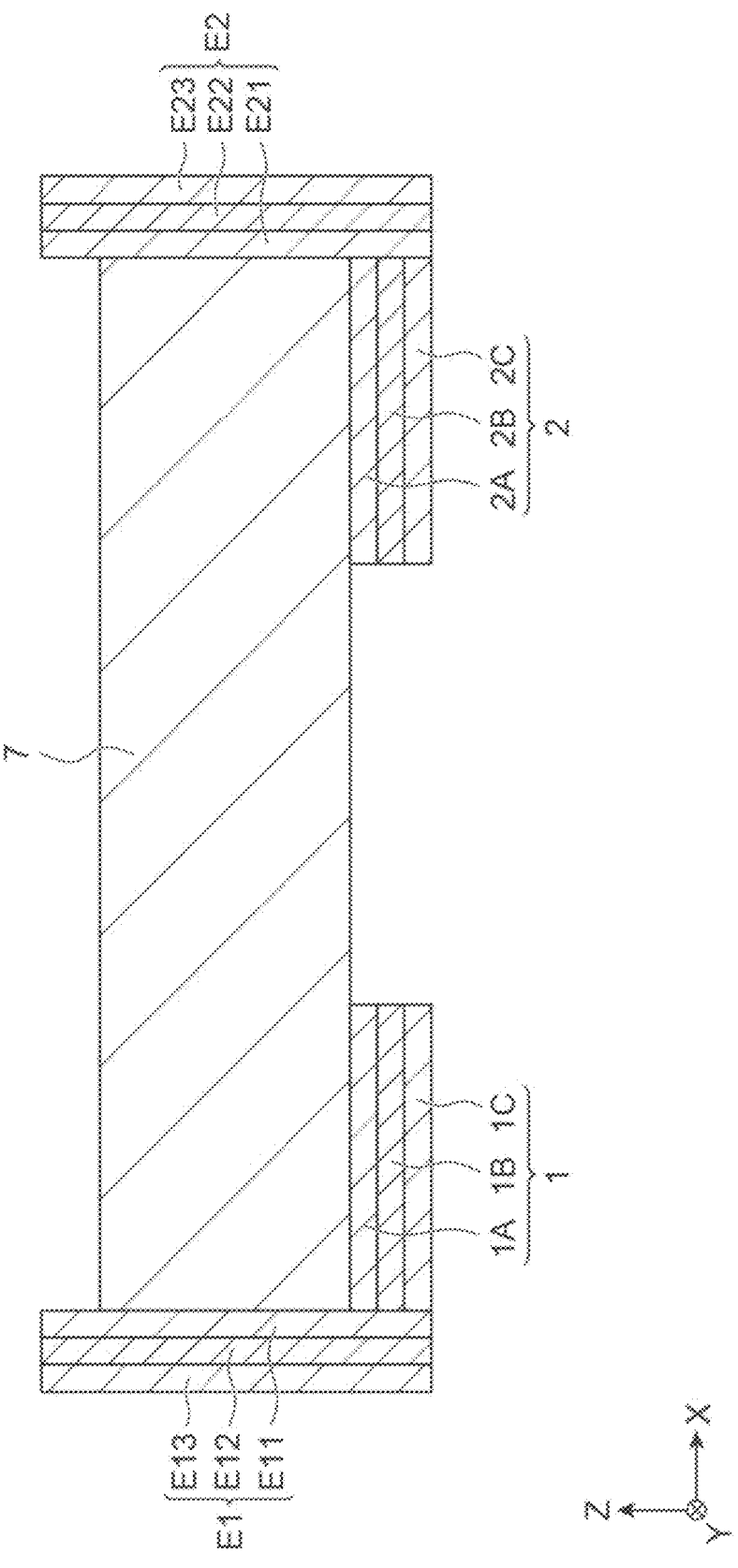
FIG. 28 is a longitudinal cross-sectional view of the vicinity of a region provided with an anode terminal and a cathode terminal.

FIG. 28 is a longitudinal cross-sectional view of the vicinity of the region provided with the anode terminal and the cathode terminal.

The anode terminal 1 and the cathode terminal 2 can each have a structure in which multiple electrode layers are stacked. The first side electrode E1 contacts the side (YZ plane) of the anode terminal 1. The second side electrode E2 is in contact with the side (YZ plane) of the cathode terminal 2. There are various combinations of materials that constitute these electrode-stacked structures.

The anode terminal 1 includes a first anode electrode layer 1A, a second anode electrode layer 1B, and a third anode electrode layer 1C. The material of the seed layer that constitutes the anode terminal 1 can be the same as the material of the seed layer that constitutes the first side electrode E1. The material of the first anode electrode layer 1A that constitutes the anode terminal 1 can be the same as the material of the first electrode layer E11 that constitutes the first side electrode E1. The material of the second anode electrode layer 1B that constitutes the anode terminal 1 can be the same as the material of the second electrode layer E12 that constitutes the first side electrode E1. The material of the third anode electrode layer 1C that constitutes the anode terminal 1 can be the same as the material of the third electrode layer E13 that constitutes the first side electrode E1. It is also possible to use different materials for each of these electrode layers.

The cathode terminal 2 includes a first cathode electrode layer 2A, a second cathode electrode layer 2B, and a third cathode electrode layer 3C. The material of the seed layer that constitutes the cathode terminal 2 can be the same as the material of the seed layer that constitutes the second side electrode E2. The material of the first cathode electrode layer 2A that constitutes the cathode terminal 2 can be the same as the material of the first electrode layer E21 that constitutes the second side electrode E2. The material of the second cathode electrode layer 2B that constitutes the cathode terminal 2 can be the same as the material of the second electrode layer E22 that constitutes the second side electrode E2. The material of the third cathode electrode layer 2C that constitutes the cathode terminal 2 can be the same as the material of the third electrode layer E23 that constitutes the second side electrode E2. It is also possible to use different materials for each of these electrode layers.

In the above example, the anode terminal 1 and the cathode terminal 2 are manufactured in different periods from the first side electrode E1 and the second side electrode E2. In the case where the first side electrode E1 and the second side electrode E2 are manufactured after forming the anode terminal 1 and the cathode terminal 2, the seed layer under the first electrode layer E11 in the first side electrode E1 contacts the side (YZ plane) of the anode terminal 1. Similarly, the seed layer of the first electrode layer E21 in the second side electrode E2 contacts the side (YZ plane) of the cathode terminal 2. These lowermost electrode layers are made of a material with high adhesiveness, ensuring satisfactory bonding between these terminals and electrode layers.

Figure 29:
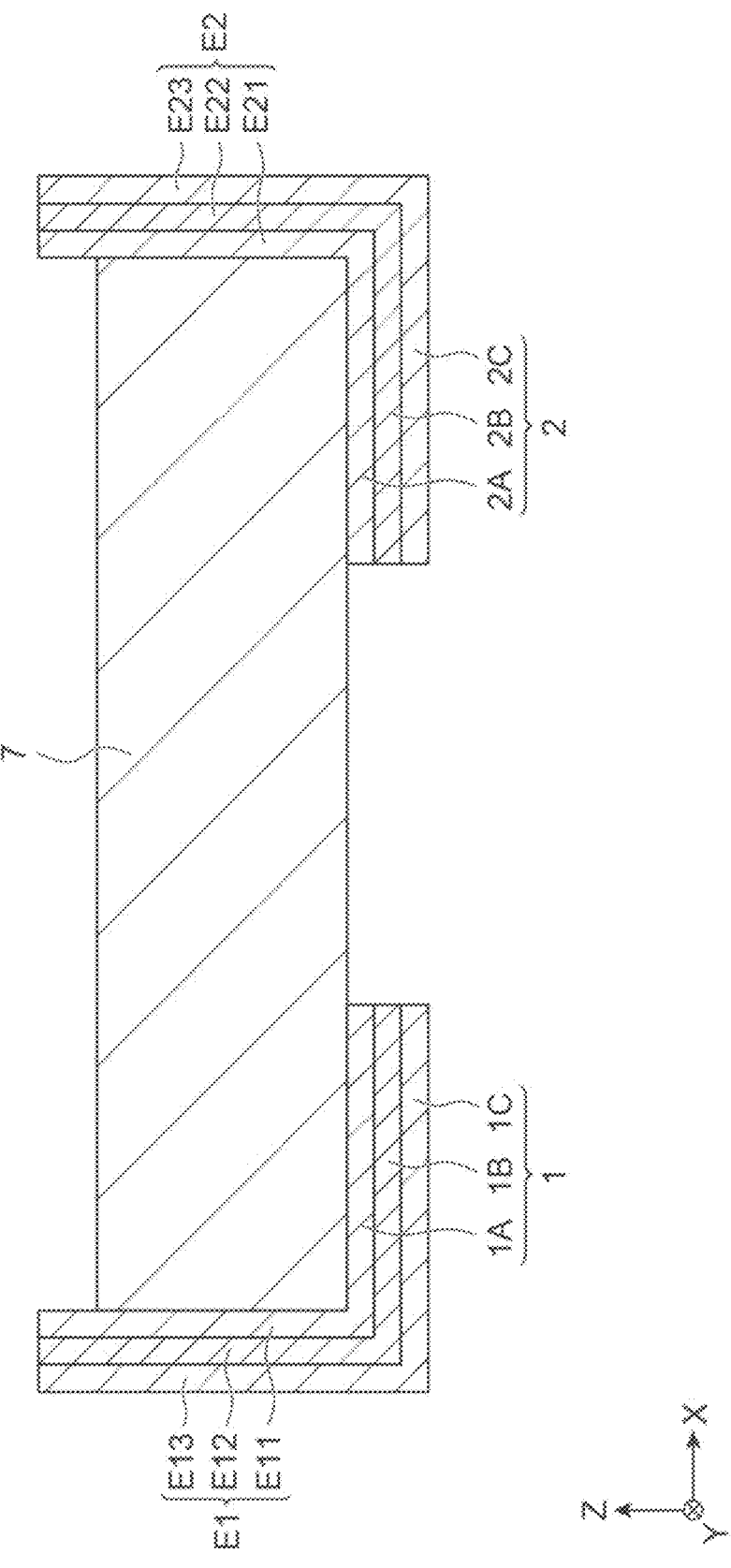
FIG. 29 is a longitudinal cross-sectional view of the vicinity of a region provided with an anode terminal and a cathode terminal.

FIG. 29 is a longitudinal cross-sectional view of the vicinity of the region provided with the anode terminal and the cathode terminal.

In this example, an electrode-stacked structure is disclosed in which the anode terminal 1 and the cathode terminal 2 are formed simultaneously with the first side electrode E1 and the second side electrode E2. In this case, there is a continuous structure where layers with the same material composition at both ends of the solid electrolytic capacitor in the X-axis direction.

In other words, the first anode electrode layer 1A of the anode terminal 1 is continuous with the first electrode layer E11 of the first side electrode E1. Similarly, the second anode electrode layer 1B is continuous with the second electrode layer E12. The third anode electrode layer 1C is continuous with the third electrode layer E13. The seed layer of the anode terminal 1 is also continuous with the seed layer of the first side electrode E1.

Similarly, the first cathode electrode layer 2A of the cathode terminal 2 is continuous with the first electrode layer E21 of the second side electrode E2. The second cathode electrode layer 2B is continuous with the second electrode layer E22. The third cathode electrode layer 2C is continuous with the third electrode layer E23. The seed layer of the cathode terminal 2 is also continuous with the seed layer of the second side electrode E2.

The materials of these electrode layers are as described above.

Figure 30:
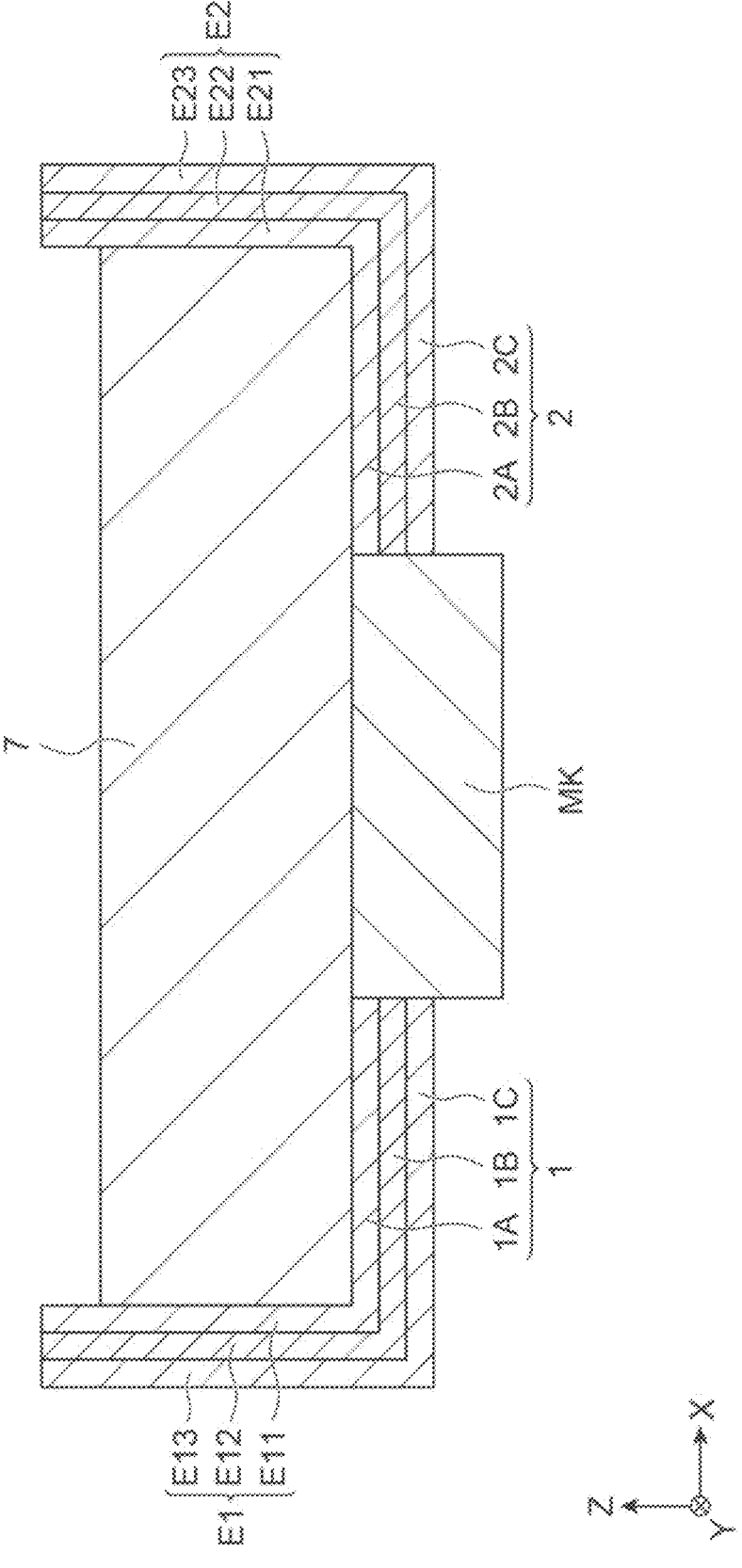
FIG. 30 is a diagram illustrated to describe the manufacturing process of the structure illustrated in FIG. 29.

FIG. 30 is a diagram illustrated to describe the manufacturing process of the structure illustrated in FIG. 29. In the figure, a longitudinal cross-sectional view of the vicinity of the region provided with the anode terminal and the cathode terminal is illustrated.

In this manufacturing method, the anode terminal 1 and the cathode terminal 2 are not formed in the process prior to the above-mentioned groove formation process (FIG. 16). In the subsequent side electrode formation process (FIG. 17), a mask MK is formed (FIG. 30) before forming the side electrode. The mask MK is formed on the surface of the support substrate 7. The material of the mask MK is an insulating material, and a resist resin material or an inorganic insulating material can be used. The mask MK is formed in the region between the regions where the anode terminal 1 and the cathode terminal 2 are to be formed. The planar pattern of the mask MK (pattern on the XY plane) can be a stripe shape along the Y-axis. After the formation of the mask MK, the first side electrode E1, the second side electrode E2, the anode terminal 1, and the cathode terminal 2 are simultaneously formed. In other words, the electrode layers constituting these are stacked in order. After forming these electrode-stacked structures, the mask MK can be removed, but it may also be left without removal.

Moreover, a supplementary description regarding the relationship between the shape of the groove pattern formed before and after the above-mentioned etching process (see FIG. 14) and the structure of the solid electrolytic capacitor is provided.

Figure 31:
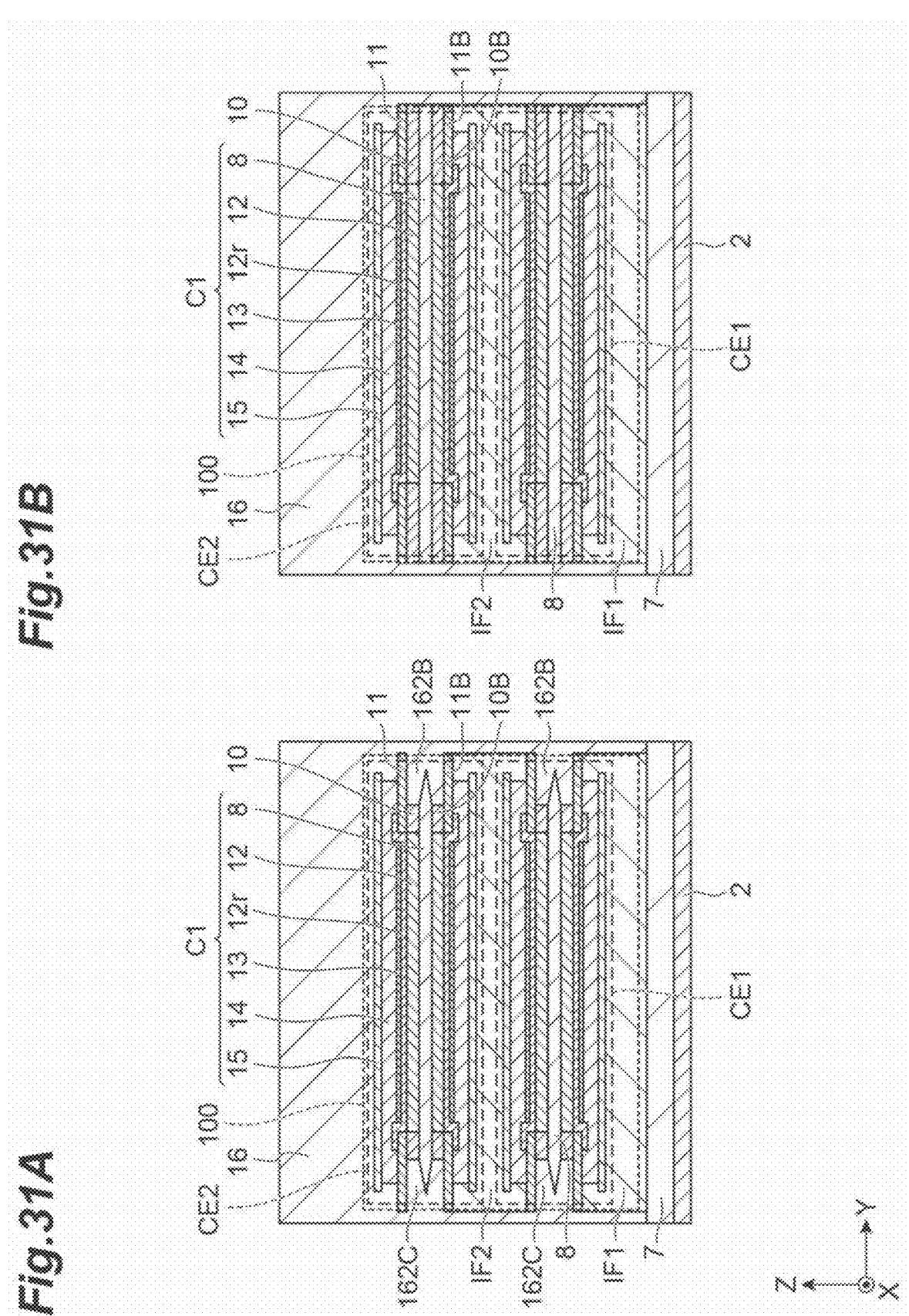
FIGS. 31A and 31B are longitudinal cross-sectional views of a solid electrolytic capacitor.

FIG. 31A is a longitudinal cross-sectional view (YZ cross-sectional view) of a first type of solid electrolytic capacitor. In manufacturing this solid electrolytic capacitor, a first groove pattern is formed in the groove formation process illustrated in FIG. 13. The planar shape (XY planar shape) of the first groove pattern is a rectangular lattice. The first groove pattern has a plurality of X grooves extending in the X-axis direction and a plurality of Y grooves extending in the Y-axis direction (see FIG. 13). Next, the first groove pattern is subjected to an etching process (see FIG. 14), and then resin filling is performed (see FIG. 15). In this case, after the final process is completed, the first type of solid electrolytic capacitor illustrated in the figure is completed.

In the first type of solid electrolytic capacitor, both ends of the anode electrode layer 8 in the Y-axis direction have protrusions. In other words, in the groove pattern formation process illustrated in FIG. 13, a plurality of X-grooves extending in the X-axis direction is formed, and the XZ plane constituting the inner wall surface of the X-groove is exposed during etching. Thus, in the etching process (FIG. 14), the exposed inner wall surface of the X-groove is etched, and both ends of the anode electrode layer 8 in the Y-axis direction are also side-etched, becoming tapered. In the resin filling process after etching (FIG. 15), the resin is filled in the space located at one end of the anode electrode layer 8 in the Y-axis direction to form an insulating portion 162B, and resin is filled in the space located at the other end to form an insulating portion 162C.

FIG. 31B is a longitudinal cross-sectional view (YZ cross-sectional view) of a second type of solid electrolytic capacitor. In manufacturing this solid electrolytic capacitor, a second groove pattern is formed in the groove formation process illustrated in FIG. 13. The planar shape (XY planar shape) of the second groove pattern is a stripe constituting only a plurality of Y grooves extending in the Y-axis direction (see FIG. 13). Next, the etching process (see FIG. 14) is performed on the second groove pattern, and then a third groove pattern is formed. The planar shape (XY planar shape) of the third groove pattern is a stripe constituting only a plurality of X grooves extending in the X-axis direction. Then, the resin filling is performed (see FIG. 15). In this case, after the final process is completed, the second type of solid electrolytic capacitor illustrated in the figure is completed.

In the second type of solid electrolytic capacitor, both ends in the Y-axis direction of the anode electrode layer 8 do not have a protrusion, and the XZ plane, which includes the tip surfaces of both ends, is flat. In other words, in the groove formation process before etching (FIG. 13), the X groove is not formed, and when the third groove pattern is formed after the etching process (FIG. 14), the X groove (the inner wall surface of the groove is the flat XZ plane) is formed. In the resin filling process following this process (FIG. 15), insulating resin is filled into the X-groove, and the XZ plane is covered with a resin film. In the method of manufacturing the second type of solid electrolytic capacitor, the resin is filled into the flat-sided X-groove, making resin filling easier and increasing the degree of freedom in design.

The electrode-stacked structure and manufacturing processes illustrated in FIGS. 29 and 30 can also be applied to the following embodiments.

A method of manufacturing a solid electrolytic capacitor according to another embodiment is now described. The method of manufacturing the solid electrolytic capacitor described below follows the same processes as illustrated in FIGS. 4 to 15, with different manufacturing processes in FIGS. 16 to 18 (second manufacturing method for the side electrodes).

FIGS. 32 to 35 are diagrams illustrated to describe a second manufacturing method of the side electrodes. A preferred example of these processes is performed by inverting the state illustrated in FIGS. 32 to 35. Specifically, in a preferred example, a second support substrate 71 is placed vertically below the solid electrolytic capacitor. Moreover, it is also possible to execute each process without inverting the top and bottom of these diagrams.

Figure 32:
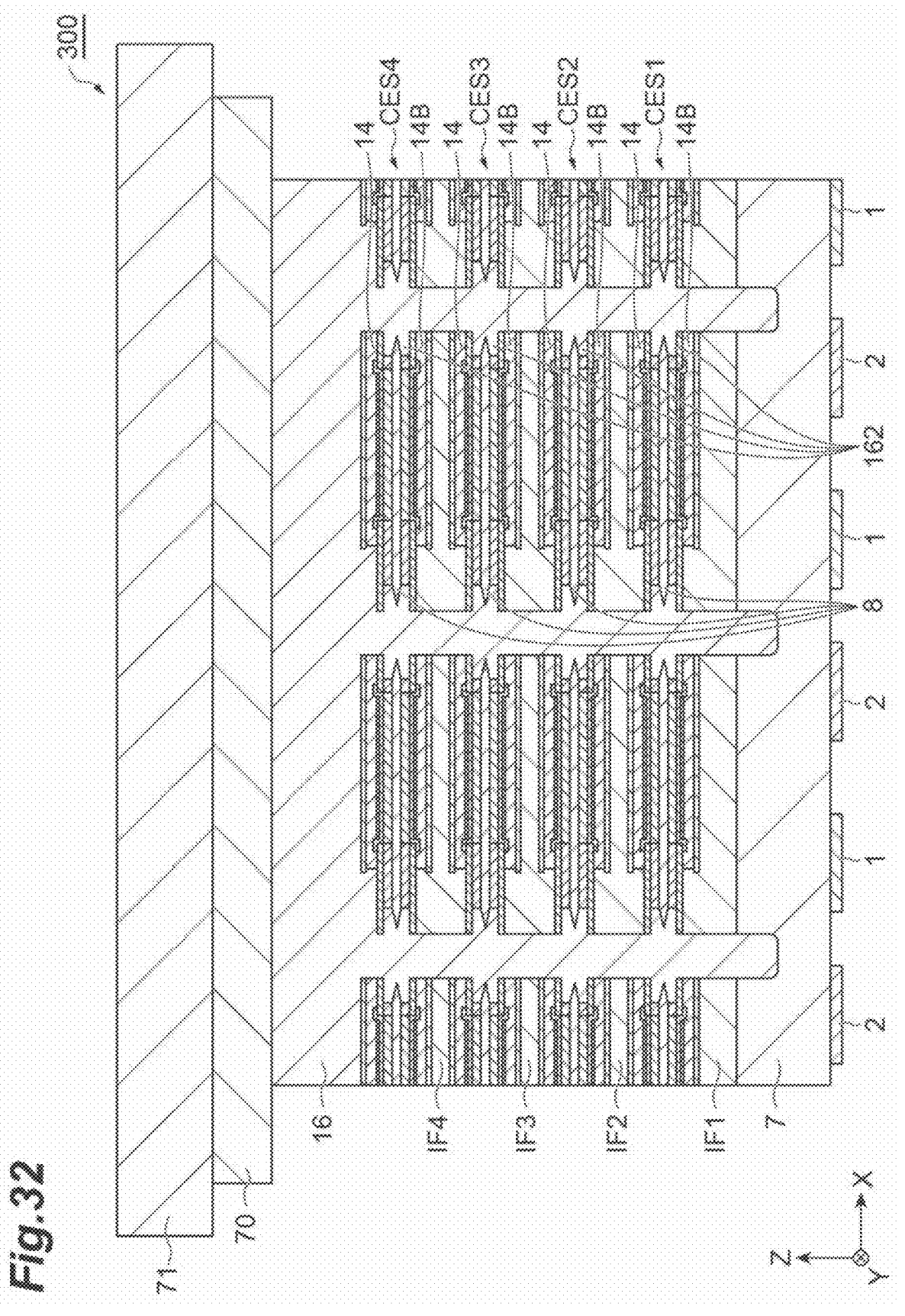
FIG. 32 is a diagram illustrated to describe a second method of manufacturing a side electrode.

As illustrated in FIG. 32, in the second manufacturing method of the side electrode, after the process of FIG. 15 described above, one side of an adhesive tape 70 (adhesive sheet) is attached to the surface of the protective insulator 16. The other side of the adhesive tape 70 is attached to the second support substrate 71. Instead of the adhesive tape 70, an adhesive resin material or the like can also be used. The adhesive tape 70 is a peelable tape, and UV tape, heat-release tape, or micro-adhesive tape may be used. In addition, if the adhesive tape 70 is sufficiently thick, it may be possible to omit the second support substrate 71. Having the second support substrate 71 improves ease of handling and prevents cracking and breaking. Materials such as stainless steel, glass, or glass epoxy can be used for the second support substrate 71. For example, the thickness of the adhesive tape 70 can be set to be greater than or equal to the thickness of the first solid electrolytic capacitor sheet CES1.

Figure 33:
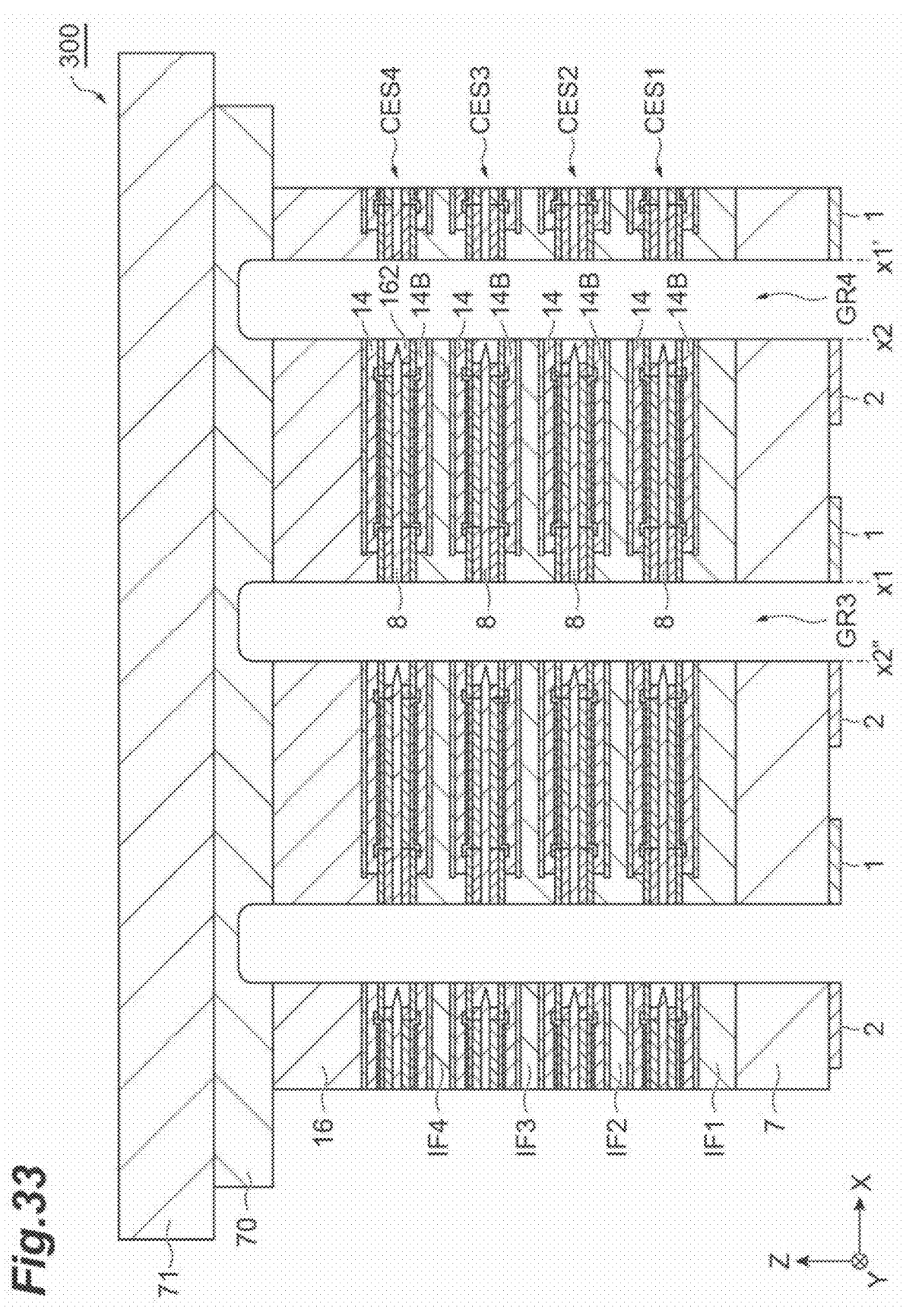
FIG. 33 is a diagram illustrated to describe the second method of manufacturing the side electrode.

Next, as illustrated in FIG. 33, a plurality of grooves (e.g., third groove GR3 or fourth groove GR4) that reach the inside of the adhesive tape 70 is formed from the surface of the support substrate 7. Each groove is formed to completely cut through each solid electrolytic capacitor sheet in the thickness direction (Z-axis) and reach the inside of the adhesive tape 70. The width, position, and method of forming these grooves are the same as those described in FIG. 16, and only the depth of the grooves is different.

Figure 34:
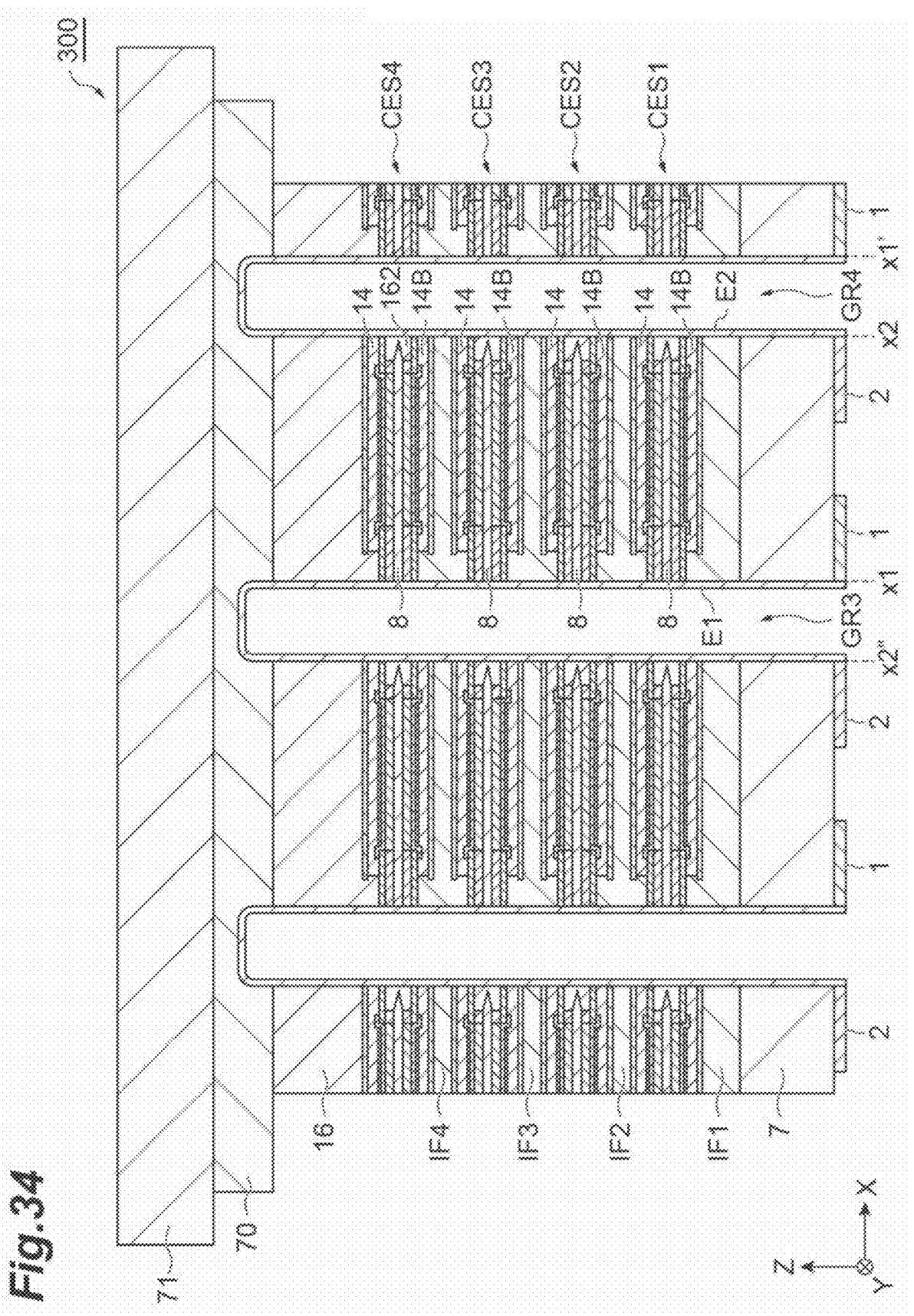
FIG. 34 is a diagram illustrated to describe the second method of manufacturing the side electrode.

Next, as illustrated in FIG. 34, side electrodes (first side electrode E1 and second side electrode E2) are formed inside the grooves that have been formed. The material and method of forming the side electrodes are the same as those described in FIG. 17. Of course, the electrode-stacked structure and its manufacturing method described in FIG. 28 to FIG. 30 can also be applied to this example.

Figure 35:
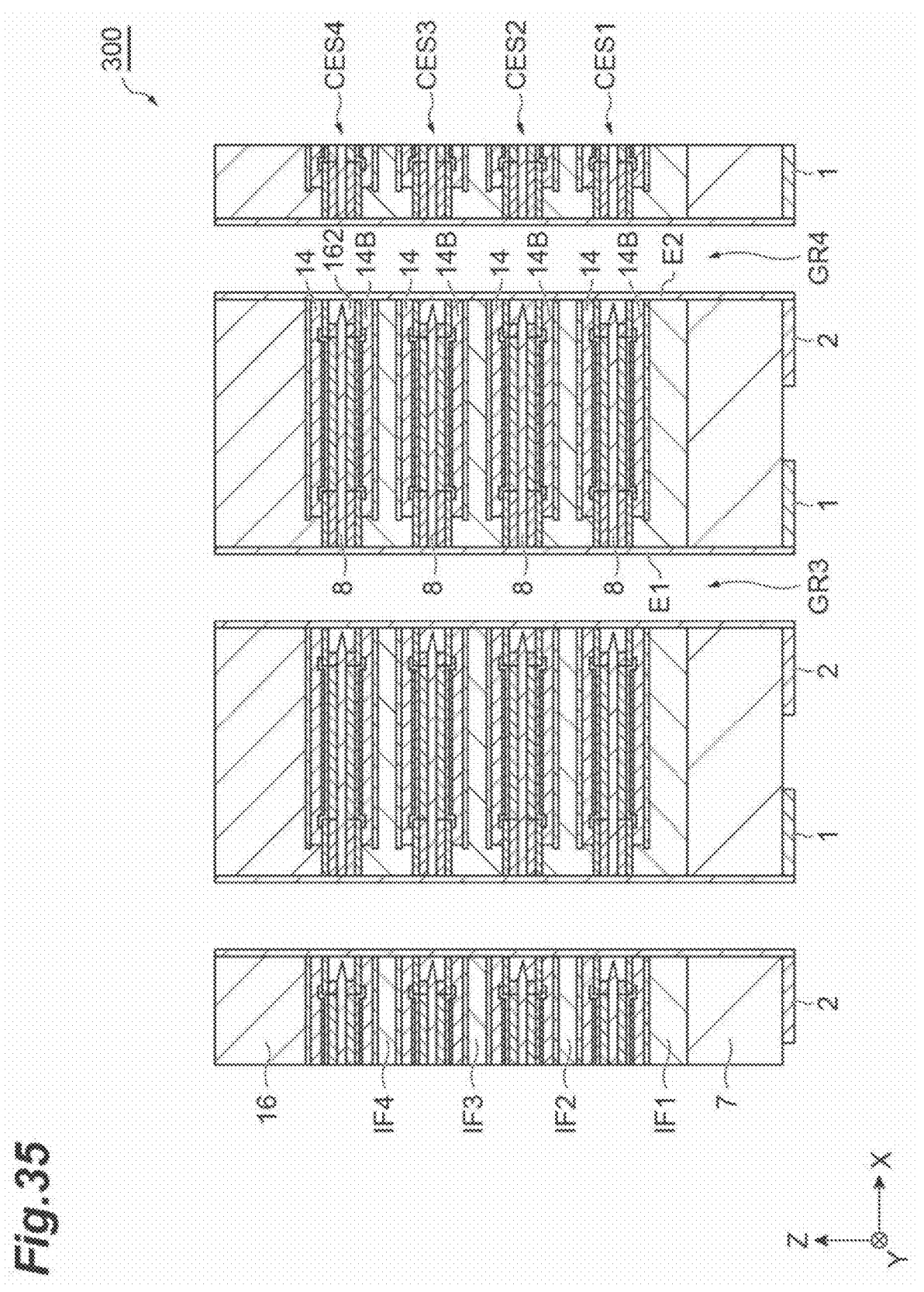
FIG. 35 is a diagram illustrated to describe the second method of manufacturing the side electrode.

Next, as illustrated in FIG. 35, the adhesive tape 70 is removed from the stacked sheet 300. As a result, individual solid electrolytic capacitors are separated at least in the direction along the X-axis.

The groove in which the side electrode is formed extends along the Y-axis direction in a planar view. Thus, to completely individualize each solid electrolytic capacitor, it is appropriate to completely cut the stacked sheet 300 along grooves extending in the X-axis direction at an appropriate time. For example, in the individualization process, after the formation of the side electrodes as described in FIG. 34 and before removing the adhesive tape 70, the stacked sheet 300 can be cut (diced) at the stripe-shaped grooves extending in the X-axis direction, thereby dividing the stacked sheet into individual solid electrolytic capacitors. The position of dicing along the X-axis direction is similar to that described in FIG. 18. This group of stripe-shaped grooves can be made to reach the inside of the adhesive tape 70 from the surface of the support substrate 7.

This manufacturing method further includes a process of attaching the stacked sheet to a second support substrate 71 using an adhesive member (adhesive tape 70 or adhesive sheet), a cutting process of cutting the stacked sheet up to the adhesive tape 70 at the first position x1 to expose the anode electrode layer 8 and at the second position x2 to expose the insulating portion 162 and the cathode electrode layer 14, and a side electrode formation process of forming the first side electrode E1 on the first side surface exposed by cutting at the first position x1 and the second side electrode E2 on the second side surface exposed by cutting at the second position x2. In this manufacturing method, the first side electrode connected to the anode electrode layer 8 and the second side electrode connected to the cathode electrode layer 14 can be easily formed, thereby improving productivity. In addition, the use of the adhesive member allows the stacked sheet to be completely cut in the cutting process, thereby simplifying the individualization process.

Figure 36:
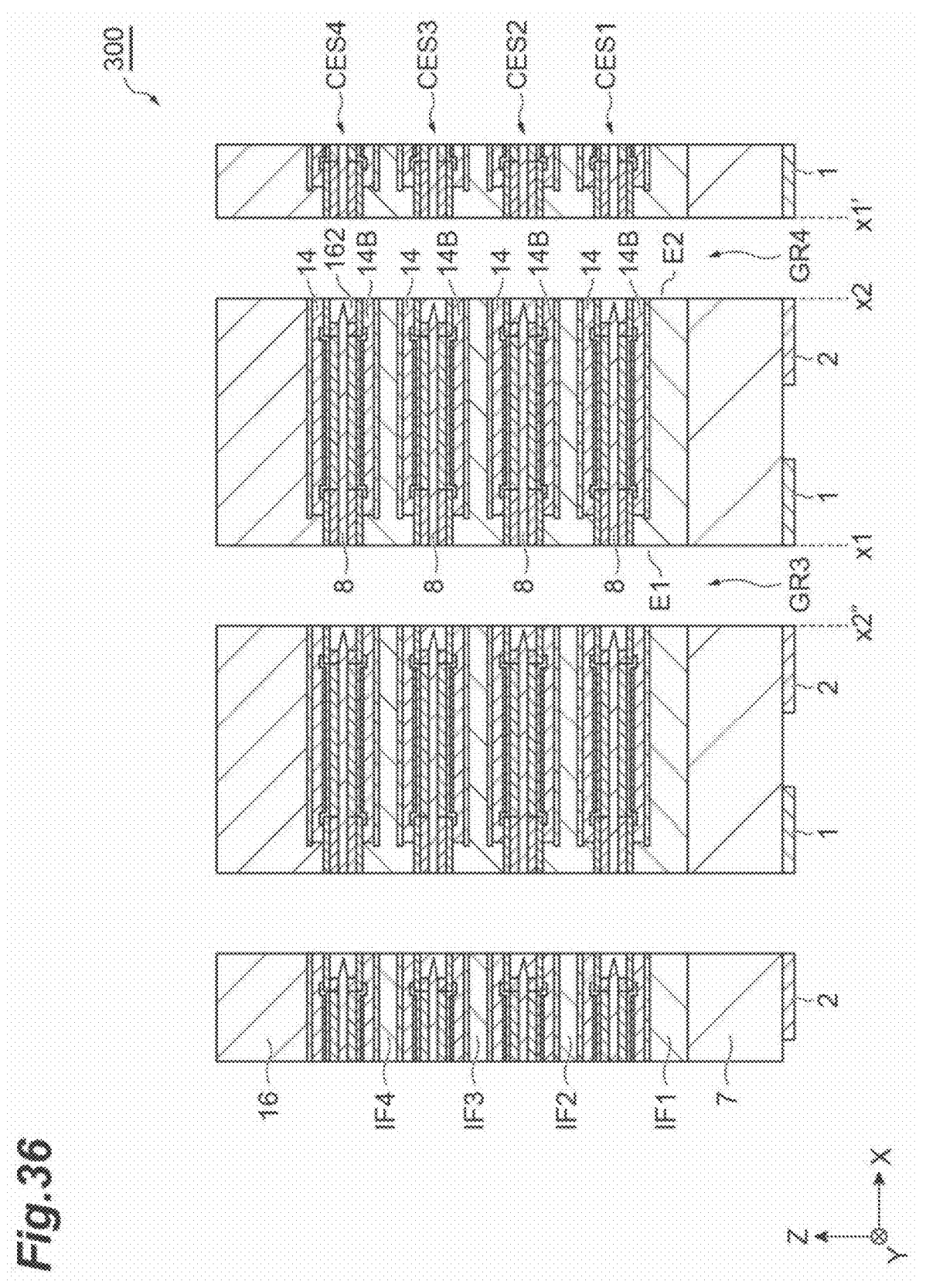
FIG. 36 is a diagram illustrated to describe a third method of manufacturing the side electrode.

FIG. 36 is a diagram illustrated to describe a third manufacturing method of the side electrode.

In this manufacturing method, the stacked sheet 300 manufactured in the process of FIG. 33 is prepared. The stacked sheet 300 has a plurality of grooves (e.g., third groove GR3 or fourth groove GR4) extending in the Y-axis direction. Next, as described above, a group of grooves along the X-axis direction is formed in the stacked sheet 300, and then the adhesive tape 70 is removed from the stacked sheet 300. This results in individual solid electrolytic capacitors with both side surfaces exposed at both ends in the X-axis direction.

Figure 37:
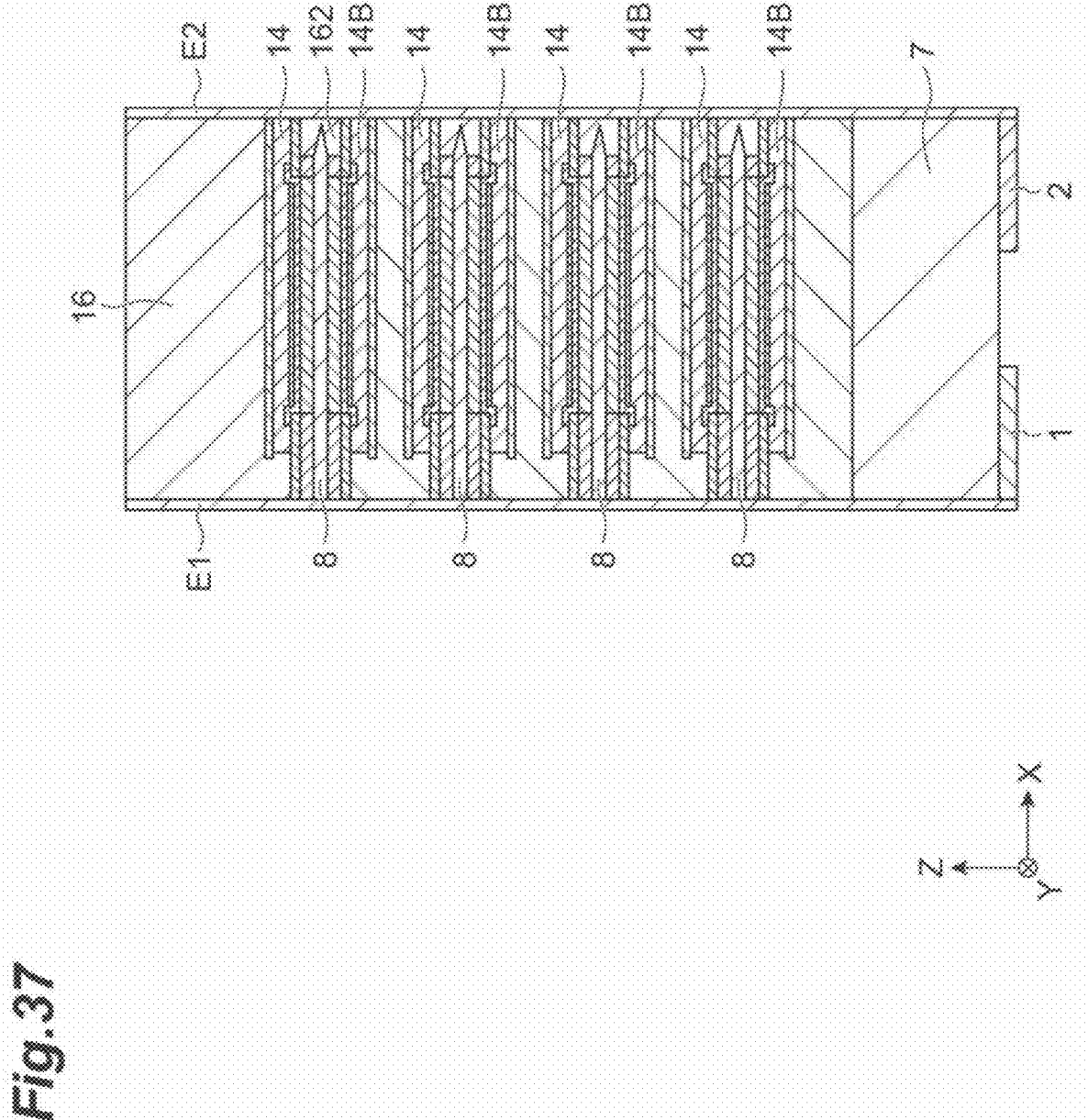
FIG. 37 is a diagram illustrated to describe the third method of manufacturing the side electrode.

Next, as illustrated in FIG. 37, the first side electrode E1 and the second side electrode E2 are formed on the exposed side surfaces of the solid electrolytic capacitor in the process of FIG. 36. These electrodes can be formed by applying a conductive adhesive (e.g., silver paste) to the exposed side surfaces. The first side electrode E1 and the second side electrode E2 are electrically and physically connected to the anode terminal 1 and the cathode terminal 2, respectively. This manufacturing method makes it possible to form the side electrodes in a simple manner. Of course, the electrode-stacked structure and its manufacturing method described in FIG. 28 to FIG. 30 can also be applied to this example.

Moreover, as a method of forming the first cathode electrode layer 14 and the second cathode electrode layer 14B, a technique other than the sputtering and/or plating can be adopted. In other words, a method of forming the cathode electrode layer by printing a paste containing a conductive material on the surface of a target sheet is used. In this case, the method of manufacturing a solid electrolytic capacitor includes (i) a manufacturing process of a solid electrolytic capacitor sheet and (ii) a processing process of a plurality of solid electrolytic capacitor sheets.

In the (i) solid electrolytic capacitor sheet manufacturing process, the following processes (a) to (e) are sequentially executed.

(a) Metal Sheet Preparation Process

Figures 38A, 38B, 38C, 38D:
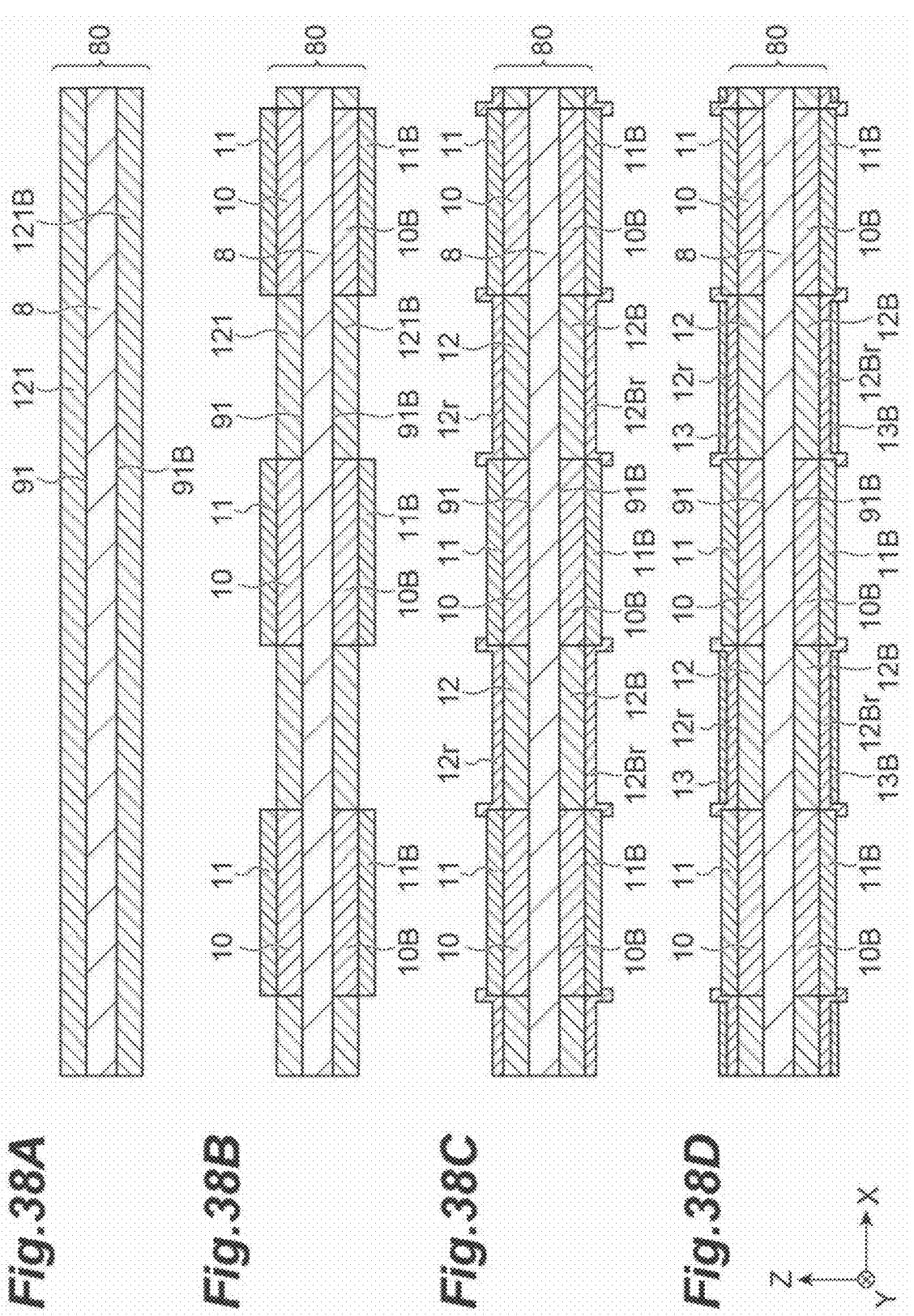
FIGS. 38A, 38B, 38C, and 38D are diagrams illustrated to describe the method of manufacturing a solid electrolytic capacitor.

In the (a) metal sheet preparation process, the metal sheet 80 is formed as illustrated in FIG. 38A. The metal sheet 80 includes the anode electrode layer 8, the first roughened layer 121, and the second roughened layer 121B. This (a) process is the same as the process described with reference to FIG. 4.

(b) Insulating Region Formation Process

In the (b) insulating region formation process, as illustrated in FIG. 38B, a resist is applied to the upper and lower surfaces of the metal sheet 80. As a result, the first insulating region 10, the first insulating layer 11, the second insulating region 10B, and the second insulating layer 11B are formed. This (b) process is the same as the process described with reference to FIG. 5. The planar configuration of the metal sheet 80 is also the same as that described with reference to FIGS. 5 and 6.

(c) Solid Electrolyte Layer Formation Process

In the (c) solid electrolyte layer formation process, as illustrated in FIG. 38C, a conductive polymer is added into the openings between the insulating regions to form the first solid electrolyte layer 12, the first conductive polymer layer 12r, the second solid electrolyte layer 12B, and the second conductive polymer layer 12Br. This (c) process is the same as the process described with reference to FIG. 7.

(d) Conductive Layer Formation Process

In the (d) conductive layer formation process, as illustrated in FIG. 38D, the first conductive layer 13 is formed on the surface of the first solid electrolyte layer 12, and the second conductive layer 13B is formed on the back surface of the second solid electrolyte layer 12B. This (d) process is the same as the process described with reference to FIG. 8.

(e) Cathode Electrode Layer Formation Process

Figure 39:
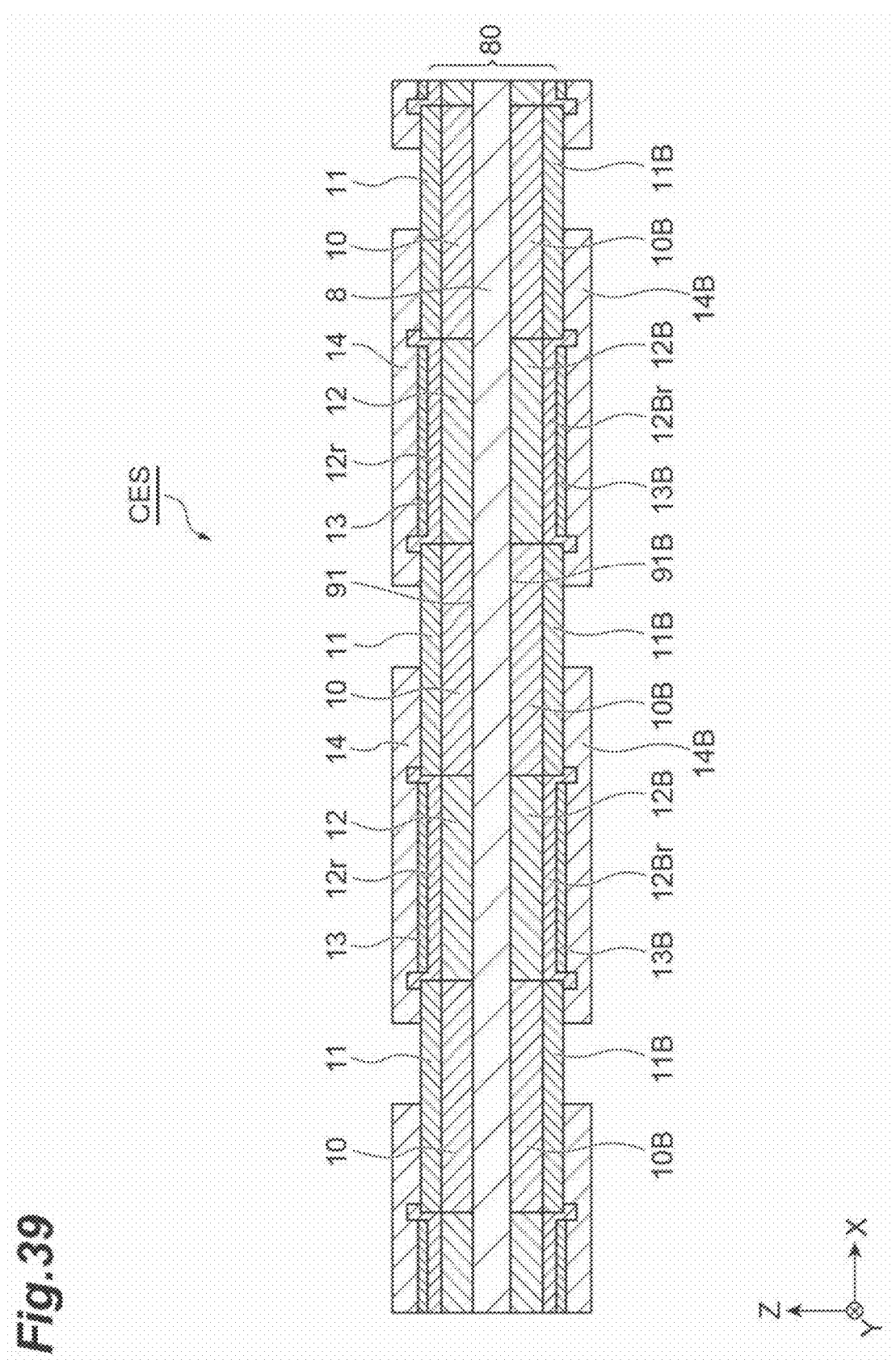
FIG. 39 is a diagram illustrated to describe a method of manufacturing a solid electrolytic capacitor.

In the (e) cathode electrode layer formation process, as illustrated in FIG. 39, the first cathode electrode layer 14 is formed on the first surface of the metal sheet 80, and the second cathode electrode layer 14B is formed on the second surface. The first cathode electrode layer 14 has a pattern that covers the insulating layer and conductive layer formed on the first surface of the metal sheet 80. The second cathode electrode layer 14B has a pattern that covers the insulating layer and conductive layer formed on the second surface. These cathode electrode layers can be formed using printing techniques, particularly screen printing.

As the material for the cathode electrode layer, metal paste can be used. The metal paste is a mixed paint of a plurality of metal particles and a resin. As the metal material constituting the metal particles, silver (Ag) can be used. The silver paste is a mixture material of a plurality of Ag particles and a resin. As the material constituting the metal particles, a metal material containing one or more metals selected from a metal group consisting of gold (Au), silver (Ag), copper (Cu), aluminum (Al), and nickel (Ni) can be used. The resin contained in the metal paste is preferably a thermosetting resin, but an ultraviolet (UV) curable resin can also be used. Epoxy resin, phenolic resin, acrylic resin, urethane resin, and silicone resin are known as resins that can be used in the metal paste. In addition to the resin selected from the resin group mentioned above, other materials can also be included as the resin used in the metal paste. The silver paste in this example can contain a plurality of silver particles and a thermosetting epoxy-based resin.

As illustrated in FIG. 40, in the process of forming the cathode electrode layer (metal layer) on the upper surface, first, a screen mask MSK having an electrode material transmission region EMT is prepared. The electrode material is a metal paste. The metal paste becomes a cathode electrode layer after curing. The metal paste (cathode electrode layer) includes resin RN and a plurality of metal particles PCL dispersed within the resin RN. The screen mask MSK is placed slightly above the surface of the substrate to be printed. There is a small gap between the screen mask MSK and the surface of the substrate. The liquid electrode material before curing is supplied to the upper surface of the screen mask MSK. With a squeegee SQ pressed against the upper surface of the screen mask MSK, the squeegee SQ is moved along the surface of the screen mask MSK. As a result, the liquid electrode material passes through the electrode material transmission region EMT (consisting of a mesh or a group of minute openings) formed in the screen mask MSK and is supplied onto the upper surface of the substrate. The aperture diameter of one hole of the mesh is, for example, 25 μm or more and 170 μm or less. The number of grid lines per inch (2.54 cm) of the mesh can be, for example, 100 lines or more and 400 lines or less. The material of the screen mask MSK can be a resin such as polyester, or a metal such as stainless steel.

When the screen mask MSK is separated from the substrate surface, the first cathode electrode layer 14 of the same shape as the electrode material transmission regions EMT is formed. In other words, the cathode electrode layer is formed by supplying a material containing resin and metal particles onto the surface of the solid electrolytic capacitor sheet before formation of the cathode electrode layer, through the screen mask MSK having a pattern (electrode material transmission region EMT) above the first conductive layer 13. The shape of the electrode material transmission region EMT is a plurality of rectangles arranged in a matrix in a planar view. Thus, the shape of the first cathode electrode layer 14 is also a plurality of rectangles arranged in a matrix in a planar view. The first cathode electrode layer 14 covers the first conductive layer 13. When viewed in plan, there is a gap between adjacent first cathode electrode layers 14. The shape of this gap is a lattice pattern (rectangular grid), and the first insulating layer 11 is located directly below the gap. If the resin contained in the metal paste is a thermosetting resin, heating is performed. If the resin is an ultraviolet (UV) curable resin, ultraviolet light is used to cure the resin.

After the formation of the first cathode electrode layer 14, if necessary, the upper and lower sides of the metal sheet 80 are inverted to expose the back side of the substrate. The back side of the substrate is the side on which the first cathode electrode layer 14 is not formed, and it becomes the upper side after the above-mentioned inversion. On this back side, the second cathode electrode layer 14B is formed. The method of forming the second cathode electrode layer 14B is the same as the method of forming the first cathode electrode layer 14. The shape of the second cathode electrode layer 14B is the same as the shape of the first cathode electrode layer 14, and in a planar view, it becomes a plurality of rectangles arranged in a matrix. The second cathode electrode layer 14B covers the second conductive layer 13B (see FIG. 39).

In the case of forming the cathode electrode layer by the sputtering technique, a resist patterning process and an etching process are required, but in the case of using the printing technique, these processes are not required. The planar pattern of the cathode electrode layer can be the same as that in the case where the sputtering technique is used, and the dimensions of the cathode electrode layer formed by the printing technique can be the same as those described in FIG. 11.

As described above, the method of manufacturing the solid electrolytic capacitor sheet includes (a) metal sheet preparation process, (b) insulating region formation process, (c) solid electrolyte layer formation process, (d) conductive layer formation process, and (e) cathode electrode layer formation process. Through these processes, a solid electrolytic capacitor sheet CES is manufactured.

The (ii) process of processing a plurality of solid electrolytic capacitor sheets to manufacture individual solid electrolytic capacitors involves sequentially executing the following processes (A) to (G).

(A) Stacked Sheet Formation Process

In the (A) stacked sheet formation process, as illustrated in FIG. 41, multiple solid electrolytic capacitor sheets are stacked on the support substrate 7 and bonded together via an insulating sheet arranged between the solid electrolytic capacitor sheets. The anode terminal 1 and the cathode terminal 2 are formed on the back side of the support substrate 7. On top of the support substrate 7, the first insulating sheet IF1, the first solid electrolytic capacitor sheet CES1, the second insulating sheet IF2, the second solid electrolytic capacitor sheet CES2, the third insulating sheet IF3, the third solid electrolytic capacitor sheet CES3, the fourth insulating sheet IF4, the fourth solid electrolytic capacitor sheet CES4, and the uppermost insulating sheet IFT are stacked in this order. This (A) process is identical to the process described with reference to FIG. 12.

(B) Groove Formation Process

In the (B) groove formation process, as illustrated in FIG. 42, a plurality of grooves (first groove GR1 and second groove GR2) are formed in the stacked sheet 300 produced in process (A). This (B) process is the same as the process described with reference to FIG. 13. Additionally, the cutting positions of each groove are also the same as the positions described with reference to FIG. 13. Moreover, the structure in FIG. 42 does not include the protective layers (first protective layer 15 and second protective layer 15B) illustrated in FIG. 13. Thus, the inner surface of the first groove GR1 and the second groove GR expose the side surfaces of the layers other than these protective layers (such as the anode electrode layer 8, first insulating region 10, first insulating layer 11, first cathode electrode layer 14, second insulating region 10B, second insulating layer 11B, second cathode electrode layer 14B, or insulating sheet).

(C) Etching Process

In the (C) etching process, as illustrated in FIG. 43, an etching solution is introduced into the multiple grooves illustrated in FIG. 42, and the exposed side surfaces of the anode electrode layer 8, the first insulating region 10, the first cathode electrode layer 14, the second insulating region 10B, and the second cathode electrode layer 14B in the grooves are etched. The first insulating layer 11 and the second insulating layer 11B can be made of a resin material with respective side surfaces not etched by the etching solution. Moreover, the aluminum portion contained in the first insulating region 10 (second insulating region 10B) is etched, but the resin portion is not etched and tends to remain in a sponge-like state. The figure simplifies the structure by not illustrating the sponge-like resin part. This (C) process is identical to the process described with reference to FIG. 14. Focusing on one solid electrolytic capacitor, the first space SPA that is continuous with the first groove GR1 is formed on the left side, and the second space SPC that is continuous with the second groove GR2 is formed on the right side.

(D) Filling Process

In the (D) filling process, as illustrated in FIG. 44, insulating resin (the protective insulator 16, right insulating portion 162, or left insulating portion 162A) is filled into the group of grooves illustrated in FIG. 43 and the spaces connected to each groove. This (D) process is identical to the process described with reference to FIG. 15.

(E) Cutting Process

In the (E) cutting process, as illustrated in FIG. 45, multiple grooves (third groove GR3 or fourth groove GR4) whose depth direction is the positive direction of the Z-axis are formed in the stacked sheet 300. Moreover, the stacked sheet 300 can be inverted to facilitate the formation of these grooves. This (E) process is identical to the process described with reference to FIG. 16.

(F) Side Electrode Formation Process

In the (F) side electrode formation process, as illustrated in FIG. 46, the side electrode E is formed on the inner surface of the groove formed in the process of FIG. 45. Moreover, in the following dicing process, the right portion of the side electrode E in one groove becomes the first side electrode E1, and the left portion becomes the second side electrode E2. This (F) process is identical to the process described with reference to FIG. 17.

(G) Dicing Process (Individualization Process)

In the (G) dicing process, as illustrated in FIG. 47, the stacked sheet with the side electrode formed in the process of FIG. 46 is diced. Dicing can be performed using the rotary blade or similar tools, creating a third opening H3 for separating individual components. This (G) process is identical to the process described with reference to FIG. 18.

FIG. 48A is a longitudinal cross-sectional view of a solid electrolytic capacitor manufactured by the above-mentioned manufacturing method. The region surrounded by the dotted line C in FIG. 47 becomes one solid electrolytic capacitor. The first solid electrolytic capacitor sheet CES1, the second solid electrolytic capacitor sheet CES2, the third solid electrolytic capacitor sheet CES3, and the fourth solid electrolytic capacitor sheet CES4 illustrated in FIG. 47 become the first solid electrolytic capacitor element CE1, the second solid electrolytic capacitor element CE2, the third solid electrolytic capacitor element CE3, and the fourth solid electrolytic capacitor element CE4, respectively.

FIG. 48B is a longitudinal cross-sectional view of a solid electrolytic capacitor manufactured by a manufacturing method that involves widening the width of the dicing rotary blade. The region surrounded by the dotted line J in FIG. 47 constitutes one solid electrolytic capacitor. This solid electrolytic capacitor does not have a side electrode with a bent portion. If the side electrode has a bent portion, there is an effect of increasing the fillet strength as described above. If the side electrode does not have a bent portion, the component becomes smaller.

As described above, the manufacturing method of the solid electrolytic capacitor includes the following processes: (A) stacked sheet formation process, (B) groove formation process, (C) etching process, (D) filling process, (E) cutting process, (F) side electrode formation process, and (G) dicing process. In the solid electrolytic capacitor sheets constituting the stacked sheet, by forming the cathode electrode layer by a printing technique, the number of processes can be reduced, thus simplifying the manufacturing method and lowering the manufacturing cost. Furthermore, the printing technique, compared with the sputtering technique, eliminates the need to form a resist layer for patterning the cathode electrode layer, thus reducing the thickness of the solid electrolytic capacitor sheet and allowing the solid electrolytic capacitors to be thinner.

Furthermore, in any of the above manufacturing methods, during the (A) the stacked sheet formation process, the material for the insulating sheets bonding each solid electrolytic capacitor sheet (the first insulating sheet IF1, second insulating sheet IF2, third insulating sheet IF3, fourth insulating sheet IF4, and uppermost insulating sheet IFT) is preferably made of an adhesive resin. This insulating sheet is made of a resin sheet in which filler such as silica is added to a thermosetting resin such as epoxy resin. It is also possible to make this insulating sheet from a prepreg material, which includes glass fiber (glass cloth or glass nonwoven fabric) impregnated with a resin such as epoxy resin. Using a prepreg material as a constituent material for the insulating sheet can enhance the strength of the product. It is acceptable to use both glass fiber-containing prepreg materials and glass fiber-free insulating sheets, optimizing the thickness and strength by using only the uppermost insulating sheet IFT as a glass fiber-containing prepreg.

In the above-mentioned manufacturing method, a conductive material-containing paste is printed on the target surface to form a cathode electrode layer, but this structure and its manufacturing method can also be applied to the structures and manufacturing methods described in FIGS. 19A to 37.

Next, a solid electrolytic capacitor with a modified structure will be described. The fundamental structure of this solid electrolytic capacitor is as illustrated in FIG. 1 described earlier.

FIG. 49 is a longitudinal cross-sectional view of a solid electrolytic capacitor according to an embodiment.

The solid electrolytic capacitor includes the support substrate 7 on which the anode terminal 1 and the cathode terminal 2 are provided, the stacked body 100 provided with the plurality of solid electrolytic capacitor elements stacked on the support substrate 7, and the protective insulator 16 provided on the stacked body 100. The protective insulator 16 may be formed directly on the upper surface of the solid electrolytic capacitor element on the uppermost surface side constituting the stacked body 100. In this example, the stacked body 100 includes the uppermost insulating sheet IFT provided on the upper surface of the solid electrolytic capacitor element on the uppermost surface side, and a reinforcing sheet CF1 provided on the uppermost insulating sheet IFT. Thus, the protective insulator 16 is provided to be in contact with the upper surface of the reinforcing sheet CF1.

The reinforcing sheet CF1 is made of a prepreg (pre-impregnated) that contains glass fiber (glass cloth or glass non-woven fabric) or glass cloth. This prepreg can include a cured resin material and can be used as a core material such as a glass epoxy board. By using the reinforcing sheet CF1, warping during stacking of the solid charge capacitor sheets can be suppressed, and damage to the components during groove (slit) processing can be reduced.

The solid electrolytic capacitor includes the stacked body 100, which is provided on the support substrate 7, and the anode terminal 1 and cathode terminal 2, which are electrically connected to the first side electrode E1 and second side electrode E2, respectively, and are provided on the lower surface of the support substrate 7. In the case where the solid electrolytic capacitor is arranged on a wiring board having a first land electrode and a second land electrode, the anode terminal 1 and the cathode terminal 2 become connection terminals to these land electrodes. Specifically, the first land electrode is arranged directly below the anode terminal 1 provided on the lower surface of the support substrate 7, and the second land electrode is arranged directly below the cathode terminal 2. In this case, the first side electrode E1 and the second side electrode E2 can be electrically connected to the first land electrode and the second land electrode. Moreover, it is possible to connect the first and second side electrodes to the land electrodes on the wiring board even if the anode terminal 1 and the cathode terminal 2 are omitted.

The support substrate 7 is made of an insulating material. Inorganic insulating materials and organic insulating materials are known as insulating materials. Silicon oxide (e.g., $SiO_2$), silicon nitride (e.g., $SiN_x$), aluminum oxide (e.g., $Al_2O_3$), magnesium oxide (e.g., MgO), and the like are known as inorganic insulating materials, and glass substrates and LTCC (low temperature co-fired ceramics) substrates containing alumina and glass materials are known as insulating material substrates containing these materials. Thermosetting resins such as polyimide and epoxy resin are known as organic insulating materials. A glass epoxy substrate such as FR4 (Flame Retardant type 4), which is made by impregnating glass fiber (glass cloth or glass non-woven fabric) with epoxy resin and curing it, can also be used. In this example, a glass epoxy substrate is used as an insulating material suitable for the support substrate 7. Although the lower surface of the support substrate 7 is provided with the anode terminal 1 and the cathode terminal 2, a dummy electrode layer may be acceptable to be provided on the upper surface of the support substrate 7. The dummy electrode layer is used for reducing the warping of the support substrate 7, and it may be acceptable to have it the same shape as the anode terminal 1 and the cathode terminal 2 or to provide it on the entire upper surface of the support substrate 7.

The protective insulator 16 is made of an insulating material. Inorganic insulating materials and organic insulating materials are known as insulating materials. The above-mentioned materials are known as inorganic insulating materials, but in this example, an organic insulating material is used. Thermosetting resins such as polyimide and epoxy resin are known as organic insulating materials. In this example, an epoxy resin containing a filler is used as an insulating material suitable for the protective insulator 16. The protective insulator 16 before thermal curing in manufacturing can be in the form of powder, liquid, grain, or film.

The stacked body 100 is formed by stacking a plurality of solid electrolytic capacitor elements. Each solid electrolytic capacitor element (the first solid electrolytic capacitor element CE1 and the second solid electrolytic capacitor element CE2) includes the first capacitor C1 and the second capacitor C2 illustrated in FIG. 1. The structure of the first solid electrolytic capacitor element CE1 is the same as the structure of the second solid electrolytic capacitor element CE2. The structure of the first capacitor C1 is the same as the structure of the second capacitor C2, except that it is upside down.

The first capacitor C1 includes a roughened layer provided on the upper surface of the anode electrode layer 8, the first dielectric layer provided on the upper surface of the roughened layer, the first solid electrolyte layer 12 provided on the upper surface of the first dielectric layer, and the first cathode electrode layer 14 provided on the upper surface of the first solid electrolyte layer 12. The first dielectric layer and the solid electrolyte layer 12 are sandwiched between the anode electrode layer 8 and the first cathode electrode layer 14. Specifically, the first capacitor C1 includes the anode electrode layer 8, the first dielectric layer provided on the surface of the anode electrode layer 8, the first solid electrolyte layer 12 covering the first dielectric layer, the first cathode electrode layer 14 sandwiching the first solid electrolyte layer 12 together with the first dielectric layer, and a first protective layer 15 covering the first cathode electrode layer 14. The first protective layer 15 can be omitted.

Moreover, the first solid electrolyte layer 12 is made of a roughened layer containing a conductive polymer. Additionally, on the roughened layer of the first solid electrolyte layer 12, a conductive polymer layer 12r is formed. The conductive polymer layer 12r also functions as a solid electrolyte layer.

The roughened layer is made of roughened aluminum and has numerous pores. The roughening treatment can be performed by chemical conversion treatment and anodic oxidation. The roughening treatment can also be carried out only through chemical conversion treatment. The roughening treatment can also be performed only through anodic oxidation. The chemical conversion treatment can be carried out by immersing the aluminum foil in a chemical conversion solution (e.g., an aqueous solution of ammonium adipate). The anodic oxidation can be performed by applying a voltage to the aluminum foil immersed in an electrolyte. In using anodic oxidation, a porous layer is formed on the surface side of the aluminum foil, and a dielectric layer made of aluminum oxide is formed. Additionally, the roughening treatment can also be performed by etching. The first cathode electrode layer 14 is formed over the conductive polymer layer 12r via the first conductive layer 13. The first conductive layer 13 may be a single layer or it may be two or more layers.

The anode electrode layer 8 is made of a valve metal, but the material is not particularly limited as long as it is one that is generally used in electrolytic capacitors. As the valve metal or valve-acting metal, aluminum (Al), tantalum (Ta), niobium (Nb), titanium (Ti), hafnium (Hf), zirconium (Zr), zinc (Zn), tungsten (W), bismuth (Bi), antimony (Sb), and the like are known. Among these, aluminum or tantalum is relatively preferably used. The anode electrode layer 8 may be an alloy containing at least one metal selected from such a metal group. The metal constituting the anode electrode layer 8 is preferably a metal having a different solubility in acid or alkali from the metal constituting the cathode electrode layer, and is preferably a metal capable of selective etching in specific liquids. The anode electrode layer 8 in this example is assumed to be aluminum. The thickness of the anode electrode layer 8 is, for example, 1 μm to 500 μm.

In this example, the first cathode electrode layer 14 is made of copper (Cu). The first cathode electrode layer 14 may be made of other metals such as nickel (Ni), silver (Ag), and tin (Sn), in addition to copper (Cu). From the viewpoints of conductivity and cost, it is preferable that the first cathode electrode layer 14 is a single layer of copper alone or a composite layer containing copper and/or other metals (such as Ni, Cr, or Ni—Cr). The first cathode electrode layer 14 may be an alloy containing at least one metal selected from the group of these metals. In the case where an underlying layer of the first cathode electrode layer 14 contains Ni, Cr, or the like, the adhesion can be improved. Depending on the type of material of the first cathode electrode layer 14 (e.g., Ag), the underlying layer may not be necessary.

The conductive polymer (compound) included in the first solid electrolyte layer 12 and the conductive polymer layer 12r preferably contains at least one selected from the group consisting of polypyrrole, polyaniline, polythiophene, polyfuran, and derivatives thereof. Poly (3,4-ethylenedioxythiophene) (PEDOT) and polypyrrole (ppy) are preferably used. These may be used alone or in a mixture of two or more. These materials can have excellent conductivity by adding an appropriate dopant.

The first conductive layer 13 is, for example, an adhesive conductive layer (e.g., carbon paste). The adhesive conductive layer includes a conductor and an adhesive. The conductor in the adhesive conductive layer is a material containing carbon (e.g., graphite) or a metal. The adhesive in the adhesive conductive layer is a resin such as a phenol resin, a urea resin, an epoxy resin, a polyester resin, or a polyimide resin, or a hydrocarbon compound such as paraffin oil. Carbon paste is a mixture of graphite powder and an adhesive, and it can be used for the first conductive layer 13. The first conductive layer 13 can be formed by a printing technique.

Moreover, the metal conductive layer constituting the first cathode electrode layer 14 may be made of copper (Cu), nickel (Ni), silver (Ag), or tin (Sn), and these metal conductive layers may be formed as plating layers using electroplating. These metal conductive layers may also be formed by any method, such as sputtering. In the case of forming the plating layer by an electroless plating technique, the adhesive conductive layer underneath it may contain a catalytic metal. The catalytic metal is a noble metal with catalytic activity for electroless plating, and may be palladium (palladium-based material), gold, platinum, rhodium, or the like, with palladium being particularly preferred. These may be used alone or in a mixture of two or more. Additional metal film forming (thickening) using electrolytic plating may be performed on a metal film formed by electroless plating or sputtering.

Generally, for copper plating, sulfuric acid copper bath, pyrophosphoric acid copper bath, cyanide copper bath, copper fluoride bath, or the like may be used. For nickel plating, watt bath (nickel sulfate), sulfamate bath (nickel sulfamate), chloride bath (nickel chloride), or the like can be used. For tin plating, sulfuric acid baths, sulfonic acid baths, or the like can be used. Various plating techniques are known and can be applied to the formation of each plating layer.

The first conductive layer 13 has a function of electrically connecting the solid electrolyte layer 12 directly beneath it with the first cathode electrode layer 14 above it. The first conductive layer 13 has a function of protecting the solid electrolyte layer 12 directly beneath it. From the viewpoint of the protective function, this conductive layer also acts as a protective layer. Moreover, the first conductive layer 13 preferably includes a resin layer that incorporates a conductor into a resin that is highly heat-resistant, highly moisture-resistant (with low water absorption and permeability), and has high mechanical strength. The preferred thickness of the first conductive layer 13 is 1 μm to 50 μm, but it can also be set between 3 μm to 10 μm. Although it is possible to electrically connect the solid electrolyte layer 12 and the first cathode electrode layer 14 even if the first conductive layer 13 is omitted, it is preferable to have the first conductive layer 13.

The first protective layer 15 is made of a resist material that includes resin, and is preferably made of a material containing both resin and an inorganic material. As an inorganic material, a filler such as silica (silicon oxide) can be used. As the resin material, a thermosetting resin such as polyimide or epoxy resin can be used. In this example, the first protective layer 15 using epoxy resin with added silica is employed. The resist material can be a liquid material dissolved in a suitable solvent during manufacturing. Moreover, the first protective layer 15 can be omitted.

The second capacitor C2 has a roughened layer provided on the lower surface of the anode electrode layer 8, the second dielectric layer is provided on the lower surface of the roughened layer, the second solid electrolyte layer 12B is provided on the lower surface of the second dielectric layer, and the second cathode electrode layer 14B is provided on the lower surface of the second solid electrolyte layer 12B. The second dielectric layer and the second solid electrolyte layer 12B are sandwiched between the anode electrode layer 8 and the second cathode electrode layer 14B. Specifically, the second capacitor C2 includes the anode electrode layer 8, the second dielectric layer provided on the surface of the anode electrode layer 8, the second solid electrolyte layer 12B covering the second dielectric layer, the second cathode electrode layer 14B sandwiching the second solid electrolyte layer 12B together with the second dielectric layer, and a second protective layer 15B covering the second cathode electrode layer 14B. Moreover, the second solid electrolyte layer 12B is made of a roughened layer containing a conductive polymer. Below the roughened layer of the second solid electrolyte layer 12B, a conductive polymer layer 12Br is formed. The second cathode electrode layer 14B is formed below the conductive polymer layer 12r via a second conductive layer 13B.

The material of the second solid electrolyte layer 12B is identical to the material of the first solid electrolyte layer 12. The material of the conductive polymer layer 12Br is identical to that of the conductive polymer layer 12r. The material of the second conductive layer 13B is identical to the material of the first conductive layer 13. The material of the second cathode electrode layer 14B is identical to that of the first cathode electrode layer 14. The material of the second protective layer 15B is identical to the material of the first protective layer 15.

The anode electrode layer 8 is physically and electrically connected to the first side electrode E1 provided on the first side surface S1 of the stacked body 100. The anode electrode layer 8 is electrically connected to the anode terminal 1 through the first side electrode E1. The first cathode electrode layer 14 and the second cathode electrode layer 14B are physically and electrically connected to the second side electrode E2 provided on the second side surface S2 of the stacked body 100. The first cathode electrode layer 14 and the second cathode electrode layer 14B are electrically connected to the cathode terminal 2 through the second side electrode E2.

The shape of the first side electrode E1 and the shape of the second side electrode E2 are the same and are plane symmetrical with respect to the XZ plane passing through the center position in the X-axis direction of the stacked body 100.

The part of the first side electrode E1 on the side of the protective insulator 16 has a first bent portion E1B that bent to bend away from the first side surface S1 to the outside, and the lower surface of the first bent portion E1B is exposed. Since the first bent portion E1B is bent around the Y-axis, the amount of rotational deformation around the Z-axis is small. Furthermore, a fillet is more likely to be formed at the position in contact with the lower surface of the first bent portion E1B. In this case, the dimension in the X-axis direction of the fillet at the position contacting the lower surface of the first bent portion E1B becomes large, and its volume increases. Thus, under environmental changes such as temperature, the amount of deformation of the first bent portion E1B is small, and the resistance to stress increases with the increase in the volume of the fillet itself. Thus, cracks are less likely to occur in the fillet, and the solid electrolytic capacitor can operate with high reliability. In addition, the complicated connection interface between the fillet and the side electrode also has the effect of preventing the progression of occurred cracks.

The part of the second side electrode E2 on the side of the protective insulator 16 has a second bent portion E2B that is bent to move away from the second side surface S2 toward the outside, and the lower surface of the second bent portion E2B is exposed. Since the second bent portion E2B is bent around the Y-axis, the amount of rotational deformation around the Z-axis is small. Furthermore, a fillet is more likely to be formed at the position where it contacts the lower surface of the second bent portion E2B. In this case, the dimension in the X-axis direction of the fillet at the position where it contacts the lower surface of the second bent portion E2B becomes large, leading to an increase in volume. Thus, under environmental changes such as temperature, the amount of deformation of the second bent portion E2B is small, and the resistance to stress increases with the increase in the volume of the fillet itself. Thus, cracks are less likely to occur in the fillet, and the solid electrolytic capacitor can operate with high reliability. In addition, the complicated connection interface between the fillet and the side electrode also has the effect of preventing the progression of occurred cracks.

It is preferable that the dimension L1 of the first bent portion E1B in the direction perpendicular to the first side surface S1 is 0.01 mm or more and 1 mm or less along the lower surface of the protective insulator 16. The dimension L1 is further preferably 0.03 mm or more and 0.3 mm or less. In the case where the dimension L1 of the first bent portion E1B is equal to or greater than the above-mentioned lower limit, the fillet is likely to come into contact with the lower surface of the first bent portion E1B. In addition, it helps to suppress the progress of the generated microcracks in the Z direction and prevent complete breakage of the component connection. Additionally, even if the dimension L1 of the first bent portion E1B exceeds the above-mentioned upper limit, the rate of increase in the effect of expanding the contact area of the fillet with the bottom surface of the first bent portion E1B becomes small, and from the viewpoint of suppressing an excessive increase in the component size and reducing material costs, it is preferable for the dimension L1 to be equal to or less than the upper limit.

Similarly, the dimension L2 of the second bent portion E2B in the direction perpendicular to the second side surface S2 is preferably 0.01 mm or more and 1 mm or less along the lower surface of the protective insulator 16. It is even more preferable that the dimension L2 is 0.03 mm or more and 0.3 mm or less. In the case where the dimension L2 of the second bent portion E2B is equal to or greater than the above-mentioned lower limit, the fillet is likely to come into contact with the lower surface of the second bent portion E2B. In addition, it helps to suppress the progress of the generated microcracks in the Z direction and prevent complete breakage of the component connection. Additionally, even if the dimension L2 of the second bent portion E2B exceeds the above-mentioned upper limit, the increase rate of the effect of expanding the contact area of the fillet to the lower surface of the second bent portion E2B is small, and from the viewpoint of suppressing an excessive increase in the component size and reducing material costs, it is preferable that the dimension L2 is equal to or less than the upper limit. Moreover, a prototype was manufactured by setting the dimension L1=the dimension L2. The dimensions of the prototype are L1=0.1 mm, L1=0.25 mm, and L1=0.45 mm. In both cases, satisfactory contact with the fillet was observed. From this viewpoint, it is possible, for example, to set L1=L2=prototype dimension±ΔL (ΔL=L1×50%) as an illustration.

In this figure, the positive direction of the X-axis is the right side, and the negative direction is the left side. Between the first side electrode E1 and the first solid electrolyte layer 12, a first insulating region 10 on the left side is interposed. In the vicinity of the interface between the first insulating region 10 on the left side and the anode electrode layer 8, a dielectric layer is formed, and the region closer to the anode electrode layer 8 than the dielectric layer is a conductive region. Between the first side electrode E1 and the second solid electrolyte layer 12B, a second insulating region 10B on the left side is interposed. In the vicinity of the interface between the second insulating region 10B on the left side and the anode electrode layer 8, a dielectric layer is formed, and the region closer to the anode electrode layer 8 than the dielectric layer is a conductive region. The first insulating region 10 is formed by filling the gaps in the roughened layer on the upper part of the anode electrode layer 8 with an insulating resin. Similarly, the second insulating region 10B is formed by filling an insulating resin into the gaps in the roughened layer below the anode electrode layer 8.

Between the second side electrode E2 and the first solid electrolyte layer 12, the right-side first insulating region 10 and the insulating portion 162 are interposed. In the vicinity of the interface between the right-side first insulating region 10 and the anode electrode layer 8, a dielectric layer is formed, and the region closer to the anode electrode layer 8 than the dielectric layer is a conductive region. Between the second side electrode E2 and the second solid electrolyte layer 12B, the right-side second insulating region 10B is interposed. In the vicinity of the interface between the right-side second insulating region 10B and the anode electrode layer 8, a dielectric layer is formed, and the region closer to the anode electrode layer 8 than the dielectric layer is a conductive region.

The insulating portion 162 is interposed between the right-side first insulating region 10 and the second side electrode E2. The insulating portion 162 is interposed between the second insulating region 10B on the right side and the second side electrode E2. The insulating portion 162 is interposed between the right end of the anode electrode layer 8 and the second side electrode E2. The material of the insulating portion 162 is different from the material of the first insulating region 10 and the second insulating region 10B. The material of the first insulating region 10 and the second insulating region 10B is the same.

The material of the insulating portion 162 may include the same material as the protective insulator 16. The insulating portion 162 may include a filler in the resin. Examples of the resin material include phenol resin, methacrylic resin, epoxy resin, silicone resin, polycarbonate, polyethylene terephthalate, polyamide, polyimide, polybutadiene, polyethylene, polystyrene, and the like. The resin may be a resist material. The resin material can be a thermosetting resin such as polyimide or epoxy resin, but a photocurable resin can also be used. Additionally, examples of inorganic materials constituting the filler include silica ($SiO_2$), aluminum oxide ($Al_2O_3$), and aluminum nitride (AlN).

Moreover, the first insulating layer 11 is interposed between the first insulating region 10 and the first cathode electrode layer 14. The first insulating layer 11 contains the same resin material as the first insulating region 10 and includes a filler. Since the filler does not fundamentally permeate the first insulating region 10, the filler content is small. The second insulating layer 11B is interposed between the second insulating region 10B and the second cathode electrode layer 14B. The second insulating layer 11B is made of the same material as the first insulating layer 11. The second insulating region 10B is made of the same material as the first insulating region 10.

The insulating portion 162 is provided between the first mask layer M1 (protective layer) and the second mask layer M1B (protective layer). The first mask layer M1 can contain a resin (e.g., epoxy resin) and a filler. During manufacturing, because the viscosity of the uncured resin material of the first mask layer M1 is high, the uncured resin material does not permeate the interior during application on the roughened layer. Thus, during manufacturing, the roughened layer directly below the first mask layer M1 does not contain resin, making it easy to etch. The insulating portion 162 is embedded in the region formed by etching the roughened layer. The first mask layer M1 is located between the insulating portion 162 and the first cathode electrode layer 14. The second mask layer M1B is located between the insulating portion 162 and the second cathode electrode layer 14B. The material and function of the second mask layer M1B are the same as those of the first mask layer M1. The portion just below the mask layer becomes a space without resin residue after etching of the roughened layer, making it easier to embed the insulating portion 162, and it is also possible to use a resin with low permeability as the material for the insulating portion 162.

Between the support substrate 7 and the first solid electrolytic capacitor element CE1, a first insulating sheet IF1 is interposed. Between the first solid electrolytic capacitor element CE1 and the second solid electrolytic capacitor element CE2, a second insulating sheet IF2 is interposed. The insulating sheet is made of a material containing resin, and preferably a material containing resin and an inorganic material. As an inorganic material, a filler such as silica, or glass fiber (glass cloth or glass non-woven fabric) can be used. As the resin material, a thermosetting resin such as epoxy resin can be used. In this example, a resin sheet in which silica is added to epoxy resin is used, but it is also possible to use a prepreg material with epoxy resin impregnated into glass fiber.

The previously mentioned FIG. 3 is a diagram illustrating the structure in the vicinity of the solid electrolyte layer.

On the surface of the anode electrode layer 8, a first dielectric layer 9 is formed. The first dielectric layer 9 is typically a metal oxide film with electrical insulation properties (such as aluminum oxide ($Al_2O_3$) when the anode electrode layer 8 is made of aluminum). The first dielectric layer 9 is formed by oxidizing the surface layer of the anode electrode layer 8 in a specified manner. The thickness of the first dielectric layer 9 is, for example, 1 nm to 1 μm. The first solid electrolyte layer 12 is formed along the first dielectric layer 9 on the fine concave and convex surfaces of the anode electrode layer 8 formed by surface roughening, filling a recess 8c. The thickness of the first solid electrolyte layer 12 is preferably a thickness that can cover the concave and convex surfaces. The thickness of the first solid electrolyte layer 12 is, for example, approximately 1 μm to 100 μm. Moreover, in this figure, an example is illustrated in which the first conductive layer 13 is formed on the first solid electrolyte layer 12.

Moreover, the total thickness provided with the anode electrode layer 8, the first solid electrolyte layer 12, and the second solid electrolyte layer 12B (the thickness of the region (metal sheet) containing aluminum) can be set preferably to 50 μm through 300 μm. More preferably, this thickness can be set between 100 μm and 150 μm.

The peripheral structure of the lateral tip portion of the anode electrode layer 8 is now described.

FIG. 50 is a diagram illustrating an example of the peripheral structure of the lateral tip portion of the anode electrode layer.

The solid electrolytic capacitor includes the stacked body 100 provided with the plurality of stacked solid electrolytic capacitor elements, the first side electrode E1 provided on a first side surface S1 of the stacked body 100, and the second side electrode E2 provided on a second side surface S2 of the stacked body 100.

In this regard, the solid electrolytic capacitor element includes the first dielectric layer, the first solid electrolyte layer 12, and the first cathode electrode layer 14 on the upper side of the anode electrode layer 8, and includes the first insulating region 10 and the insulating portion 162 on the lateral side. The anode electrode layer 8 is electrically connected to the first side electrode E1. The first dielectric layer is provided on the anode electrode layer 8. The first cathode electrode layer 14 is electrically connected to the second side electrode E2. The first solid electrolyte layer 12 is interposed between the first dielectric layer and the first cathode electrode layer 14. The insulating portion 162 is interposed between the side of the anode electrode layer 8 and the second side electrode E2, and contains an insulating resin. The first insulating region 10 is interposed between the insulating portion 162 and the first solid electrolyte layer 12, and contains a material different from that of the insulating portion 162. The dielectric layer made of aluminum oxide or the like is interposed between the first insulating region 10 and the anode electrode layer 8, and this dielectric layer is formed around the interface vicinity region 91'.

The lower side of the anode electrode layer 8 is provided with the second dielectric layer, the second solid electrolyte layer 12B, and the second cathode electrode layer 14B, and is provided with the second insulating region 10B and the insulating portion 162 on the lateral. Between the second insulating region 10B and the anode electrode layer 8, a dielectric layer made of aluminum oxide or the like is interposed, and this dielectric layer is formed around an interface vicinity region 91B'.

In this figure, an XYZ three-dimensional orthogonal coordinate system is also set, and multiple solid electrolytic capacitor elements are stacked along the Z-axis direction, with the direction from the first side electrode E1 to the second side electrode E2 being the positive direction of the X-axis. The anode electrode layer 8 has a protrusion 8p that protrudes in the positive direction of the X-axis at the end position in the positive direction of the X-axis. The X position of the tip of the protrusion 8p is designated as the tip position xp. The first distance D1 is the distance between the anode electrode layer 8 and the second side electrode E2, and more specifically, the distance between the tip position xp of the protrusion 8p and the position of the second side surface S2 (second position x2). The X position of the first insulating region 10 closest to the second side electrode E2 is designated as the end position xs. The second distance D2 is the distance between the first insulating region 10 and the second side electrode E2, and more specifically, the distance between the end position xs of the first insulating region 10 on the second side electrode side and the position of the second side surface S2 (second position x2). In this example, the first distance D1 is smaller than the second distance D2. Moreover, the second distance D2 is also the distance between the second insulating region 10B and the second side electrode E2. In this manner, the position of the side surface of the anode electrode layer 8 is closer to the second side electrode E2 than to the insulating region 10 (D1<D2).

In the insulating portion 162, the preferred filler content can be 20% by mass or more and 90% by mass or less. The insulating portion 162 can include a plurality of surrounding resins. As these resins, epoxy resin, which is a thermosetting resin, or a mixed resin of acrylic and epoxy can be used. As these resins, it is preferable to use epoxy resin with high heat resistance and high elasticity or epoxy resin with low elasticity from the viewpoint of reducing warping and stress due to heat. Moreover, the fundamental function of the insulating portion 162 is to provide electrical insulation between the anode electrode layer 8 and the second side electrode E2.

The side of the second side electrode E2 of the anode electrode layer 8 is provided with the protrusion 8p. Stress may be applied to the interface between the protrusion 8p and the insulating portion 162. Stress may be applied to the interface between the first insulating region 10 (or the second insulating region 10B) and the insulating portion 162. On the other hand, the tip position xp of the protrusion 8p that determines the first distance D1 is different from the end position xs on the side of the second side electrode of the first insulating region 10 that determines the second distance D2, so the alignment of these positions can help suppress the transmission of stress to the interface with the insulating portion 162 more than when these positions are coincident. In other words, it is possible to suppress the occurrence and progression of cracks in the component. In the case where an interface of an appropriate material is located above the anode electrode layer 8, the tip position (X-direction position) of the protrusion 8p can be made different from the interface position (X-direction position), so further suppressing the transmission of stress to the interface than when these positions are coincident.

Furthermore, the protrusion 8p has a triangular shape in the XZ plane. A first angle θ that defines the upper hypotenuse of the triangle forms an angle with the Z-axis passing through the X-axis position (xs) that determines the second distance D2 of the first insulating region 10 and the contour line 8s of the protrusion 8p at the intersection of this Z-axis and the protrusion 8p in the XZ plane. The first angle θ is greater than 90° (an obtuse angle: 90°<0). In the case of this obtuse angle shape, when a deformation stress is applied that bends the hypotenuse (contour line 8s) of the protrusion 8p about the Y-axis, the force acting on the first insulating region 10 is smaller than in the case where the first angle θ is 90°. Thus, the occurrence of cracks in the component is suppressed.

Similarly, a second angle θ' that defines the lower hypotenuse of the triangle is the angle formed by the Z-axis passing through the X-axis position (xs) that determines the second distance D2 of the second insulating region 10B and the contour line 8Bs of the protrusion 8p at the intersection of the Z-axis and the protrusion 8p in the XZ plane. The second angle θ' is greater than 90° (an obtuse angle: 90°<θ'). In the case of this obtuse angle shape, when a deformation stress is applied that bends the hypotenuse (contour line 8Bs) of the protrusion 8p about the Y-axis, the force acting on the second insulating region 10B is smaller than when the second angle θ' is 90°. Thus, the occurrence of cracks in the component is suppressed.

With the above-mentioned structure, in addition to suppressing the occurrence of cracks, delamination between the layers is also suppressed, thereby increasing the lifespan of the solid electrolytic capacitor.

The solid electrolytic capacitor according to the embodiment is capable of reducing stress occurring around the side surface of the anode electrode layer 8. In addition to the above-mentioned protrusion 8p, the component includes the first mask layer M1 and the second mask layer M1B. As described above, by using the mask layer, it is easy to remove the material (roughened layer) provided on the inner surface side, so the filling rate of the insulating portion provided in the space formed by the removal can be easily improved. The insulating portion 162 is adjacent to the anode electrode layer 8, and improving the filling rate of the insulating portion reduces the occurrence rate of stress due to internal voids and the like, thereby enhancing the reliability of the component. In addition, increasing the degree of freedom in forming the insulating portion 162 allows for modifications in the structure of the insulating portion to reduce stress, thus further improving the reliability of the component.

Moreover, the viscosity of the first mask layer M1 before solidification (curing) is higher than that of the first insulating layer 11 before solidification. The first mask layer M1 in this example includes a resin and a filler. To increase the viscosity of the first mask layer M1, the filler content of the first mask layer M1 can be made higher than the filler content of the first insulating layer 11. In addition, to increase the viscosity of the first mask layer M1 before solidification, the molecular weight of the resin of the first mask layer M1 before solidification can be made higher than the molecular weight of the resin of the first insulating layer 11 before solidification. Moreover, the viscosity of the first mask layer M1 before solidification also depends on the proportion of the solvent. The first mask layer M1 has a higher viscosity than the first insulating layer 11 before solidification, and is less likely to be absorbed by the roughened layer located under the mask layer M1 during manufacturing. Thus, the solid electrolytic capacitor has a structure that facilitates the removal of the roughened layer directly below the mask layer, resulting in a high filling rate of the insulating portion 162. Similarly, the viscosity of the second mask layer M1B before solidification is higher than that of the second insulating layer 11B before solidification. The second mask layer M1B in this example includes a resin and a filler. To increase the viscosity of the second mask layer M1B, the filler content of the second mask layer M1B can be made higher than the filler content of the second insulating layer 11B. In addition, to increase the viscosity of the second mask layer M1B before solidification, the molecular weight of the resin of the second mask layer M1B before solidification can be made higher than the molecular weight of the resin of the second insulating layer 11B before solidification. Moreover, the viscosity of the second mask layer M1B before solidification also depends on the proportion of the solvent.

Regarding the material, further description reveals that the first insulating region 10 includes the metal contained in the anode electrode layer 8 and the resin contained in the first insulating layer 11. The first insulating region 10 is formed by supplying resin to a roughened layer formed by roughening a metal sheet including the anode electrode layer 8, and the resin remaining thereon forms the first insulating layer 11. Thus, the first insulating region 10 contains the metal contained in the anode electrode layer 8 and the resin contained in the first insulating layer 11. The exemplified metal is aluminum, and the exemplified resin is epoxy resin. The material of the second insulating region 10B is the same as the material of the first insulating region 10.

The insulating portion 162 contains resin and filler, and the constituent material of the insulating portion 162 is different from that of the insulating region 10 as a whole. By including filler in the insulating portion 162, it is possible to increase its hardness and enhance its mechanical strength. In addition, it is possible to reduce the thermal expansion coefficient of the insulating portion 162.

FIG. 51 is a diagram illustrating an example of the peripheral structure of the lateral tip portion of the anode electrode layer.

This structure is different from the structure illustrated in FIG. 50 in that the region directly below the first mask layer M1 is further etched and then the insulating portion 162 is formed. In other words, in this solid electrolytic capacitor element, the first insulating region 10 includes a first region $10_1$ and a second region $10_2$. The second region $10_2$ is a region from which the metal elements inside are removed when the anode electrode layer is etched, and the second region $10_2$ becomes a resin-filled region $162_X$ of the insulating portion 162 by filling it with resin in subsequent processes. The initial second region $10_2$ has a structure softened to a sponge-like state by etching, with the metal contained inside the initial insulating region 10 being removed. The insulating region 10 before etching contains resin and metal. The first region $10_1$ contains the metal contained in the anode electrode layer 8 and the resin contained in the first insulating layer 11. A part of the insulating portion 162 is located around the protrusion 8p of the anode electrode layer 8, and the relatively soft resin-filled region $162_X$ is located around the insulating portion 162. The resin-filled region $162_X$ has a structure that can reduce the stress applied to the protrusion 8p. Only the resin can be permeated into the second region $10_2$ (resin roughened part) during resin sealing. In this case, by forming a resin-only layer at the interface with the anode electrode layer 8, where stress is most applied, and by combining it with the method of improving the filling rate of the insulating portion using a mask layer, further reducing the possibility of forming voids in the roughened resin part, which is difficult to fill.

FIG. 52 is a diagram illustrating an example of the second region $10_2$.

The second region $10_2$ contains the resin RSN contained in the first insulating layer 11. The second region $10_2$ is a resin material from which metal materials such as aluminum have been removed. In the manufacturing process, immediately after removing the metal material, the second region $10_2$ contains a plurality of minute spaces MS dispersed in the resin RSN. The minute space MS may contain a gas such as air. Since the minute space MS is basically filled with resin, after the final manufacturing process, the second region $10_2$ becomes the resin-filled region $162_X$ constituting solely of resin material.

FIG. 53 is a diagram illustrating an example of the peripheral structure of the lateral tip portion of the anode electrode layer.

This structure, compared to the structure illustrated in FIG. 51, has a structure in which the region directly below the first mask layer M1 is further etched and then the insulating portion 162 is formed. In other words, in this solid electrolytic capacitor element, the first insulating region 10 includes the first region $10_1$ and the resin-filled region $162_X$, but the tip position of the anode electrode layer 8 is located in a place deeper than the position of the resin-filled region $162_X$ on the side of the second side electrode E2. Specifically, the position of the side of the anode electrode layer 8 is farther from the second side electrode E2 than the resin-filled region $162_X$ (D2<D1 in the figure). Before being filled with resin, the resin-filled region $162_X$ has a structure in which the metal contained in the original insulating region 10 is removed by etching and softened to a sponge-like state, allowing resin to be filled into the internal minute spaces as needed. The softened resin-filled region $162_X$ is located around the protrusion 8p of the anode electrode layer 8, and the resin-filled region $162_X$ has a structure that can reduce the stress applied to the protrusion $8p$ by the resin-filled region $162_X$.

FIG. 54 is a diagram illustrating an example of the peripheral structure of the lateral tip portion of the anode electrode layer.

In this structure, compared to the structure illustrated in FIG. 7, the region directly below the first mask layer M1 is further etched, and then two or more types of filling materials with different characteristics are filled into the space after etching. In other words, the insulating portion 162 includes a first insulating portion 1621 adjacent to the resin-filled region $162_X$ and a second insulating portion 1622 interposed between the first insulating portion 1621 and the second side electrode E2. The resin contained in the first insulating portion 1621 is also contained in the minute space MS, while the second insulating portion 1622 has a higher filler content than the first insulating portion 1621.

The second insulating portion 1622 is located farther from the anode electrode layer 8 than the first insulating portion 1621, so the mechanical strength can be increased by increasing the filler content and increasing the hardness.

FIG. 55 illustrates an example of the resin-filled region and the first insulating portion.

The first insulating portion 1621, which constitutes a part of the insulating portion 162, has a relatively low filler content (including the case where no filler is contained), so when this is formed, the resin, which is a constituent material thereof, is also contained in the minute space MS in the resin-filled region $162_X$. If the resin is filled in the minute space MS and the amount of air inside is reduced, it is also possible to reduce stress variations during temperature fluctuations. Filling the minute space MS with resin makes it also possible to prevent moisture from accumulating in the void portion, thus avoiding deterioration of electrical reliability.

FIG. 56 illustrates an example of the peripheral structure of the lateral tip portion of the anode electrode layer.

This structure is an enlarged area of the first insulating portion 1621 compared to the structure illustrated in FIG. 54. This structure achieves functional effects similar to those of the structure illustrated in FIG. 54.

FIG. 57 is a diagram illustrating an example of the peripheral structure of the lateral tip portion of the anode electrode layer.

This structure is an example in which the insulating portion 162 includes only the first insulating portion 1621 adjacent to the resin-filled region $162_X$, compared to the structure illustrated in FIG. 56. The insulating portion 162 does not include the second insulating portion. Of course, the resin contained in the first insulating portion 1621 is also included in the minute space MS in the resin-filled region $162_X$. This structure achieves functional effects similar to those of the structure illustrated in FIG. 56, but with the advantage of reducing the number of manufacturing processes by one.

A method of manufacturing the solid electrolytic capacitor mentioned above is now described.

FIG. 58A is a longitudinal cross-sectional view of an intermediate capacitor illustrated to describe a method of manufacturing a solid electrolytic capacitor, and FIG. 58B is a plan view of the intermediate capacitor.

The method of manufacturing the solid electrolytic capacitor includes (i) a process of manufacturing a solid electrolytic capacitor sheet (FIGS. 58A to 64B), and (ii) a process of processing a plurality of solid electrolytic capacitor sheets (FIGS. 65 to 75B).

In the (i) solid electrolytic capacitor sheet manufacturing process, the following processes (a) to (g) are performed in sequence.

(a) Formation of Mask Layer on Metal Sheet

In the process of forming a mask layer illustrated in FIGS. 58A and 58B, first, a metal sheet 80 made of a valve metal is prepared. The metal sheet 80 includes an anode electrode layer 8 made of a valve metal (aluminum in this example), a first roughened layer 121, and a second roughened layer 121B. The first roughened layer 121 is formed on the upper surface of the anode electrode layer 8. The second roughened layer 121B is formed on the lower surface of the anode electrode layer 8. The roughened layer is formed by etching or the like on both sides of the metal sheet, then followed by chemical processing on both sides of the metal sheet (forming an oxide film and/or anodic oxidation) to form an oxide layer on these surfaces. On the upper surface of the anode electrode layer 8, the first dielectric layer (oxide layer: in this example, an $Al_2O_3$ layer) is formed. The first dielectric layer is formed around the interface vicinity region 91 as illustrated in FIG. 3. The second dielectric layer (oxide layer: in this example, an $Al_2O_3$ layer) is formed on the lower surface of the anode electrode layer 8. The second dielectric layer is formed around the interface vicinity region 91B as illustrated in FIG. 3.

After preparing the metal sheet 80, a first mask layer M1 with a first pattern is formed on the first roughened layer 121. The first pattern is a stripe-like line pattern. Subsequently, a second mask layer M1B having a second pattern is formed on the second roughened layer 121B (lower surface). The second pattern is also a stripe-like line pattern. Screen printing can be used as a technique for forming the mask layer. Moreover, the resin contained in the printing paint for forming the mask layer and the insulating layer (e.g., thermosetting resin (epoxy resin)) is a prepolymer before curing, and is a polymer after the curing process. The first mask layer M1 and the second mask layer M1B may be formed at the same time. The mask layer is a resin material containing a resin (e.g., epoxy resin) and a filler, and does not penetrate into the roughened layer because of its high viscosity. In the case where the first resist constituting this mask layer is a hardly soluble resist, using the resin that constitutes the first insulating layer 11 as the second resist satisfies the condition where the paint viscosity of the first resist≥the paint viscosity of the second resist and/or the printing thickness of the first resist≤the printing thickness of the second resist. In other words, either the viscosity or the printing thickness of the first resist is higher or thinner than that of the first resist. More specifically, the printing paint for forming the mask layer is a liquid mixture containing resin+(filler)+solvent. In general, the viscosity of this liquid mixture can be adjusted by the resin molecular weight, the amount of solvent, the amount of filler, or the filler shape (specific surface area). Compared to the paint used to form the first insulating layer 11 and the second insulating layer 11B, the viscosity and thixotropy can be increased in any cases where the molecular weight of the resin is large, the amount of solvent is small, the filler specific surface area is large, or the filler amount is large.

Moreover, an example of a resin material constituting the mask layer (first mask layer M1 and second mask layer M1B) is a liquid mixture used as a solder resist. For example, a thermosetting solder resist is hardened by using a curing agent such as imidazole with epoxy resin. Alkaline developing type solder resist dissolves the resin using a weak alkali such as sodium carbonate before the post-curing heating for curing.

In addition, a soluble resist material that is soluble in alkali or solvent may be used as the resist material for forming the mask layer, and the resist that has permeated the roughened interior may be dissolved and removed after the subsequent etching process of the anode electrode layer. If the first resist used for the mask layer is soluble, the above-mentioned restrictions on the viscosity and thickness may not be applicable. After functioning as a mask layer, a positive resist may be used as a resist material that can be relatively easily removed by a stripping agent (solvent). In addition to those using a cresol novolac resin and a photosensitizer (naphthoquinone diazide compound) used in positive-type resists, many other resist materials are known.

(b) Insulating Region Formation Process

FIG. 59A is a longitudinal cross-sectional view of an intermediate capacitor illustrated to describe the method of manufacturing a solid electrolytic capacitor, and FIG. 59B is a plan view of the intermediate capacitor. In the insulating region formation process illustrated in FIGS. 59A and 59B, resist is applied to the upper and lower surfaces of the metal sheet 80. There are various known techniques for applying the resist. For example, various techniques such as screen printing, gravure printing, and spray coating are known. In this example, the screen-printing technique is used.

In the resist printing process on the upper surface, a resist layer having a lattice pattern (rectangular grid) is formed on the upper surface of metal sheet 80. A mask (screen plate) with openings for the regions to be coated with resist is used to coat the resist in the openings, and pressure is applied to the resist using a squeegee. Moreover, this resist layer also includes a linear first opening pattern OP1 along the Y-axis direction, and this opening pattern is located on the first mask layer M1. The width (dimension in the X-axis direction) of the first opening pattern OP1 is smaller than the width of the first mask layer M1.

In the resist printing process on the lower surface, a resist layer having a lattice pattern (rectangular grid) is formed on the lower surface of the metal sheet 80. A mask (screen plate) with openings for the regions to be coated with resist is used to coat the resist in the openings, and pressure is applied to the resist using a squeegee. The resist layer also includes a linear second opening pattern OP2 along the Y-axis direction, and this opening pattern is located on the second mask layer M1B (on the lower surface). The width (dimension in the X-axis direction) of the second opening pattern OP2 is smaller than the width of the second mask layer M1B.

The resist printing process on the upper surface and the resist printing process on the lower surface can be performed simultaneously. By performing them simultaneously, the manufacturing time can be shortened. The resist printing process on the upper surface and the resist printing process on the lower surface can also be performed in different periods. The metal sheet 80 can also be flipped to process both sides. Moreover, the resist material is a mixture of epoxy resin and silica filler. Known fillers other than silica include alumina and aluminum hydroxide.

By applying the resist, the resist (insulating resin: such as epoxy resin) permeates the first roughened layer 121, forming the first insulating region 10 having a lattice pattern (rectangular opening pattern) and a linear opening pattern in plan view. Some resist remains on the first insulating region 10, and the first insulating layer 11 having a lattice pattern (rectangular opening pattern) and a line-shaped opening pattern in plan view is formed. By applying the resist, the resist (insulating resin: such as epoxy resin) permeates the second roughened layer 121B, and the second insulating region 10B having a lattice pattern (rectangular opening pattern) and a line-shaped opening pattern in plan view is formed. Some resist remains below the second insulating region 10B, and the second insulating layer 11B having a lattice pattern (rectangular opening pattern) and a line-shaped opening pattern in plan view is formed.

The relationship between the viscosities of the resin materials used to form the first insulating layer 11 and the first mask layer M1 is as described above, and the viscosity of the first mask layer M1 can be set relatively high. Moreover, in the case where a soluble resin material is used, the relationship between the viscosities may not be limited to this. An example of the resin material constituting the insulating layer (first insulating layer 11 and second insulating layer 11B) is a liquid mixture used as a solder resist. A liquid mixture with a viscosity of 10,000 (mPa·s) at 25° C. can be diluted with a solvent to reduce the viscosity and allow efficient penetration into the roughened layer. The viscosity of the resist material can be, for example, 10 to 100 Pas (10,000 to 100,000 mPa·s, value at a rotation speed of 1 rpm) when used to form the first insulating layer 11, and 100 to 500 Pa·s (1 rpm) when used for the mask layer. In this way, the printing resist used for forming the mask layer can have a viscosity higher than 10,000 mPs.

Moreover, the resist (resin) fundamentally does not permeate the first roughened layer 121 directly below the first mask layer M1, thus protecting the first roughened layer 121. Similarly, the resist (resin) fundamentally does not permeate the second roughened layer 121B directly below the second mask layer M1B, thus protecting the second roughened layer 121B. A roughened layer that does not contain a resin material can be easily etched, allowing for the removal of the roughened layer in subsequent processes and satisfactory filling of the removed space with the insulating portion described above.

The width (distance $\Delta X$) in the X-axis direction of the rectangular opening pattern formed in the first insulating layer 11 (first insulating region 10) is given by distance $\Delta X$=position xb−position xa. A conductive polymer is introduced into the openings of the first roughened layer 121 and the second roughened layer 121B, which are determined by distance $\Delta X$. The dimensions of the second insulating layer 11B (second insulating region 10B) are the same as those of the first insulating layer 11 (first insulating region 10).

The first insulating layer 11 is formed on the surface of the metal sheet 80. The dimension of the metal sheet 80 in the X-axis direction is larger than the dimension in the Y-axis direction. The metal sheet 80 can be wound around a roll with the Y-axis as the axis of rotation, and in this case, the figure illustrates a portion of the metal sheet extending from the roll.

The outer contour of the first insulating layer 11 is rectangular. The contour of the metal sheet 80 is rectangular. These contours may coincide, but the first insulating layer 11 may be formed inside the metal sheet 80 in a planar view. In this case, a margin area is established between the contour of the metal sheet 80 and the first insulating layer 11 formed inside it.

Moreover, the orders of the mask layer formation process and the formation process for the insulating layer 11 can have a relationship as described later in FIGS. 79A to 79D. In other words, the mask layer can be formed after forming the insulating layer 11.

(c) Solid Electrolyte Layer Formation Process

FIG. 60A is a longitudinal cross-sectional view of an intermediate capacitor illustrated to describe the method of manufacturing a solid electrolytic capacitor, and FIG. 60B is a plan view of the intermediate capacitor. In the formation of a solid electrolyte layer illustrated in FIGS. 60A and 60B, after the insulating regions are formed, a conductive polymer is introduced into the rectangular openings on the upper and lower surfaces of the metal sheet 80 to form a solid electrolyte layer. There are various known methods for introducing conductive polymers. For example, techniques such as coating, chemical oxidation polymerization, and electrolytic polymerization are known.

In the coating technique, a solution containing the conductive polymer is supplied into the rectangular openings between the first insulating regions 10 on the upper surface side (and the openings between the second insulating regions 10B on the lower surface side). The solution containing a conductive polymer is either a solution in which a soluble conductive polymer is dissolved in a solvent (water or a solvent) or a solution in which conductive polymer particles (particle diameter: several nm to 20 nm) are dispersed in a solvent such as water or an organic solvent. Methods of supplying the solution containing a conductive polymer into an opening include dispensing droplets from a dispenser and applying a physically continuous liquid. The supplying methods include techniques such as inkjet, printing, and transfer. In this example, a method is used with the solution containing a conductive polymer (e.g., an aqueous solution) is dropped into the opening from a dispenser, and then dried (removal of moisture). An example of the conductive polymer is doped poly (3,4-ethylenedioxythiophene) (PEDOT). Other conductive polymers mentioned above can also be used. Moreover, in the electrolytic polymerization technique, after forming a conductive resin seed layer as the base, the seed layer is immersed in a monomer solution and grown into a conductive resin layer by electrochemical polymerization.

The conductive polymer introduced to the upper surface side permeates into the first roughened layer 121 in the opening between the first insulating regions 10 (see FIGS. 59A and 59B), forming the first solid electrolyte layer 12, forming a portion remaining on the upper part of the first solid electrolyte layer 12, forming the first conductive polymer layer 12*r*. In addition, a portion of the conductive polymer may protrude slightly from the opening, and the first conductive polymer layer 12*r* may be positioned to contact the main surface (XY plane) of the first insulating region 10. This positioning can help reduce the risk of misalignment during manufacturing and the occurrence of uncoated and unfilled portions. In the XY plane, the shapes of the respective first solid electrolyte layers 12 are rectangular, and these first solid electrolyte layers 12 are arranged in a two-dimensional manner. Moreover, the shapes of the respective first solid electrolyte layers 12 are not limited to a rectangle and can vary.

The conductive polymer introduced to the lower surface side permeates the second roughened layer 121B (see FIGS. 59A and 59B) in the opening between the second insulating regions 10B, forming the second solid electrolyte layer 12B, and a portion of the conductive polymer remains in the lower part (lower part in the drawings) of the second solid electrolyte layer 12B, forming the second conductive polymer layer 12B*r*. Additionally, a portion of the conductive polymer may protrude slightly from the opening, and the second conductive polymer layer 12B*r* may be positioned to contact the main surface (XY plane) of the second insulating region 10B. This positioning can help reduce the risk of misalignment during manufacturing and the occurrence of uncoated and unfilled portions. In the XY plane, the shapes of the respective second solid electrolyte layers 12B are rectangular, and these second solid electrolyte layers 12B are arranged two-dimensionally. Moreover, the shapes of the respective second solid electrolyte layers 12B are not limited to a rectangle, and can vary.

The process of introducing the conductive polymer on the upper side and the process of introducing the conductive polymer on the lower side can be performed simultaneously or at different periods. By performing them simultaneously, the manufacturing time can be shortened. Additionally, it is possible to process the sheet by flipping it.

(d) Conductive Layer Formation Process

FIG. 61A is a longitudinal cross-sectional view of the intermediate capacitor illustrated to describe the method of manufacturing the solid electrolytic capacitor, and FIG. 61B is a plan view of the intermediate capacitor. In the conductive layer formation processes illustrated in FIG. 61A and FIG. 61B, after the conductive polymer introduction process, the first conductive layer 13 is formed on the surface of the first solid electrolyte layer 12, and the second conductive layer 13B is formed on the back surface of the second solid electrolyte layer 12B. Each conductive layer may be a single layer or it may be two or more layers. The formation method can be a method of applying the material of the conductive layer (e.g., carbon paste). Techniques such as screen printing, gravure printing (transfer), and supplying using a dispenser can be used. There are many supplying techniques using a dispenser, such as air dispensing, in which compressed air is added to the liquid material and pushed out from a nozzle, jet dispensing in which the liquid material is sprayed from the tip of a nozzle and supplied, and supplying using an inkjet.

The first conductive layer formation process on the upper side and the second conductive layer formation process on the lower side can be performed simultaneously or in different periods. By performing them simultaneously, the manufacturing time can be shortened. Additionally, it is possible to process the sheet by flipping it.

(e) Cathode Electrode Layer Formation Process

FIG. 62A is a longitudinal cross-sectional view of the intermediate capacitor illustrated to describe the method of manufacturing the solid electrolytic capacitor, and FIG. 62B is a plan view of the intermediate capacitor. In the cathode electrode layer formation process illustrated in FIGS. 62A and 62B, after the conductive layer formation process, the first cathode electrode layer 14 is formed on the surface including the surface of the first conductive layer 13, and the second cathode electrode layer 14B is formed on the back surface including the surface of the second conductive layer 13B. There are various techniques for forming the layers, but in this example, electroplating is used.

In the case of forming the first cathode electrode layer 14 on the upper side, an underlying layer is formed on the surface including the surface of the first conductive layer 13. In the case of forming the second cathode electrode layer 14B on the lower side, an underlying layer is formed on the surface including the surface of the second conductive layer 13B. These underlying layers are formed, for example, by using a sputtering technique. The material of the underlying layer may be copper (Cu) or nickel-chromium alloy (NiCr). The material of the underlying layer may be any material that has high adhesion to the layer directly below it and allow the plating layer to grow on top of it. Then, a plating layer is formed on the underlying layer. The material of the plating layer in this example is copper (Cu). The plating layer is formed by electrolytic plating on the entire surface on which the underlying layer is formed. Through these plating techniques, the first cathode electrode layer 14 and the second cathode electrode layer 14B are formed. The cathode electrode layer is formed on the entire exposed surface of the substrate, and patterning can be performed in the subsequent process.

(f) Protective Layer (Resist) Formation Process

FIG. 63A is a longitudinal cross-sectional view of the intermediate capacitor illustrated to describe the method of manufacturing the solid electrolytic capacitor, and FIG. 63B is a plan view of the intermediate capacitor. In the formation process of the protective layer illustrated in FIGS. 63A and 63B, after the formation process of the cathode electrode layer, the first protective layer 15 is formed on the first cathode electrode layer 14, and the second protective layer 15B is formed on the second cathode electrode layer 14B. There are various techniques for forming the first protective layer 15 and the second protective layer 15B. For example, screen printing and gravure printing (transfer) can be used. In this example, the screen-printing technique is used. The resist material used for forming the first protective layer 15 and the second protective layer 15B is a material containing resin, as described above. The first protective layer formation process on the upper side and the second protective layer formation process on the lower side can be performed simultaneously or in different periods. By performing them simultaneously, the manufacturing time can be shortened. Additionally, it is possible to process the sheet by flipping it.

The first protective layer 15 has multiple regions arranged in a two-dimensional configuration, where the shape (shape in the XY plane) of each region is rectangular and the gaps between these regions form a lattice shape (rectangular grid). The width of this gap in the X-axis direction is given as the width of the first opening H1. Moreover, the shape of each first protective layer 15 is not limited to a rectangle, and can be various shapes.

The second protective layer 15B has a plurality of regions arranged two-dimensionally, each of which has a rectangular shape (shape in the XY plane), forming gaps between these regions in a lattice shape (rectangular grid). The width of this gap in the X-axis direction is given as the width of the second opening H1B. The second protective layer 15B also has a frame-shaped region (not illustrated) similar to that of the first protective layer 15. The dimensions of each region of the second protective layer 15B are identical to those in the first protective layer 15. These protective layers can function as a mask during the etching of the cathode electrode layer. The shape of each of the second protective layers 15B is not limited to a rectangle, and can be various shapes.

The first insulating region 10 is located directly below the first opening H1 located between adjacent rectangular regions included in the first protective layer 15, with the first cathode electrode layer 14 interposed therebetween. Directly below the second opening H1B located between adjacent rectangular regions included in the second protective layer 15B (on the side of the anode electrode layer 8), the second insulating region 10B is located through the second cathode electrode layer 14B.

(g) Cathode Electrode Layer Etching and Dividing Process

FIG. 64A is a longitudinal cross-sectional view of the intermediate capacitor illustrated to describe the method of manufacturing the solid electrolytic capacitor, and FIG. 64B is a plan view of the intermediate capacitor. In the etching and dividing process of the cathode electrode layer illustrated in FIGS. 64A and 64B, after the formation process of the first and second protective layers, the first cathode electrode layer 14 and the second cathode electrode layer 14B are etched using these protective layers as a mask to divide them into multiple regions. As the etching solution, a ferric chloride solution, a copper chloride solution, a mixture of sulfuric acid and hydrogen peroxide solution, or the like can be used. Methods of etching include spraying the etching solution onto the cathode electrode layer or immersing the cathode electrode layer in the etching solution. The cathode electrode layer formed by plating has a dual-layer structure, so these layers are etched.

The etching solution is used to remove the region directly below the first opening in the first cathode electrode layer 14, dividing the first cathode electrode layer 14 into a plurality of rectangular regions. The width of the gap between these rectangular regions of the first cathode electrode layer 14 in the X-axis direction may be slightly wider than the width of the first opening H1 of the protective layer in the X-axis direction. The XY plane shape of these gaps forms a lattice pattern (rectangular grid).

The etching solution is used to remove the region directly below the first opening in the second cathode electrode layer 14B, dividing the second cathode electrode layer 14B into a plurality of rectangular regions. The width of the gap between these rectangular regions of the second cathode electrode layer 14B in the X-axis direction may also be slightly wider than the width of the second opening H1B of the protective layer in the X-axis direction. The XY plane shape of these gaps forms a lattice pattern (rectangular grid).

As described above, the method of manufacturing the solid electrolytic capacitor sheet includes the processes of (a) forming a mask layer on a metal sheet, (b) forming an insulating region, (c) forming a solid electrolyte layer, (d) forming a conductive layer, (e) forming a cathode electrode layer, (f) forming a protective layer, and (g) etching and dividing the cathode electrode layer. Through these processes, a solid electrolytic capacitor sheet CES is manufactured.

The (ii) process of processing a plurality of solid electrolytic capacitor sheets to manufacture individual solid electrolytic capacitors involves sequentially executing the following processes (A) to (G).

(A) Stacked Sheet Formation Process

FIG. 65 is a diagram illustrated to describe the method of manufacturing the solid electrolytic capacitor. In the stacked sheet formation process illustrated in FIG. 65, first, N solid electrolytic capacitor sheets illustrated in FIG. 64 are prepared (2≤N). In this example, let N=4, and a first solid electrolytic capacitor sheet CES1, a second solid electrolytic capacitor sheet CES2, a third solid electrolytic capacitor sheet CES3, and a fourth solid electrolytic capacitor sheet CES4 are prepared.

Next, a first insulating sheet IF1, the first solid electrolytic capacitor sheet CES1, a second insulating sheet IF2, the second solid electrolytic capacitor sheet CES2, a third insulating sheet IF3, the third solid electrolytic capacitor sheet CES3, a fourth insulating sheet IF4, the fourth solid electrolytic capacitor sheet CES4, an uppermost insulating sheet IFT, and the reinforcing sheet CF1 are stacked on the support substrate 7 in this order. Pressure is applied in the Z-axis direction to the group of stacked sheets while heating it, forming a stacked sheet 300. Moreover, a plurality of anode terminals 1 and cathode terminals 2 are patterned and formed on the lower surface side of the support substrate 7 in advance, but in this example, intermediate terminals 210 that will become anode terminals and cathode terminals after subsequent division process are also formed.

In this example, the insulating sheets (first insulating sheet IF1, second insulating sheet IF2, third insulating sheet IF3, fourth insulating sheet IF4, and uppermost insulating sheet IFT) are made of materials such as thermosetting resins as described above, and by applying heat and pressure simultaneously, each insulating sheet bonds the upper and lower elements and hardens. The insulating sheet is preferably made of an adhesive sheet made of a mixture of a thermosetting resin and a filler. The insulating sheet can also be made of a prepreg containing glass fiber (glass cloth or glass non-woven fabric). In this case, the component strength is improved, making it less prone to deformation due to processing load, and it is also effective in improving reliability due to temperature fluctuations. In other words, it is advantageous to use a prepreg material containing glass fiber (glass cloth or glass non-woven fabric) for the insulating sheet because it benefits the processing load during the groove formation process and the molding load during the sealing process in the next process. Furthermore, forming the uppermost insulating sheet on the outermost layer side further increases strength. It is also possible to use a combination of prepreg material with glass fibers and insulating sheets without glass fibers, optimizing thickness and strength by making only the uppermost insulating sheet on the outermost layer from prepreg with glass fibers.

(B) Groove Formation Process

FIG. 66 is a diagram illustrated to describe the method of manufacturing the solid electrolytic capacitor. In the groove formation process illustrated in FIG. 66, first, the stacked sheet 300 formed in the process of FIG. 65 is prepared. Next, the support substrate 7 of the stacked sheet 300 is placed on the lower side, and grooves are formed in a direction from top to bottom (the −Z-axis direction in FIG. 66). The planar shape of the entire groove in the XY plane is a lattice (rectangular grid), with the group of multiple grooves extending in the X-axis direction and the group of multiple grooves extending in the Y-axis direction. Each groove is formed to cut the first roughened layer 121 (first mask layer M1) and the second roughened layer 121B (second mask layer M1B) of each electrolytic capacitor sheet in the thickness direction (Z-axis), and reaches the inside of the support substrate 7. Each groove does not cut the support substrate 7 completely. These grooves are formed by pressing a rotary blade against the stacked sheet 300. The number of rotary blades used to form the groove may be plural or singular. The width of each groove (rotary blade) is 0.1 mm to 0.7 mm, preferably 0.3 mm to 0.5 mm.

The two grooves adjacent along the X-axis direction and extending along the Y-axis direction are referred to as a first groove GR1 and a second groove GR2. In the subsequent process, the stacked sheet 300 is cut with the rotary blade having a width wider than the width of the first groove GR1 to form a third groove GR3 (see FIG. 72), and cut with the rotary blade having a width wider than the width of the second groove GR2 to form a fourth groove GR4 (see FIG. 72).

In this figure, the positive direction of the X-axis is the right side, and the negative direction is the left side.

In the region provided with the first groove GR1, the cutting positions from the left side are set as follows in order. Arranged in order from the left are the left-side cutting position x2" of the third groove GR3 (third rotary blade), the left-side cutting position xc0' of the first groove GR1 (first rotary blade), the right-side cutting position xe0' of the first groove GR1 (first rotary blade), the right-side cutting position (first position x1) of the third groove GR3 (third rotary blade), and the position xd0 of the left edge of the mask (protective layer 15) located to the right of the first groove GR1.

In the region provided with the second groove GR2, the cutting positions from the left side are set as follows in order. From the left side, there are arranged with the left-side cutting position (second position x2) of the fourth groove GR4 (fourth rotary blade), the left-side cutting position xc' of the second groove GR2 (second rotary blade), the right-side cutting position xe of the second groove GR2 (second rotary blade), the right-side cutting position x1' of the fourth groove GR4 (fourth rotary blade), and the position xd of the left edge of the mask (protective layer 15) located to the right of the second groove GR2.

Moreover, the XY plane shape of the group of grooves formed before the etching process of the anode electrode layer 8 made of aluminum does not have to be a rectangular lattice as described above. For example, the group of these grooves may be composed of only a plurality of grooves extending along the Y-axis direction. In this case, after the subsequent etching process is completed, a plurality of groups extending along the X-axis direction are formed. In this case, the inner side (XZ plane) of the grooves along the X-axis direction becomes flat, making it easier to embed insulating resin in the groove group. In the case of using this process, the degree of freedom in design is higher than in the case where the inner side (XZ plane) of the grooves extending in the X-axis direction is etched.

FIG. 67 is an enlarged view of the periphery of the lateral tip portion of the anode electrode layer to describe the method of manufacturing the solid electrolytic capacitor. Although the first groove GR1 is illustrated, the peripheral structure of the second groove GR2 is also the same as this structure.

The first groove GR1 extends through the first protective layer 15, the first cathode electrode layer 14, the first mask layer M1, the first roughened layer 121, the anode electrode layer 8, the second roughening layer 121B, the second mask layer M1B, the second cathode electrode layer 14B, and the second protective layer 15B in the thickness direction. By forming the first groove GR1, the side surfaces of the first roughened layer 121 and the second roughened layer 121B are exposed. The exposed surfaces are etched.

(C) Etching Process

FIG. 68 is a diagram illustrated to describe the method of manufacturing the solid electrolytic capacitor. In the etching process illustrated in FIG. 68, an etching solution is introduced into the multiple grooves illustrated in FIG. 66, and the side surfaces of the first roughened layer 121, the second roughened layer 121B, and the anode electrode layer 8 exposed in the grooves are etched. As a technique of introducing the etching solution, spray coating may be used, or the etching solution may be allowed to immerse the exposed surfaces within the grooves. As for the type of etching solution for the material of the anode electrode layer 8 (in this example, aluminum (Al)), an etching solution capable of selectively etching the material without etching the material of the cathode electrode layer 14 (in this example, copper (Cu)) is used. As such an etching solution, an alkaline solution such as an aqueous sodium hydroxide solution or an acidic solution such as sulfuric acid can be used. Additives may be added to the etching solution as needed.

The first roughened layer 121 made of aluminum, the second roughened layer 121B made of aluminum, and both exposed side surfaces of the anode electrode layer 8 made of aluminum are etched, and new first spaces SPA and second spaces SPC continuous with each groove are formed by the etching, and protrusions are formed on both sides of the anode electrode layer 8. Focusing on one solid electrolytic capacitor, the first space SPA that is continuous with the first groove GR1 is formed on the left side, and the second space SPC that is continuous with the second groove GR2 is formed on the right side.

The etching solution dissolves the first roughened layer 121, the second roughened layer 121B, and the anode electrode layer 8, but if the etching time is extended, the aluminum contained in the first insulating region 10 and the second insulating region 10B will also dissolve. The first insulating region 10 and the second insulating region 10B contain aluminum constituting the roughened layer and an insulating resin such as epoxy resin infiltrated into the roughened layer. Since the etching solution dissolves the aluminum contained in the roughened layer, the regions on the groove side of the first insulating region 10 and the second insulating region 10B are either removed by the etching solution, leaving only the insulating resin.

Moreover, the protrusions are formed not only at both ends in the X-axis direction of the anode electrode layer 8 but also at both ends in the Y-axis direction, although the protrusions in the Y-axis direction may not be formed. For example, if the process of forming grooves extending in the X-axis direction is set after this etching process, protrusions at both ends in the Y-axis direction will not be formed. Such modifications to the manufacturing process are also possible.

FIG. 69 is an enlarged view of the periphery of the lateral tip portion of the anode electrode layer to describe the method of manufacturing the solid electrolytic capacitor. As illustrated in the figure, the region where the first and second roughened layers were formed is completely removed, and the first space SPA and the second space SPC that are continuous with the second groove GR2 (first groove GR1) are formed. If the first mask layer M1 and the second mask layer M1B are made of a soluble resist, they can be removed. If a soluble mask layer is used and the mask layer is dissolved in the etching process, the mask layer disappears, resulting in direct contact between the cathode electrode layer 14 and the insulating portion 162 (see FIG. 71).

(D) Filling Process

FIG. 70 is a diagram to describe the method of manufacturing the solid electrolytic capacitor. In the filling process illustrated in FIG. 70, the groove group formed in the stacked sheet 300 and the spaces continuous with each groove are filled with insulating resin (protective insulator 16, right insulating portion 162, or left insulating portion 162A). This insulating resin preferably contains a filler. In the filling process, the insulating resin is supplied to the upper surface of the stacked sheet 300, and pressure is applied in the Z-axis direction to fill the insulating resin into the grooves and spaces. The form of the supplied insulating resin may be liquid or solid sheet-like. As filling techniques, compression molding using a liquid-insulating resin, transfer molding, or injection molding can be used. Alternatively, a method can be used where a sheet-like resin sealing material is adhered to the surface of the stacked sheet 300 and the resin sealing material is press-flattened.

The insulating resin is a molded resin and, after the completion of the solid electrolytic capacitor, it covers most of the components. The insulating material constituting the insulating resin (protective insulator 16) is as described above, and as a suitable example, an epoxy resin containing a filler can be used. In the filling process, focusing on one solid electrolytic capacitor, the left insulating portion 162A is filled in the first space SPA formed in FIG. 68, and the right insulating portion 162 is filled in the second space SPC.

FIG. 71 is an enlarged view of the periphery of a lateral tip portion of an anode electrode layer to describe a method of manufacturing a solid electrolytic capacitor; As illustrated in the figure, the second groove GR2 (first groove GR1) and the above-mentioned first space SPA and second space SPC are filled with resin, forming the insulating portion 162 (insulating portion 162A). To reduce the possibility of voids, a low-viscosity resin that does not contain filler may be injected into the grooves before the resin sealing, and the periphery of the resin roughened portion may be filled with resin in advance (see FIGS. 51 to 57).

(E) Cutting Process

FIG. 72 is a diagram illustrated to describe the method of manufacturing the solid electrolytic capacitor. In the cutting process illustrated in FIG. 72, multiple grooves are formed within the stacked sheet 300, with the depth direction being the positive direction of the Z-axis. Moreover, the stacked sheet 300 can be inverted to facilitate the formation of these grooves.

The overall shape of the grooves in the XY plane is stripe-shaped, with the group of multiple grooves extending in the Y-axis direction. Each groove is formed to cut the first insulating region 10 and the second insulating region 10B of each electrolytic capacitor sheet in the thickness direction (Z-axis) and reaches the inside of the protective insulator 16 that functions as a lid. Each groove does not completely cut the protective insulator 16. These grooves are formed by pressing a rotary blade against the stacked sheet 300. The number of rotary blades used to form the groove may be plural or singular.

Adjacent in the X-axis direction and extending in the Y-axis direction, two grooves are designated as the third groove GR3 and the fourth groove GR4. The positional relationship between these grooves is as described above. With the formation of the third groove GR3, a part of the left side of the anode terminal 1 is removed. With the formation of the fourth groove GR4, a part of the right side of the cathode terminal 2 is removed.

Focusing on one solid electrolytic capacitor, a stacked body functioning as an individual component is formed between the first position x1 on the right side of the third groove GR3 and the second position x2 on the left side of the fourth groove GR4. With the formation of the third groove GR3, the left side surface of the anode electrode layer 8 is exposed at the first position x1. With the formation of the fourth groove GR4, the right sides of the first cathode electrode layer 14 and the second cathode electrode layer 14B are exposed at the second position x2. In other words, in the cutting process, the stacked sheet 300 is cut at the first position x1 to expose the anode electrode layer 8, and the stacked sheet 300 is cut at the second position x2 to expose the insulating portion 162 and the cathode electrode layer (the first cathode electrode layer 14 and the second cathode electrode layer 14B).

FIG. 73 is an enlarged view of the periphery of the lateral tip portion of the anode electrode layer illustrated to describe the method of manufacturing the solid electrolytic capacitor. As illustrated in the figure, the fourth groove GR4 extends, in the thickness direction, through the first protective layer 15, the first cathode electrode layer 14, the first mask layer M1, the insulating portion 162, the first insulating region 10, the anode electrode layer 8, the second insulating region 10B, the second mask layer M1B, the second cathode electrode layer 14B, and the second protective layer 15B The formation of the fourth groove GR4 exposes the side surfaces of the first cathode electrode layer 14 and the second cathode electrode layer 14B on the left side surface of the groove in the figure. On the right side of the groove in the figure, the side of the anode electrode layer 8 is exposed. Moreover, by changing the amount of resin filled and the cutting positions of the third and fourth grooves, the structures illustrated in FIGS. 51 to 57 can also be manufactured. Moreover, the cutting position at the right end of the third groove GR3 may be moved to the position of the gap in the first protective layer 15 (the first opening H1 in FIGS. 63A and 63B).

(F) Side Electrode Formation Process

FIG. 74 is a diagram illustrated to describe the method of manufacturing the solid electrolytic capacitor. In the side electrode formation process illustrated in FIG. 74, a side electrode E is formed on the inner surface of the groove formed in the process of FIG. 72. Moreover, in the following dicing process, the right portion of the side electrode E in one groove becomes the first side electrode E1, and the left portion becomes the second side electrode E2. More specifically, in the side electrode formation process, the first side electrode E1 is formed on the first side surface S1 (see FIG. 49) exposed by cutting at the first position x1 (see FIG. 72), and the second side electrode E2 is formed on the second side surface S2 (see FIG. 49) exposed by cutting at the second position x2 (see FIG. 72). The side electrode E is formed by depositing a plating layer on the underlying layer after the formation of the underlying layer.

The material of the underlying layer is a metal material with high adhesion to resin and metal. The material of the underlying layer (seed layer) can be composed of metals such as Cu, Cr, Ni, Ti, or Zn, conductive materials such as conductive carbon like C, or alloys containing at least one of these materials. The seed layer can be formed by common techniques such as sputtering, electroless plating, or coating. The material of the underlying layer may be any material that has high adhesion to the layer directly below it and allow the plating layer to grow on top of it. Then, a plating layer is formed on the underlying layer. The plating layer may be a single layer or may be composed of multiple stacked metal layers. The material of the plating layer in this example is copper (Cu). The plating layer is formed by electrolytic plating on the entire surface on which the underlying layer is formed. The plating layer can be configured as two or more layers. For example, the first plating layer can be a Cu layer, and the second plating layer can be a Ni layer. For example, the first plating layer can be a Cu layer, the second plating layer can be a Ni layer, and the third plating layer can be a Sn layer. For example, the first plating layer can be a Cu layer, and the second plating layer can be a Sn layer. Instead of the Sn layer, an Au layer can be used.

(G) Dicing Process (Individualization Process)

In the dicing process illustrated in FIG. 74, the stacked sheet on which the side electrodes are formed is diced. Dicing can be performed using the rotary blade or similar tools, creating a third opening H3 for separating individual components. The dicing lines are set in a lattice pattern (rectangular grid) and are composed of a plurality of cutting lines extending in the X-axis direction and a plurality of cutting lines extending in the Y-axis direction. The plurality of cutting lines extending in the X-axis direction pass directly above the insulating resin embedded in the grooves extending in the X-axis direction in the process of FIG. 70. The group of cutting lines extending in the Y-axis direction passes through the deepest part of the side electrode E. As described above, this manufacturing method includes an individualization process in which the stacked sheet is divided by dicing or the like to form individual solid electrolytic capacitors.

FIGS. 75A and 75B are longitudinal cross-sectional views of the solid electrolytic capacitor. FIG. 75A is a longitudinal cross-sectional view of the solid electrolytic capacitor manufactured by the above-mentioned manufacturing method. The region surrounded by the dotted line C in FIG. 74 represents one solid electrolytic capacitor. The first solid electrolytic capacitor sheet CES1, the second solid electrolytic capacitor sheet CES2, the third solid electrolytic capacitor sheet CES3, and the fourth solid electrolytic capacitor sheet CES4 illustrated in FIG. 74 correspond to the first solid electrolytic capacitor element CE1, the second solid electrolytic capacitor element CE2, the third solid electrolytic capacitor element CE3, and the fourth solid electrolytic capacitor element CE4, respectively. This solid electrolytic capacitor is identical to the solid electrolytic capacitor illustrated in FIG. 49, except that the number of solid electrolytic capacitor elements is four.

FIG. 75B is a longitudinal cross-sectional view of a solid electrolytic capacitor manufactured by the method in which the width of the dicing rotary blade is widened. The region surrounded by the dotted line J in FIG. 74 represents one solid electrolytic capacitor. This solid electrolytic capacitor does not have a side electrode with a bent portion. If the side electrode has a bent portion, there is an effect of increasing the fillet strength as described above. If the side electrode does not have a bent portion, the component becomes smaller.

As described above, the manufacturing method of the solid electrolytic capacitor includes the following processes: (A) stacked sheet formation process, (B) groove formation process, (C) etching process, (D) filling process, (E) cutting process, (F) side electrode formation process, and (G) dicing process.

In the (A) stacked sheet formation process, a plurality of solid electrolytic capacitor sheets CES each including the anode electrode layer 8 and the cathode electrode layer 14 were prepared, and the plurality of solid electrolytic capacitor sheets were stacked to form the stacked sheet 300.

In the (B) groove formation process, the first groove GR1 and the second groove GR2 were formed in the stacked sheet 300.

In the (C) etching process, the side surfaces of the first roughened layer 121, the second roughened layer 121B, and the anode electrode layer 8 exposed in the first groove GR1 and the second groove GR2 were etched.

In the (D) filling process, the insulating resin was filled into the space formed by the etching in process (C) to form the insulating portion 162.

In the (E) cutting process, the stacked sheet 300 was cut at the first position x1 to expose the anode electrode layer 8, and the stacked sheet 300 was cut at the second position x2 to expose the insulating portion 162 and the cathode electrode layer (first cathode electrode layer 14 and second cathode electrode layer 14B).

In the (F) side electrode formation process, the first side electrode E1 was formed on the first side surface S1 exposed by the cut at the first position x1, and the second side electrode E2 was formed on the second side surface S2 exposed by the cut at the second position x2.

In the (G) dicing process, the stacked sheet 300 was diced to separate it into a plurality of solid electrolytic capacitors. The dicing process is generally performed when using the stacked sheet provided with the plurality of solid electrolytic capacitors arranged two-dimensionally. Furthermore, even before the dicing process, the group of multiple solid electrolytic capacitors is manufactured. If the dicing process at this stage is omitted, for example, in the above-mentioned (E) cutting process, a method of adhering the stacked sheet 300 to another adhesive sheet and completely cutting the stacked sheet itself can be considered, in which case the cutting process also serves as the dicing process.

The above-mentioned manufacturing method of the solid electrolytic capacitor includes a stacked sheet formation process of preparing the plurality of solid electrolytic capacitor sheets each including the anode electrode layer and the cathode electrode layer and of stacking the plurality of solid electrolytic capacitor sheets to form a stacked sheet, and includes a dicing process of dicing the stacked sheet.

In this manufacturing method, the plurality of solid electrolytic capacitor sheets each including the anode electrode layer and the cathode electrode layer is prepared in advance, stacked, and then individualized (diced) to manufacture individual solid electrolytic capacitors. With this manufacturing method, it is possible to cut out a large number of solid electrolytic capacitors at once after stacking, thereby improving productivity The above-mentioned manufacturing method of the solid electrolytic capacitor includes a groove formation process of forming a groove in the stacked sheet 300, an anode side etching process of etching the side surface of the anode electrode layer 8 exposed in the groove, and a filling process of filling an insulating resin into the space formed by etching the anode electrode layer 8 to form the insulating portion 162. The side surface of the anode electrode layer can be insulated by the filled insulating resin. The above-mentioned manufacturing method of the solid electrolytic capacitor further includes a cutting process of cutting the stacked sheet at the first position x1 to expose the anode electrode layer 8 and at the second position x2 to expose the insulating portion and the cathode electrode layer 14, and a side electrode formation process of forming the first side electrode E1 on the first side surface exposed by the cutting at the first position x1 and forming the second side electrode E2 on the second side surface exposed by the cutting at the second position x2.

In this manufacturing method, the first side electrode E1 connected to the anode electrode layer 8 and the second side electrode E2 connected to the cathode electrode layer 14 can be easily formed, improving productivity.

In the above-mentioned method of manufacturing the solid electrolytic capacitor, the groove formation process includes forming the first groove GR1 and the second groove GR2 in the stacked sheet 300 as a groove, and the anode side etching process etches the exposed side surfaces of the anode electrode layer 8 in the first groove GR1 and the second groove GR2.

Forming the first groove GR1 and the second groove GR2 makes it possible to form an independent solid electrolytic capacitor element between these grooves. Even if there is only one groove, a method of cutting the stacked sheet at a position on the opposite side to the groove formation side in a separate process is also possible, but forming the first groove GR1 and the second groove GR2 allows for more efficient production.

In the above-mentioned method of manufacturing the solid electrolytic capacitor, the method of manufacturing a solid electrolytic capacitor sheet used in the stacked sheet formation process includes a process of forming the insulating region 10 having a lattice pattern in a planar view on the anode electrode layer 8, a process of forming the solid electrolyte layer 12 within an opening of the lattice pattern, and a process of forming the cathode electrode layer 14 that is electrically connected to the solid electrolyte layer 12 and divided into a plurality of regions in a planar view. The process of forming the divided cathode electrode layer can include a process of forming the cathode electrode layer 14 electrically connected to the solid electrolyte layer 12 and a process of dividing the cathode electrode layer 14 into a plurality of regions in a planar view. It is also possible to pre-form the divided cathode electrode layer using a printing technique with a conductive resin or the like.

Dividing the cathode electrode layer 14 into a plurality of regions in advance allows the anode and cathode to be electrically isolated (insulated) after stacking and allows the stacked sheet to be easily divided. This makes the subsequent dicing process of the stacked sheet 300 easier. In addition, when cutting between the plurality of regions of the cathode electrode layer 14 in the above-mentioned cutting process, since the region is separated from the cut surface, it becomes easy to form a structure in which the first side electrode E1 is not connected to the cathode electrode layer 14. Moreover, as described above, since the side electrodes are formed along the Y-axis direction, a plurality of grooves along the Y-axis direction (e.g., the first groove GR1 and the second groove GR2) in a planar view is formed before the etching process. On the other hand, the plurality of grooves (grooves for filling with insulating resin) along the X-axis direction in a planar view can also be formed after completing the etching process.

In the above-mentioned method of manufacturing the solid electrolytic capacitor, the method of manufacturing the solid electrolytic capacitor sheet used in the stacked sheet formation process includes a process of preparing the metal sheet 80 having a roughened layer on the anode electrode layer 8, and the insulating region 10 is formed by supplying an insulating resin into the roughened layer.

Supplying an insulating resin to the roughened layer makes it possible to form the insulating region easily. Moreover, a part of the insulating region can dissolve the metallic components contained in the roughened layer during the above-mentioned etching process, allowing for the insulating resin to be filled during the filling process, thereby completely isolating the anode portion and improving insulation performance.

In the above-mentioned method of manufacturing the solid electrolytic capacitor, in the dicing process, the stacked sheet 300 is diced along the gaps between the multiple regions of the cathode electrode layer 14. The dicing makes it possible to produce easily individual solid electrolytic capacitors.

The overall structure of the above-mentioned solid electrolytic capacitor is as illustrated in FIG. 20. FIG. 20 is a perspective view of the solid electrolytic capacitor.

Referring to FIG. 20, the solid electrolytic capacitor includes the stacked body 100 formed by stacking the plurality of solid electrolytic capacitor elements, the first side electrode E1 and the second side electrode E2 provided at both ends of the stacked body 100 in the X-axis direction, and the anode terminal 1 and the cathode terminal 2 provided on the lower surface of the support substrate 7, and the protective insulator 16 located at least on the upper part of the solid electrolytic capacitor is a molded resin made of an insulating resin. This molded resin covers both end positions of the stacked body 100 in the Y-axis direction.

In the case where the above-mentioned solid electrolytic capacitor is mounted on a substrate, it appears as illustrated in FIG. 21. The above-mentioned FIG. 21 is a diagram illustrating the solid electrolytic capacitor mounted on a substrate.

Referring to FIG. 21, the first land electrode 103 and the second land electrode 104 are formed on the wiring board

105 made of an insulator. The first land electrode 103 is electrically connected to the anode terminal 1 and the first side electrode E1 via a first fillet 10$_1$ made of a solder material. The second land electrode 104 is electrically connected to the cathode terminal 2 and the second side electrode E2 via a second fillet 10$_2$ made of a solder material.

The anode terminal 1 and the cathode terminal 2 are made of copper (Cu), and their surfaces may include a material (Sn) contained in solder. The first side electrode E1 and the second side electrode E2 are made of copper (Cu), and their surfaces may include a material (Sn) contained in solder.

The first fillet 10$_1$ is in contact with the side (YZ plane) of the first side electrode E1 and the lower surface (XY plane) of the first bent portion E1B. The second fillet 10$_2$ is in contact with the side (YZ plane) of the second side electrode E2 and the lower surface (XY plane) of the second bent portion E2B. The presence of the first bent portion E1B and the second bent portion E2B increases the dimension of the fillet in the X-axis direction, enhancing the mechanical strength.

The manufacturing apparatus for the solid electrolytic capacitor described above is as illustrated in FIG. 22. FIG. 22 is a diagram illustrating an example of a manufacturing apparatus for a solid electrolytic capacitor.

Referring to FIG. 22, the processes (a) to (g) of manufacturing the solid electrolytic capacitor sheet CES described above are capable of utilizing the roll body 201 around which the initial metal sheet 80 is wound. The metal sheet 80 extending from the roll body 201 is transported into a processing device 200 by the transport device 202. The processing device 200 continuously executes the above-mentioned processes (a) to (g). After the process (g) is completed, the metal sheet 80 is cut at regular intervals by the cutting device 203, thus separating it into individual solid electrolytic capacitor sheets CES. The solid electrolytic capacitor sheets CES are then sequentially stacked on the support substrate 7 as described in process (A), followed by further processing. In this manufacturing method, using the roll body 201 to perform continuous processing allows an increase in production efficiency. Moreover, it is not necessary to perform all the processing processes by the processing device 200, and after performing some of the processes by the processing device 200, the metal sheet can be wound onto another roll, and then another process can be executed using that roll. Alternatively, it is also possible to execute the above-mentioned manufacturing method using sheet bodies cut to a convenient size without using a roll.

The vicinity of the terminals of the above-mentioned solid electrolytic capacitor can be as illustrated in FIG. 28. FIG. 28 is a longitudinal cross-sectional view of the vicinity of the region provided with the anode terminal and the cathode terminal.

Referring to FIG. 28, the anode terminal 1 and the cathode terminal 2 can each have a structure in which a plurality of electrode layers is stacked. The first side electrode E1 contacts the side (YZ plane) of the anode terminal 1. The second side electrode E2 is in contact with the side (YZ plane) of the cathode terminal 2. There are various combinations of materials that constitute these electrode-stacked structures.

The anode terminal 1 includes a first anode electrode layer 1A, a second anode electrode layer 1B, and a third anode electrode layer 1C. The material of the seed layer that constitutes the anode terminal 1 can be the same as the material of the seed layer that constitutes the first side electrode E1. The material of the first anode electrode layer 1A that constitutes the anode terminal 1 can be the same as the material of the first electrode layer E11 that constitutes the first side electrode E1. The material of the second anode electrode layer 1B that constitutes the anode terminal 1 can be the same as the material of the second electrode layer E12 that constitutes the first side electrode E1. The material of the third anode electrode layer 1C that constitutes the anode terminal 1 can be the same as the material of the third electrode layer E13 that constitutes the first side electrode E1. It is also possible to use different materials for each of these electrode layers.

The cathode terminal 2 includes a first cathode electrode layer 2A, a second cathode electrode layer 2B, and a third cathode electrode layer 3C. The material of the seed layer that constitutes the cathode terminal 2 can be the same as the material of the seed layer that constitutes the second side electrode E2. The material of the first cathode electrode layer 2A that constitutes the cathode terminal 2 can be the same as the material of the first electrode layer E21 that constitutes the second side electrode E2. The material of the second cathode electrode layer 2B that constitutes the cathode terminal 2 can be the same as the material of the second electrode layer E22 that constitutes the second side electrode E2. The material of the third cathode electrode layer 2C that constitutes the cathode terminal 2 can be the same as the material of the third electrode layer E23 that constitutes the second side electrode E2. It is also possible to use different materials for each of these electrode layers.

In the above example, the anode terminal 1 and the cathode terminal 2 are manufactured in different periods from the first side electrode E1 and the second side electrode E2. In the case where the first side electrode E1 and the second side electrode E2 are manufactured after forming the anode terminal 1 and the cathode terminal 2, the seed layer under the first electrode layer E11 in the first side electrode E1 contacts the side (YZ plane) of the anode terminal 1. Similarly, the seed layer of the first electrode layer E21 in the second side electrode E2 contacts the side (YZ plane) of the cathode terminal 2. These lowermost electrode layers are made of a material with high adhesiveness, ensuring satisfactory bonding between these terminals and electrode layers.

The vicinity of the terminals of the above-mentioned solid electrolytic capacitor can be as illustrated in FIG. 29. FIG. 29 is a longitudinal cross-sectional view of the vicinity of the region provided with the anode terminal and the cathode terminal.

Referring to FIG. 29, this example discloses an electrode-stacked structure manufactured by forming the anode terminal 1 and the cathode terminal 2 simultaneously with the first side electrode E1 and the second side electrode E2. In this case, there is a continuous structure where layers with the same material composition at both ends of the solid electrolytic capacitor in the X-axis direction.

In other words, the first anode electrode layer 1A of the anode terminal 1 is continuous with the first electrode layer E11 of the first side electrode E1. Similarly, the second anode electrode layer 1B is continuous with the second electrode layer E12. The third anode electrode layer 1C is continuous with the third electrode layer E13. The seed layer of the anode terminal 1 is also continuous with the seed layer of the first side electrode E1.

Similarly, the first cathode electrode layer 2A of the cathode terminal 2 is continuous with the first electrode layer E21 of the second side electrode E2. The second cathode electrode layer 2B is continuous with the second electrode layer E22. The third cathode electrode layer 2C is continuous with the third electrode layer E23. The seed layer of the cathode terminal 2 is also continuous with the seed layer of the second side electrode E2.

The materials of these electrode layers are as described above.

The structure illustrated in FIG. 29 mentioned earlier is manufactured by the manufacturing process described in FIG. 30. In the figure, a longitudinal cross-sectional view of the vicinity of the region provided with the anode terminal and the cathode terminal is illustrated.

In this manufacturing method, the anode terminal 1 and the cathode terminal 2 (intermediate terminal 210) are not formed in a process prior to the groove formation process (FIG. 66). In the subsequent side electrode formation process (FIG. 74), a mask MK is formed before the side electrode is formed. The mask MK is formed on the surface of the support substrate 7. The material of the mask MK is an insulating material, and a resist resin material or an inorganic insulating material can be used. The mask MK is formed in the region between the regions where the anode terminal 1 and the cathode terminal 2 are to be formed. The planar pattern of the mask MK (pattern on the XY plane) can be a stripe shape along the Y-axis. After the formation of the mask MK, the first side electrode E1, the second side electrode E2, the anode terminal 1, and the cathode terminal 2 are simultaneously formed. In other words, the electrode layers constituting these are stacked in order. After forming these electrode-stacked structures, the mask MK can be removed, but it may also be left without removal.

Moreover, the first side electrode E1 and the second side electrode E2 described above may be formed by applying a conductive adhesive (e.g., silver paste) to the exposed side surfaces. The first side electrode E1 and the second side electrode E2 are electrically and physically connected to the anode terminal 1 and the cathode terminal 2, respectively. This manufacturing method makes it possible to form the side electrodes in a simple manner. Additionally, the cathode electrode layer 14 may be formed by screen printing in addition to a sputtering or plating technique.

As for the peripheral structure of the lateral tip portion of the anode electrode layer, the following structures can also be employed.

FIG. 76 is a diagram illustrating an example of the peripheral structure of the lateral tip portion of the anode electrode layer.

The peripheral structure of this example is different from the structure illustrated in FIG. 50 in that the insulating portion 162 and the cathode electrode layer 14 (second cathode electrode layer 14B) are in contact with each other, but otherwise is the same as the structure illustrated in FIG. 50. In other words, in this example, the region of the first mask layer M1 (and the second mask layer M1B) close to the second side electrode E2 is completely removed by etching. The mask layer is made of an etchable material.

A part of the region of the first mask layer M1 (and the second mask layer M1B) far from the second side electrode E2 remains unetched. In other words, the first mask layer M1 (protective layer) is interposed between the first insulating region 10 and the first insulating layer 11. The second mask layer M1B (protective layer) is interposed between the second insulating region 10B and the second insulating layer 11B.

By removing the first mask layer M1 during the etching process (FIG. 68), the space for resin filling in the subsequent process (FIG. 70) can be made wider, facilitating easier resin filling.

FIG. 77 is a diagram illustrating an example of the peripheral structure of the lateral tip portion of the anode electrode layer.

The peripheral structure of this example is different from the structure illustrated in FIG. 56 in that the insulating portion 162 and the cathode electrode layer 14 (second cathode electrode layer 14B) are in contact with each other, but otherwise the same as the structure illustrated in FIG. 56. In this example, the first mask layer M1 (and the second mask layer M1B) are completely removed by etching. The mask layer is made of an etchable material. Thus, the insulating portion 162 extends to the region between the first insulating region 10 and the first insulating layer 11. The insulating portion 162 extends to the region between the second insulating region 10B and the second insulating layer 11B.

By completely removing the first mask layer M1 during the etching process (FIG. 68), the space for resin filling in the subsequent process (FIG. 70) can be made wider, making resin filling easier.

FIG. 78 is a diagram illustrating an example of the peripheral structure of the lateral tip portion of the anode electrode layer.

The peripheral structure of this example is the same as the structure illustrated in FIG. 57 except that the insulating portion 162 and the cathode electrode layer 14 (second cathode electrode layer 14B) are in contact with each other, but otherwise is the same as the structure illustrated in FIG. 57. In this example, the first mask layer M1 (and the second mask layer M1B) are completely removed by etching. The mask layer is made of an etchable material. Thus, the insulating portion 162 extends to the region between the first insulating region 10 and the first insulating layer 11. The insulating portion 162 extends to the region between the second insulating region 10B and the second insulating layer 11B.

By completely removing the first mask layer M1 during the etching process (FIG. 68), the space for resin filling in the subsequent process (FIG. 70) can be made wider, making resin filling easier.

FIGS. 79A, 79B, 79C, and 79D are diagrams illustrating the longitudinal cross-sectional structure in the vicinity of the mask layer.

The raw material for the first insulating layer 11 and the raw material for the first mask layer M1 may be made of the same material. FIG. 79A is a cross-sectional view of FIGS. 50, 51, 53, 54, 56, and 57 when the raw material for the first insulating layer 11 and the raw material for the first mask layer M1 are made of the same material. In this case, the first insulating layer 11 and the first mask layer M1 are integrated to such an extent that they are indistinguishable visually. The raw material for the first insulating layer 11 and the raw material for the first mask layer M1 may be made of materials similar enough to be indistinguishable visually after manufacturing. In the case where the first mask layer M1 is present (FIGS. 50, 51, 53, 54, 56, and 57), the cathode electrode layer 14 does not contact the insulating region 10. Additionally, the raw materials for the second insulating layer 11B and the second mask layer M1B, when made of the same or similar materials, integrate in a way that they are visually indistinguishable, as illustrated in the figure.

FIG. 79B illustrates an example in which the raw material of the first insulating layer 11 and the raw material of the first mask layer M1 are the same and have approximately the same thickness. Moreover, during manufacturing, the viscosity of the raw material of the first insulating layer 11 is lower than the viscosity of the raw material of the first mask layer M1. In this case, when the raw materials of the first insulating layer 11 and the first mask layer M1 integrate to the extent that they become indistinguishable by visual inspection, the raw materials of the second insulating layer 11B and the second mask layer M1B, if made of the same or similar materials, will also integrate similarly, and become indistinguishable by visual inspection, as illustrated in the figure.

FIG. 79C illustrates an example in which the first mask layer M1 is formed after the formation of the first insulating layer 11. In this case, a part of the first mask layer M1 is formed on the first insulating layer 11.

FIG. 79D illustrates an example in which the first mask layer M1 is formed after the formation of the first insulating layer 11, and further, the first mask layer M1 is dissolved by the etching material. In this case, the insulating portion 162 is filled in the region from which the first mask layer M1 has been removed. As the etching time increases, a boundary position a between the insulating region 10 and the insulating portion 162 moves in the direction away from the second electrode (to the left side of the figure). The boundary position a can be moved to the position illustrated in FIGS. 51, 53, 54, 56, and 57.

FIG. 80 is a diagram illustrating an example of the peripheral structure of the lateral tip portion of the anode electrode layer.

This figure illustrates a longitudinal sectional structure when the structure of FIG. 79B is employed in the case of the structure of FIG. 50. The first insulating layer 11 and the first mask layer M1 are integrated to such an extent that they are indistinguishable visually from each other. The second insulating layer 11B and the second mask layer M1B are also integrated to such an extent that they are indistinguishable visually from each other. The structure of FIG. 79B can also be applied to FIGS. 51, 53, 54, 56, and 57. The structure of FIG. 79C can also be applied to FIGS. 50, 51, 53, 54, 56, and 57. The structure of FIG. 79D can also be applied to FIGS. 76, 77, and 78. In the case where the mask layer dissolves, the insulating portion 162 comes into contact with the cathode electrode layer 14. The structures of the second insulating layer 11B and the second mask layer M1B are the same as the structures of the first insulating layer 11 and the first mask layer M1, and each modified structure in this case can be applied to the various structures described above.

The solid electrolytic capacitor of the present disclosure includes the stacked body provided with the plurality of stacked solid electrolytic capacitor elements, the first side electrode E1 arranged on the first side surface of the stacked body, and the second side electrode E2 arranged on the second side surface of the stacked body, and each solid electrolytic capacitor element includes the anode electrode layer 8 electrically connected to the first side electrode E1, the dielectric layer 9 arranged on the anode electrode layer 8, the cathode electrode layer 14 electrically connected to the second side electrode E2, the solid electrolyte layer 12 interposed between the dielectric layer 9 and the cathode electrode layer 14, the insulating region 10 arranged on the anode electrode layer 8 and adjacent to the side of the solid electrolyte layer 12, the insulating portion 162 interposed between the side of the insulating region 10 and the second side electrode E2 and containing an insulating resin, and the first insulating layer 11 interposed between the insulating region 10 and the cathode electrode layer 14 and containing the same resin as the resin contained in the insulating region 10.

The solid electrolytic capacitor of the present disclosure can include the protective layer (mask layer M1) interposed between the insulating portion 162 and the cathode electrode layer 14. This protective layer is capable of functioning as a mask layer during manufacturing. The mask layer M1 is also capable of being etched during manufacturing.

According to this solid electrolytic capacitor, it is possible to reduce stress generated around the side surface of the anode electrode layer. Specifically, using a mask layer allows for the easy removal of the material (roughened layer) arranged on the inner surface side. The roughened layer is easier to etch than a roughened layer containing a resin. The roughened layer is provided under the protective layer that serves as the mask layer, and this roughened layer is etched, so that an insulating resin can be easily supplied into the space formed by etching to form the insulating portion. In other words, it becomes easier to improve the filling rate of the insulating portion provided in the space formed by removal. The insulating portion is adjacent to the anode electrode layer. If the filling rate of the insulating portion is improved, the rate of stress generation due to internal voids and the like is reduced, enhancing the reliability of the component. Furthermore, increasing the degree of freedom in forming the insulating portion makes it possible to improve the structure of the insulating portion to reduce stress, further enhancing the reliability of the element.

The solid electrolytic capacitor of the present disclosure includes the protective layer (mask layer M1) interposed between the insulating portion 162 and the cathode electrode layer 14.

The solid electrolytic capacitor according to one embodiment of the present disclosure is the solid electrolytic capacitor of any one of the embodiments described above, in which the protective layer (mask layer M1) contains resin and filler and has a higher filler content than the first insulating layer 11. The mask layer has a higher viscosity than the first insulating layer before solidification, making it less likely to be absorbed by the roughened layer located under the mask layer M1 during manufacturing. Thus, the solid electrolytic capacitor has a structure that allows the roughened layer to be easily removed.

The solid electrolytic capacitor according to one embodiment of the present disclosure is the solid electrolytic capacitor of any one of the embodiments described above, in which the insulating region 10 includes the metal contained in the anode electrode layer 8 and the resin contained in the first insulating layer 11.

The insulating region 10 is formed by supplying resin to the roughened layer formed by roughening a metal sheet provided with the anode electrode layer 8, and the first insulating layer 11 is formed by the resin remaining thereon. Thus, the insulating region 10 includes the metal contained in the anode electrode layer 8 and the resin contained in the first insulating layer 11. The exemplified metal is aluminum, and the resin is epoxy resin.

The solid electrolytic capacitor according to one embodiment of the present disclosure is the solid electrolytic capacitor of any one of the embodiments described above, in which the insulating portion 162 includes a resin and a filler.

The constituent material of the insulating portion 162 is different overall from that of the insulating region 10. In the case where the insulating portion 162 includes a filler, the hardness of the insulating portion 162 can be increased, enhancing the mechanical strength.

The solid electrolytic capacitor according to one embodiment of the present disclosure is the solid electrolytic capacitor of any one of the embodiments described above, in which the insulating portion 162 and the cathode electrode layer 14 are in contact with each other.

The solid electrolytic capacitor according to one embodiment of the present disclosure is the solid electrolytic capacitor of any one of the embodiment s described above, in which a protective layer (mask layer M1) is interposed between the insulating region 10 and the first insulating layer 11.

The solid electrolytic capacitor according to one embodiment of the present disclosure is the solid electrolytic capacitor of any one of the embodiments described above, in which the insulating region 10 includes the first region $10_1$ having the metal included in the anode electrode layer 8 and the resin included in the first insulating layer 11, and the insulating portion 162 includes the resin-filled region ($162_X$ or $10_2$) adjacent to the first region $10_1$ and having the resin included in the first insulating layer 11, and the first insulating portion 1621 adjacent to the resin-filled region $162_X$ and having a resin and a filler.

The solid electrolytic capacitor according to one embodiment of the present disclosure is the solid electrolytic capacitor of any one of the embodiments described above, in which the insulating region 10 includes the first region $10_1$ having the metal contained in the anode electrode layer 8 and the resin contained in the first insulating layer 11, and the insulating portion 162 includes the resin-filled region ($162_X$ or $10_2$) adjacent to the first region $10_1$ and containing the resin contained in the first insulating layer 11, the first insulating portion 1621 adjacent to the resin-filled region $162_X$ and containing resin, and the second insulating portion 1622 interposed between the first insulating portion 1621 and the second side electrode E2 and containing filler and resin, the resin contained in the first insulating portion is also contained in the resin-filled region $162_X$, and the second insulating portion 1622 has a higher filler content than the first insulating portion 1621.

The solid electrolytic capacitor according to one embodiment of the present disclosure is the solid electrolytic capacitor of any one of the embodiments described above, in which the resin-filled region $162_X$ includes the resin contained in the first insulating layer 11 and the resin contained in the first insulating portion 1621.

As described above, the insulating portion 162 can extend to the region between the insulating region 10 and the first insulating layer 11.

The solid electrolytic capacitor according to one embodiment of the present disclosure is the solid electrolytic capacitor of any one of the embodiments described above, in which the insulating region 10 includes the first region $10_1$ having the metal contained in the anode electrode layer 8 and the resin RSN contained in the first insulating layer 11, and the resin-filled region $162_X$ having the resin contained in the first insulating layer 11 and including minute spaces MS dispersed within the resin.

Since the resin-filled region $162_X$ includes the minute spaces MS, it is softer than the first region $10_1$ which includes metal, and when the anode electrode layer 8 is located near the resin-filled region $162_X$, it is possible to reduce the stress applied to the anode electrode layer 8.

The solid electrolytic capacitor according to one embodiment of the present disclosure is the solid electrolytic capacitor of any one of the embodiments described above, in which the insulating portion 162 includes the first insulating portion $162_1$ adjacent to the resin-filled region $10_2$ and the second insulating portion $162_2$ interposed between the first insulating portion and the second side electrode, the resin RSN included in the first insulating portion $162_1$ is also included in the minute spaces, and the second insulating portion $162_2$ has a higher filler content than the first insulating portion $162_1$.

The second insulating portion $162_2$ is located farther from the anode electrode layer 8 than the first insulating portion $162_1$, so the mechanical strength can be increased by increasing the filler content and increasing the hardness. On the other hand, the first insulating portion $162_1$ has a relatively low filler content (including the case where it does not contain filler), and during its formation, the resin that is the constituent material thereof is also contained in the minute space MS. If the resin is filled in the minute space MS and the amount of air inside is reduced, it is also possible to reduce stress variations during temperature fluctuations.

The solid electrolytic capacitor according to one embodiment of the present disclosure is the solid electrolytic capacitor of any one of the embodiments described above, in which the insulating portion 162 includes the first insulating portion $162_1$ adjacent to the resin-filled region $162_X$, and the resin contained in the first insulating portion $162_1$ is also contained in the minute space MS.

In one embodiment of the solid electrolytic capacitor of the present disclosure, the position of the side of the anode electrode layer 8 (the tip of the protrusion 8p) is closer to the second side electrode E2 than the insulating region 10 in any one of the embodiments of the solid electrolytic capacitor described above.

The method of manufacturing the solid electrolytic capacitor described above includes the processes of preparing the metal sheet 80 having the anode electrode layer 8 and the roughened layer 121 arranged on the anode electrode layer 8 and having the dielectric layer, forming a protective layer (mask layer M1) on the metal sheet 80, supplying resin to the protective layer (mask layer M1) on the anode electrode layer 8 or to the region adjacent to the region where the protective layer (mask layer M1) is to be formed, either before or after the formation of the protective layer (mask layer M1), so that the resin is absorbed into the roughened layer 121 to form the insulating region 10, leaving resin on the insulating region 10 to form the first insulating layer 11, supplying the conductive polymer to the roughened layer 121 to form the solid electrolyte layer 12, forming the cathode electrode layer 14 on the solid electrolyte layer 12, stacking solid electrolytic capacitor sheets including the metal sheet 80 and the cathode electrode layer 14 to form a stacked body, forming the first groove GR1 in the stacked body at a position passing through the protective layer (mask layer M1) and exposing the side surface of the roughened layer 121 located directly below the protective layer (mask layer M1), etching the exposed side surface of the roughened layer 121, supplying insulating resin into the space formed by the etching to form the insulating portion 162 adjacent to the insulating region 10, forming the second groove in the stacked body to expose the side surfaces of the anode electrode layer 8 and the cathode electrode layer 14, forming the first side electrode E1 on the first side surface S1 of the stacked body, which includes the exposed side surface of the anode electrode layer 8, forming the second side electrode E2 on the second side surface S2 of the stacked body, which includes the exposed side surface of the cathode electrode layer 14.

Moreover, if the first insulating layer 11 is formed before the formation of the protective layer (mask layer M1), first, a resin is supplied to a region adjacent to the region where the protective layer (mask layer M1) is to be formed, and the resin is absorbed into the roughened layer 121 to form the insulating region 10, and the resin is left on the insulating region 10 to form the first insulating layer 11. Next, the protective layer (mask layer M1) is formed on the region adjacent to the first insulating layer 11. As a result, as illustrated in FIGS. 79B and 79D, the first mask layer M1 is located on a part of the area on the first insulating layer 11. The process on the back side provided with the second insulating layer is the same as the process on the front side provided with the first insulating layer 11. The process after the process of forming the solid electrolyte layer 12 is the same as the process of forming the first mask layer M1 before the first insulating layer 11. The region where the protective layer is to be formed is the region where the protective layer (mask layer) is formed, as illustrated in FIG. 12.

The roughened layer 121 is easier to etch than a roughened layer mixed with resin. The roughened layer 121 is provided under the protective layer (mask layer M1), and this roughened layer 121 is etched, so the insulating resin can be easily supplied into the space formed by etching to form the insulating portion 162. In the case where the filling rate of the insulating portion 162 is improved, the occurrence rate of stress due to internal voids and the like decreases, enhancing the reliability of the component. In addition, since the degree of freedom in forming the insulating portion 162 is increased, it is possible to improve the structure of the insulating portion 162 so that the stress is reduced, as described above, and the reliability of the element can be enhanced.

Moreover, in the above description, it is possible to use materials with the same composition for the cured first mask layer M1 and the first insulating layer 11. The second mask layer M1B and the second insulating layer 11B can use materials with the same composition after curing. For example, in the manufacture of these layers, only the amount of solvent that evaporates during drying is changed, and/or the thickness of the film to be printed is changed. This allows the amount of resin materials permeating the roughened portion made of aluminum to be adjusted. Thus, such adjustments make it possible to form the mask layer and the insulating layer. In the case of using such a material, the first insulating layer 11 and the first mask layer M1 (the second insulating layer 11B and the second mask layer M1B), which are illustrated separately in the drawings, may be integrated.

In addition, in the structure illustrated in FIG. 54 and subsequent figures, the resin-filled region $162_X$ and the first insulating portion $162_1$ are illustrated as separate members of the manufacturing process, but these materials may be made of approximately the same material. In this case, the resin-filled region $162_X$ and the first insulating portion $162_1$ are illustrated separately in the drawings, but they may be integrated.

In the case where a solid electrolytic capacitor is mounted on a substrate, a fillet such as solder is used. If the solid electrolytic capacitor thermally expands due to a change in the environment such as temperature, stress is applied to the fillet that contacts the side electrode. If stress is applied, cracks may occur in the fillet. In this case, the operational reliability of the solid electrolytic capacitor decreases. A solid electrolytic capacitor that is capable of operating with high reliability even under environmental changes such as temperature is expected.

The solid electrolytic capacitor according to one embodiment of the present disclosure described above includes the stacked body provided with the plurality of stacked solid electrolytic capacitor elements, the first side electrode arranged on the first side surface of the stacked body, the second side electrode arranged on a second side surface of the stacked body, and the protective insulator arranged on the stacked body. Each solid electrolytic capacitor element includes the anode electrode layer electrically connected to the first side electrode, the dielectric layer arranged on the anode electrode layer, the cathode electrode layer electrically connected to the second side electrode, and the solid electrolyte layer interposed between the dielectric layer and the cathode electrode layer. The portion of the first side electrode on the protective insulator side includes the first bent portion bent outwardly away from the first side surface, and the lower surface of the first bent portion is exposed.

In this structure, the fillet is likely to be formed at a position that contacts the lower surface of the first bent portion. In this case, the dimensions of the fillet at the position where it contacts the lower surface of the first bent portion become larger, and the volume increases. Thus, under environmental changes such as temperature fluctuations, the resistance to stress also increases as the volume of the fillet itself increases. Thus, cracks are less likely to occur in the fillet, and the solid electrolytic capacitor can operate with high reliability. In addition, the complicated connection interface between the fillet and the side electrode also has the effect of preventing the progression of occurred cracks.

In the solid electrolytic capacitor according to one embodiment of the present disclosure described above, the stacked body may include the support substrate provided thereon, the anode terminal arranged on the lower surface of the support substrate and electrically connected to the first side electrode, and the cathode terminal arranged on the lower surface of the support substrate and electrically connected to the second side electrode.

By arranging the first land electrode directly under the anode terminal arranged on the lower surface of the support substrate and the second land electrode directly under the cathode terminal, the first side electrode and the second side electrode can be electrically connected to the first land electrode and the second land electrode, respectively.

In the solid electrolytic capacitor according to one embodiment of the present disclosure, the dimension L1 of the first bent portion in the direction perpendicular to the first side surface is 0.01 mm or more and 1 mm or less. In the case where the dimension L1 of the first bent portion is equal to or greater than the above-mentioned lower limit, the fillet is likely to come into contact with the lower surface of the first bent portion. Even if the dimension L1 of the first bent portion exceeds the above-mentioned upper limit, the contact area of the fillet with the lower surface of the first bent portion does not expand, so from the viewpoint of reducing material costs, it is preferable that the dimension L1 is equal to or less than the upper limit.

In the solid electrolytic capacitor according to one embodiment of the present disclosure, in any one of the above-mentioned embodiments, the solid electrolytic capacitor further includes the insulating sheet interposed between adjacent solid electrolytic capacitor elements, the insulating sheet containing resin, and the first side electrode is bonded to the side surface of the anode electrode layer and the side surface of the insulating sheet.

The insulating sheet, with its side surfaces, is better suited for a stacked body with high thickness uniformity and homogeneity compared to coated insulating resin.

In a solid electrolytic capacitor according to one embodiment of the present disclosure, in any one of the above-mentioned embodiments, a portion of the second side electrode on the protective insulator side has the second bent portion bent outwardly away from the second side surface, and the lower surface of the second bent portion is exposed.

The solid electrolytic capacitor according to one embodiment of the present disclosure includes the stacked body provided with the plurality of stacked solid electrolytic capacitor elements, the first side electrode arranged on the first side surface of the stacked body, the second side electrode arranged on the second side surface of the stacked body, and the protective insulator arranged on the stacked body, and each solid electrolytic capacitor element includes the anode electrode layer electrically connected to the first side electrode, the dielectric layer arranged on the anode electrode layer, the cathode electrode layer electrically connected to the second side electrode, and the solid electrolyte layer interposed between the dielectric layer and the cathode electrode layer, and the portion of the second side electrode on the protective insulator side has the second bent portion bent outwardly away from the second side, and the lower surface of the second bent portion is exposed.

The function of the second bent portion is similar to that of the first bent portion, and as the volume of the fillet itself increases, the resistance to stress increases under environmental changes such as temperature. Thus, cracks are less likely to occur in the fillet, and the solid electrolytic capacitor can operate with high reliability.

The solid electrolytic capacitor of the present disclosure can operate with high reliability even under changes in environments such as temperature.

It is known that a structure with an insulating layer (insulating region) adjacent to the anode electrode layer in a solid electrolytic capacitor exists. If there are changes in environments such as temperature, stress is applied between the anode electrode layer and the insulating layer. When stress is applied, there is a possibility of delamination or cracks. In this case, the operational reliability of the solid electrolytic capacitor decreases. A solid electrolytic capacitor that is capable of operating with high reliability even under environmental changes such as temperature is expected.

The solid electrolytic capacitor according to another embodiment of the present disclosure includes a stacked body provided with a plurality of stacked solid electrolytic capacitor elements, a first side electrode arranged on a first side surface of the stacked body, and a second side electrode arranged on a second side surface of the stacked body. Each solid electrolytic capacitor element includes an anode electrode layer electrically connected to the first side electrode, a dielectric layer arranged on the anode electrode layer, a cathode electrode layer electrically connected to the second side electrode, a solid electrolyte layer interposed between the dielectric layer and the cathode electrode layer, and an insulating region arranged on the anode electrode layer and adjacent to a side of the solid electrolyte layer.

In this regard, a first distance (D1) between the anode electrode layer and the second side electrode is smaller than a second distance (D2) between the insulating region and the second side electrode.

With regard to the anode electrode layer protruding laterally, since the tip position is different from the position of the insulating region on the second side electrode side, the transmission of stress applied to the interface with the insulating portion can be suppressed more than when these positions are coincident.

The solid electrolytic capacitor according to one embodiment of the present disclosure includes, in any one of the embodiments described above, an insulating portion interposed between the side surface of the anode electrode layer and the second side electrode, containing an insulating resin, and the insulating region is interposed between the insulating portion and the solid electrolyte layer and contains a material different from the insulating portion.

The solid electrolytic capacitor according to one embodiment of the present disclosure includes, in any one of the solid electrolytic capacitors described above, the insulating portion is provided with the first region adjacent to a side of the anode electrode layer and the second region adjacent to a side of the insulating region, and the second region is softer than the first region. The second region of the insulating portion is soft, thus elastically protecting the nearby structure against component deformation.

The solid electrolytic capacitor according to one embodiment of the present disclosure is any one of the solid electrolytic capacitors described above, in which the first region includes a resin and a filler, the second region includes a resin, and the filler content of the second region is lower than the filler content of the first region.

Since the filler content of the second region of the insulating portion is lower, it becomes softer than the first region. Thus, it has the effect of elastically protecting the nearby structure against element deformation.

In the solid electrolytic capacitor according to one embodiment of the present disclosure, in the solid electrolytic capacitor of any one of the embodiments described above, the second side electrode side of the anode electrode layer is provided with a protrusion. In the case where an interface of a suitable material is located on the anode electrode layer, the tip position of the protrusion can be made different from the interface position, thereby suppressing the transmission of stress to the interface compared to when these positions coincide.

In the solid electrolytic capacitor according to one embodiment of the present disclosure, in the solid electrolytic capacitor of any one of the embodiments described above, an XYZ three-dimensional orthogonal coordinate system is set, the multiple solid electrolytic capacitor elements are stacked along the Z-axis direction, the direction from the first side electrode toward the second side electrode is the positive direction of the X-axis, the second side electrode side of the anode electrode layer is provided with a protrusion, and the angle $\theta$ between the Z-axis passing through the X-axis position that determines the second distance (D2) of the insulating region and the contour line of the protrusion at the intersection of the Z-axis and the protrusion in the XZ plane satisfies $90°<\theta$.

In the case where the angle $\theta$ of the protrusion is an obtuse angle, when a deformation stress is applied to bend the contour line of the protrusion around the Y-axis, the force acting on the insulating region is smaller than when the angle $\theta$ is 90°, thus suppressing the occurrence of cracks in the component.

A solid electrolytic capacitor according to another embodiment of the present disclosure includes a stacked body provided with a plurality of stacked solid electrolytic capacitor elements, a first side electrode arranged on a first side surface of the stacked body, and a second side electrode arranged on a second side surface of the stacked body, each solid electrolytic capacitor element provided with an anode electrode layer electrically connected to the first side electrode, a dielectric layer arranged on the anode electrode layer, a cathode electrode layer electrically connected to the second side electrode, and a solid electrolyte layer interposed between the dielectric layer and the cathode electrode layer, and the second side electrode side of the anode electrode layer includes a protrusion. In the case where an interface of a suitable material is located on the anode electrode layer, the tip position of the protrusion can be made different from the interface position, thereby suppressing the transmission of stress to the interface compared to when these positions coincide. The solid electrolytic capacitor of the present disclosure can operate with high reliability even under changes in environments such as temperature.

A structure having a plurality of stacked solid electrolytic capacitor elements is known for solid electrolytic capacitors. A method of manufacturing such stacked solid electrolytic capacitors that can improve productivity is expected.

The method of manufacturing the solid electrolytic capacitor according to one embodiment of the present disclosure includes a stacked sheet formation process in which a plurality of solid electrolytic capacitor sheets each provided with an anode electrode layer and a cathode electrode layer are prepared and stacked to form a stacked sheet, and an individualization process in which the stacked sheet is divided to form individual solid electrolytic capacitors.

In this manufacturing method, a plurality of solid electrolytic capacitor sheets provided with an anode electrode layer and a cathode electrode layer are prepared in advance, stacked, and then individualized to manufacture individual solid electrolytic capacitors. With this manufacturing method, it is possible to cut out a large number of solid electrolytic capacitors at once after stacking, thereby improving productivity.

The method of manufacturing a solid electrolytic capacitor according to one embodiment of the present disclosure further includes, in the method of manufacturing the solid electrolytic capacitor of any one of the embodiments described above, a groove formation process of forming a groove in a stacked sheet, an anode side etching process of etching a side surface of the anode electrode layer exposed in the groove, and a filling process of filling an insulating resin into a space formed by etching the anode electrode layer to form an insulating portion. The side surface of the anode electrode layer can be insulated by the filled insulating resin.

The method of manufacturing a solid electrolytic capacitor according to one embodiment of the present disclosure further includes, in the method of manufacturing the solid electrolytic capacitor of any one of the embodiments described above, a cutting process of cutting the stacked sheet at a first position to expose the anode electrode layer and cutting the stacked sheet at a second position to expose the insulating portion and the cathode electrode layer, and a side electrode formation process of forming a first side electrode on the first side surface exposed by cutting at the first position and forming a second side electrode on the second side surface exposed by cutting at the second position. In this manufacturing method, the first side electrode connected to the anode electrode layer and the second side electrode connected to the cathode electrode layer can be easily formed, thereby improving productivity.

The method of manufacturing the solid electrolytic capacitor according to one embodiment of the present disclosure may further include, in the manufacturing method of the solid electrolytic capacitor of any one of the embodiments described above, a process of forming a protective insulator on the first surface side of the stacked sheet, a cutting process of cutting the stacked sheet at a first position to expose the anode electrode layer to a position reaching the protective insulator and cutting the stacked sheet at a second position to expose the insulating portion and the cathode electrode layer to a position reaching the protective insulator, and a side electrode formation process of forming a first side electrode on the first side surface exposed by cutting at the first position and forming a second side electrode on the second side surface exposed by cutting at the second position.

The method of manufacturing the solid electrolytic capacitor according to one embodiment of the present disclosure further includes, in the method of manufacturing a solid electrolytic capacitor of any one of the embodiments described above, a process of attaching a stacked sheet to a support substrate via an adhesive member, a cutting process of cutting the stacked sheet at a first position to expose the anode electrode layer to a position that reaches the adhesive member, and at a second position to expose the insulating portion and the cathode electrode layer to a position that reaches the adhesive member, and a side electrode formation process of forming a first side electrode on the first side surface exposed by the cutting at the first position, and forming a second side electrode on the second side surface exposed by the cutting at the second position. In this manufacturing method, the first side electrode connected to the anode electrode layer and the second side electrode connected to the cathode electrode layer can be easily formed, thereby improving productivity. In addition, the use of the adhesive member allows the stacked sheet to be completely cut in the cutting process, thereby simplifying the individualization process.

In the method of manufacturing the solid electrolytic capacitor according to one embodiment of the present disclosure, the groove formation process may involve forming a first groove and a second groove in the stacked sheet as the grooves, and the anode side etching process may involve etching the side surface of the anode electrode layer exposed in the first groove and the second groove.

Forming the first groove and the second groove makes it possible to form an independent solid electrolytic capacitor element between these grooves. Moreover, even if there is only one groove, a method of cutting the stacked sheet at a position on the opposite side from the groove formation side in a separate process can be considered, but forming both the first groove and the second groove allows for more efficient production.

In the method of manufacturing the solid electrolytic capacitor according to one embodiment of the present disclosure, in any one of the above-mentioned embodiments of the method of manufacturing the solid electrolytic capacitor, the method of manufacturing the solid electrolytic capacitor sheet used in the stacked sheet formation process may include a process of forming an insulating region having a lattice pattern in a planar view on an anode electrode layer, a process of forming a solid electrolyte layer in an opening of the lattice pattern, and a process of forming a cathode electrode layer electrically connected to the solid electrolyte layer and divided into a plurality of regions in a planar view.

By dividing the cathode electrode layer into a plurality of regions in advance, electrical separation (insulation) of the anode and cathode after stacking becomes easier, facilitating the division of the stacked sheet. Furthermore, in the above-mentioned cutting process, when cutting between the plurality of regions of the cathode electrode layer, the regions are separated from the cut surface, making it easier to form a structure where the first side electrode is not connected to the cathode electrode layer.

In the method of manufacturing the solid electrolytic capacitor according to one embodiment of the present disclosure, in any one of the above-mentioned embodiments of the method of manufacturing the solid electrolytic capacitor, the method of manufacturing the solid electrolytic capacitor sheet used in the stacked sheet formation process includes a process of preparing a metal sheet having a roughened layer on an anode electrode layer, and the insulating region is formed by supplying an insulating resin into the roughened layer.

Supplying an insulating resin to the roughened layer makes it possible to form the insulating region easily. Moreover, a part of the insulating region can dissolve the metallic components contained in the roughened layer during the above-mentioned etching process, allowing for the insulating resin to be filled during the filling process, thereby completely isolating the anode portion and improving insulation performance.

In the method of producing the solid electrolytic capacitor according to one embodiment of the present disclosure, in any one of the embodiments described above, in the individualizing process, the stacked sheet is diced along the gaps between the multiple regions of the cathode electrode layer. The dicing makes it possible to produce easily individual solid electrolytic capacitors.

The method of manufacturing the solid electrolytic capacitor according to the present disclosure can improve productivity.

A structure having a plurality of stacked solid electrolytic capacitor elements is known for solid electrolytic capacitors. For such stacked type solid electrolytic capacitors, a solid electrolytic capacitor and a method of manufacturing the same that can improve the reliability are expected.

A solid electrolytic capacitor according to another embodiment of the present disclosure includes a stacked body provided with a plurality of stacked solid electrolytic capacitor elements, a first side electrode arranged on a first side surface of the stacked body, and a second side electrode arranged on a second side surface of the stacked body, each of the solid electrolytic capacitor elements including an anode electrode layer electrically connected to the first side electrode, a dielectric layer arranged on the anode electrode layer, a cathode electrode layer electrically connected to the second side electrode, a solid electrolyte layer interposed between the dielectric layer and the cathode electrode layer, an insulating region arranged on the anode electrode layer and adjacent to a side of the solid electrolyte layer, an insulating portion interposed between the side of the insulating region and the second side electrode and containing an insulating resin, and a first insulating layer interposed between the insulating region and the cathode electrode layer and containing the same resin as the resin included in the insulating region.

The solid electrolytic capacitor according to one embodiment of the present disclosure includes a protective layer interposed between the insulating portion and the cathode electrode layer in the solid electrolytic capacitor of any one of the embodiments described above. This protective layer is capable of functioning as a mask layer during manufacturing. The mask layer can also be removed by etching during manufacturing.

The solid electrolytic capacitor according to one embodiment of the present disclosure is any one of the solid electrolytic capacitors described above, and includes a protective layer interposed between the insulating portion and the cathode electrode layer.

The solid electrolytic capacitor according to one embodiment of the present disclosure is any one of the solid electrolytic capacitors described above, and includes a protective layer having a resin and a filler and having a higher filler content than the first insulating layer.

The solid electrolytic capacitor according to one embodiment of the present disclosure is any one of the solid electrolytic capacitors described above, and includes an insulating region having the metal contained in the anode electrode layer and the resin contained in the first insulating layer.

The solid electrolytic capacitor according to one embodiment of the present disclosure is any one of the solid electrolytic capacitors described above, and includes an insulating portion having a resin and a filler.

The solid electrolytic capacitor according to one embodiment of the present disclosure is any one of the solid electrolytic capacitors described above, in which the insulating portion is in contact with the cathode electrode layer.

The solid electrolytic capacitor according to one embodiment of the present disclosure is any one of the solid electrolytic capacitors described above, in which a protective layer is interposed between the insulating region and the first insulating layer.

The solid electrolytic capacitor according to one embodiment of the present disclosure is any one of the solid electrolytic capacitors described above, in which the insulating region includes a first region containing the metal contained in the anode electrode layer and the resin contained in the first insulating layer, and the insulating portion includes a resin-filled region adjacent to the first region and containing the resin contained in the first insulating layer, and a first insulating portion adjacent to the resin-filled region and containing resin and filler.

The solid electrolytic capacitor according to one embodiment of the present disclosure is the solid electrolytic capacitor of any one of the embodiments described above, in which the insulating region includes a first region having the metal contained in the anode electrode layer and the resin contained in the first insulating layer, and the insulating portion includes a resin-filled region adjacent to the first region and containing the resin contained in the first insulating layer, a first insulating portion adjacent to the resin-filled region and containing resin, and a second insulating portion interposed between the first insulating portion and the second side electrode and containing filler and resin, in which the resin contained in the first insulating portion is also contained in the resin-filled region, and the second insulating portion has a higher filler content than the first insulating portion.

The solid electrolytic capacitor according to one embodiment of the present disclosure is the solid electrolytic capacitor of any one of the embodiments described above, in which the resin-filled region includes the resin contained in the first insulating layer and the resin contained in the first insulating portion.

The solid electrolytic capacitor according to one embodiment of the present disclosure is the solid electrolytic capacitor of any one of the embodiments described above, in which the position of the side of the anode electrode layer is closer to the second side electrode than to the insulating region.

The method of manufacturing the solid electrolytic capacitor according to one embodiment of the present disclosure includes the processes of: preparing a metal sheet having an anode electrode layer and a roughened layer arranged on the anode electrode layer and having a dielectric layer, forming a protective layer on the metal sheet, supplying resin to the protective layer on the anode electrode layer or to a region adjacent to the region where the protective layer is to be formed, either before or after the formation of the protective layer, so that the resin is absorbed into the roughened layer to form an insulating region, leaving resin on the insulating region to form a first insulating layer, supplying a conductive polymer to the roughened layer to form a solid electrolyte layer, forming a cathode electrode layer on the solid electrolyte layer, stacking solid electrolytic capacitor sheets including the metal sheet and the cathode electrode layer to form a stacked body, forming a first groove in the stacked body at a position passing through the protective layer and exposing the side surface of the roughened layer located directly below the protective layer, etching the exposed side surface of the roughened layer, supplying insulating resin into the space formed by the etching to form an insulating portion adjacent to the insulating region, forming a second groove in the stacked body to expose the side surfaces of the anode electrode layer and the cathode electrode layer, forming a first side electrode on a first side surface of the stacked body, which includes the exposed side surface of the anode electrode layer, forming a second side electrode on a second side surface of the stacked body, which includes the exposed side surface of the cathode electrode layer.

According to the present solid electrolytic capacitor and the method of manufacturing the solid electrolytic capacitor, reliability can be improved.

As described above, it is possible to provide the solid electrolytic capacitor and the method of manufacturing the solid electrolytic capacitor that can improve reliability and/or productivity. The solid electrolytic capacitor of the present disclosure includes a stacked body provided with a plurality of stacked solid electrolytic capacitor elements, a first side electrode arranged on a first side surface of the stacked body, and a second side electrode arranged on a second side surface of the stacked body. The side electrode may include a bent portion, the anode electrode layer may protrude toward the side electrode, and/or an insulating region and an insulating layer may be interposed between the side of the anode electrode layer and the side electrode.

Although various exemplary embodiments have been described above, the present disclosure is not limited to the exemplary embodiments described above, and various omissions, substitutions, and modifications may be made. Additionally, it is possible to combine elements from different embodiments to form other embodiments. Furthermore, from the above explanation, it will be understood that various embodiments of the present disclosure are described herein for explanatory purposes, and that various modifications can be made without departing from the scope and spirit of the present disclosure. Thus, the various embodiments disclosed herein are not intended to be limiting, and the true scope and spirit are indicated by the claims.

What is claimed is:

1. A solid electrolytic capacitor comprising:
a stacked body including a plurality of solid electrolytic capacitor elements being stacked;
a first side electrode arranged on a first side surface of the stacked body; and
a second side electrode arranged on a second side surface of the stacked body,
wherein each of the solid electrolytic capacitor elements includes:
an anode electrode layer electrically connected to the first side electrode,
a dielectric layer arranged on the anode electrode layer,
a cathode electrode layer electrically connected to the second side electrode,
a solid electrolyte layer interposed between the dielectric layer and the cathode electrode layer, and an insulating region arranged on the anode electrode layer and adjacent to a side surface of the solid electrolyte layer, and
wherein a first distance, which is a shortest distance between the anode electrode layer and the second side electrode, is smaller than a second distance, which is a shortest distance between the insulating region and the second side electrode.

2. The solid electrolytic capacitor according to claim 1, comprising an insulating portion interposed between a side surface of the anode electrode layer and the second side electrode and containing an insulating resin,
wherein the insulating region is interposed between the insulating portion and the solid electrolyte layer and contains a material different from a material of the insulating portion.

3. The solid electrolytic capacitor according to claim 2, wherein the insulating portion includes:
a first region laterally adjacent to the anode electrode layer; and
a second region laterally adjacent to the insulating region, and
wherein the second region is softer than the first region.

4. The solid electrolytic capacitor according to claim 3, wherein
the first region includes a resin and a filler;
the second region includes a resin; and
the second region has a content rate of the filler lower than a content rate of the filler contained in the first region.

5. The solid electrolytic capacitor according to claim 1, wherein the anode electrode layer is provided with a protrusion on a side of the second side electrode.

6. A solid electrolytic capacitor comprising:
a stacked body including a plurality of solid electrolytic capacitor elements being stacked;
a first side electrode arranged on a first side surface of the stacked body; and
a second side electrode arranged on a second side surface of the stacked body,
wherein each of the solid electrolytic capacitor elements includes:
an anode electrode layer electrically connected to the first side electrode,
a dielectric layer arranged on the anode electrode layer,
a cathode electrode layer electrically connected to the second side electrode,
a solid electrolyte layer interposed between the dielectric layer and the cathode electrode layer, and
an insulating region arranged on the anode electrode layer and adjacent to a side surface of the solid electrolyte layer,
wherein a first distance between the anode electrode layer and the second side electrode is smaller than a second distance between the insulating region and the second side electrode,
wherein the plurality of solid electrolytic capacitor elements is stacked along a Z-axis direction with an XYZ three-dimensional orthogonal coordinate system set and with a direction from the first side electrode to the second side electrode defined as a positive direction of an X-axis,
wherein the anode electrode layer is provided with a protrusion on a side of the second side electrode, and
wherein an angle θ formed between the Z-axis passing through a position in the X-axis direction determining the second distance of the insulating region and a contour line of the protrusion at a position of an intersection of the Z-axis and the protrusion in an XZ plane satisfies a condition of 90°<θ.

7. A solid electrolytic capacitor comprising:

a stacked body including a plurality of solid electrolytic capacitor elements being stacked;

a first side electrode arranged on a first side surface of the stacked body; and a second side electrode arranged on a second side surface of the stacked body, wherein each of the solid electrolytic capacitor elements includes:

an anode electrode layer electrically connected to the first side electrode, a dielectric layer arranged on the anode electrode layer, a cathode electrode layer electrically connected to the second side electrode, and a solid electrolyte layer interposed between the dielectric layer and the cathode electrode layer, an insulating region arranged on the anode electrode layer and adjacent to a side surface of the solid electrolyte layer, and wherein the anode electrode layer is provided with a protrusion on a side of the second side electrode, and the protrusion protrudes outwardly from the insulating region.

8. A solid electrolytic capacitor comprising:

a stacked body including a plurality of solid electrolytic capacitor elements being stacked;

a first side electrode arranged on a first side surface of the stacked body; and a second side electrode arranged on a second side surface of the stacked body, wherein each of the solid electrolytic capacitor elements includes:

an anode electrode layer electrically connected to the first side electrode, a dielectric layer arranged on the anode electrode layer, a cathode electrode layer electrically connected to the second side electrode, a solid electrolyte layer interposed between the dielectric layer and the cathode electrode layer, an insulating region arranged on the anode electrode layer and laterally adjacent to a side surface of the solid electrolyte layer, an insulating portion interposed between a side surface of the insulating region and the second side electrode and containing an insulating resin, and a first insulating layer interposed between the insulating region and the cathode electrode layer and containing a resin identical to a resin contained in the insulating region, and wherein the insulating region includes the resin contained in the first insulating layer.

9. A solid electrolytic capacitor comprising:

a stacked body including a plurality of solid electrolytic capacitor elements being stacked;

a first side electrode arranged on a first side surface of the stacked body; and a second side electrode arranged on a second side surface of the stacked body, wherein each of the solid electrolytic capacitor elements includes:

an anode electrode layer electrically connected to the first side electrode, a dielectric layer arranged on the anode electrode layer, a cathode electrode layer electrically connected to the second side electrode, a solid electrolyte layer interposed between the dielectric layer and the cathode electrode layer, an insulating region arranged on the anode electrode layer and adjacent to a side surface of the solid electrolyte layer, an insulating portion interposed between a side surface of the insulating region and the second side electrode and containing an insulating resin, and a first insulating layer interposed between the insulating region and the cathode electrode layer and containing a resin identical to a resin contained in the insulating region, and wherein the solid electrolytic capacitor comprises a protective layer interposed between the insulating portion and the cathode electrode layer.

10. The solid electrolytic capacitor according to claim 8, wherein the insulating portion includes a resin and a filler.

11. The solid electrolytic capacitor according to claim 8, wherein the insulating portion is in contact with the cathode electrode layer.

12. The solid electrolytic capacitor according to claim 8, wherein the insulating region comprises a first region including the metal contained in the anode electrode layer and including the resin contained in the first insulating layer, and wherein the insulating portion comprises:

a resin-filled region adjacent to the first region and including the resin contained in the first insulating layer; and a first insulating portion adjacent to the resin-filled region and including a resin and a filler.

13. The solid electrolytic capacitor according to claim 8, wherein the insulating region is provided with a first region including the metal contained in the anode electrode layer and including the resin contained in the first insulating layer, the insulating portion includes, a resin-filled region adjacent to the first region and having the resin contained in the first insulating layer, a first insulating portion adjacent to the resin-filled region and having a resin, and a second insulating portion interposed between the first insulating portion and the second side electrode and having a filler and a resin, the resin contained in the first insulating portion is also contained in the resin-filled region, and the second insulating portion has a higher content rate of the filler contained than the first insulating portion.

14. The solid electrolytic capacitor according to claim 12, wherein the resin-filled region includes:

the resin contained in the first insulating layer; and the resin contained in the first insulating portion.

15. The solid electrolytic capacitor according to claim 8, wherein the anode electrode layer has a side surface positioned closer to the second side electrode than the insulating region.

16. The solid electrolytic capacitor according to claim 8, wherein the insulating region is arranged on the anode electrode layer via a dielectric layer.

17. The solid electrolytic capacitor according to claim 8, wherein the insulating region includes a metal contained in the anode electrode layer and the resin contained in the first insulating layer.

18. The solid electrolytic capacitor according to claim 16, wherein the insulating region includes a metal contained in the anode electrode layer and the resin contained in the first insulating layer.

19. The solid electrolytic capacitor according to claim 16, wherein the thickness of the dielectric layer is from 1 nm to 1 μm.

20. The solid electrolytic capacitor according to claim 9, wherein the protective layer includes a resin and a filler, and has a content rate of the filler higher than that of the first insulating layer.

21. A solid electrolytic capacitor comprising:

a stacked body including a plurality of solid electrolytic capacitor elements being stacked;

a first side electrode arranged on a first side surface of the stacked body; and a second side electrode arranged on a second side surface of the stacked body, wherein each of the solid electrolytic capacitor elements includes:

an anode electrode layer electrically connected to the first side electrode, a dielectric layer arranged on the anode electrode layer, a cathode electrode layer electrically connected to the second side electrode, a solid electrolyte layer interposed between the dielectric layer and the cathode electrode layer, an insulating region arranged on the anode electrode layer and adjacent to a side surface of the solid electrolyte layer, an insulating portion interposed between a side surface of the insulating region and the second side electrode and containing an insulating resin, and a first insulating layer interposed between the insulating region and the cathode electrode layer and containing a resin identical to a resin contained in the insulating region, wherein the insulating portion is in contact with the cathode electrode layer; and wherein the solid electrolytic capacitor comprises a protective layer interposed between the insulating region and the first insulating layer.

* * * * *